US012330889B1

(12) United States Patent
Girtman et al.

(10) Patent No.: US 12,330,889 B1
(45) Date of Patent: Jun. 17, 2025

(54) DEPALLETIZING MACHINE

(71) Applicant: BW Integrated Systems, LLC, St. Louis, MO (US)

(72) Inventors: Michael L. Girtman, Imperial, MO (US); Moaz Nabeel, Ballwin, MO (US); Dominic G. Clucas, St. Louis, MO (US); Randall K. Hemingway, Troy, IL (US)

(73) Assignee: BW INTEGRATED SYSTEMS, LLC, St. Louis, MO (US)

( * ) Notice: Subject to any disclaimer, the term of this patent is extended or adjusted under 35 U.S.C. 154(b) by 0 days.

(21) Appl. No.: 18/532,298

(22) Filed: Dec. 7, 2023

Related U.S. Application Data

(60) Provisional application No. 63/415,060, filed on Oct. 11, 2022.

(51) Int. Cl.
  *B65G 61/00*  (2006.01)
  *B65G 43/00*  (2006.01)
  *B65G 59/04*  (2006.01)

(52) U.S. Cl.
  CPC .............. *B65G 61/00* (2013.01); *B65G 43/00* (2013.01); *B65G 59/04* (2013.01); *B65G 2201/0267* (2013.01); *Y10S 414/108* (2013.01)

(58) Field of Classification Search
  CPC ........................ B65G 2814/031; B65G 59/02; B65G 59/026; B65G 57/03; B65G 57/24; B65G 57/00; B65G 57/22; B65G 1/1373; B65G 60/00; B65G 61/00; B65G 59/023; B65G 59/005; B65G 47/088; B65G 2201/0252
  See application file for complete search history.

(56) References Cited

U.S. PATENT DOCUMENTS 4,809,965 A * 3/1989 Vander Meer ....... B65H 3/0816
  414/789.5
5,139,388 A * 8/1992 Martin ................. B65G 57/245
  414/922

(Continued)

FOREIGN PATENT DOCUMENTS

GB       2168024 A  *  6/1986  ........... B65G 57/245
WO   WO-9742114 A1  * 11/1997  ........... B65G 47/088

*Primary Examiner* — Gregory W Adams
(74) *Attorney, Agent, or Firm* — Ralph E. Jocke; WALKER & JOCKE

(57) ABSTRACT

A depalletizing machine (10) is operative to separate layers of containers (38) that are positioned in supported connection with a pallet (36). The layers are separated on the pallet by dunnage sheets (42). A top frame (44) is positioned on top of the layers of containers. The machine operates to remove the top frame and dunnage sheets and sequentially sweep each layer of containers onto a take away and holding conveyor (24). A pick head (66) is operative to engage the top frame and dunnage sheets. Dunnage sheet grippers (170) and a dunnage sheet leveler (220) operate to assure that the containers are reliably removed while maintaining the proper orientation. The exemplary machine further operates to collect the top frame and dunnage sheets and place them on the empty pallet from which the containers have been removed. Mixed dunnage stacks including returned pallets are separated through operation of a dunnage separating cell (26) to facilitate the reuse of the dunnage material.

19 Claims, 102 Drawing Sheets

SHEET DROP INTO THE DUNNAGE TRAY

(56) References Cited

U.S. PATENT DOCUMENTS

| | | | | |
|---|---|---|---|---|
| 5,310,307 | A * | 5/1994 | VanderMeer | B65G 59/026 414/796.8 |
| 6,106,220 | A * | 8/2000 | Ouellette | B65G 57/005 414/796.8 |
| 6,658,816 | B1 * | 12/2003 | Parker | B65G 57/005 414/788.1 |
| 6,915,895 | B2 * | 7/2005 | Morikazu | B65G 59/026 414/789 |
| 9,481,530 | B2 * | 11/2016 | Brandmüller | B65G 61/00 |
| 2007/0248446 | A1 * | 10/2007 | Wildner | B65G 61/00 414/788 |
| 2021/0188571 | A1 * | 6/2021 | Yohe | B65G 59/02 |
| 2021/0221628 | A1 * | 7/2021 | Yohe | B65G 57/04 |

\* cited by examiner

FRONT VIEW-DUNNAGE PICK HEAD

FLOAT CYLINDER-RETRACTED (FLOAT DURING SHEET PICKING)

SECTION VIEW-EOAT FLOAT COMPLIANCE

FLOAT CYLINDER-EXTENDED (RIGID UPON SHEET PICKING)

DUNNAGE PICK HEAD COMPLIANCE - UNEVEN LAYER - 1

DUNNAGE PICK HEAD COMPLIANCE - UNEVEN LAYER - 2

DUNNAGE PICK HEAD COMPLIANCE - UNEVEN LAYER - 3

TOP VIEW - DUNNAGE STORAGE TRAY

DUNNAGE STORAGE TRAY SCISSOR RETRACTED

DUNNAGE STORAGE TRAY SCISSOR EXTENDED (SHEET GRIPPER IN RETRACTED POSITION)
NOTE: SIDE PLATE REMOVED FOR CLARITY (SHEET GRIPPER IN MIDDLE POSITION)

(SHEET GRIPPER JAWS CLAMPED WITH SHEET)

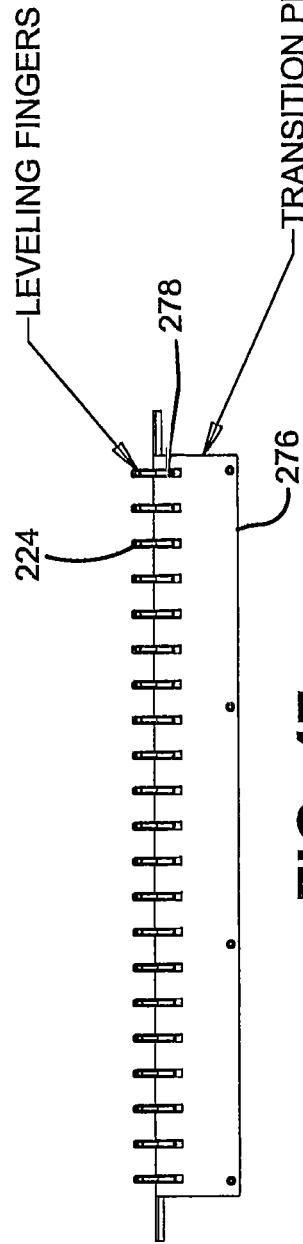
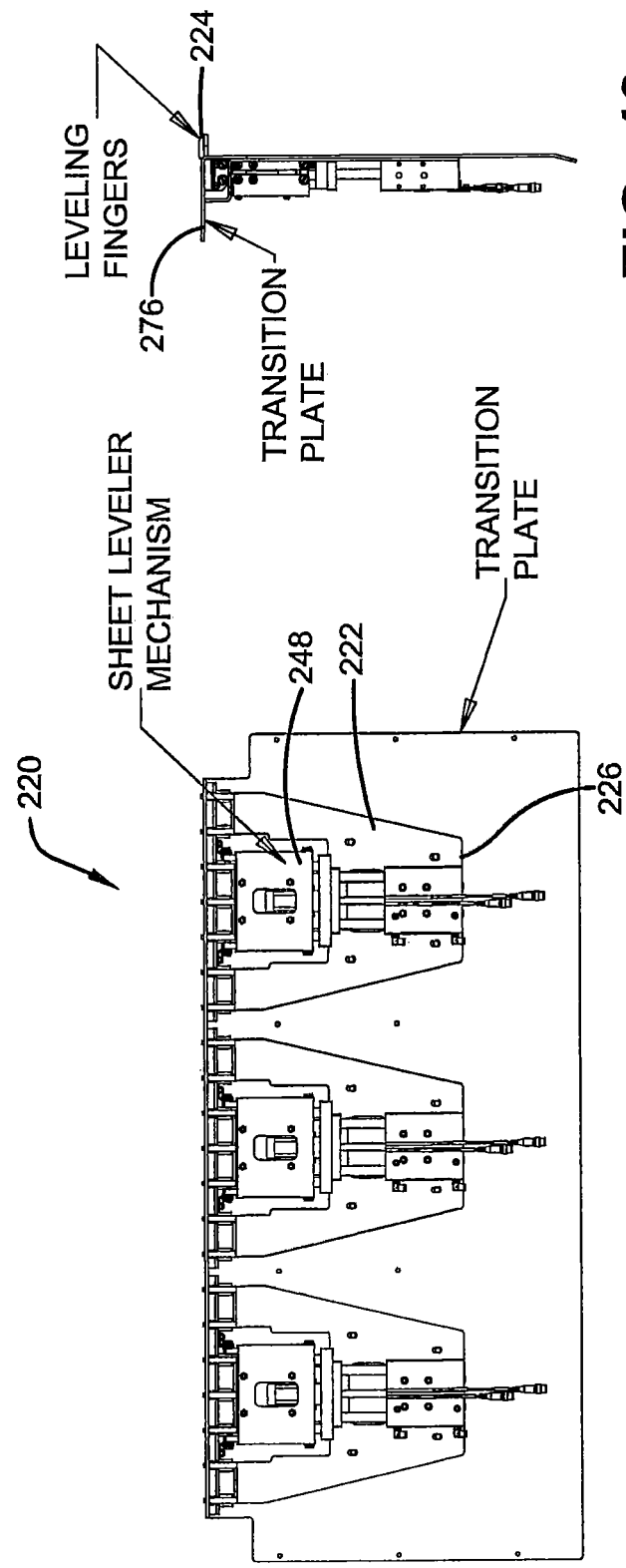

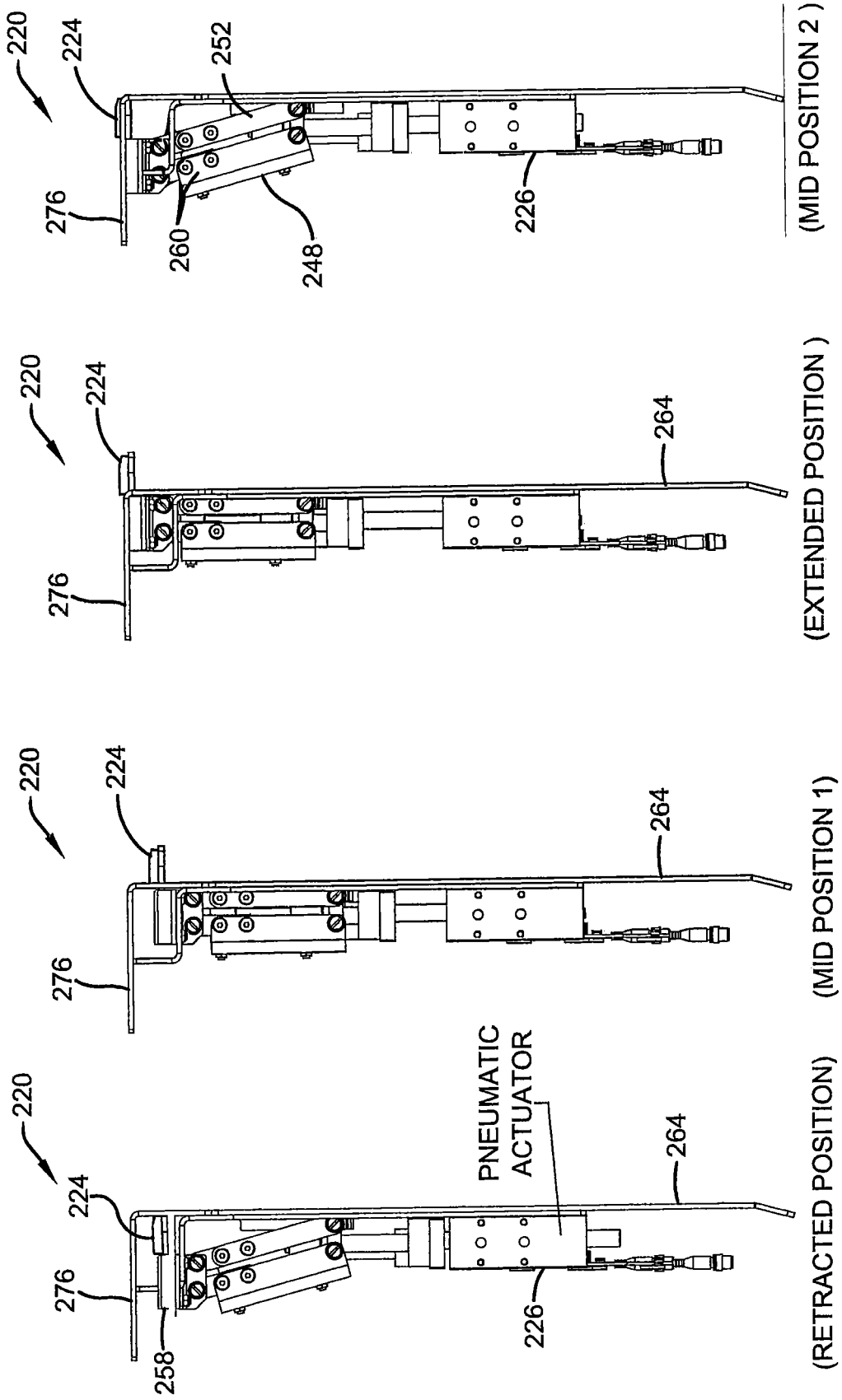

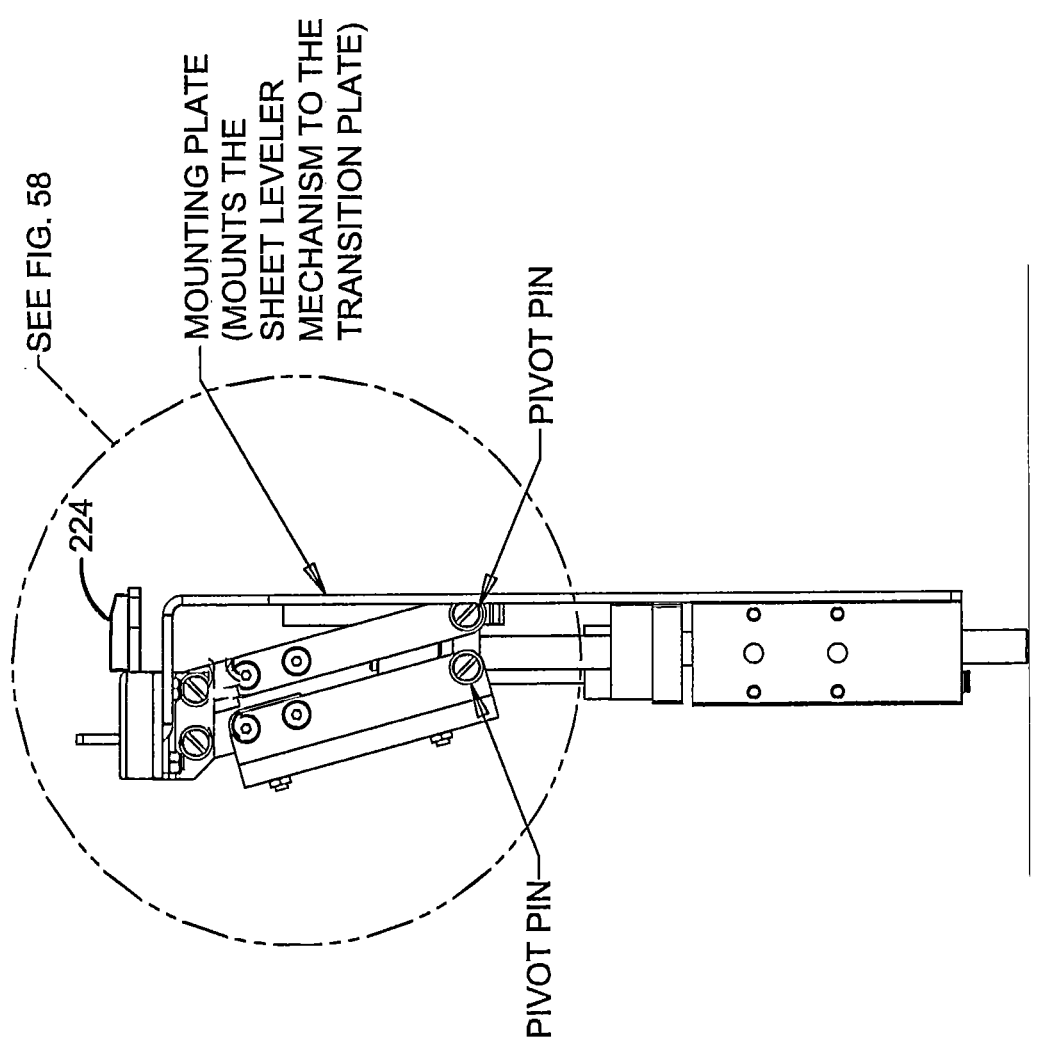
FIG. 57 (RETRACTED POSITION)

(MID POSITION 2)

INDEPENDENTLY DRIVEN PAIRS OF SWEEP BARS

SWEEP BARS POSITION AND MOVEMENT - 1

SIDE VIEW OF THE MACHINE

SWEEP BARS POSITION AND MOVEMENT - 2

SWEEP BARS POSITION AND MOVEMENT

DUNNAGE STORAGE TRAY SCISSOR EXTENDED (MIXED DUNNAGE TRAVEL FROM THE DEPALLETIZER TO THE ROBOT CELL AT FLOOR LEVEL)

(MIXED DUNNAGE END STOP POSITION ON THE PICK CONVEYOR FOR TOP FRAME AND SHEET PICK)

FIG. 93 (AUXILLARY PALLET PICK POSITION)

(AUXILLARY PALLET DROP POSITION FOR SHEETS)

FIG. 95 (TOP FRAME AND SHEET PICK POSITION)

FIG. 96 (TOP FRAME AND SHEET PICK POSITION)

FIG. 98 (TOP FRAME DROP POSITION)

FIG. 99 (SHEET PICK POSITION)

FIG. 100 (TOP FRAME DROP POSITION)

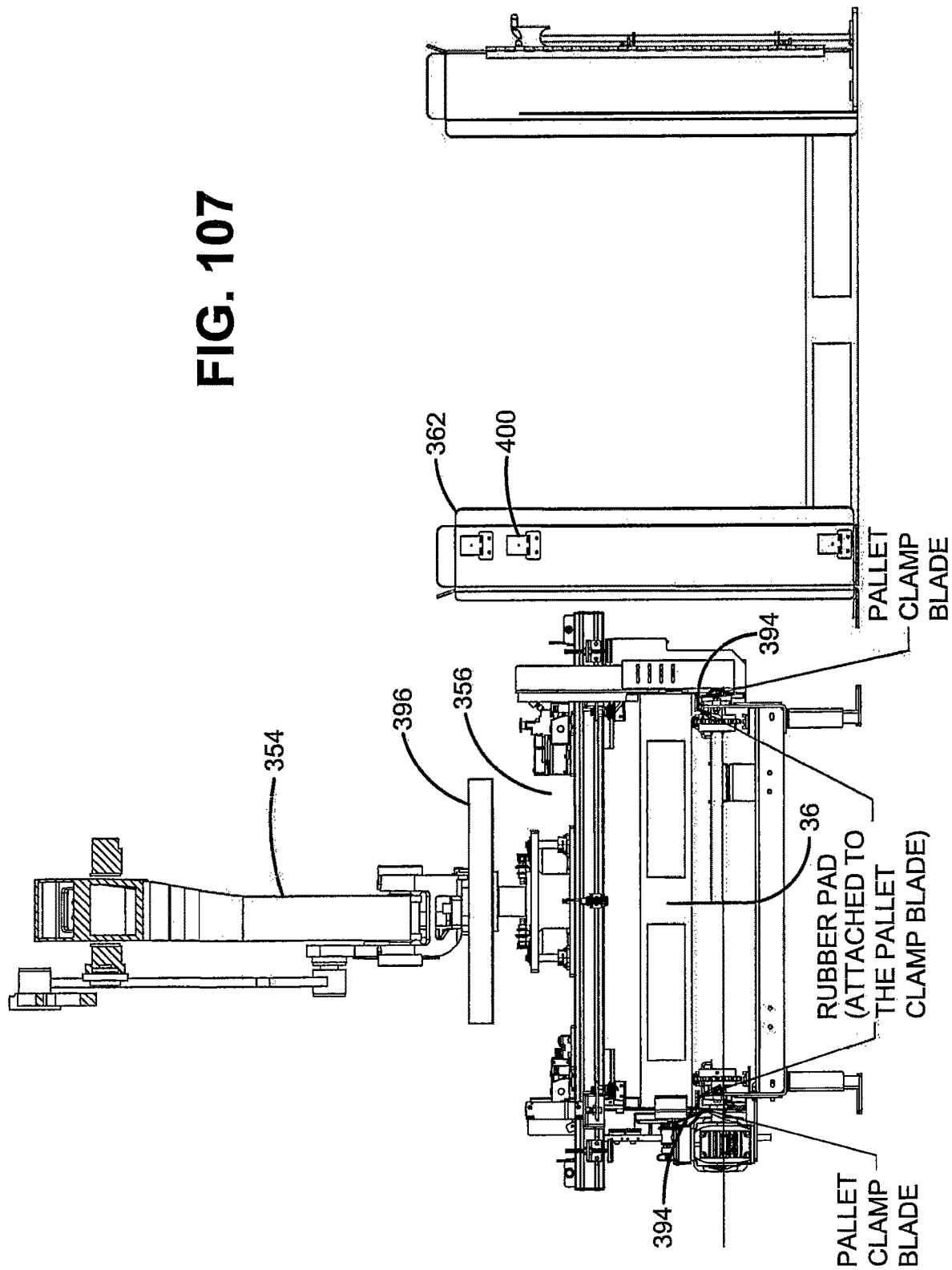

DEPALLETIZING MACHINE

TECHNICAL FIELD

Exemplary arrangements relate to machines and systems that operate to remove containers such as cans or bottles from a pallet or similar support structure, and deliver such containers to an accumulation conveyor for delivery to a subsequent operation such as washing and/or filling.

BACKGROUND ART

Containers that are configured to hold liquid or solid materials may be delivered in bulk for subsequent processing. Large numbers of such containers may be delivered on a single pallet. Considerable effort and complexity is often involved in removing containers from the pallet and orienting them in a suitable manner for subsequent operations such as washing, filling and labeling. Considerable effort and complexity may also be involved in removing and handling the dunnage, pallets and other structures that are used to hold the containers in position during transport.

Machines and systems that remove containers from pallets for further processing may benefit from improvements.

SUMMARY

Exemplary arrangements relate to a machine that operates to depalletize containers such as cans or bottles, and place the containers in a suitable position for further processing such as washing, filling and/or labeling. Exemplary arrangements are further operative to handle the dunnage, pallets and other structures which support the containers during transport and recover such structures for reuse.

BRIEF DESCRIPTION OF DRAWINGS

FIGS. 45-64 show an exemplary sheet leveler that is operative to vertically position the dunnage sheet so that containers supported on the top of the dunnage sheet can be horizontally moved off the dunnage sheet to a transition plate and container take away and holding conveyor.

FIGS. 89-107 shown an exemplary dunnage separation cell portion of the exemplary machine.

DETAILED DESCRIPTION

Figure 1:
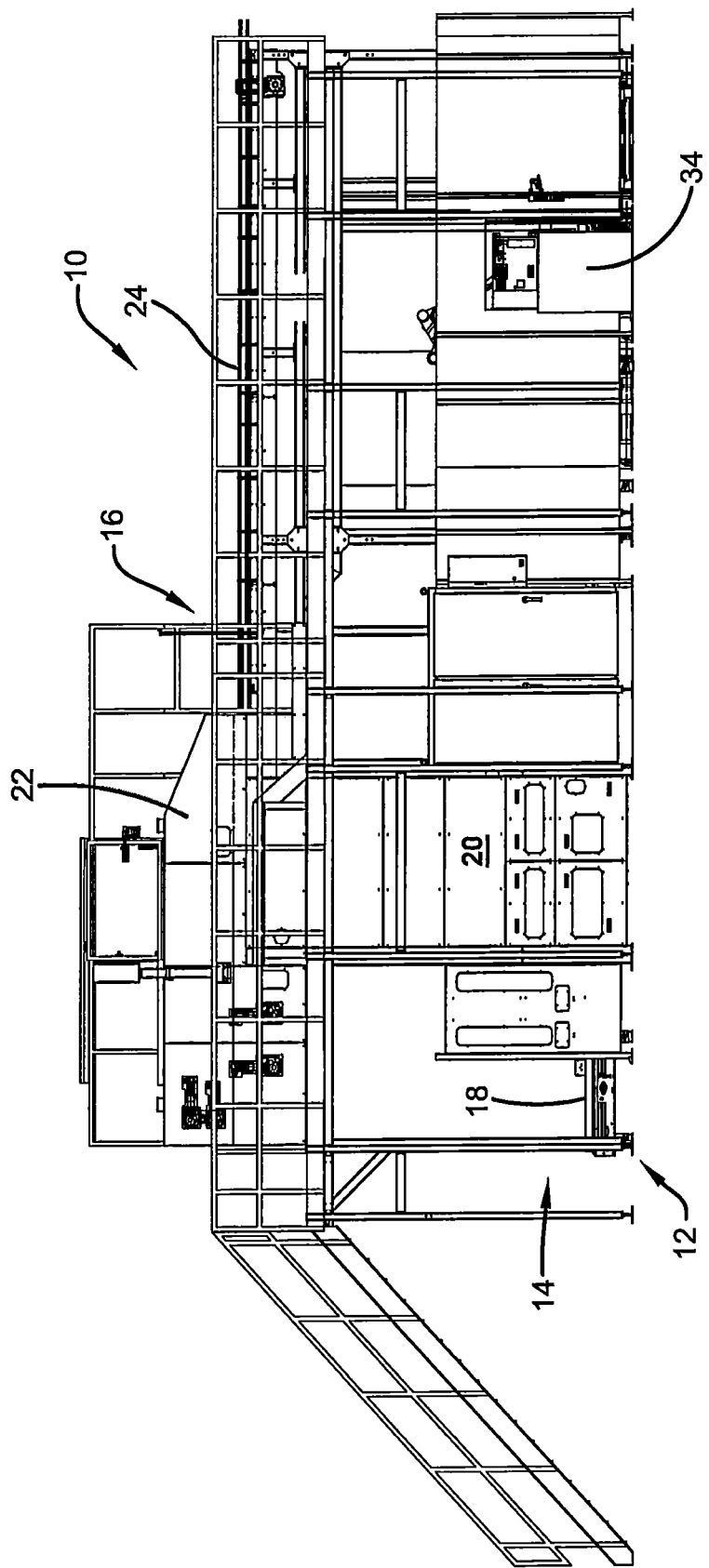
FIGS. 1-3 are right side, left side and top views respectively of an exemplary depalletizing machine.
Figure 2:
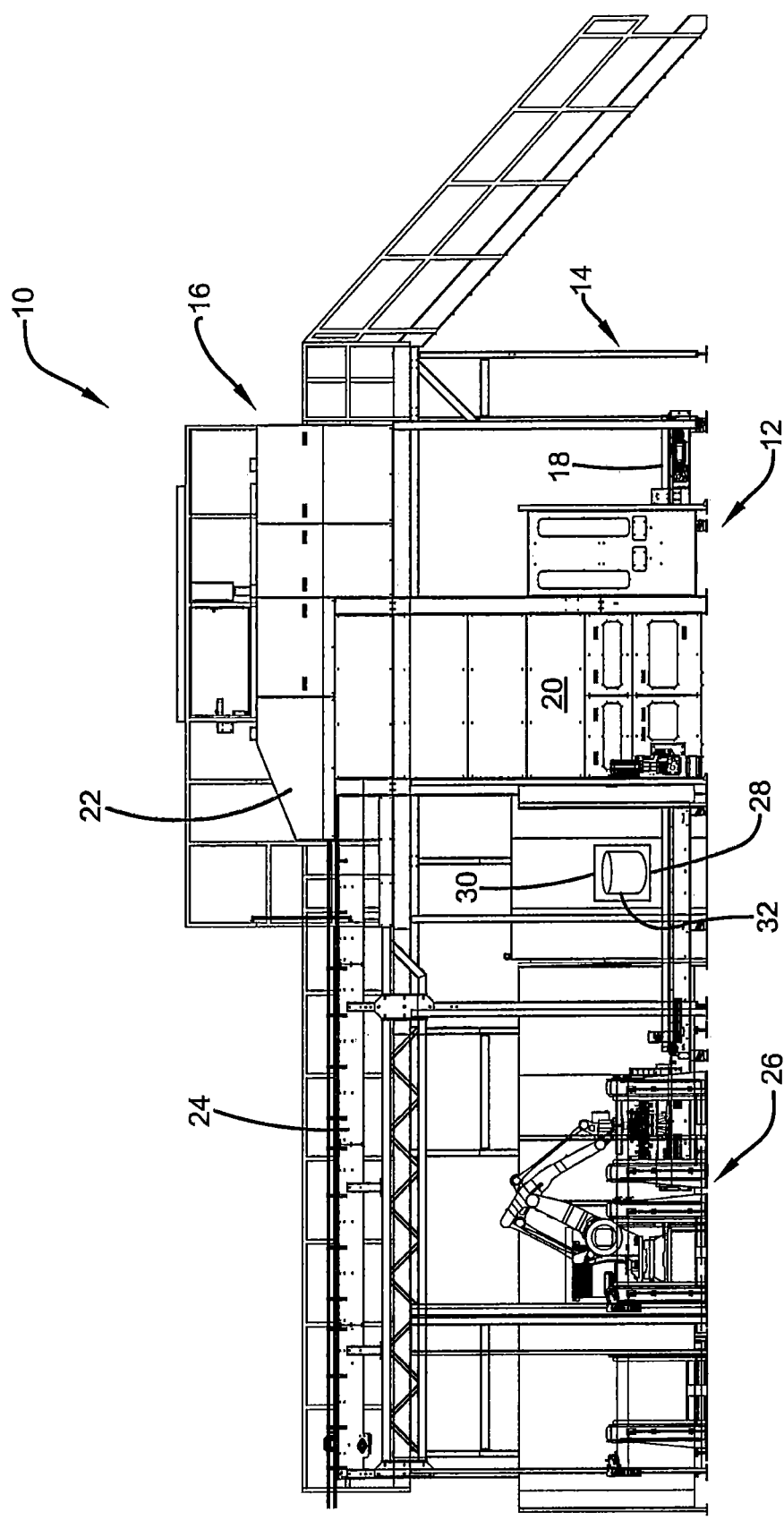
Figure 3:
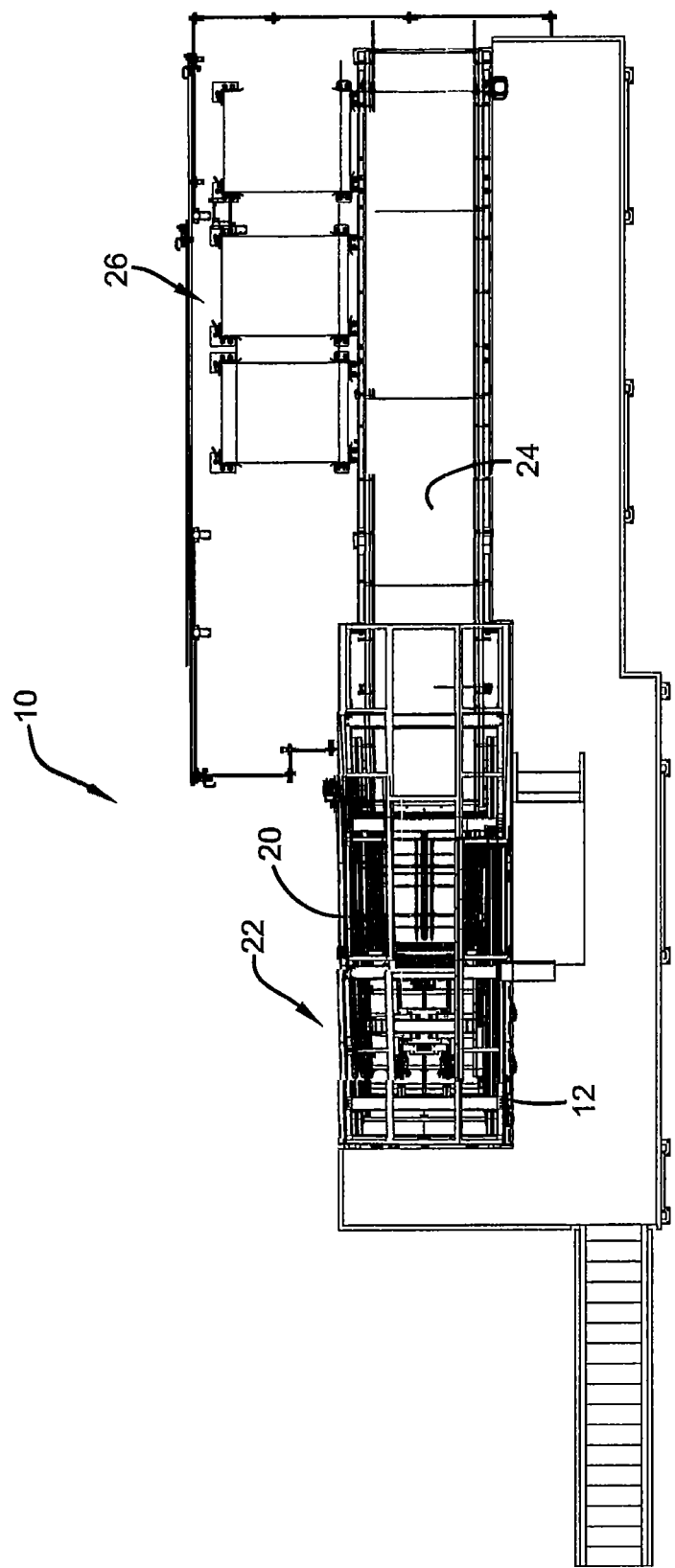

Referring now to the drawings and particularly to FIG. 1 there is shown therein an exemplary depalletizing machine generally indicated 10. The exemplary machine includes a frame body generally indicated 22 which supports the machine components. The exemplary machine includes a lower level 14 and an upper level 16. The exemplary machine includes suitable guards and other features for safety purposes as well as stairs and other access openings for servicing of the machine. In the exemplary arrangement on the lower level 14 the machine includes at least one pallet conveyor including a pallet receiving conveyor 18 that is operative to receive a pallet including containers as later discussed. The machine further includes a pallet hoist area 20 with a hoist that operates to elevate pallets holding containers so that the containers reach the upper level 16 of the machine.

The exemplary machine further includes on the upper level a separating area 22. In the separating area the containers are separated from the dunnage and associated pallet and placed onto a container take away and holding conveyor 24 which is alternatively referred to herein as a take away conveyor. The separating area also serves to hold the separated top frame and dunnage sheets which are used to position the containers on the pallet. The devices in the separating area act in a manner later described in detail to stack and place the dunnage sheets and top frame back onto the pallet after all the containers have been removed from the pallet. This enables the pallet hoist to move the separated dunnage materials along with the pallet to the lower level 14. The lower level further includes a dunnage separation cell 26. The exemplary dunnage separation cell operates to separate dunnage sheets, top frames and pallets and place them in stacked relation in designated areas to facilitate the transport and reuse thereof.

The exemplary depalletizing machine includes at least one controller schematically indicated 28. The exemplary controller includes one or more circuits which are operative to communicate electrical signals with the sensors and other devices that indicate the existence of conditions at or within the various portions of the machine. The signals also control the operation of the motors, valves, solenoids and other devices that are operative to carry out the operations and functions of the machine. In the exemplary arrangement the at least one controller includes at least one circuit including a processor 30 and at least one data store 32. The exemplary controllers are in operative connection with one or more user interfaces such as for example control panel 34. In exemplary arrangements the processor may include a processor suitable for carrying out computer executable instructions that are stored in the one or more associated data stores. The processor includes or is in operative connection with a nonvolatile storage medium including instructions such as a basic input/output system (BIOS) or other interfaces. For example exemplary processors may correspond to one or more of a combination of a CPU, FPGA, ASIC or other integrated circuit or other type of circuit that is capable of processing data and instructions. The exemplary data stores may correspond to one or more of nonvolatile or volatile memories such as random access memory, flash memory, magnetic memory, optical memory, solid-state memory or other mediums that are operative to store non-transitory computer executable instructions and data. Processor executable instructions may include instructions in any of the plurality of programming languages and formats including without limitation, routines, subroutines, programs, threads of execution, objects, methodologies, scripts and functions which carry out the actions such as those described herein. Structures for processors may include, correspond to and utilize the principles described in the textbook entitled Microprocessor Architecture, Programming and Applications with the 8085 by Ramesh S. Gaonker, Sixth Edition (Penram International Publishing 2013) which is incorporated herein by reference in its entirety.

The exemplary data stores used in connection with controllers of exemplary arrangements may include one or more of several types of mediums suitable for holding non-transitory processor circuit executable instructions. This may include for example, magnetic media, optical media, solid-state media or other types of media which comprise RAM, ROM, PROM, flash memory, computer hard drives, solid-state memory or other form of media suitable for holding data and/or computer executable instructions. Exemplary controllers may further include other components such as suitable hardware and/or software interfaces for communication with devices of the machine as well as with remote devices and systems.

In operation of the exemplary machine 10 a pallet 36 supporting multiple layers 38 of containers 40 is received on the pallet receiving conveyor 18. In the exemplary arrangement shown the containers 40 are cans which have been formed but which do not yet have tops or lids. However in other arrangements the containers may include other types of filled or empty containers such as bottles, casks or other structures that are suitable for holding solid, liquid, semi-solid or similar materials.

In the exemplary arrangement the layers 38 of containers are separated from each layer above and below by a dunnage sheet 42. In exemplary arrangements a dunnage sheet 42 is also positioned intermediate of the bottom layer of containers and the pallet. In exemplary arrangements the dunnage sheets may be comprised of material that is suitable for supporting the containers and also enabling the containers to disengage therefrom. In exemplary arrangements dunnage sheets may be comprised of cardboard, plastic, or other materials that are suitable for supporting the containers thereon. A dunnage sheet 42 is also positioned between the top layer of containers and a top frame 44. The top frame 44 bounds the top of the stack of container layers and dunnage at an end opposed of the pallet 36. In exemplary arrangements retainers such as nylon straps, plastic wrap or other types of members that operate to hold the layers in position between the top frame and the pallet are used to hold the cans in position during transport to the machine. In exemplary arrangements the straps or other retainers are separated from the stack and the pallet before it is fed into the pallet receiving conveyor. However in other arrangements a cutting and removal device may be incorporated into the machine to automatically remove the retainers from the pallet while the pallet is in the machine. As can be appreciated numerous different approaches can be taken.

Figure 4:
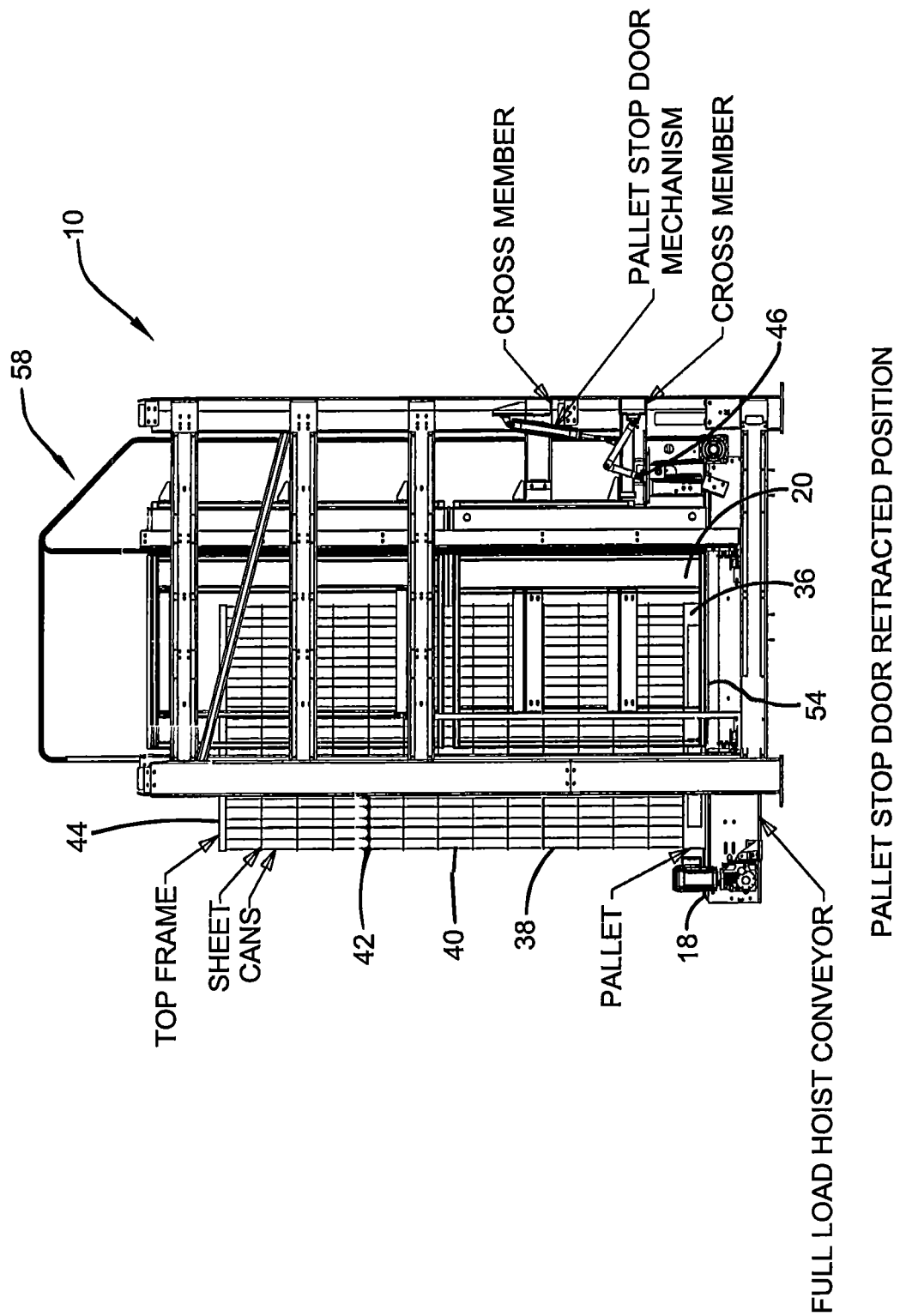
FIG. 4 shows the exemplary machine receiving a pallet which supports a plurality of layers of containers in the form of cans.
Figure 5:
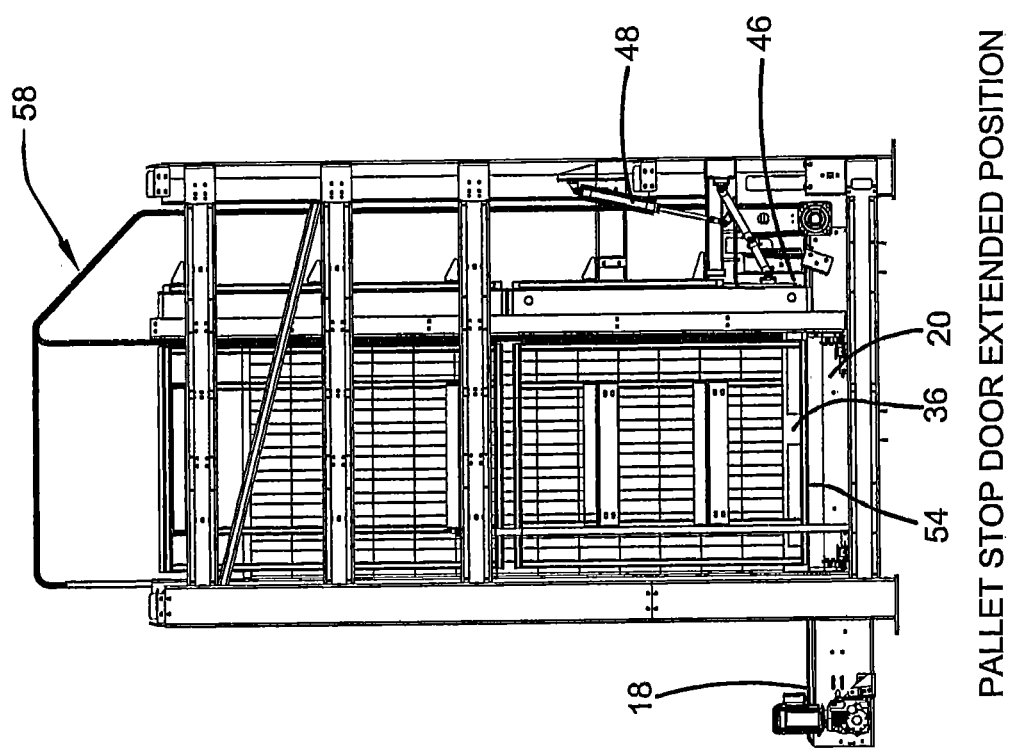
FIGS. 5 and 6 are side and top views respectively of the pallet and cans engaged with a hoist table.
Figure 6:
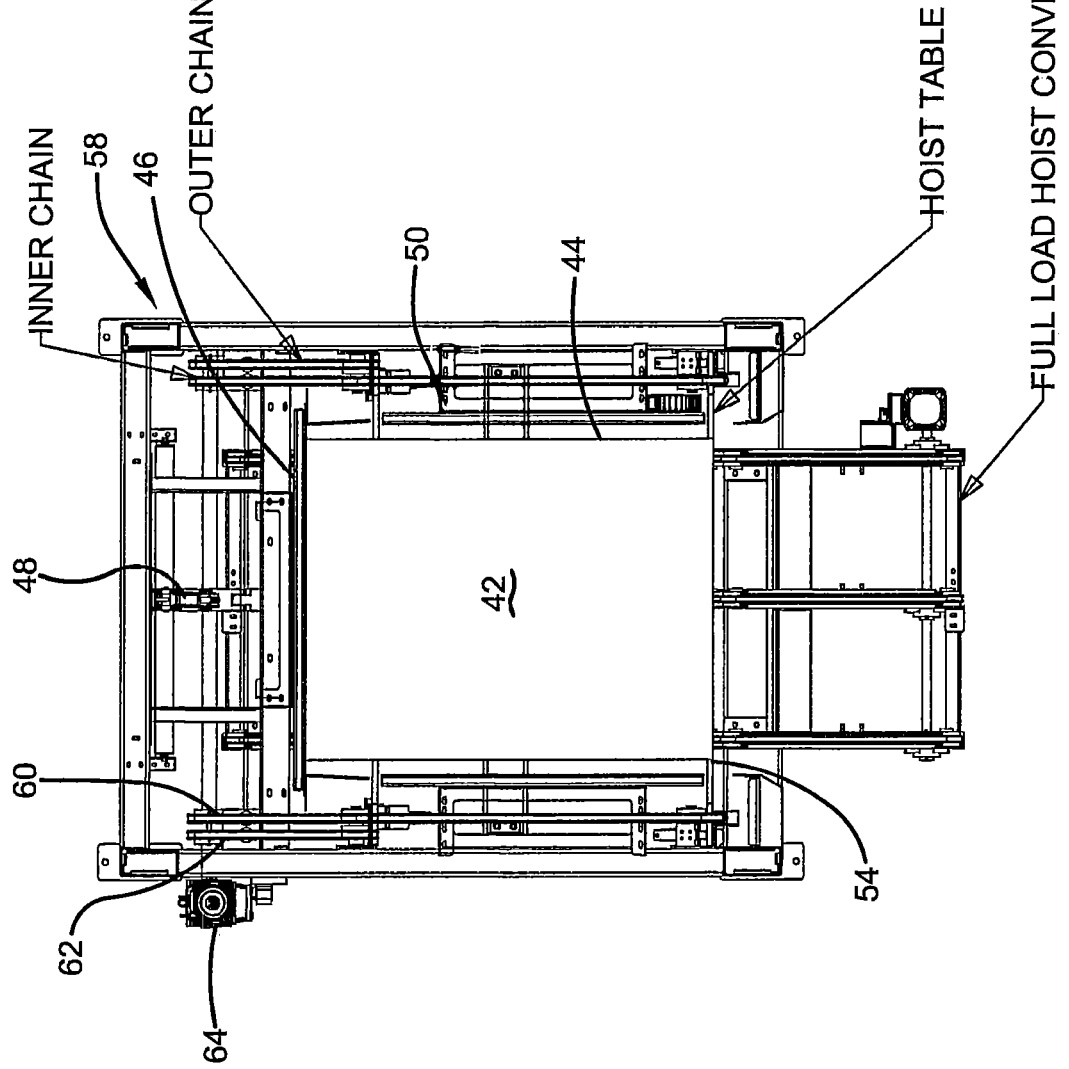
Figure 7:
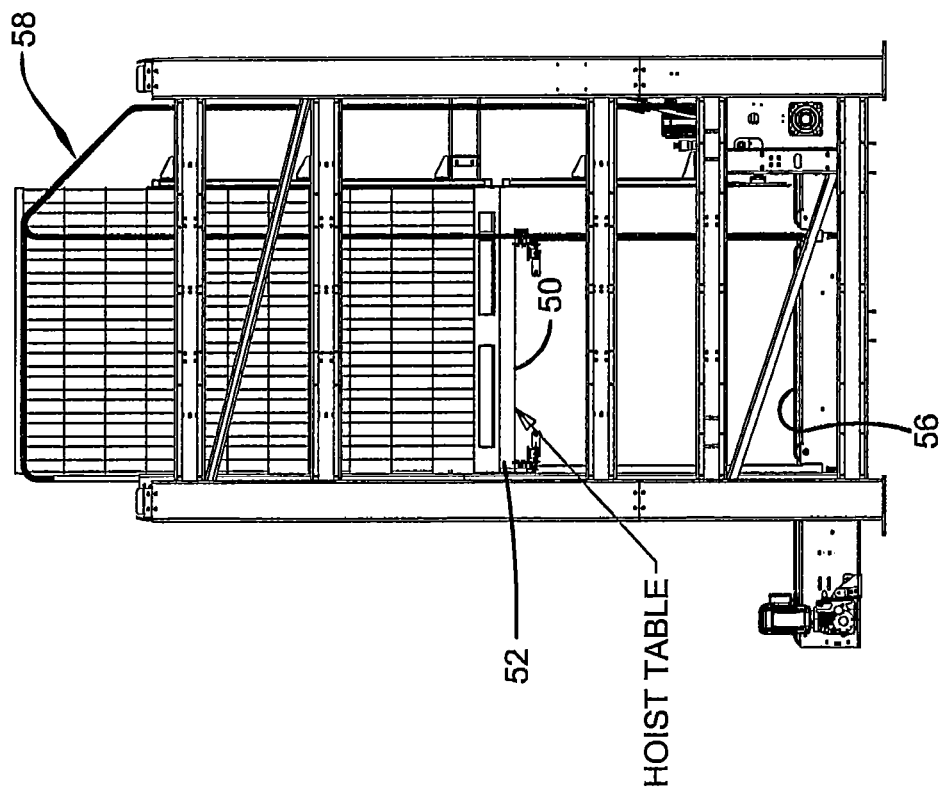
FIGS. 7 and 8 show the pallet and the cans raised from the initial receiving position on a hoist table of the machine.
Figure 8:
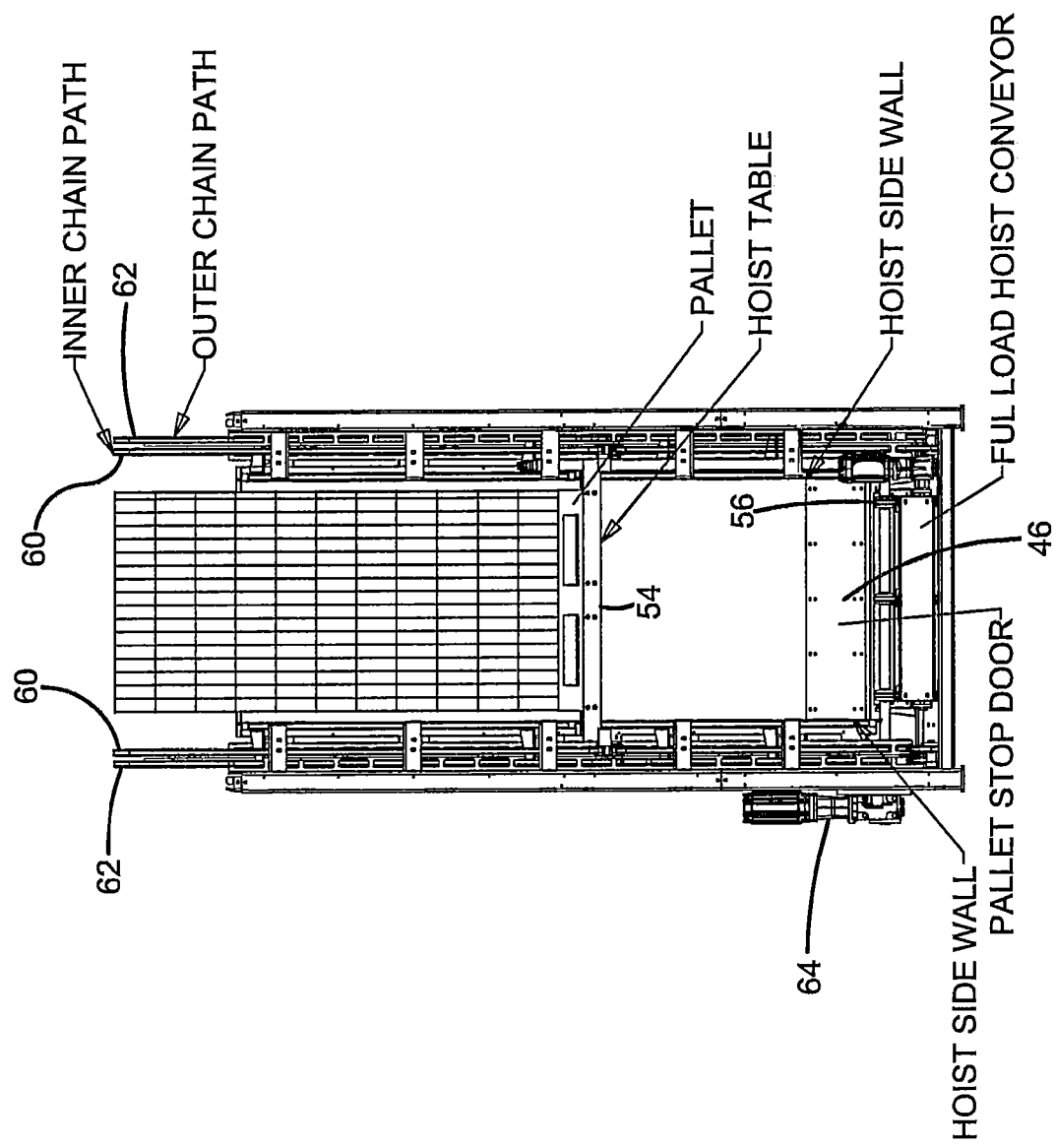

As represented in FIG. 4 the pallet that is in supporting connection with the cans is moved on the pallet receiving conveyor 18 into the pallet hoist area 20 of the machine. As represented in FIG. 5 the pallet is moved responsive to operation of the controller by the conveyor belts 56 or other moving members of the pallet receiving conveyor 18 into the hoist area 20 until the pallet is moved into immediately adjacent relation with a pallet stop door 46 that is in a closed position. In the exemplary arrangement the pallet stop door 46 is on an opposed side of an open side of the hoist area 20 into which the pallet and containers are received. As later discussed the pallet stop door is in operative connection with an actuator 48 which is controlled by the at least one controller 28 responsive to its programming and suitable sensors which are operative to detect a pallet in position in the hoist area.

The exemplary hoist area 20 includes a pallet hoist 50. The exemplary pallet hoist 50 is comprised of a pair of horizontally spaced base members 52 which are part of a hoist table 54 that is configured to engage the bottom of the pallet 36. The exemplary hoist table comprises the base members and other suitable components that are configured to engage and lift the pallet through engagement therewith without interfering with the plurality of horizontally spaced conveyor belts 56 that are operative to support the bottom of the pallet as it enters and leaves the pallet hoist area 20. The hoist table 54 is connected to a plurality of drive chains or similar driving members 58. In the exemplary arrangement the drive chains 58 include an inner drive chain 60 and outer drive chain 62 on each horizontal side of the pallet hoist. In the exemplary arrangement the inner drive chain 60 is in operative connection with the outward end of the hoist table 54 while the outer drive chain 62 is operatively connected to the inward end of the hoist table. In the exemplary arrangement the drive chains 58 are in operative connection with a hoist table drive 64 which is controlled through operation of the at least one controller. The exemplary hoist table drive is connected to each of the drive chains 58 through suitable shaft and sprocket arrangements. This assures that the hoist table is moved selectively upward and downward responsive to the hoist table drive in a manner that is consistently level throughout the range of motion of the hoist table. Of course it should be understood that this arrangement is exemplary and in other arrangements other approaches may be used.

Figure 9:
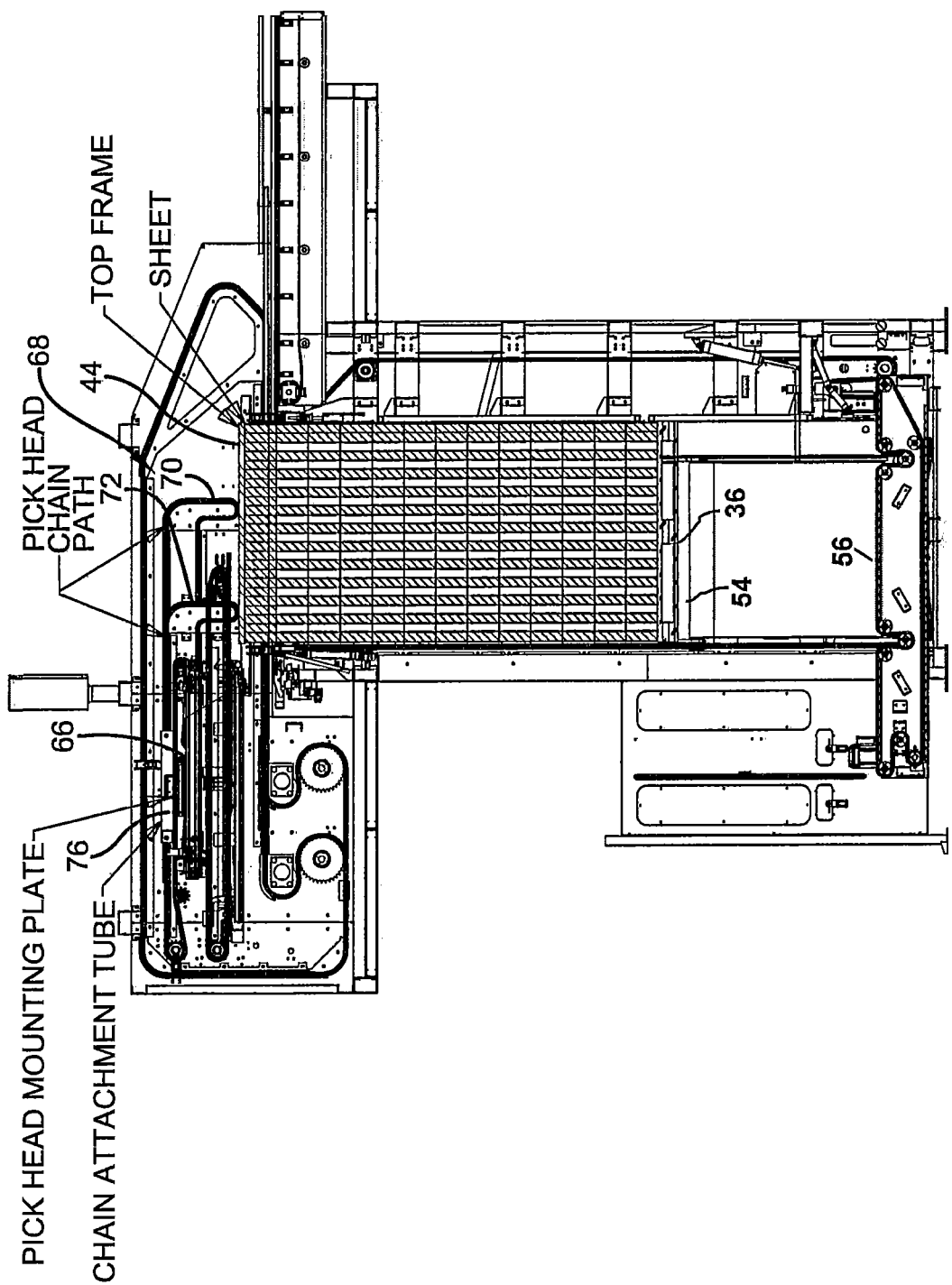
FIGS. 9 and 10 are side and top views respectively of the cans on a pallet that has been raised by the hoist table to a level at which the top frame which bounds the uppermost layer of cans is engageable with a pick head.
Figure 10:
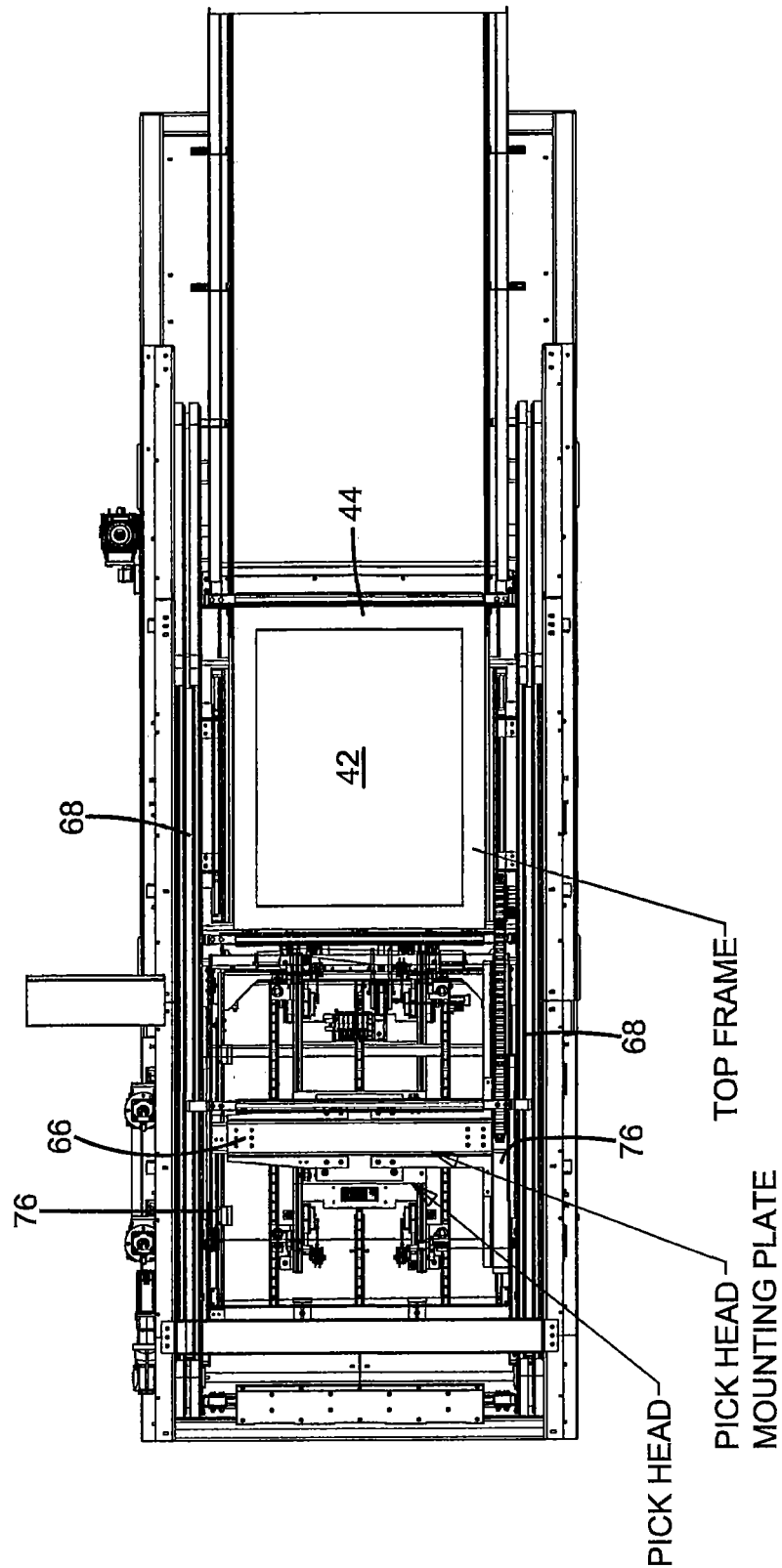

In the exemplary machine the hoist table operates to elevate the pallet 36 until the top frame is sensed at a suitable level at which the top frame and underlying first dunnage sheet above the first layer of cans can be removed. This is accomplished by the at least one controller of the machine operating responsive to one or more sensors which detect the position of the top frame and/or cans. In this position which is represented in FIG. 9, a pick head 66 of the exemplary machine is operable to engage and move the top frame and to engage and remove the dunnage sheets. In the exemplary arrangement the pick head 66 is in operative connection with a plurality of pick head chains 68. A pair of pick head chains extend on each horizontal side of the pick head 66. The pick head chains on each horizontal side of the pick head include a front pick head chain 70 and a back pick head chain 72.

The exemplary pick head includes a central mount bracket 74. The central mount bracket is connected to a chain attachment tube 76. A chain attachment tube 76 extends on each horizontal side of the central mount bracket 74. Each front pick head chain 70 is operatively connected to a forward end of the chain attachment tube 76 while each back pick head chain 72 is operatively connected to a rear area of the chain attachment tube 76. In the exemplary arrangement the front pick head chain and the back pick head chain on each horizontal side of the pick head are horizontally disposed from one another. As shown in FIG. 9 each of the pick head chains 68 has a chain path that enables selectively moving the pick head forward to be in overlying relation with the hoist table of the pallet hoist, top frame, dunnage sheets and cans, as well as selectively vertically downward and upward so that the components of the pick head can engage and move the top frame and dunnage sheets in a manner like that later discussed. Further the paths of the pick head chains enable moving the pick head vertically and horizontally away from overlying relation with the pallet hoist. Each of the pick head chains is in operative connection with a suitable drive such as a motor that operates responsive to the controller to move the pick head to the desired location to carry out the desired function. Of course it should be understood that this approach for moving the pick head is exemplary and other arrangements other approaches may be used.

Figure 11:
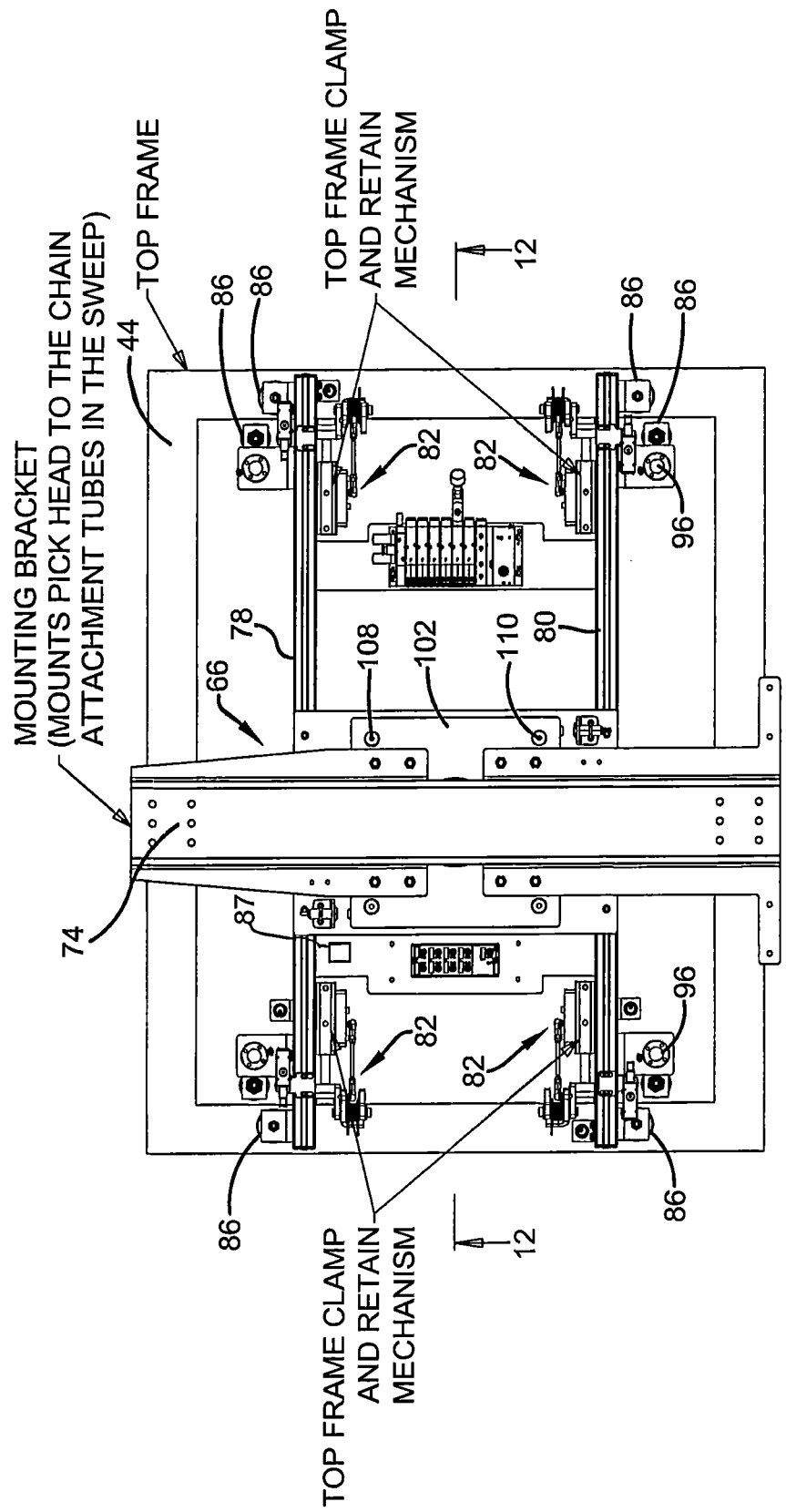
FIG. 11 is a top view of an exemplary pick head.
Figure 12:
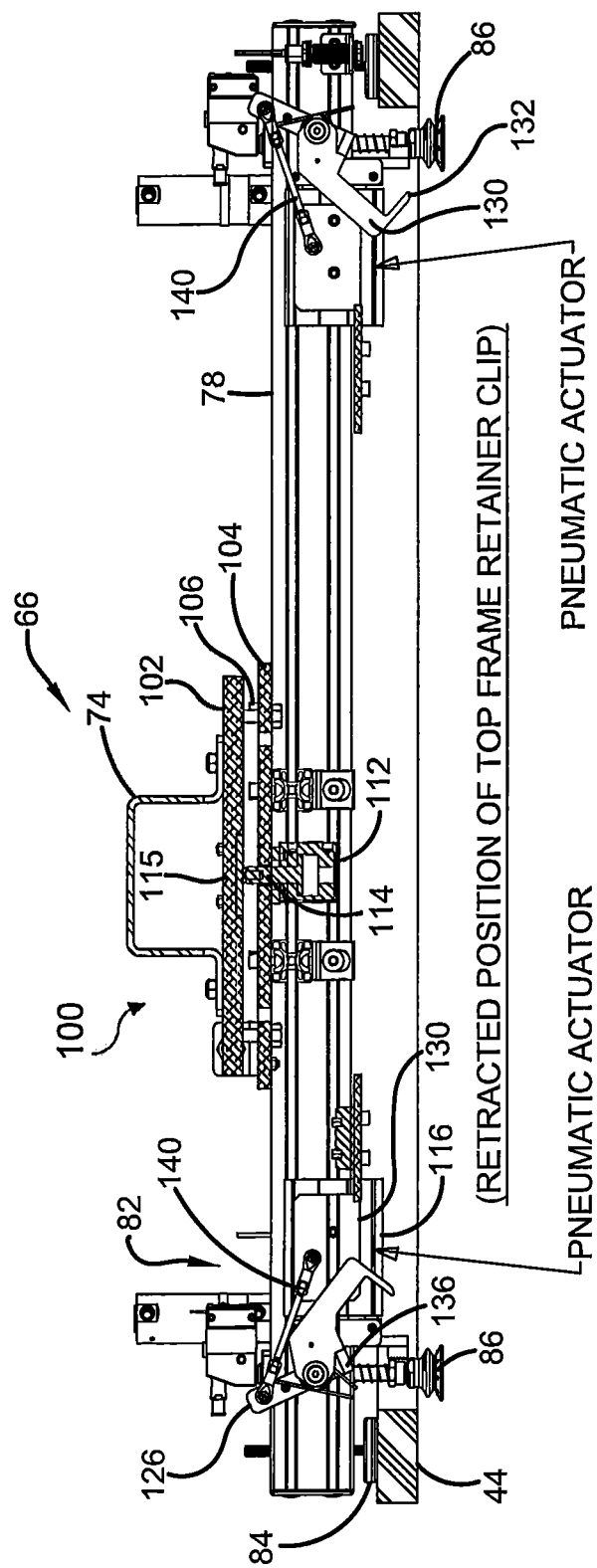
FIGS. 12 and 13 are side views of the pick head and the top frame retaining actuators thereof in the disengaged and engaged positions respectively.
Figure 13:
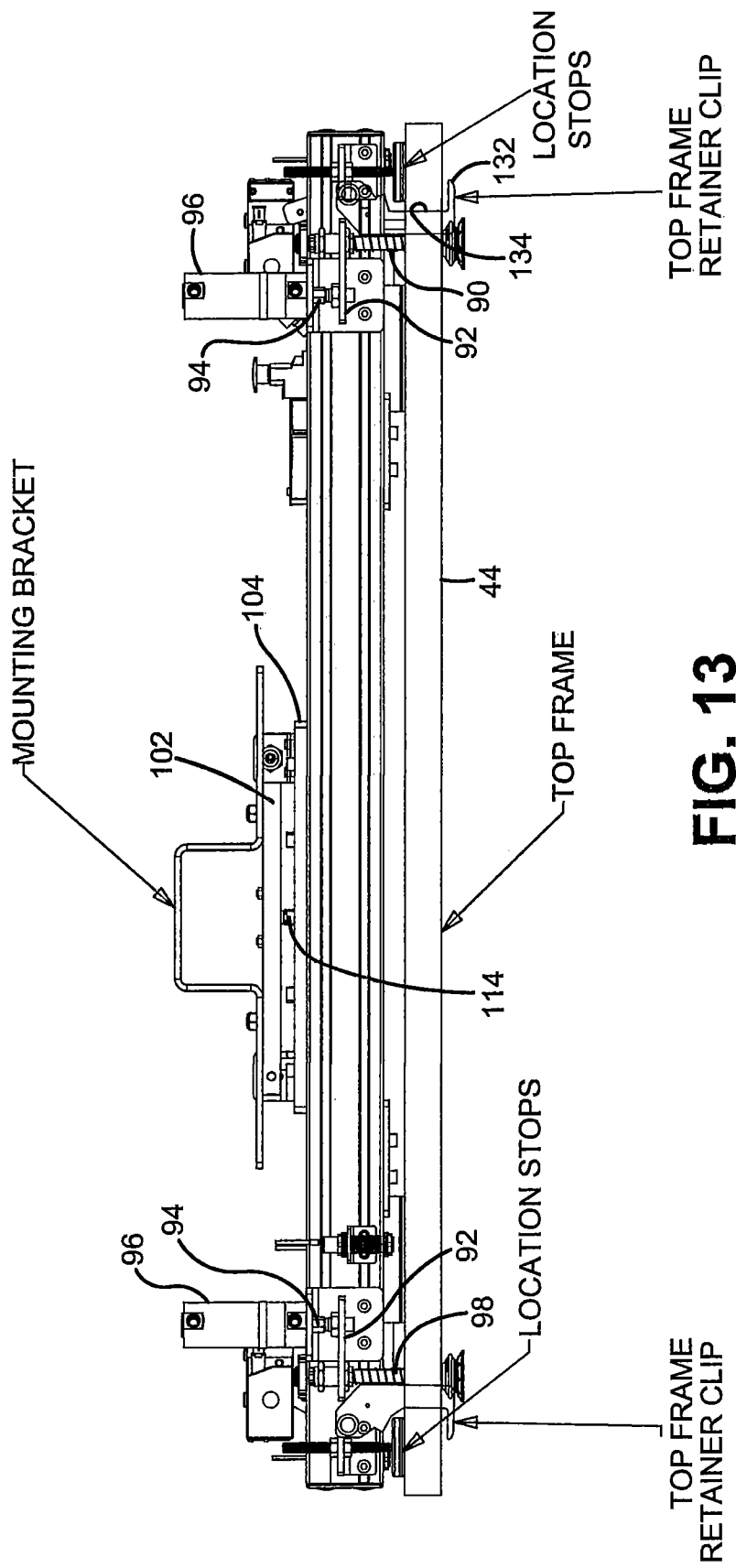

The exemplary pick head 66 includes the central mount bracket 74 which is alternatively referred to herein as a crossmember, and a pair of horizontally disposed frame rails 78, 80 that extend in a longitudinal direction perpendicular to the crossmember. Top frame engaging clamps 82 are positioned at each respective longitudinal end of the frame rails. In the exemplary arrangement the top frame clamps are mounted inboard of the respective frame rails. Downward extending location stops 84 are also positioned adjacent to respective longitudinal ends of the frame rails 78 and 80. As shown in FIGS. 12 and 13 for example, the location stops 84 are configured to engage with the top surface of the top frame 44 in disposed horizontal locations when the pick head 66 is in engagement therewith. As shown in FIG. 11 the exemplary location stops 84 extend on the outboard sides of the frame rails. Of course it should be understood that this arrangement is exemplary and in other arrangements other approaches may be used.

The exemplary pick head 66 further includes a plurality of grab members. The grab members are operative to selectively engage and release dunnage sheets. In the exemplary arrangements the grab members include suction cups 86. Each suction cup is mounted to a downwardly biased vertically moveable spring level compensator 88. The suction cups and spring level compensators are also each mounted adjacent to a respective longitudinal end of the frame rails 78, 80. The upward extending shaft 90 of each spring compensator to which a suction cup is attached includes a fluid passage. The fluid passage is in operative connection with a vacuum pump 87 that is supported on the exemplary pick head, through suitable lines or other conduits, such that a vacuum is selectively drawn on the suction cup. Of course, it should be understood that this structure of grab members is exemplary and in other arrangements structures such as movable fingers, electrostatic plates, surface tension developing structures, hook and loop fasteners or other releasable fasteners, or other structures may be used.

In the exemplary arrangement each exemplary compensator shaft that is attached to a suction cup is mounted to a push off bracket 92. Each push off bracket 92 is in operative connection with a movable rod 94 of a pneumatic cylinder 96. The cylinder is in operative connection with a solenoid valve that delivers and releases air pressure applied to the cylinder responsive to signals from the controller. In the exemplary arrangement the push off bracket 92 is in operative connection with an actuator spring 98 that extends in surrounding relation of the compensator shaft. As later discussed, in the exemplary arrangement the actuation of the cylinder is operative to move the push off bracket 92 so as to increase the downward biasing force applied by the spring 98 on the spring compensator shaft 90. Thus in the exemplary arrangement the cylinder may be operative to cause a sheet that has been engaged with a suction cup to be disengaged as a result of the increased biasing force. Further in other exemplary arrangements the push off bracket or other structure may be attached to a plunger or similar movable member that is operative to move downward responsive to the cylinder to physically assist in disengaging the respective suction cup 86 from a dunnage sheet. Of course these approaches are exemplary and in other arrangements other approaches may be used.

In the construction of the exemplary pick head 66 the crossmember 74 is mounted to the frame rails 78, 80 and the structures attached therethrough through a rotatable mount generally indicated 100 which is alternatively referred to as a swivel mount. The exemplary rotatable mount 100 enables the frame rails to be rotatable in both the longitudinal and transverse directions about the center of the pick head 66. In the exemplary arrangement the pick head is rotatable relative to each of a pair of perpendicular, horizontally extending axes. The rotatable mount 100 enables all the location stops 84 to simultaneously engage the upper surface of the top frame 44 even if the top surface of the top frame is not level. Likewise the rotatable mount 100 enables all the suction cups 86 to simultaneously engage with a dunnage sheet 42 even though the dunnage sheet is not level. Further the exemplary rotatable mount 100 is selectively operative to change between providing a rotatable connection between the crossmember 74 and the frame rails 78, 80 in an unlocked condition, and a rigid connection in a locked condition. The rigid connection in the locked condition may be desirable to accurately position the top frame clamps 82 and other components of the pick head. The rigid connection may also be desirable during movement of the pick head to prevent inertial or other forces from enabling a top frame or dunnage sheet being held and moved by the pick head from tilting or otherwise not being positioned in a suitable manner for release into the dunnage storage area of the dunnage tray.

In the exemplary arrangement the rotatable mount 100 includes an upper compliance plate 102. The upper compliance plate is positioned in overlying relation of a lower compliance plate 104. The upper and lower compliance plates are connected through four vertically extending studs 106. In the exemplary arrangement each of the studs 106 extend through respective openings 108 in the upper compliance plate that are larger than the base diameter of the studs. Further in the exemplary arrangement the openings 108 have tapered countersunk upper portions. The tops 110 of the studs 106 also have enlarged heads that are tapered in a manner that generally conforms to the upper portions of the tapered openings.

The exemplary mounting arrangement further includes a swivel lock. The exemplary swivel lock includes a cylinder 112 that is in fixed operative connection with the lower compliance plate. The exemplary cylinder 112 is a pneumatic cylinder that has a central rod 114 that is extendable upward from the cylinder responsive to the delivery of fluid pressure. In exemplary arrangements the swivel lock changes from the unlocked condition to the locked condition through application of the fluid pressure to the cylinder which causes the rod to move upward and outward from the cylinder 112 to engage the underside of the upper compliance plate 102. In the exemplary arrangement the underside of the upper compliance plate 102 that engages with the rod 114 includes a hardened wear plate 115. A solenoid valve in operative connection with one at least one controller is operative to selectively deliver and release air pressure. With the rod 114 extended upward and held in engagement with the upper compliance plate 102 through delivery of air pressure, the relative angular positions of the upper and lower compliance plates become fixed and are no longer rotatable. Thus as later discussed the controller of the machine is selectively operative at appropriate times in the machine operation cycle to cause the rotatable mount 100 of the pick head to be in the unlocked condition in which the pick head is rotatable about each of a pair of perpendicular, horizontally extending axes, and during other portions of the machine operation cycle to be rigid in the locked condition. Of course it should be understood that this configuration is exemplary and in other arrangements other approaches may be used.

Figure 14:
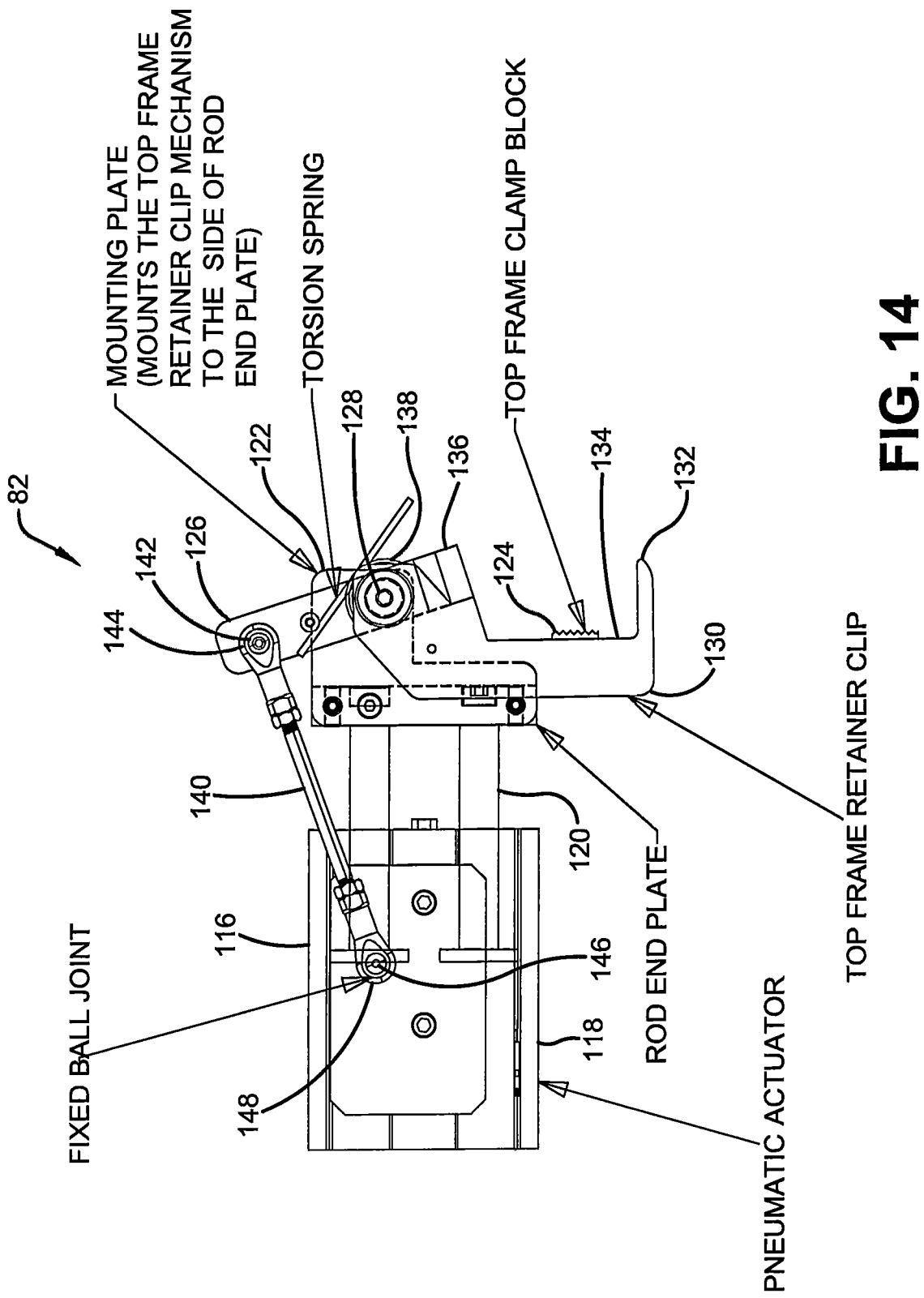
FIGS. 14-16 are side front and top views respectively of exemplary top frame retaining actuators.
Figure 15:
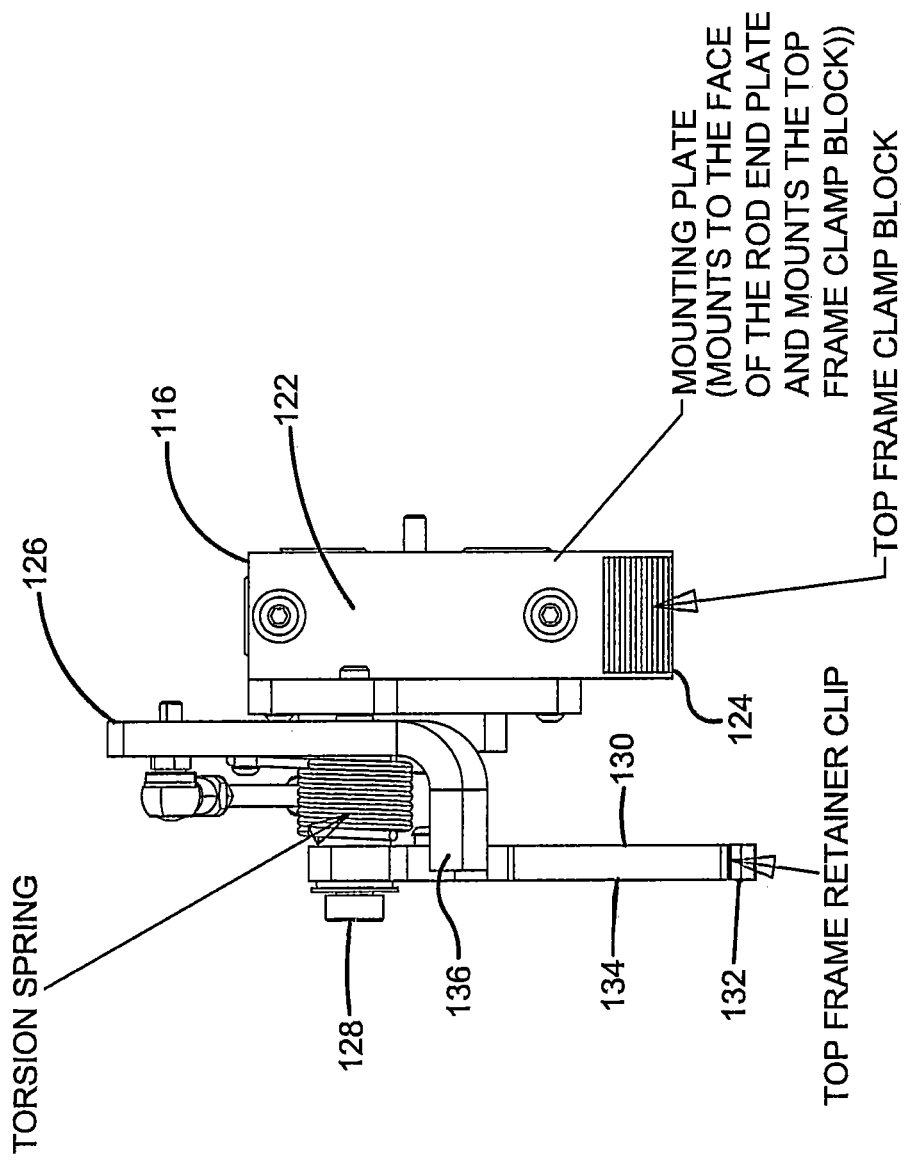
Figure 16:
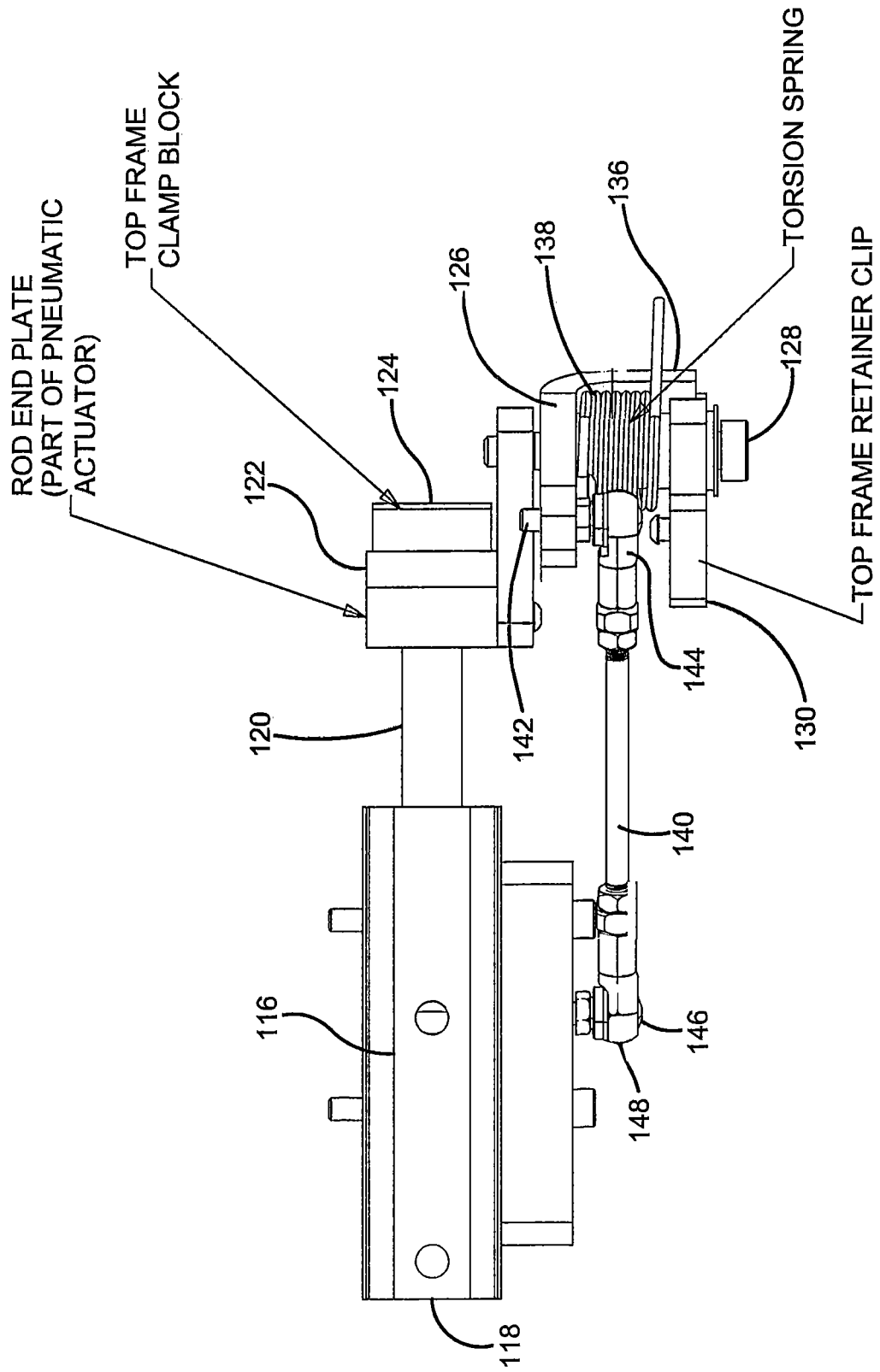
Figure 17:
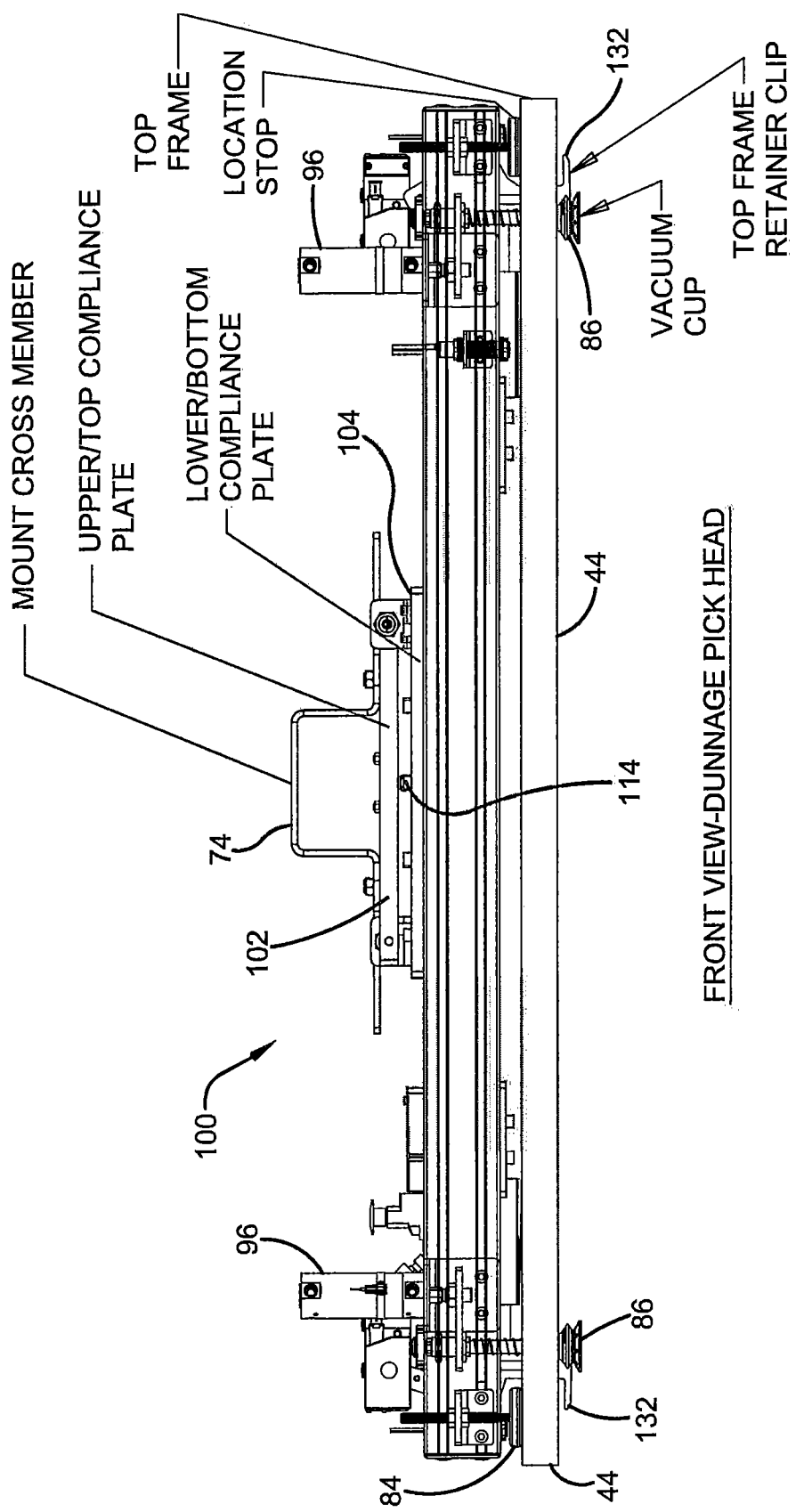
FIGS. 17-25 show the exemplary pick head in engagement with a top frame and operating to engage and move dunnage sheets.
Figure 18:
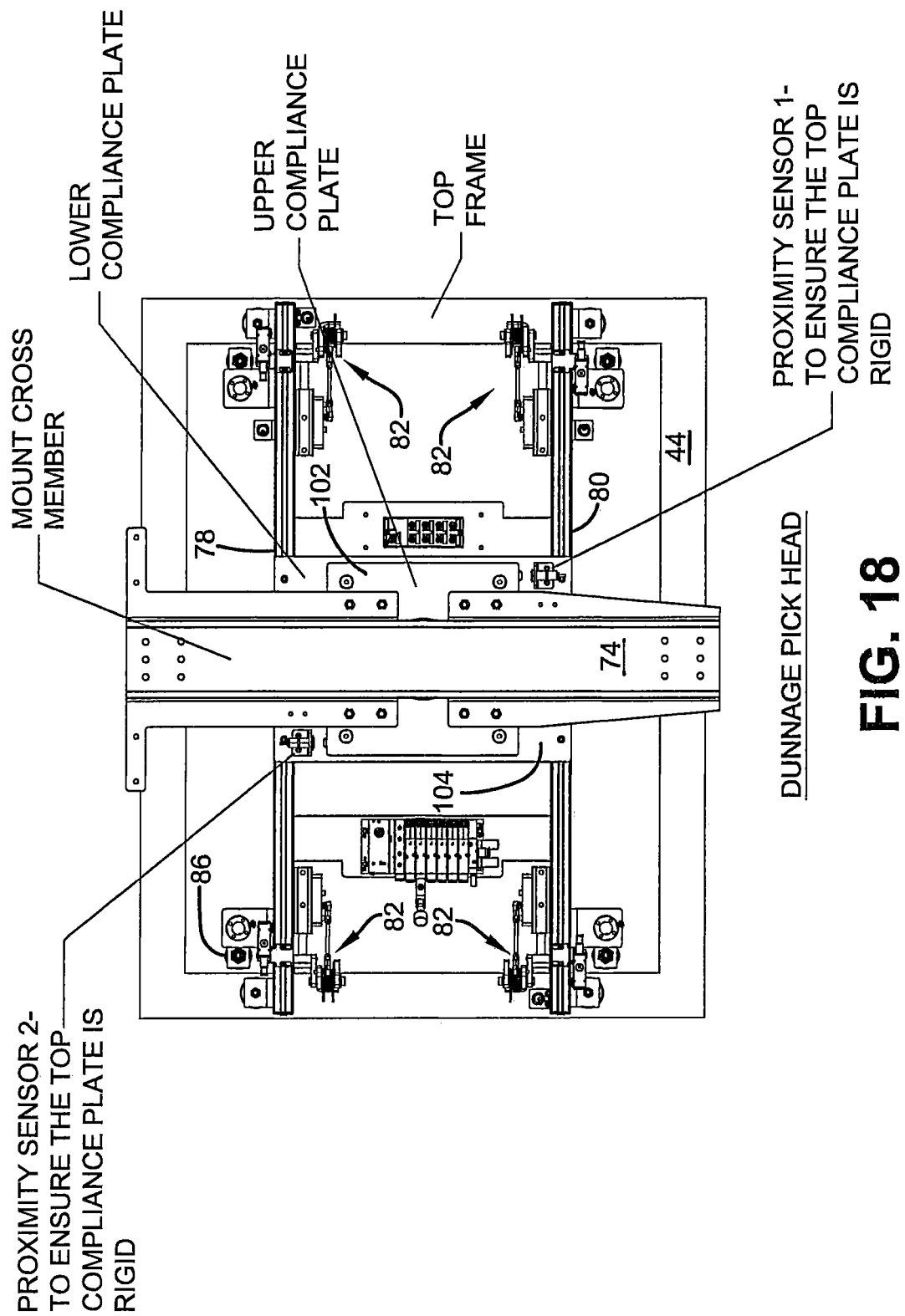

The exemplary top frame engaging top frame clamps 82 of the exemplary pick head are shown in greater detail in FIGS. 14-16. In the exemplary arrangement each top frame clamp includes an actuator 116. In the exemplary arrangement the actuator 116 is a pneumatic actuator that includes a body 118. A pair of parallel cylinder rods 120 are selectively movable outward and inward from the body 118 responsive to fluid pressure delivered through operation of a solenoid valve responsive to operation of the at least one controller. The body is mounted in fixed connection with the adjacent frame rail through suitable fasteners. In the exemplary arrangement the rods 120 are in fixed connection with a mount plate 122. The mount plate 122 includes a forward extending frame clamp block 124 on forward face thereof. In the exemplary arrangement the frame clamp block comprises a plurality of teeth that are configured to releasably engage and hold a vertically extending side surface of an inner wall of a top frame in engagement therewith.

The exemplary top frame clamps 82 further each include a respective frame engaging hook that includes a rotatable lever 126. The exemplary lever 126 is rotatably mounted to the mount plate 122. The lever 126 is rotatable about the axis of a fastener 128. A frame retainer clip 130 is also rotatably mounted in operative engagement with the mount plate 122 and is rotatable about the axis of the fastener 128. The exemplary frame retainer clip 130 includes a lower projection 132 that is configured to engage a horizontally extending lower surface of a top frame, and a recess 134 that is sized to receive therein the vertically extending inner wall of the top frame 44. As shown in FIG. 15 the lever 126 includes a turned portion 136. The turned portion 136 of the lever 126 is configured to engage the retainer clip 130. As can be appreciated from the Figures the rotation of the lever 126 is operative to impart rotational movement to the retainer clip 130 when the turned portion 136 is in engagement with the retainer clip.

The exemplary frame engaging hook associated with the top frame clamp 82 further includes a torsion spring 138. The exemplary torsion spring is configured to act between the lever 126 and the frame retainer clip 130. The exemplary torsion spring 138 is operative to bias the retainer clip to rotate counterclockwise as shown in FIG. 14. The lever 126 is operatively connected to an actuating shaft 140 at an end opposed of the turned portion 136. In the exemplary arrangement the actuating shaft 140 is connected to a stud 142 on the lever 126 through a swivel connector 144. The end of the actuating shaft 140 opposite to the swivel connector 144 is in connection with a stud 146 that is attached to the actuator body 118. The actuating shaft 140 is connected to the stud 146 through a swivel connector 148.

In the operation of the exemplary pick head 66 the pick head is moved responsive to the controller through operation of the motors and the pick head chains 68 to be in vertically overlying relation of the top frame and the top dunnage sheet and layers of cans that underlie the top frame and the uppermost dunnage sheet. The pick head 66 is then moved downward through operation of the controller such that the pick head is engaged with the top frame as shown in FIG. 12. In this exemplary arrangement the swivel lock cylinder 112 of the rotatable mount 100 is not extended and in the unlocked condition such that the location stops 84 are in engaged relation with the top surface of the top frame 44 even if the top frame is not horizontally level. Further in this condition the suction cups 86 engage the dunnage sheet that is immediately underlying the top frame 44 and are disposed and displaced upward in guided relation with the spring compensators 88.

With the pick head 66 in this position the controller of the machine operates to cause the actuators 116 of the top frame clamps 82 to have the rods 120 retracted inwardly in the body of the clamp. In this configuration as shown in FIG. 12 the respective actuating shafts 140 cause the attached lever 126 of the frame engaging hook to be rotationally positioned so that the turned portion 136 of the lever is engaged with the respective frame retainer clip 130. In this position the lever 126 acts against the force of the respective torsion spring 138 and causes the projection 132 of the respective frame retainer clip to be disposed inwardly and away from the immediately adjacent vertically extending inside face of the top frame 44. In this position the projection 132 is also disposed upwardly and away from the uppermost dunnage sheet that is positioned immediately underneath the top frame 44.

In operation of an exemplary arrangement the exemplary controller operates to cause both actuators 116 on one longitudinal side of the pick head to extend at least partially outward further away from the respective body such that the frame clamp blocks 124 on the mount plates 122 of the clamps are engaged with the vertically extending inner side wall of the top frame. In exemplary arrangements such engagement is sensed by suitable sensors or other devices. Such initial engagement further causes the top frame to be moved and positioned in engagement with the pair of engaged clamp blocks so that the orientation of the top frame is registered to a horizontal position of the top frame that helps to assure engagement by the other pair of clamp blocks.

The controller of the machine then operates to cause the pair of rods 120 of the other two top frame clamps 82 at an opposed end of the pick head to move outward away from the respective body so as to engage the adjacent vertically extending inside face of the side surface of the top frame. The controller then operates to cause the rods on each of the top frame clamps to move further outward and to be held in position with sufficient force so that the frame clamp block 124 on each respective clamp is engaged with an area on the vertically extending inside side surface of the top frame. Such engagement with the four clamp blocks is operative to hold the top frame in engagement with the top frame clamps.

It should be understood that as the rods 120 of each top frame clamp extend outward away from the body the respective actuating shaft 140 operates to rotate the lever 126 of the frame engaging hook. This causes the turned portion 136 of the respective clamp to rotate so that the frame retainer clip may rotate responsive to the torsion spring 138. As the frame retainer clip 130 rotates the projections 132 move downward and engage the upper surface of the uppermost dunnage sheet positioned immediately below the top frame. Such engagement prevents further rotation of the frame retainer clip 130 so that initially the projections 132 do not extend below the top frame. Thus while the movement of the lever 126 and the turned portion 136 would otherwise enable rotational movement of the frame retainer clip 132 to a position like that shown in FIG. 14, the engagement of the projection 132 with the top surface of the dunnage sheet initially prevents such movement.

In the exemplary operation of the machine when the top frame clamps 82 are in this position the clamp blocks 124 of each of the clamps is firmly engaged with the top frame even though the projections 132 are unable to extend downward below the top frame. The controller then operates at least one motor that causes the pick head to operate to move upward which causes the top frame 132 to move upward in engagement therewith. As a result as the top frame is moved upward the spring level compensators 88 which are attached to the suction cups which are engaged with the first dunnage sheet are enabled to move to extend downward. This pushes the top dunnage sheet away from the top frame. As the top frame is displaced away from the uppermost dunnage sheet the frame retainer clips 130 rotate responsive to the torsion springs to the positions shown in FIGS. 13 and 14. In this position the projections 132 extend in underlying relation of the lower surface of the top frame and the top frame extends in the recesses 134 of the retainer clips 130. As a result, the top frame is held in engagement with the pick head by both the horizontal force applied by the top frame clamp blocks 124 as well as by the engagement with the frame retainer clips 130 of the frame engaging hooks. As a result the top frame 44 is enabled to move in engaged relation with the pick head 66. In some arrangements once the projections 132 of the top frame clips 130 are in underlying relation of the lower surface of the top frame, the controller may operate to release the fluid pressure from the actuators 116 so the top frame is held in engagement with the pick head 66 only by the engagement of the frame retainer clips with the lower surface of the top frame.

It should also be appreciated that when machine operation requires the top frame to be disengaged from the top frame clamps as later discussed, this is accomplished by the at least one controller causing the actuators 116 to move the rods 120 inwardly into the bodies 118 of the actuators. Such movement will cause the frame retainer clips 130 to move from the position shown in FIG. 13 to the position shown in FIG. 12. As can be appreciated in this position the top frame 44 can disengage from the exemplary pick head 66 by gravity. Of course it should be understood that this approach is exemplary and in other arrangements other approaches may be used.

Figure 19:
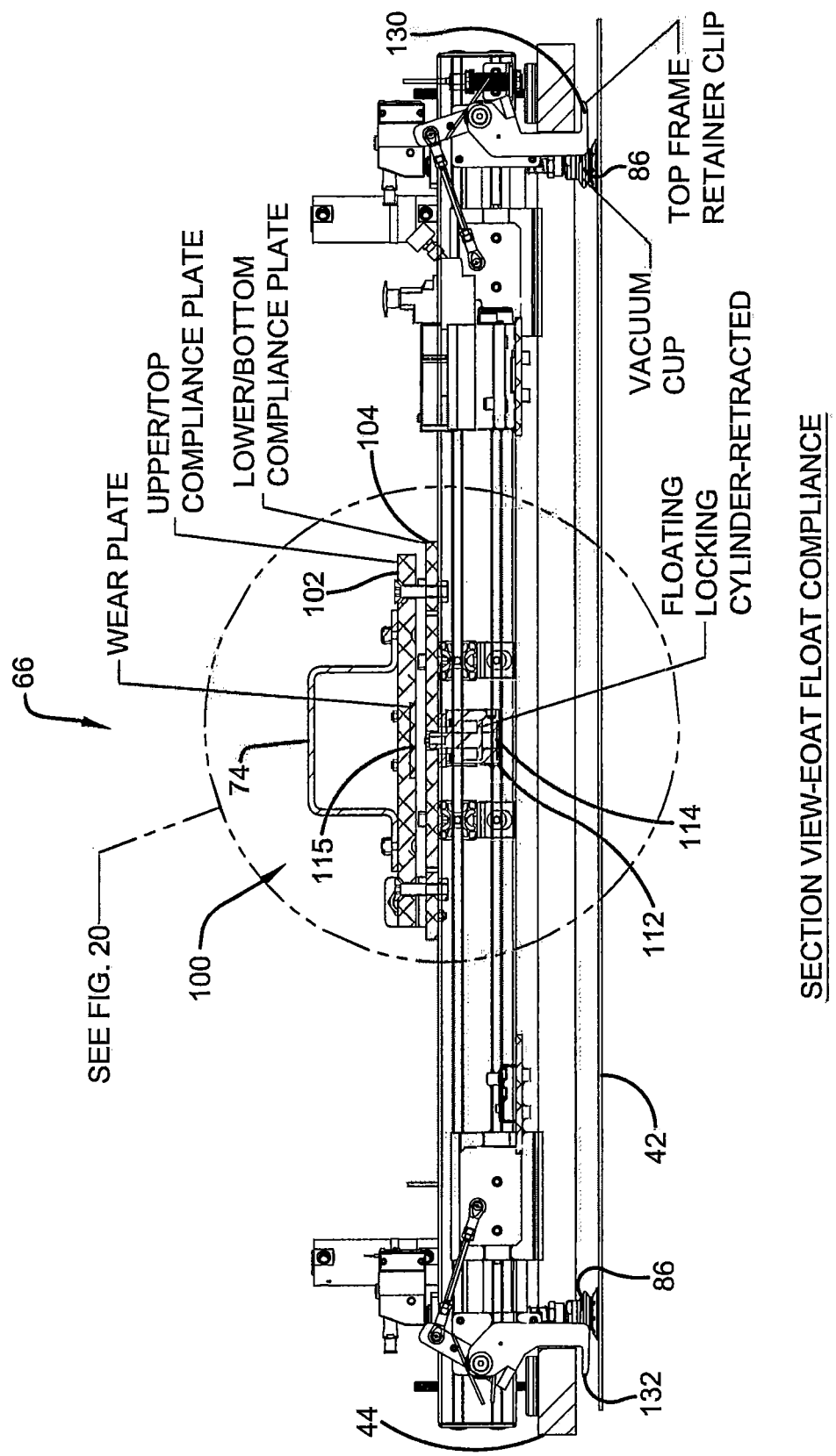
Figure 20:
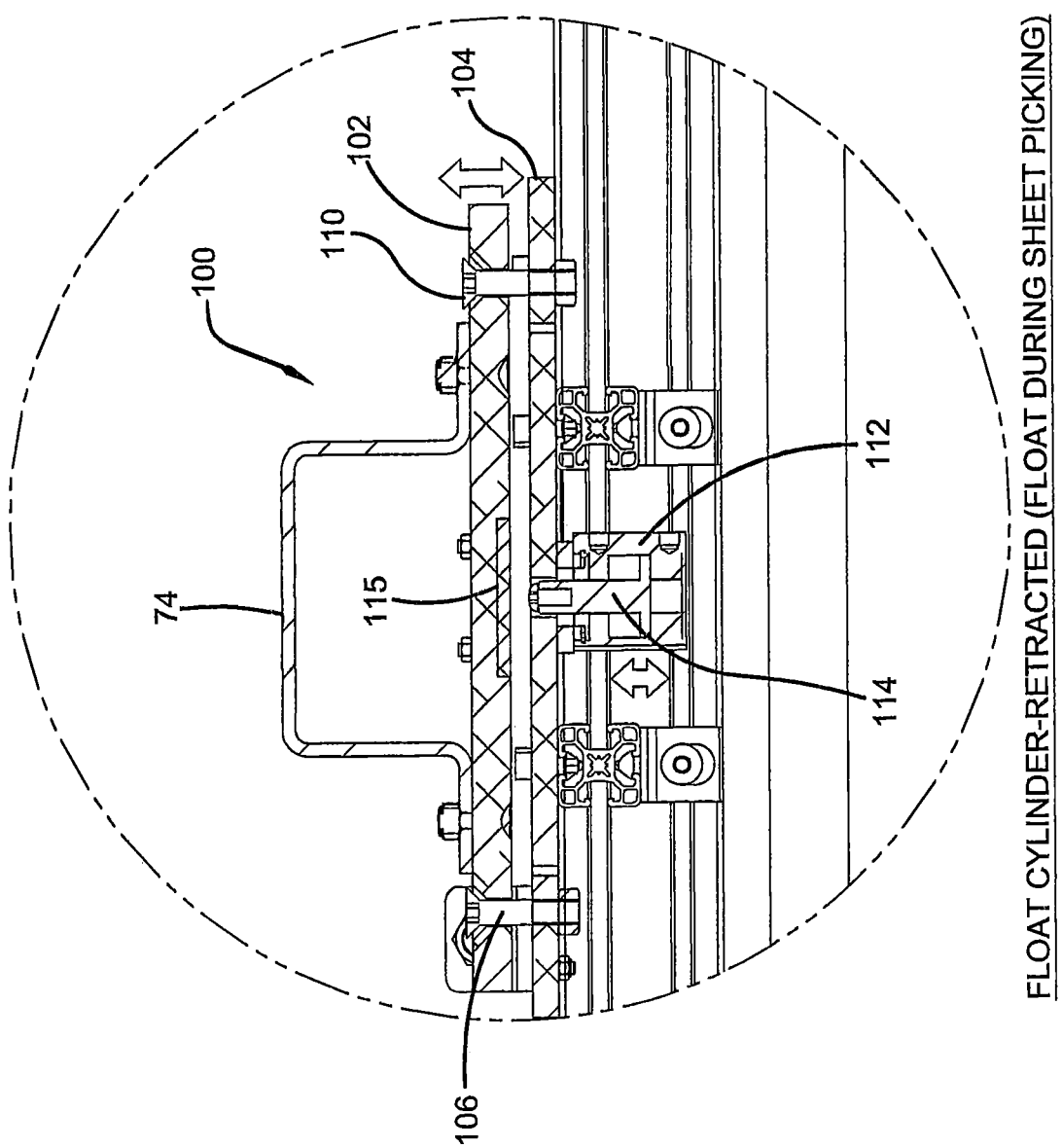
Figure 21:
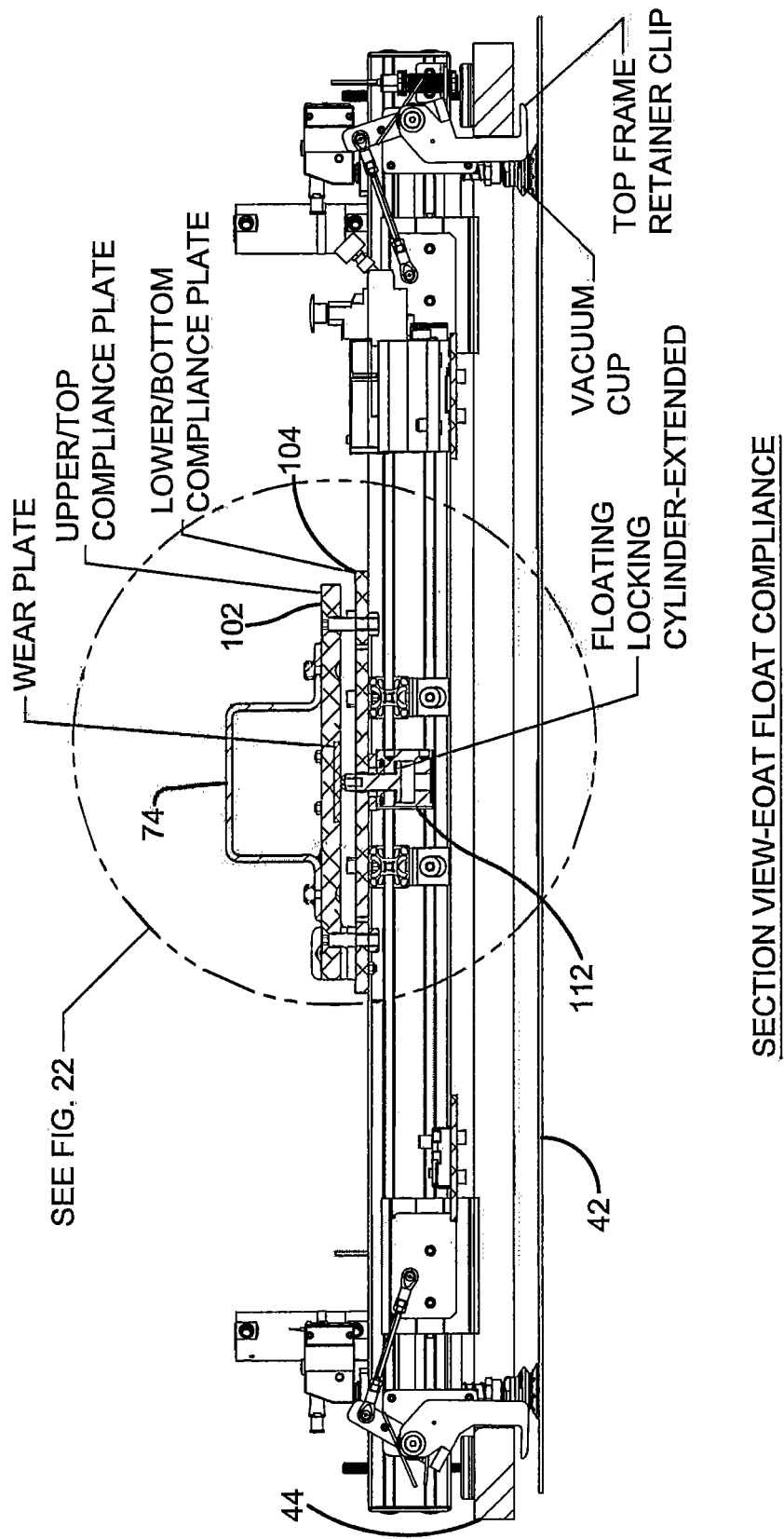

After the top frame clamps have engaged with the top frame 44 and the pick head 66 has moved somewhat upward so that the frame retainer clips 130 are positioned so that the projections 132 thereof are below the lower surface of the top frame 44, the pick head is in the position shown in FIG. 19. In this position the exemplary controller operates to cause the cylinder 112 of the swivel lock to not be pressurized so that the rod 114 thereof is retracted and the rotatable swivel mount 100 is enabled to swivel. In this condition the suction cups 86 are in suction engaged connection with the first uppermost dunnage sheet 42 that is on the top of the first layer of cans and immediately below the top frame. Because the rotatable mount is enabled to swivel, all the suction cups can engage with the top surface of the dunnage sheet 42 even if the dunnage sheet is not level. The cylinder 112 in this condition is shown in greater detail in FIG. 20.

Figure 23:
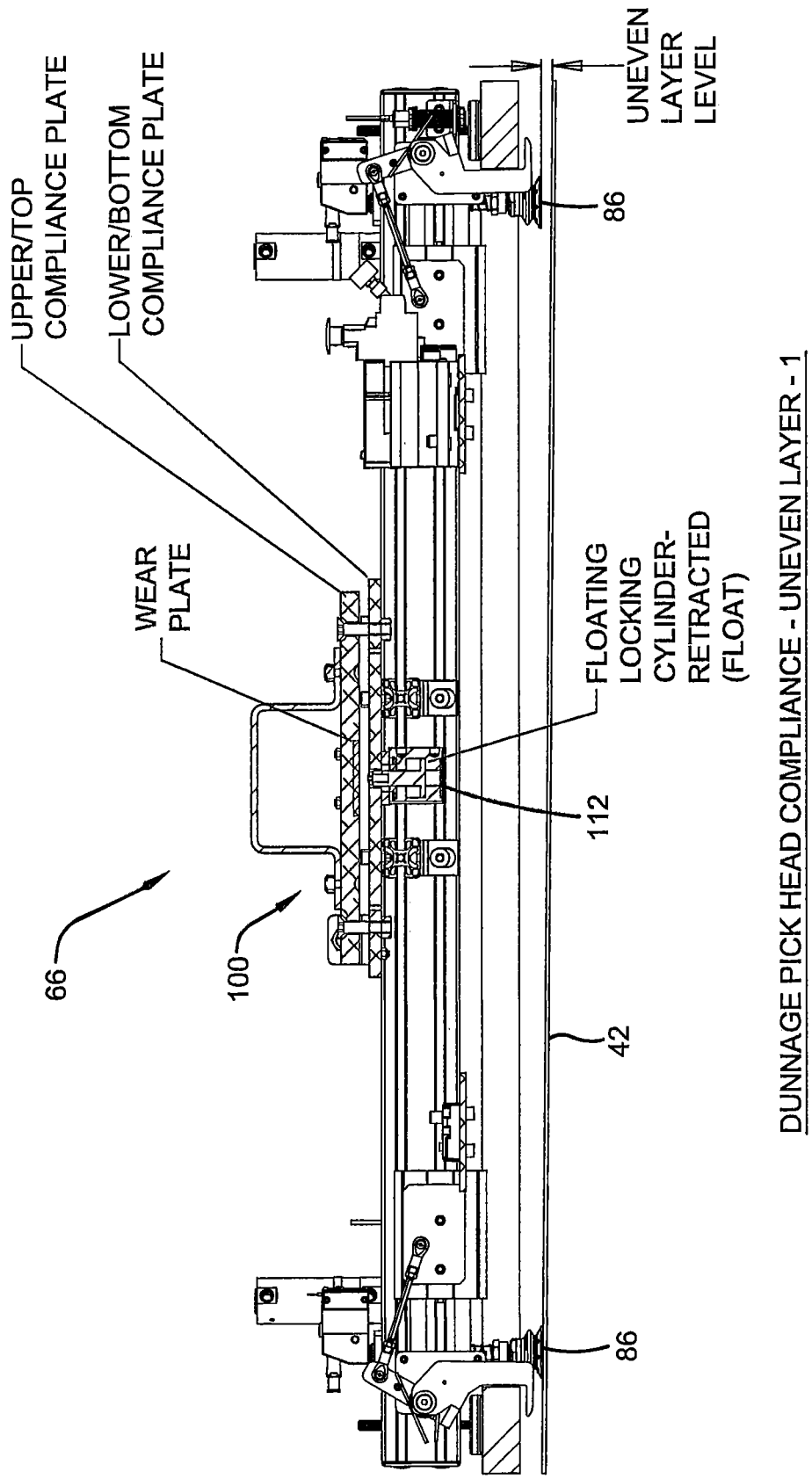
Figure 24:
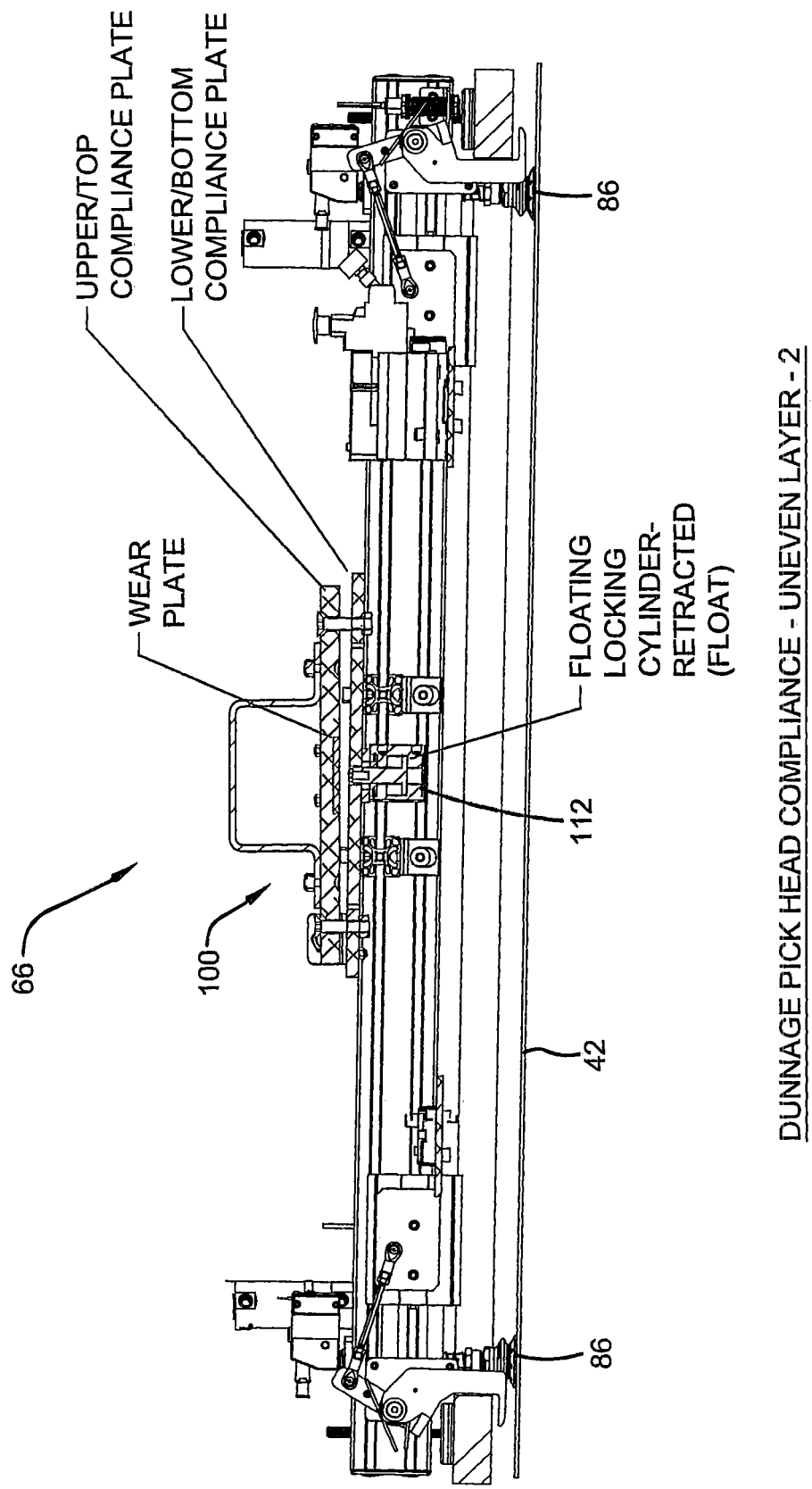
Figure 25:
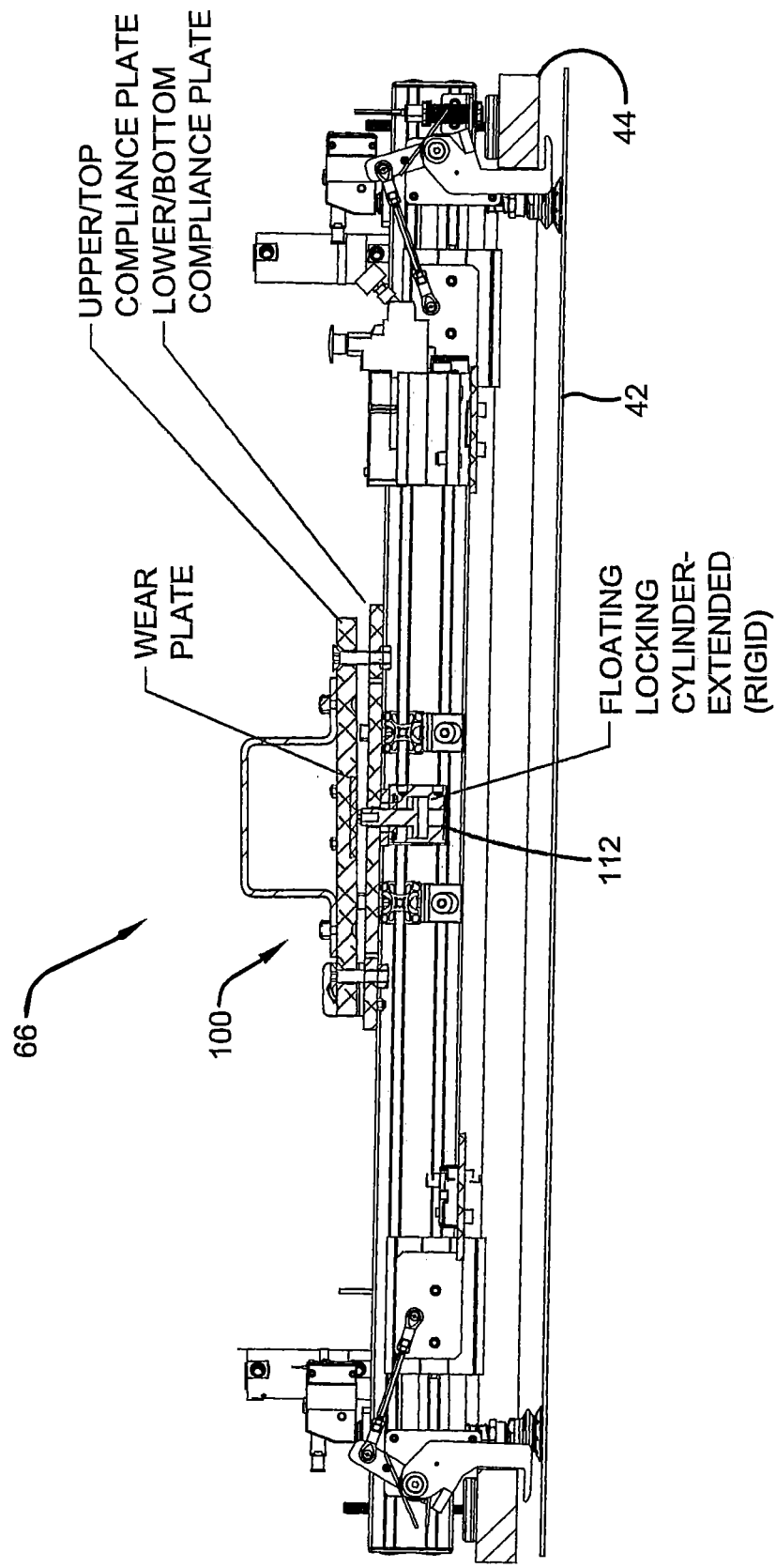

FIG. 23 shows a further example of a situation in which the dunnage sheet 42 is not level. In FIG. 23 the pick head in the level position will have at least one of the suction cups 86 disposed vertically away from the dunnage sheet while other suction cups are engaged therewith. Such condition may occur despite the spring compensators 88 that enable vertical movement of the suction cups. By the controller operating to cause the cylinder 112 of swivel lock to be in the retracted position, the rotatable mount 100 is enabled to swivel from the level position of the pick head shown in FIG. 23 to the rotated position shown in FIG. 24. In this position all of the suction cups 86 are in engagement with the dunnage sheet 42 and are enabled to firmly hold the dunnage sheet in engagement with the pick head due to the suction applied to the suction cups by the vacuum pump.

Figure 22:
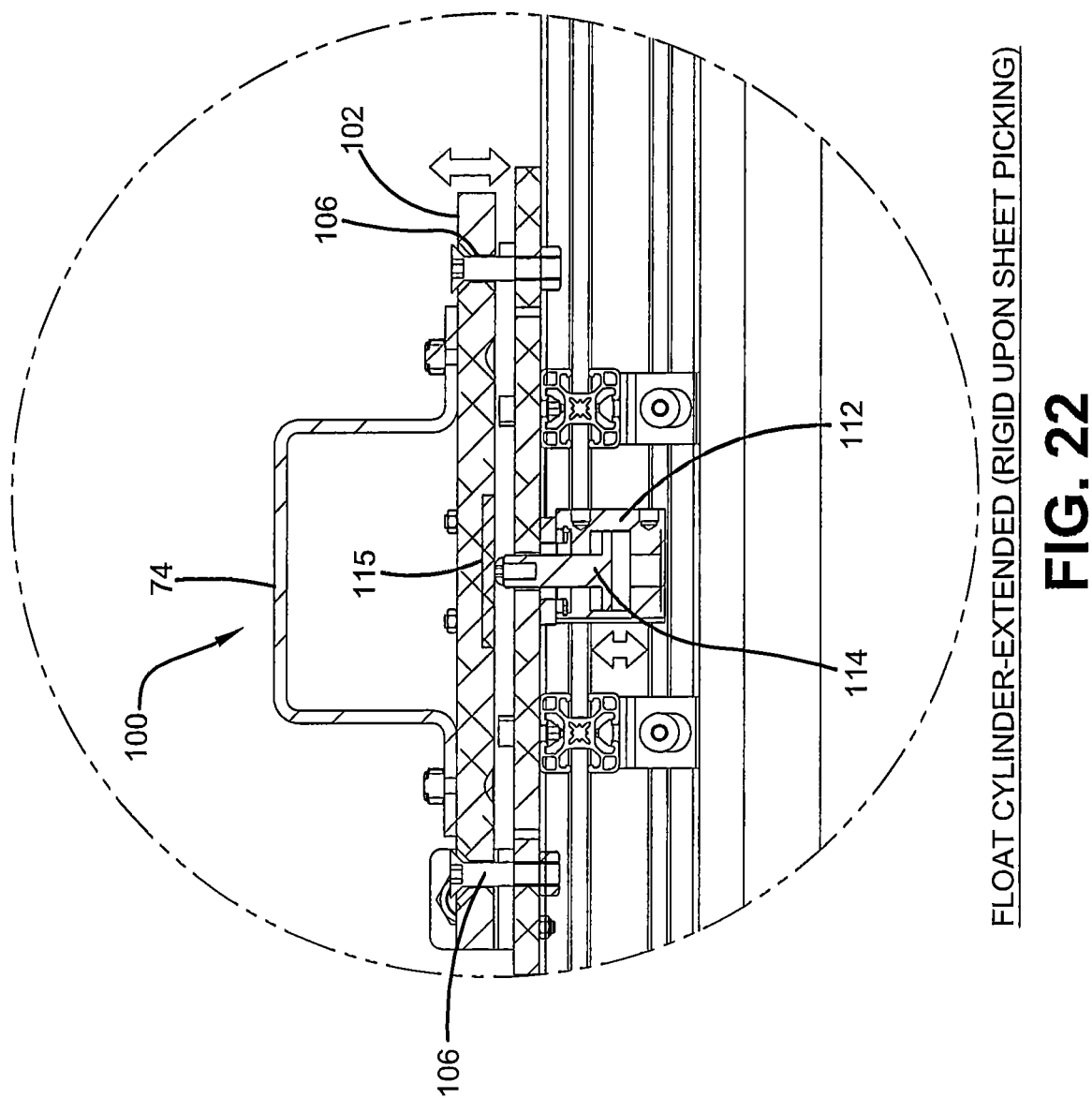

In exemplary arrangements once the pick head 66 is rotated to engage all of the suction cups 88 with the top surface of the dunnage sheet 42, the controller may operate in accordance with its programming to change the swivel mount from the unlocked condition to the locked condition. This is accomplished by applying pressure to the cylinder 112 to extend the rod 114 thereof. In this position which is shown in FIG. 22 the rod 114 firmly engages the wear plate 115 of the upper compliance plate 102. Further in this condition the tapered studs 106 firmly engage the tapered portions of the openings 108. This causes the rotatable mount 100 to move to the horizontally level condition. As a result in the exemplary arrangement once the dunnage sheet 42 has been firmly engaged by the suction cups the controller may operate the cylinder 112 to cause the dunnage sheet to be firmly held in a level condition. Doing this enables the pick head to move and position the dunnage sheet in an accurate manner and avoids unwanted swiveling, rotating or tilting movement of the pick head due to inertial or other forces. Of course it should be understood that this approach is exemplary and in other arrangements other approaches may be used.

Figure 27:
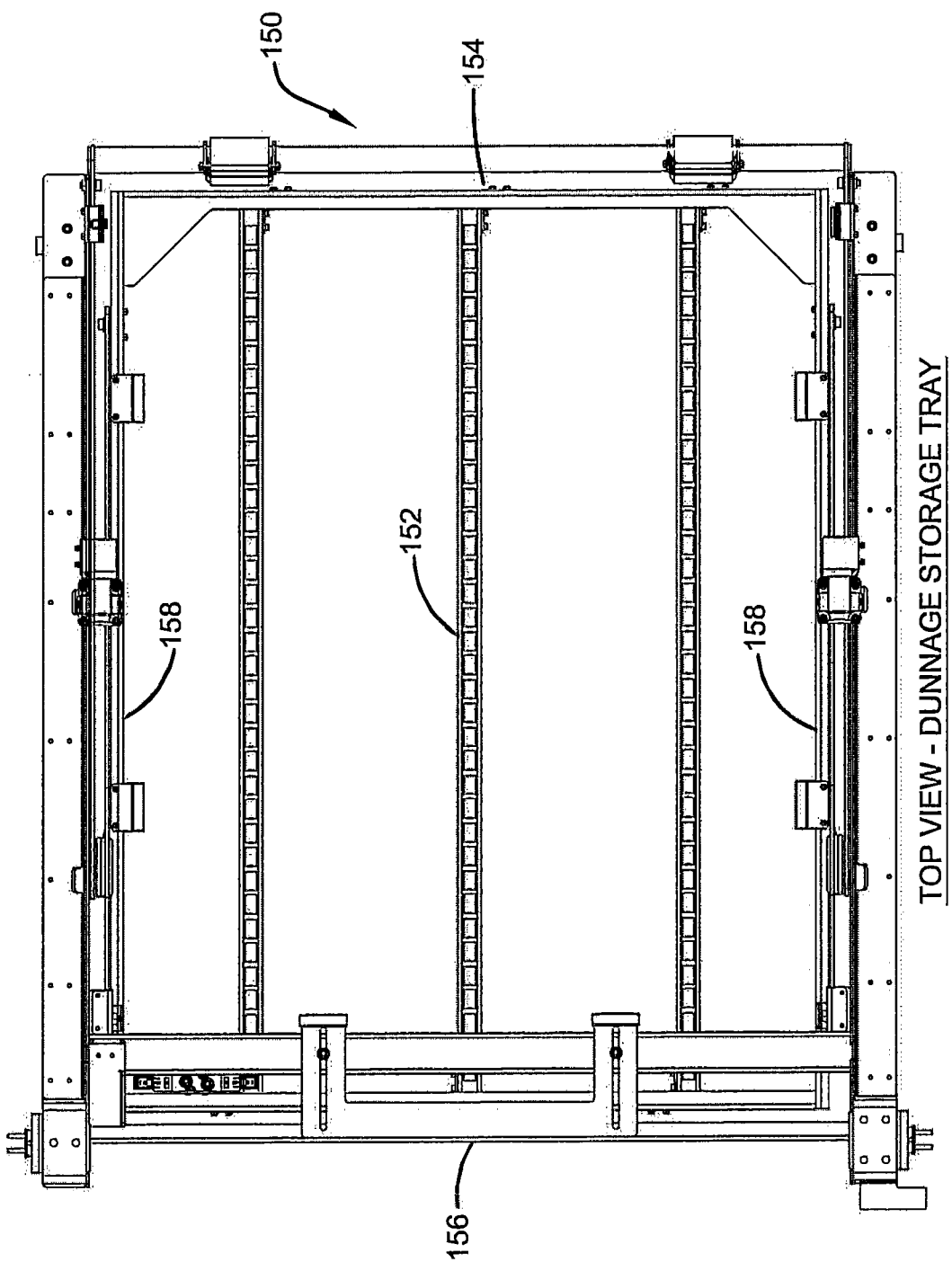
FIGS. 27-29 are top and first and second side views of an exemplary dunnage tray with FIG. 28 showing the bottom of the tray retracted and FIG. 29 showing the bottom of the tray extended downward.

In the exemplary machine a dunnage tray 150 is positioned adjacent to the upper open end of the pallet hoist area. As shown in FIG. 27 the exemplary dunnage tray 150 includes a plurality of horizontally disposed aligned longitudinally extending roller tracks 152. The roller tracks extend transversely between a front wall 154 and a back wall 156. The front and back walls extend between a pair of longitudinally extending sidewalls 158. The walls horizontally bound a dunnage storage area. As shown in the Figures the exemplary walls include upward extending guide projections 160. The exemplary guide projections are operative to guide dunnage sheets which are disengaged from the pick head 66 so that they move downward into the dunnage storage area of the dunnage tray and rest in aligned relation with the walls thereof.

Figure 28:
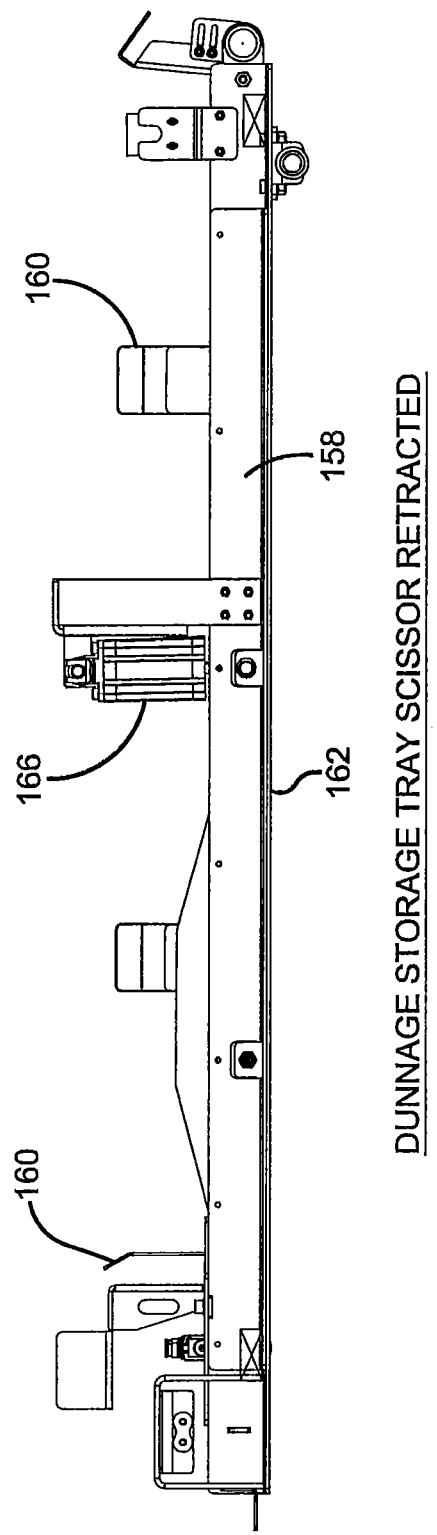
Figure 29:
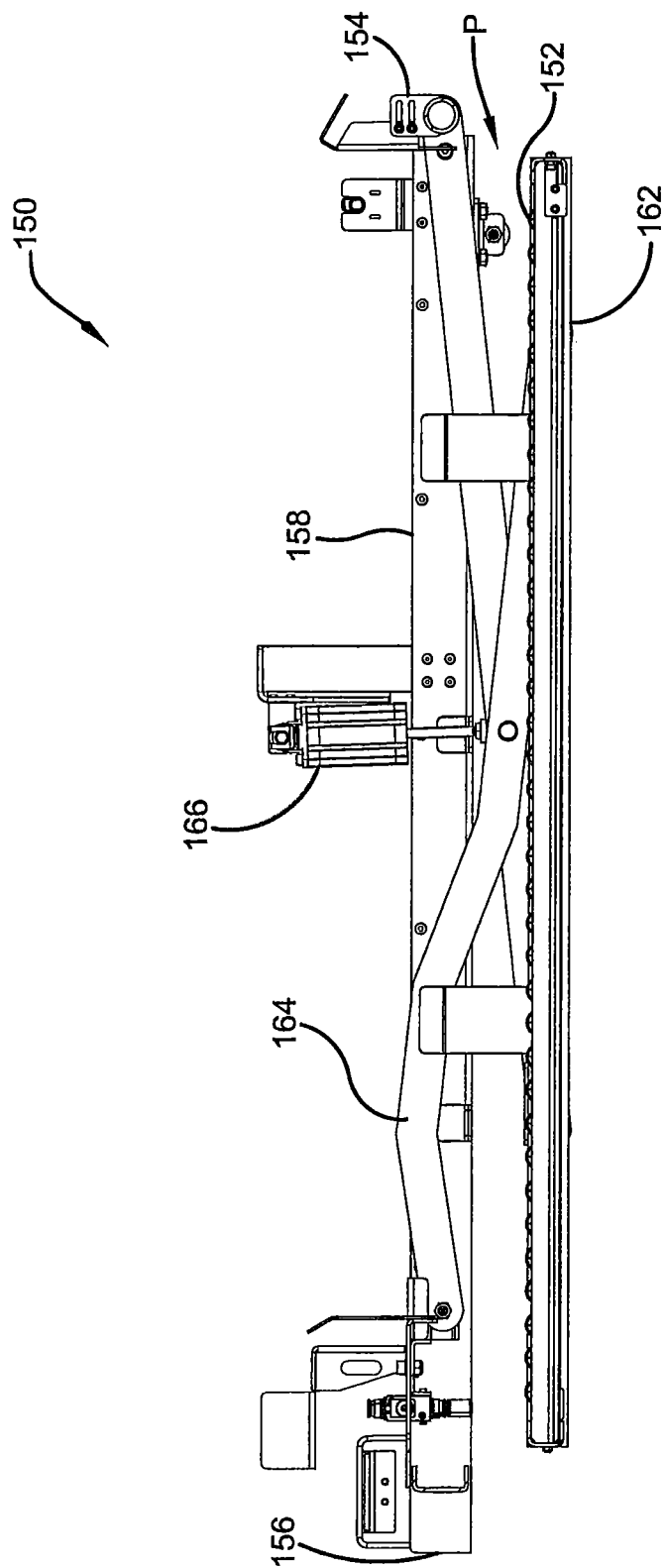

As shown in FIGS. 28 and 29 the exemplary roller tracks 152 are supported in on a rectangular subframe 162. The subframe is supported on extendable members 164 arranged in a scissor configuration. A pair of actuators 166 are in operative connection with the extendable members. The actuators enable the subframe 162 to be moved from the upward position shown in FIG. 28 to the downward position shown in FIG. 29. Each actuator is in operative connection with the at least one machine controller. In the upward position the subframe vertically bounds the bottom and closes the dunnage storage area. In the downward position shown in FIG. 29 the roller tracks and subframe are disposed sufficiently below walls 54, 56 and 58 such that a horizontal opening passage designated P extends below the walls and the subframe. As later discussed by placing the dunnage tray in this position dunnage sheets and a top frame that have been collected in the dunnage tray are enabled to be discharged therefrom through the opening between the subframe and the front wall.

Figure 26:
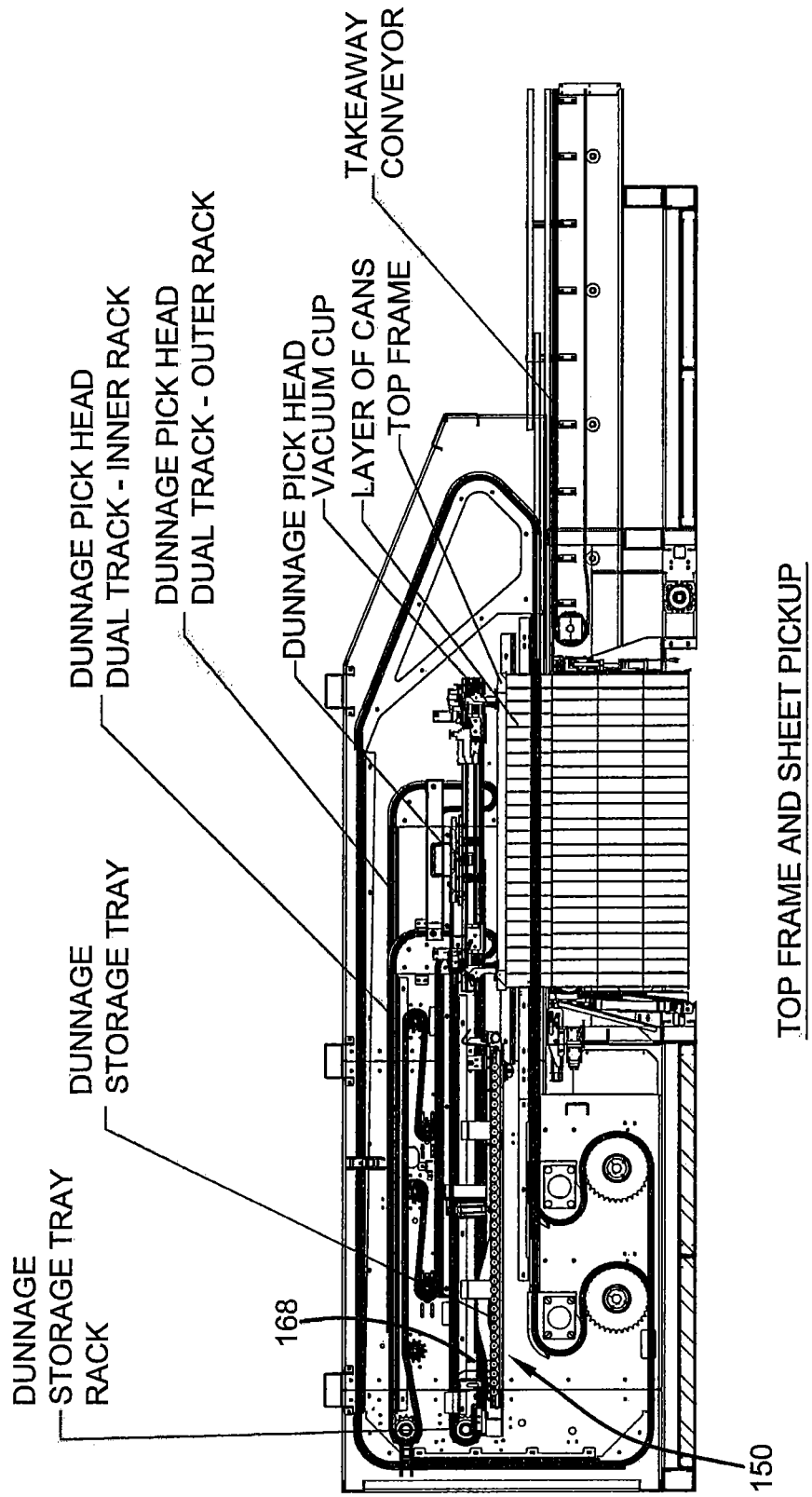
FIG. 26 is a transparent view of an upper portion of the exemplary machine showing the exemplary pick head and a dunnage tray.

As shown in FIG. 26 in the exemplary arrangement the dunnage tray 150 is selectively movable in the horizontal, longitudinal direction. In the exemplary arrangement the dunnage tray is movable by a pair of horizontally disposed dunnage drive chains 168 which are selectively driven by at least one motor responsive to the at least one machine controller. In the exemplary arrangement the dunnage tray 150 is selectively movable horizontally between a retracted position such as is shown in FIG. 26 to a position in which the dunnage tray extends in overlying relation of the hoist table 54 of the pallet hoist. Of course, it should be understood that this arrangement is exemplary and in other arrangements other approaches may be used.

Figure 30:
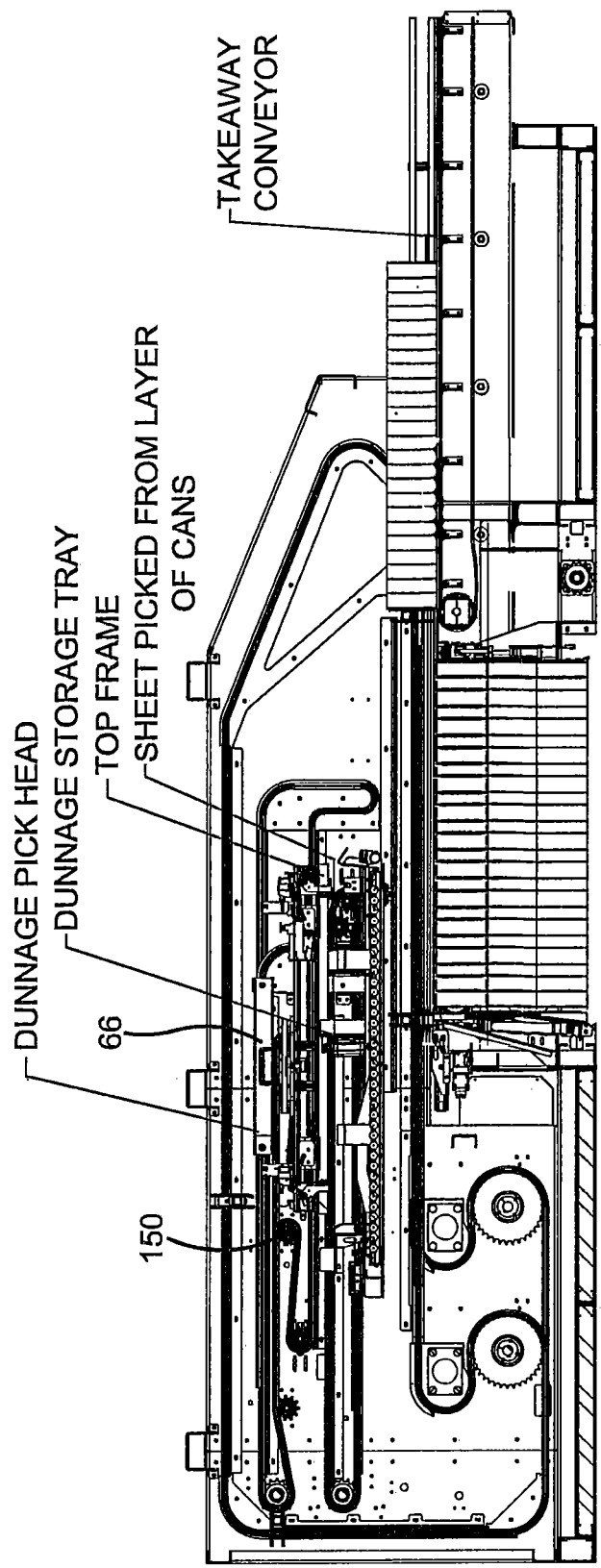
FIG. 30 is a side view showing the pick head and dunnage tray moved to a position in which a sheet may be released by the pick head into the dunnage tray.
Figure 31:
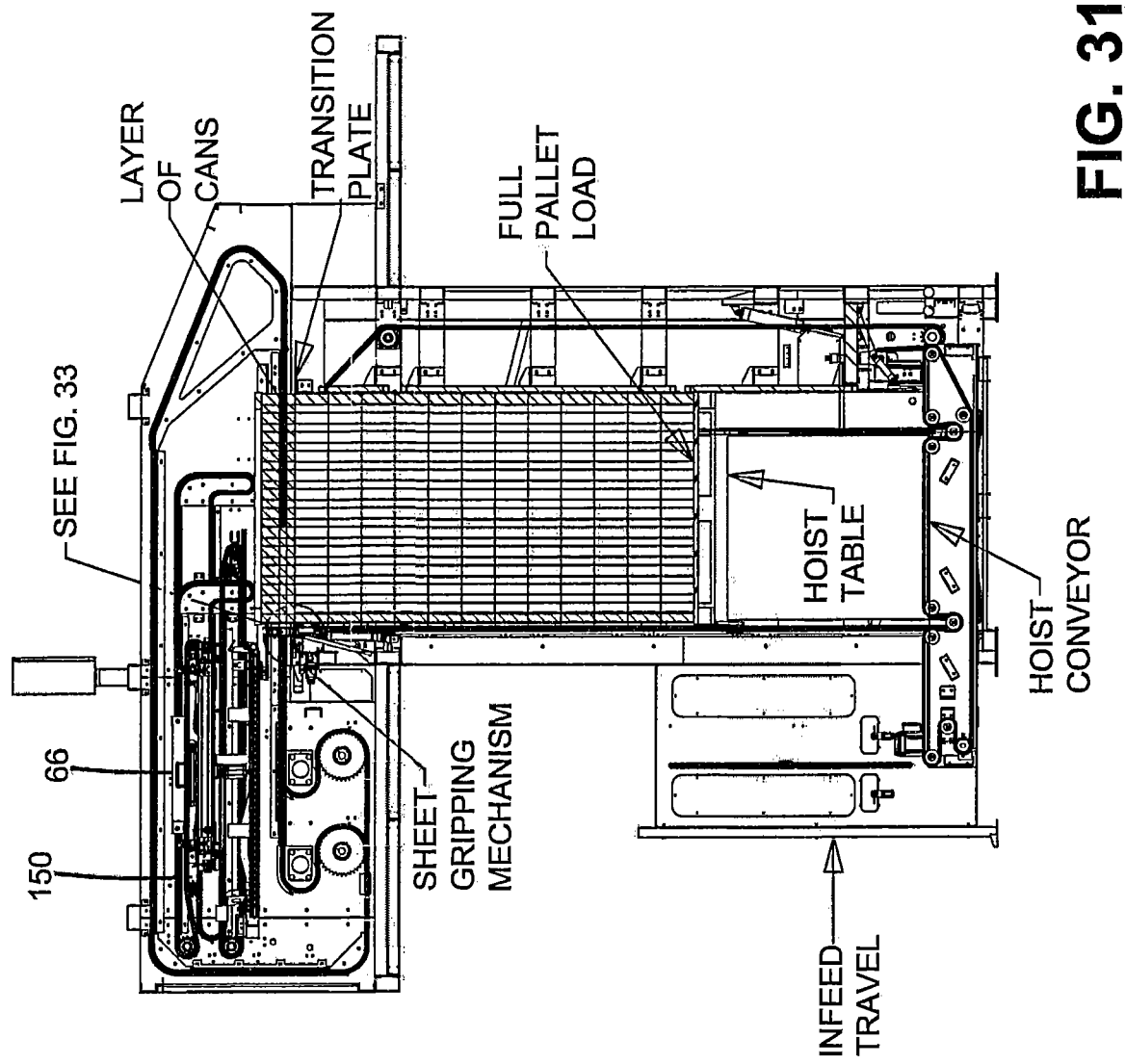
FIG. 31 shows the pick head moved to a position to engage a dunnage sheet at the top of the containers, and the dunnage tray moved to a retracted position.
Figure 32:
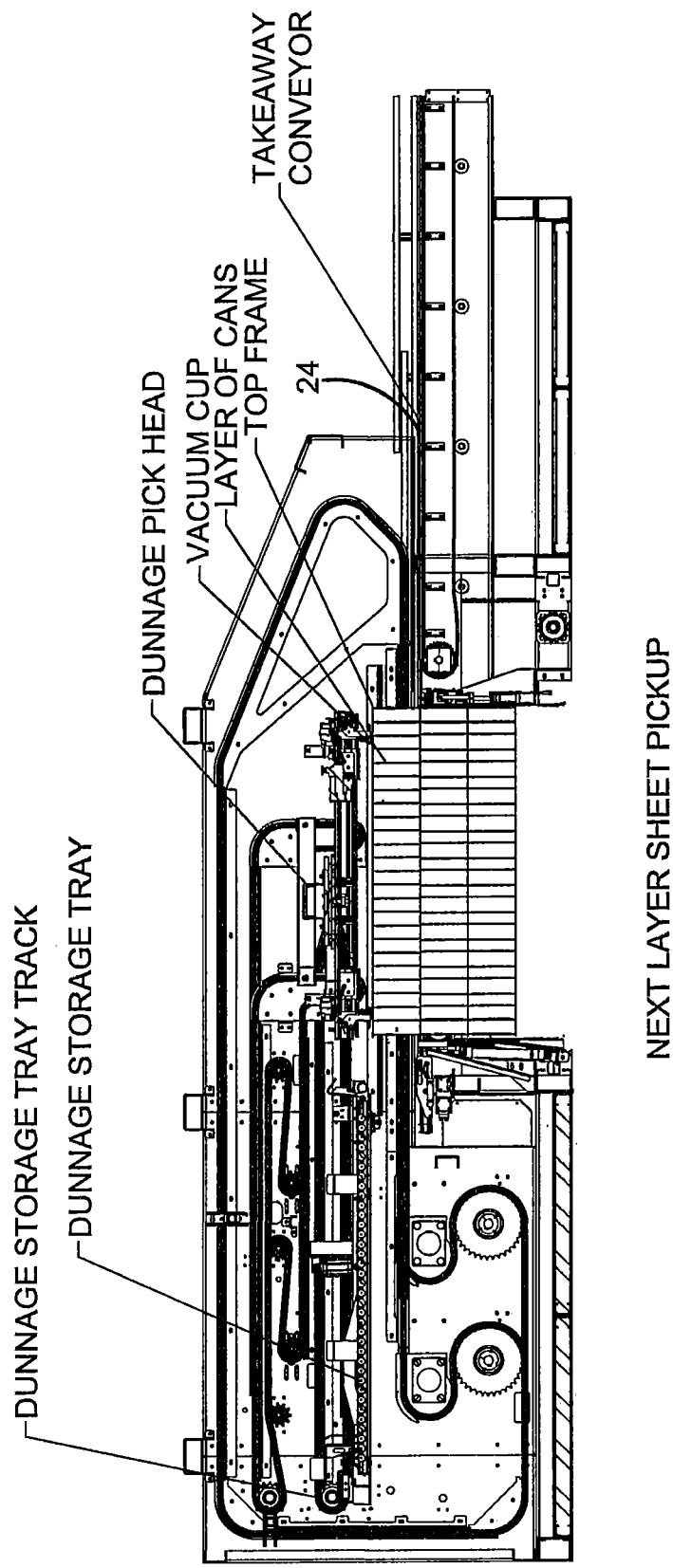
FIGS. 32-44 show an exemplary sheet gripper that is operative to engage a dunnage sheet and hold the sheet in position to resist movement as containers supported on top of the dunnage sheet are moved to disengage from the sheet.
Figure 33:
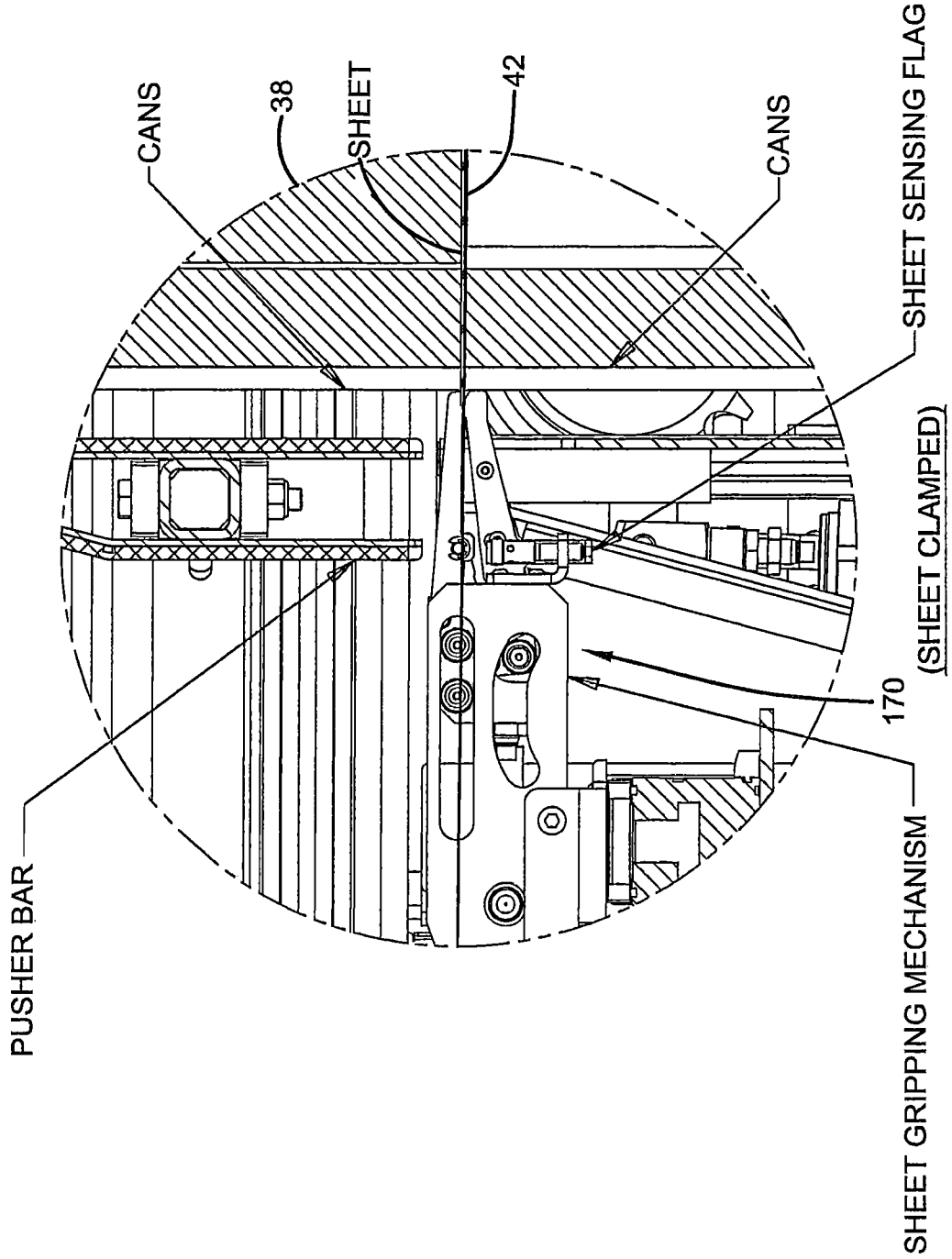

In the operation of the exemplary system after the pick head 66 has engaged the top frame 44 and the dunnage sheet 42 above the top layer of containers, the pick head operates to move upwardly and away from the cans and into a retracted position such as is shown in FIG. 30. The at least one controller further operates as the pick head moves horizontally away from the cans to cause the dunnage tray 150 with the subframe in the upward position, to move from the retracted position to a forward horizontal position as shown in FIG. 30 in which the dunnage tray extends in vertically overlying relation of the dunnage hoist. In this position the dunnage sheet engaged with the suction cups of the pick head 66 is in vertical overlying relation of the dunnage storage area between the walls of the dunnage tray. When the pick head and the dunnage tray are sensed in this position through suitable sensors, the cylinders 96 of the pick head are operated and the vacuum is released from the suction cups responsive to the at least one controller. This causes the dunnage sheet to be released from the pick head and fall downward into the dunnage storage area between the walls of the dunnage tray. When this occurs the dunnage sheet that was previously positioned below the top frame 44 and above the top layer of cans is deposited into the dunnage tray and is in engagement with the roller tracks 152 of the subframe thereof. The controller may then operate to move each of the pick head 66 and the dunnage tray into retracted positions such as is shown in FIG. 31. Of course, it should be understood that this approach is exemplary and in other arrangements other approaches may be used.

In exemplary arrangements the controller then operates to determine that the top frame and the first dunnage sheet have been removed responsive to its programming and suitable sensors. The controller of the exemplary arrangement next operates to cause the pallet hoist 50 to elevate the current top layer of cans so that the dunnage sheet 42 that extends below the current top layer of cans and above the next layer cans is generally vertically aligned with the conveyor take away and holding conveyor 24. It should be understood that in exemplary arrangements the opening that bounds the pallet hoist area includes suitable guides or other structures that help to maintain the cans properly positioned together in adjacent relation as they are moved upward and extended to the vertical level of the take away conveyor 24. Of course, this approach is exemplary and other arrangements other approaches may be used.

In the exemplary machine the cans are removed from the pallet one layer at a time. In order to reliably achieve such removal the exemplary machine provides devices and features that operate to sweep each layer of cans onto the take away and holding conveyor in a manner that is later discussed in detail. As can be appreciated the action of sweeping the cans must be accomplished without displacing the dunnage sheet that underlies the layer cans being moved onto the conveyor 24. Further the sweeping action must avoid any significant differences in height between the dunnage sheet that underlies the layer of cans and the transition surface across which the cans are moved to engage the conveyor. As can be appreciated differences in height can cause the cans to tip over or otherwise be improperly oriented or damaged. Exemplary arrangements include features that reduce these risks.

FIGS. 33-44 show an exemplary dunnage sheet gripper 170 used in the exemplary depalletizing machine. In the exemplary arrangement the sheet gripper is utilized to hold stationary the dunnage sheet 42 that is in underlying contacting relation supporting the cans in the layer 38 that is being removed from the pallet stack. In the exemplary arrangement a pair of horizontally disposed sheet grippers 170 are positioned on a horizontal side of the can layer that is opposite the container take away and holding conveyor 24. For purposes of this description the side of the can layer and dunnage sheet that is on the opposite side of the can layer from the conveyor 24 will be referred to as the back side and the side immediately adjacent to the conveyor 24 will be referred to as the front side.

Figure 40:
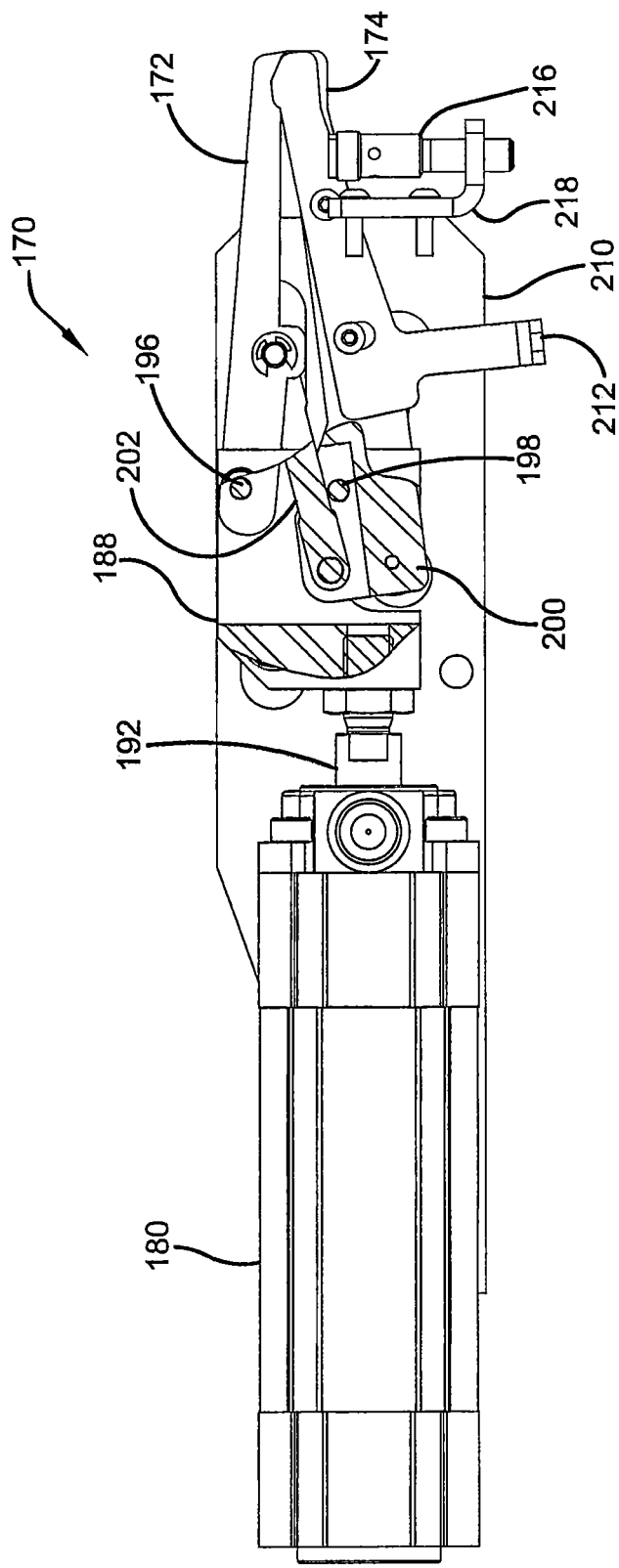
Figure 41:
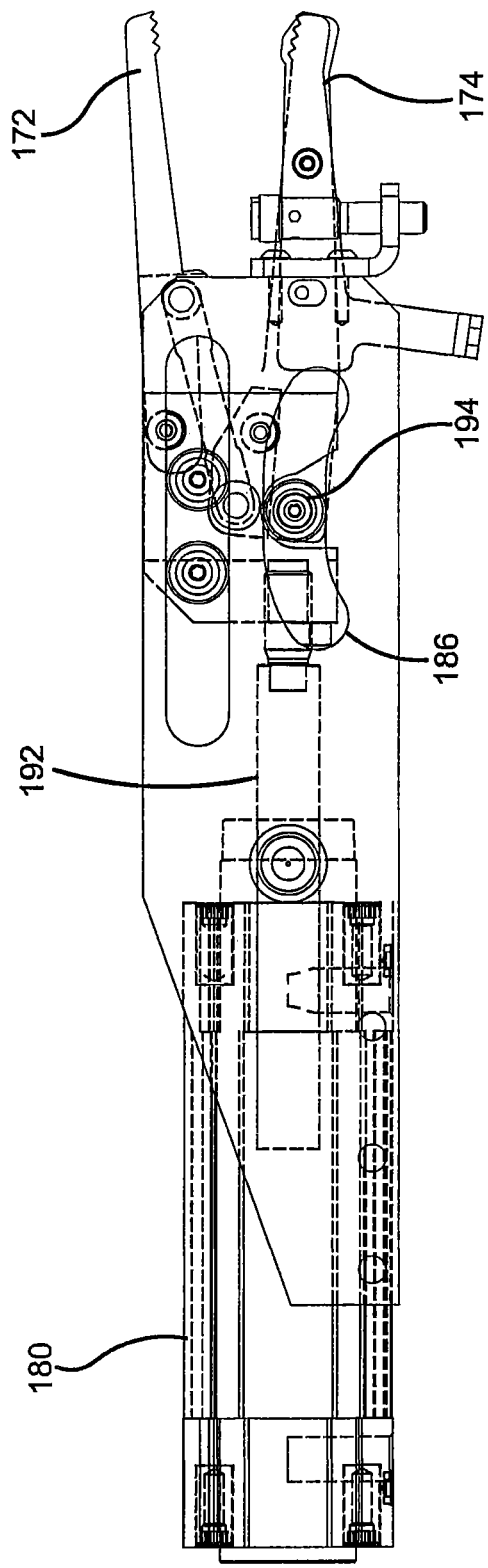
Figure 42:
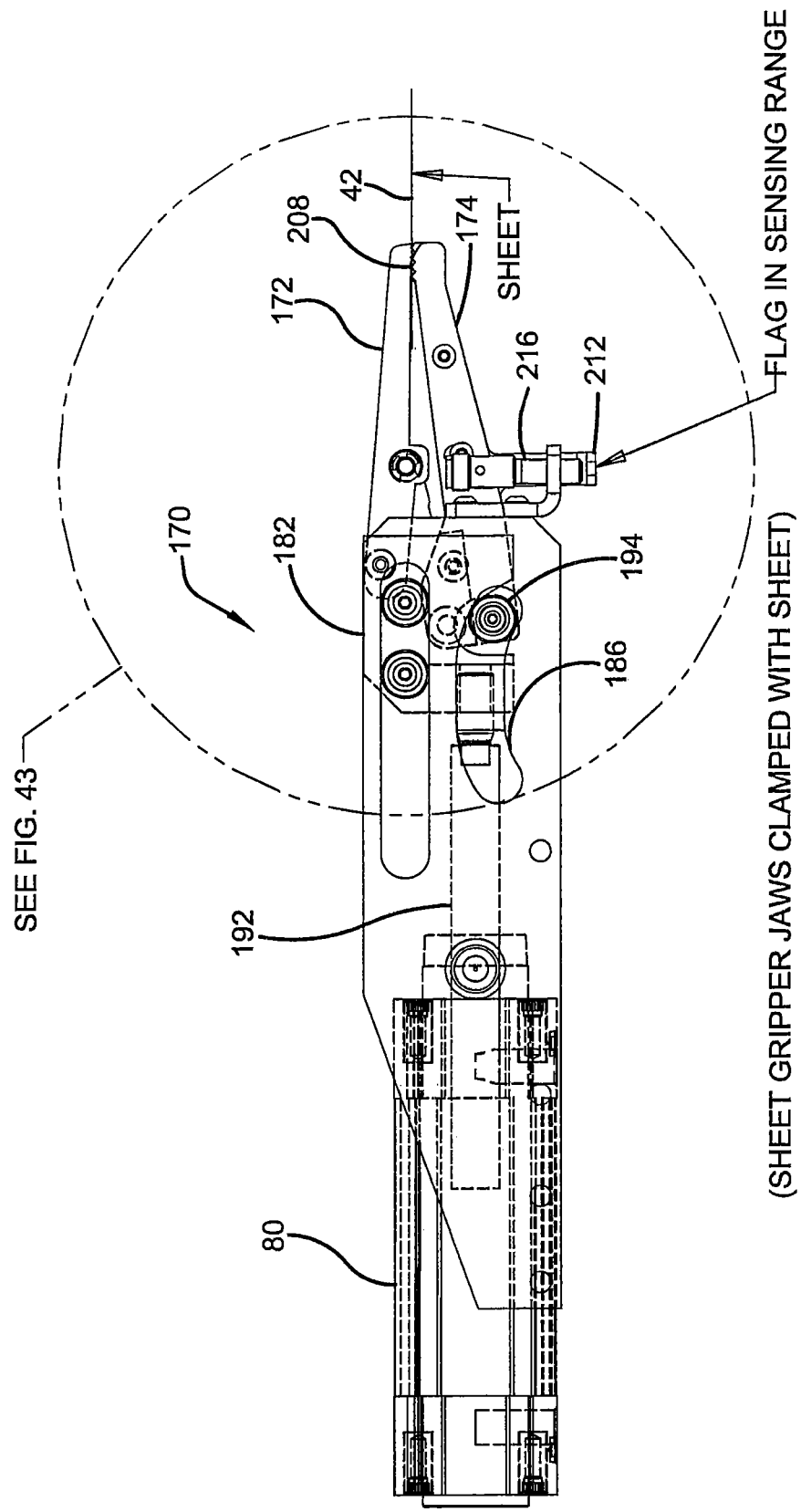

In the exemplary arrangement the sheet gripper 170 includes a pair of jaws including a top jaw 172 and a lower jaw 174. The exemplary jaws are selectively movable horizontally and between positions in which the jaws are open and closed. In the exemplary arrangement the sheet gripper and jaws are movable between a retracted position in which the jaws are disposed on the back side away from the dunnage sheet such as is shown in FIG. 40. The sheet gripper is selectively movable horizontally from the retracted position to a middle position as shown in FIG. 41 in which the jaws are open and are closer to the dunnage sheet. The exemplary sheet gripper 170 is further selectively movable horizontally from the middle position to a clamped grip position in which the jaws are moved together and engaged on opposite sides of a horizontally extending edge portion of the dunnage sheet that is immediately adjacent to a back side edge. The clamped position of the exemplary sheet gripper is shown in FIG. 42.

In the exemplary machine a pair of horizontally disposed sheet grippers 170 are utilized. Each of the sheet grippers 170 is movably mounted on a respective horizontal track 176. An actuator 178 such as a motor is in operative connection with the sheet gripper and is operable to selectively horizontally position each respective sheet gripper 170 in selected positions along the horizontally extending track 176. Suitable sensors such as an encoder is operative to detect and provide to the at least one controller of the machine, signals which are indicative of the current horizontal position of each sheet gripper. In exemplary arrangements the at least one data store in operative connection with the at least one controller includes data that corresponds to a suitable horizontal position along the track for each sheet gripper when a particular size or model of container is being handled by the machine. As can be appreciated in order to perform the function of holding the dunnage sheet that extends between a layer of containers, the jaws of the sheet gripper must be positioned to extend in a space that exists between adjacent containers at the back side of the dunnage sheet. The exemplary controller is operative responsive to input data when setting up the machine which is indicative of the particular container size, to determine horizontal locations in which the jaws may engage an edge portion of a dunnage sheet. The at least one controller is operative responsive to the stored data to cause operation of the actuators 178 to position the sheet grippers along the respective track 176 in the horizontal positions in which the jaws can engage the edge portion of dunnage sheets without engaging the containers above or below the respective dunnage sheets. Of course it should be understood that this approach is exemplary and in other arrangements other approaches may be used.

Figure 34:
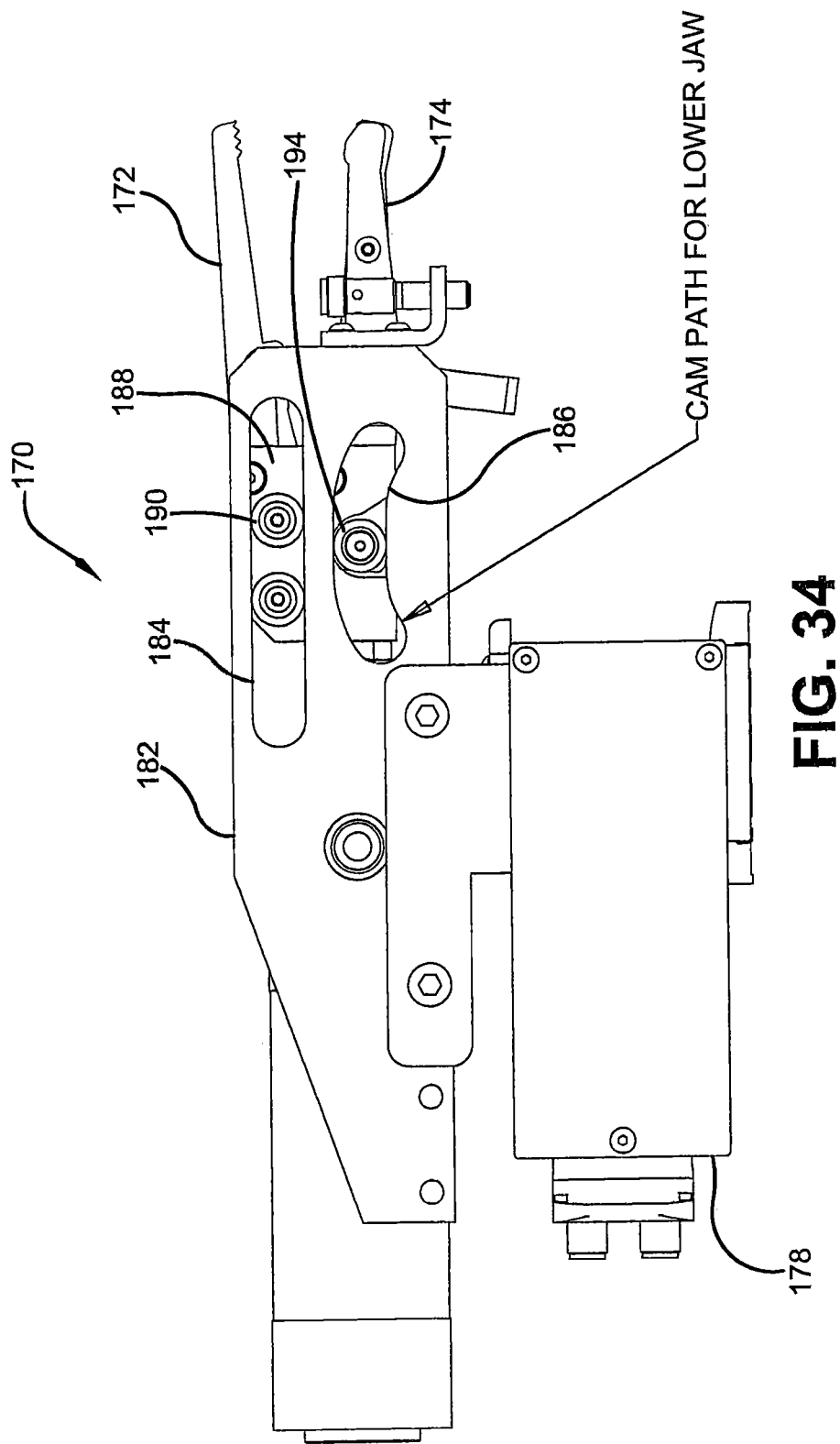
Figure 35:
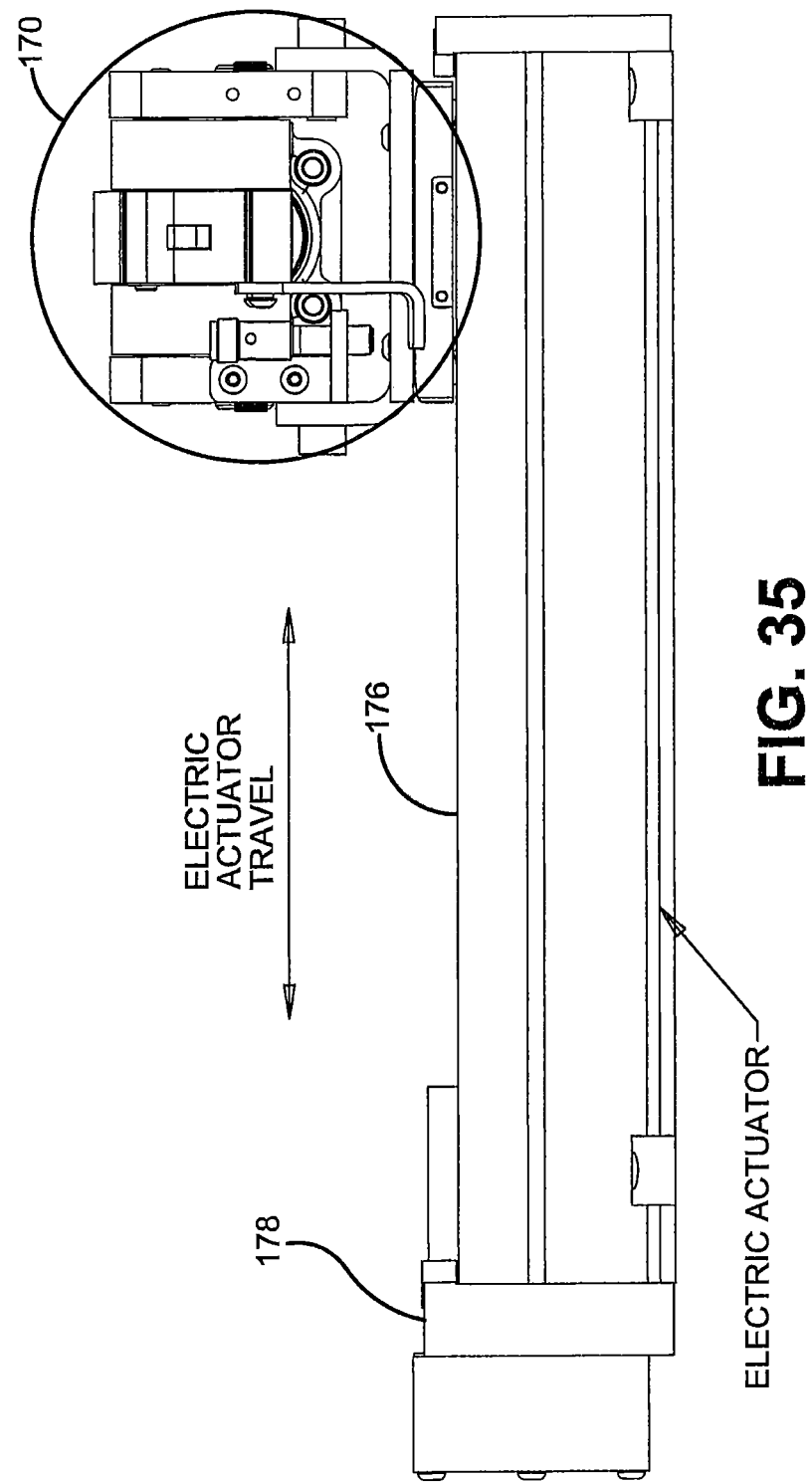
Figure 36:
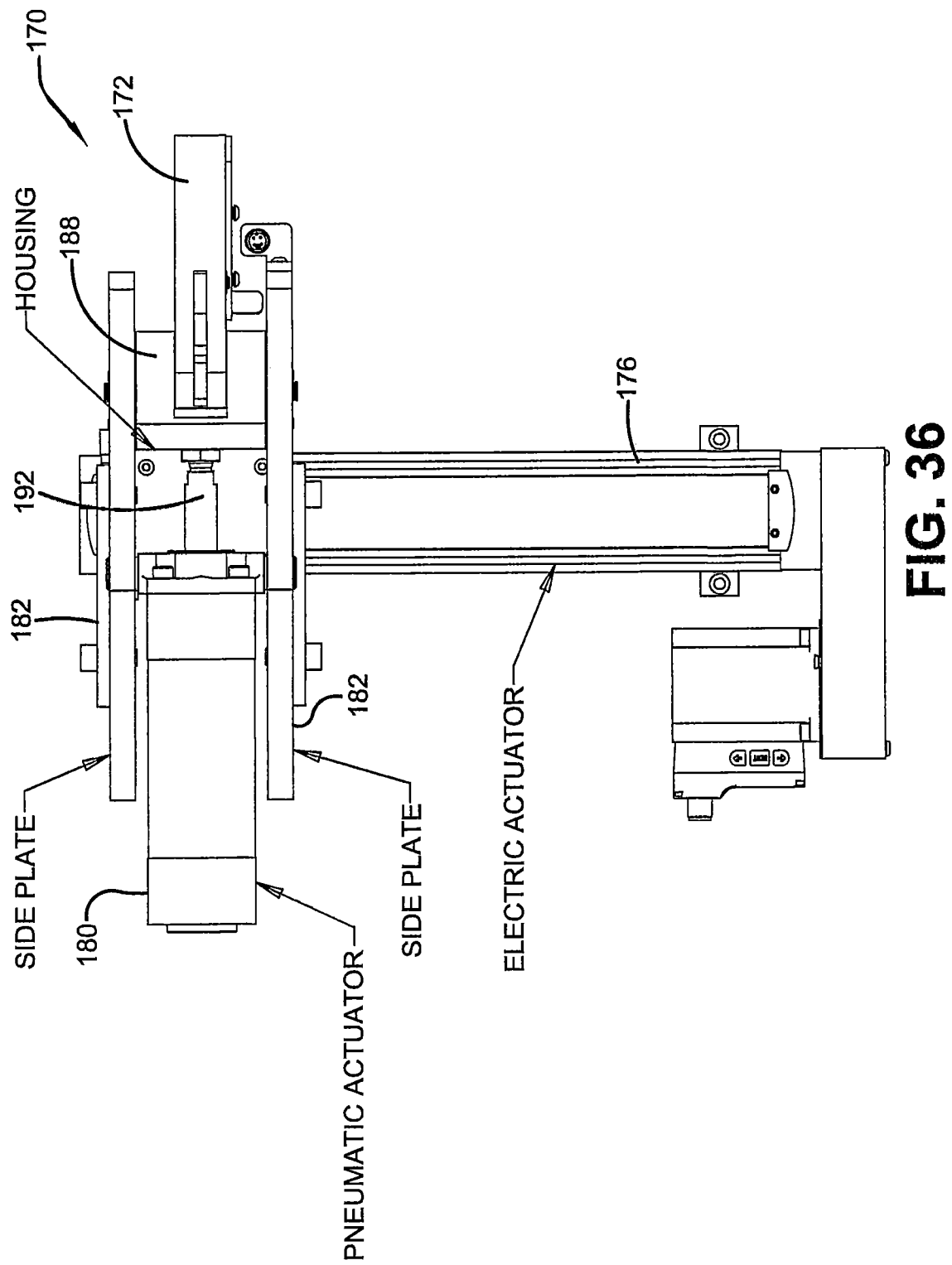

The exemplary sheet grippers 170 are in operative connection with a horizontal actuator 180. In exemplary arrangements the actuator 180 is operative to move the jaws in a horizontal direction perpendicular to the track 176. The exemplary actuator 180 is operative to move the respective sheet gripper between the retracted position, the middle position and the extended grip position. The exemplary actuator 180 comprises a pneumatic cylinder with a moveable rod. The position of the rod is controlled by the at least one controller through operation of at least one solenoid valve and responsive to suitable sensors that are operative to detect the position of the rod and/or components of the sheet gripper 170. The exemplary sheet gripper includes a pair of horizontally disposed side plates 182. As shown in FIG. 34 each of the side plates 182 includes a straight horizontal cam slot 184 and a curved cam slot 186. A housing 188 is positioned intermediate of the side plates 182. A pair of cam rollers 190 extend horizontally outward from each side of the housing 188 and move in guided relation in the straight cam slots 184 responsive to the position of a cylinder rod 192 of the actuator 180 which is engaged with the back side of housing 188 as shown in FIG. 36.

Figure 39:
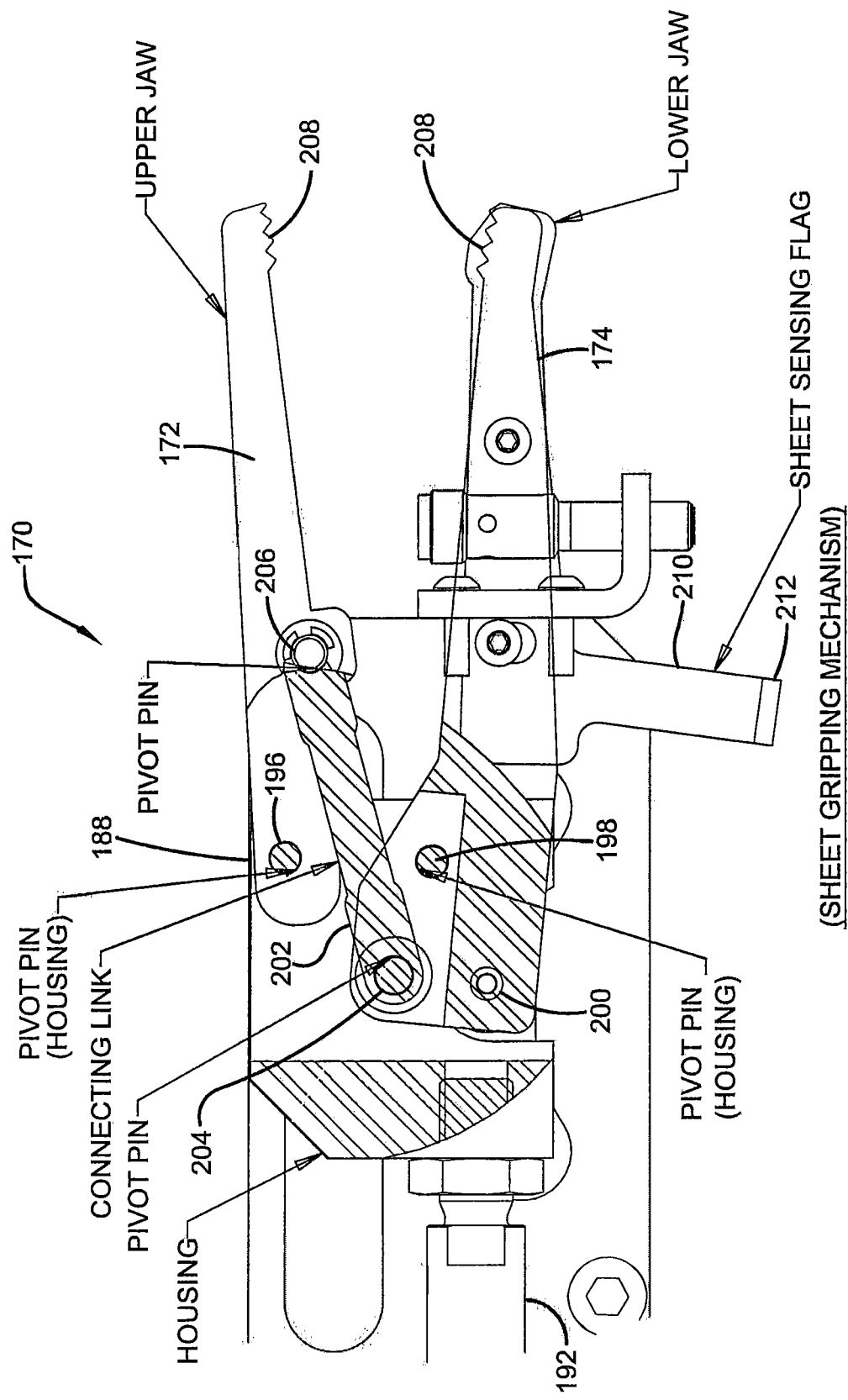

A jaw actuating cam roller 194 extends from each horizontal side of the housing and moves in guided relation in the curved cam slot 186. As can be appreciated the vertical position of the cam roller 194 varies with the position of the cam roller in the cam slot 186. The cutaway view of FIG. 39 shows the internal components of the sheet gripper 170. The upper jaw 172 is rotatable relative to the housing 188 about a fixed pivot pin 196 and the lower jaw 174 is rotatable relative to the housing about a fixed pivot pin 198. The actuating cam rollers are connected to the lower jaw on each side and are rotatable about an axis of an actuating pin 200. A connecting link 202 connects the lower jaw and the upper jaw. The connecting link 202 is rotatably connected to a pivot pin 204 on the lower jaw and a pivot pin 206 on the upper jaw.

FIG. 39 shows the open position of the jaws 172, 174 when the actuator positions the sheet gripper in the middle position. FIG. 40 shows the position of the jaws and other components when the actuator 180 moves the housing 188 into the retracted position. As can be appreciated in the retracted position the actuator cam rollers 194 and the actuator pin 200 that is attached thereto is positioned in the portion of curved cam slots 186 that is furthest away from the dunnage sheet and the cans. As can be seen from FIG. 34 in this position the actuating pin 200 is disposed vertically lower than in the middle position of the gripper shown in FIGS. 39 and 41. This causes the lower jaw 174 which is rotatable relative to the housing 188 about the pivot pin 198 to have its outward end disposed upwardly compared to the position of the outward end of the lower jaw in FIG. 39. Likewise the movement of the actuator pin 200 to the downward position causes the connecting link 202 to move the outer portion of the upper jaw 172 to a position that is downward compared to the position shown in FIG. 39. As a result the upper and lower jaws are engaged in the retracted position as shown in FIG. 40. In the exemplary arrangement the at least one controller of the machine is operative to keep the sheet grippers 170 in the retracted position which is horizontally away from the dunnage sheets during times in the machine cycle when a dunnage sheet that is between layers of containers is not required to be held in a stationary position.

When the at least one controller operates to cause the sheet grippers to engage a dunnage sheet the controller operates in accordance with its programming to change the condition of a solenoid valve or other similar structure to deliver air pressure to the actuator 180 and to move the rod 192 outward therefrom to the middle position of the grippers shown in FIGS. 39 and 41. As previously discussed in this position the outward ends of the jaws 172, 174 are disposed vertically apart as a result of the movement of the rollers 194 in the curved cam slots 186.

Figure 43:
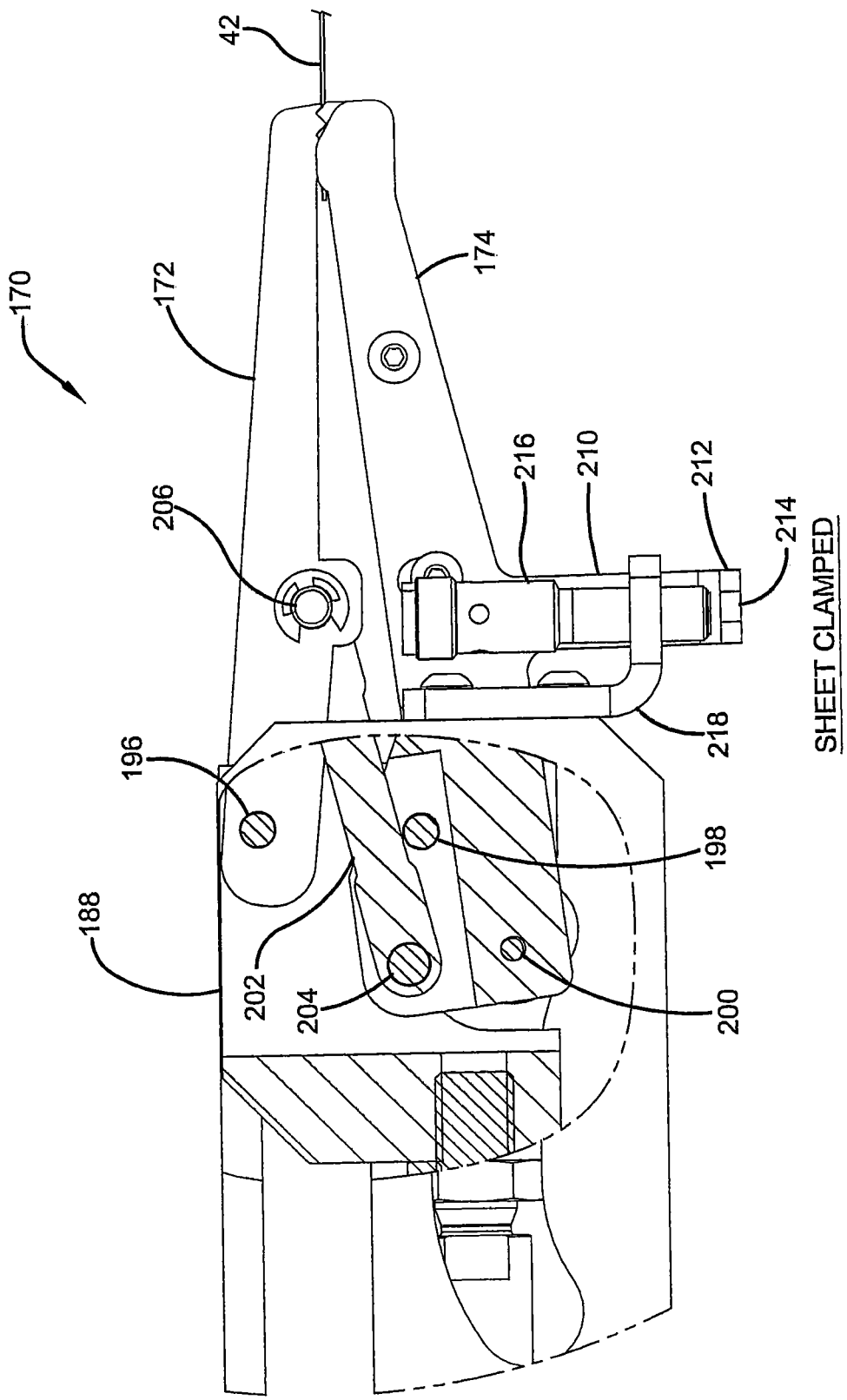

Further movement of the rod 192 of the actuator 180 from the middle position toward the extended grip position causes the rollers 194 to move to the outward ends of the curved cam slots 186 in each of the side plates 182. Such movement of the rollers 194 is operative to cause the upper and lower jaws 172 and 174 respectively to rotate about the fixed pivot pins 196 and 198. As the outward ends of the jaws move into close proximity responsive to horizontal movement of the actuator rod, the ends of the jaws engage the vertically opposed sides of the edge portion dunnage sheet 42. In the exemplary arrangement the outer ends of the upper jaw 172 and the lower jaw 174 each include respective teeth 208 which help to hold the dunnage sheet in engagement with the jaws of the gripper when in the extended clamped grip position as shown in FIGS. 42 and 43. In the clamped grip position the exemplary sheet gripper 170 is operative to hold the dunnage sheet 42 intermediate of the upper and lower jaws in a manner that prevents the back edge portion of the dunnage sheet from horizontally moving as the layer of cans is swept therefrom in a manner like that later discussed.

It should be understood that although in the exemplary arrangement the dunnage sheet grippers 170 are configured to engage the back side edge portion of the dunnage sheet in two horizontally disposed locations, in other arrangements other approaches may be used. For example in some arrangements dunnage sheet grippers may be operative to hold dunnage sheets on the longitudinal sides of the dunnage sheets rather than on the back side. Such sheet grippers that engage the longitudinal sides of the dunnage sheet may be used in addition to or as an alternative to sheet grippers which hold the back side of the dunnage sheet. Further it should be understood that while in the exemplary arrangement a pair of opposed sheet engaging jaws is utilized for gripping the sheet, in other exemplary arrangements other types of sheet holding members may be utilized. These may include for example opposed pads, rollers, or other types of members that are suitable for holding a dunnage sheet in a stationary position.

In the exemplary arrangement the sheet grippers 170 are associated with a sensor that is usable to determine if when the sheet gripper has moved to the clamped grip position, a dunnage sheet has not been engaged between the upper and lower jaws. In the exemplary arrangement the lower jaw has a sheet sensing flag projection 210 in attached connection therewith. The flag projection extends downward from a lower portion thereof on one horizontal side. The sheet sensing flag projection is in fixed operative connection with the lower jaw 174 through at least one fastener 211. The exemplary sheet sensing flag projection includes a turned sensed portion 212. The turned sensed portion of the exemplary arrangement extends generally perpendicular to the portion of the flag projection 210 that extends above the sensed portion 212. In the exemplary arrangement the sensed portion 212 includes a magnetic sensing element 214 thereon.

Figure 37:
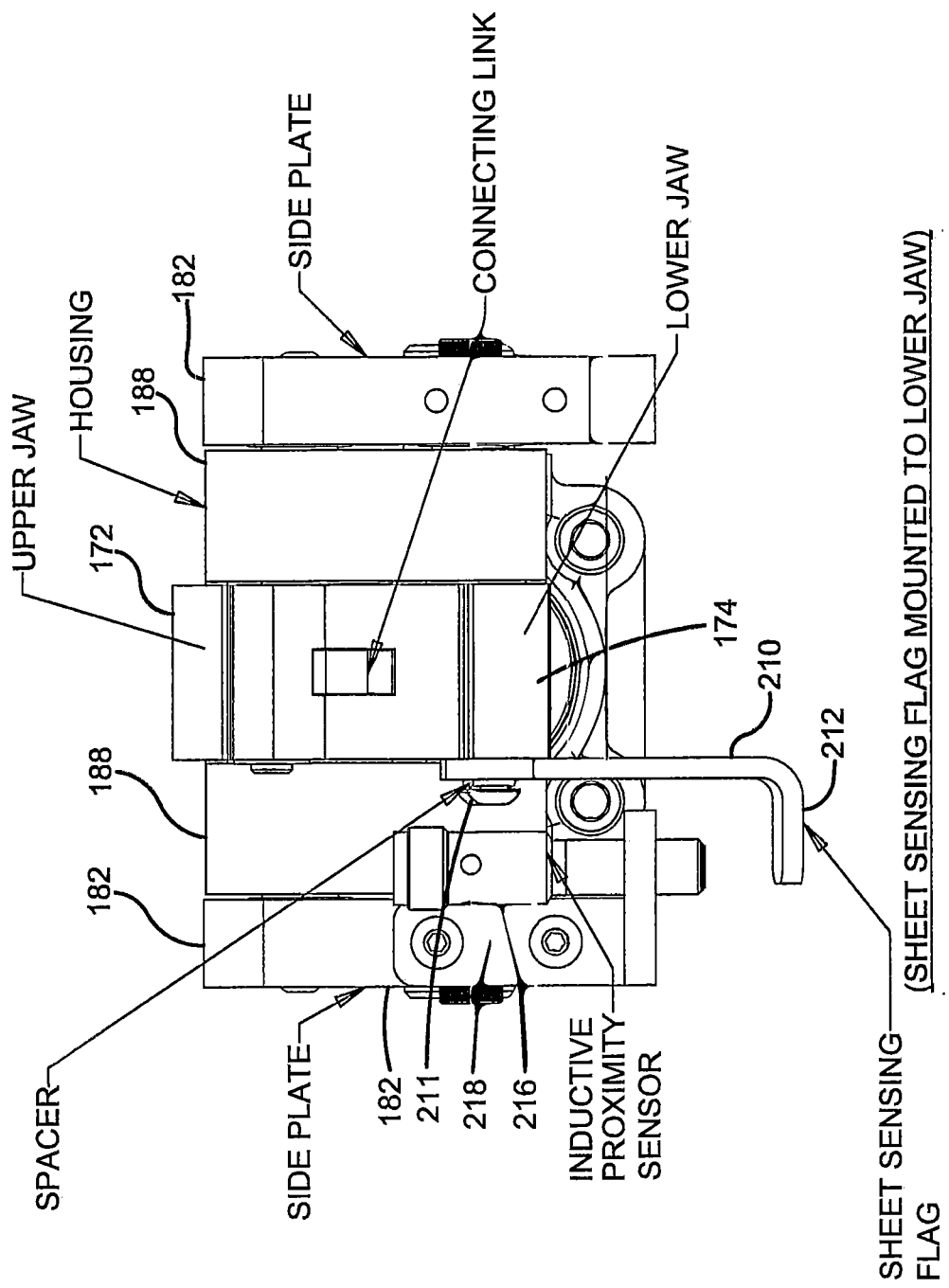
Figure 38:
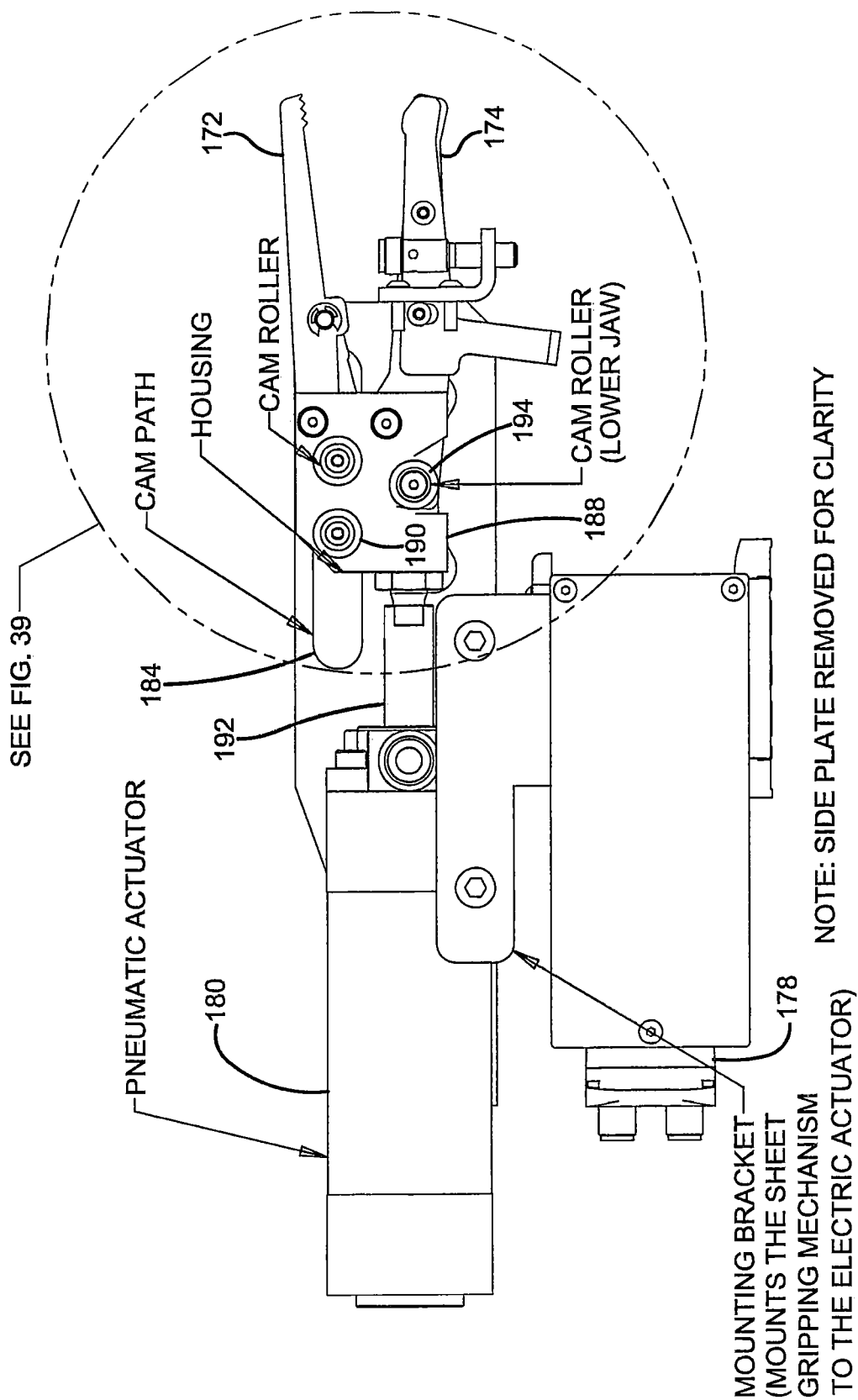
Figure 44:
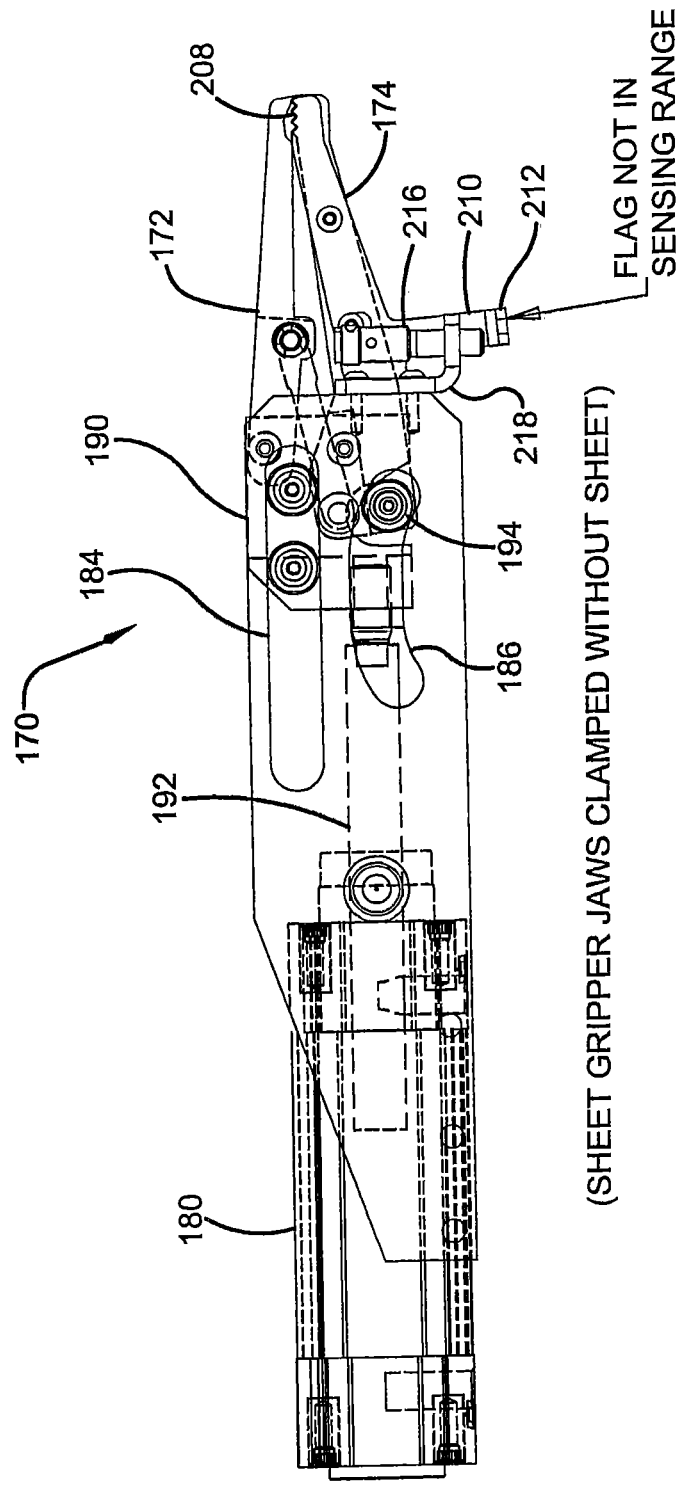
Figure 45:
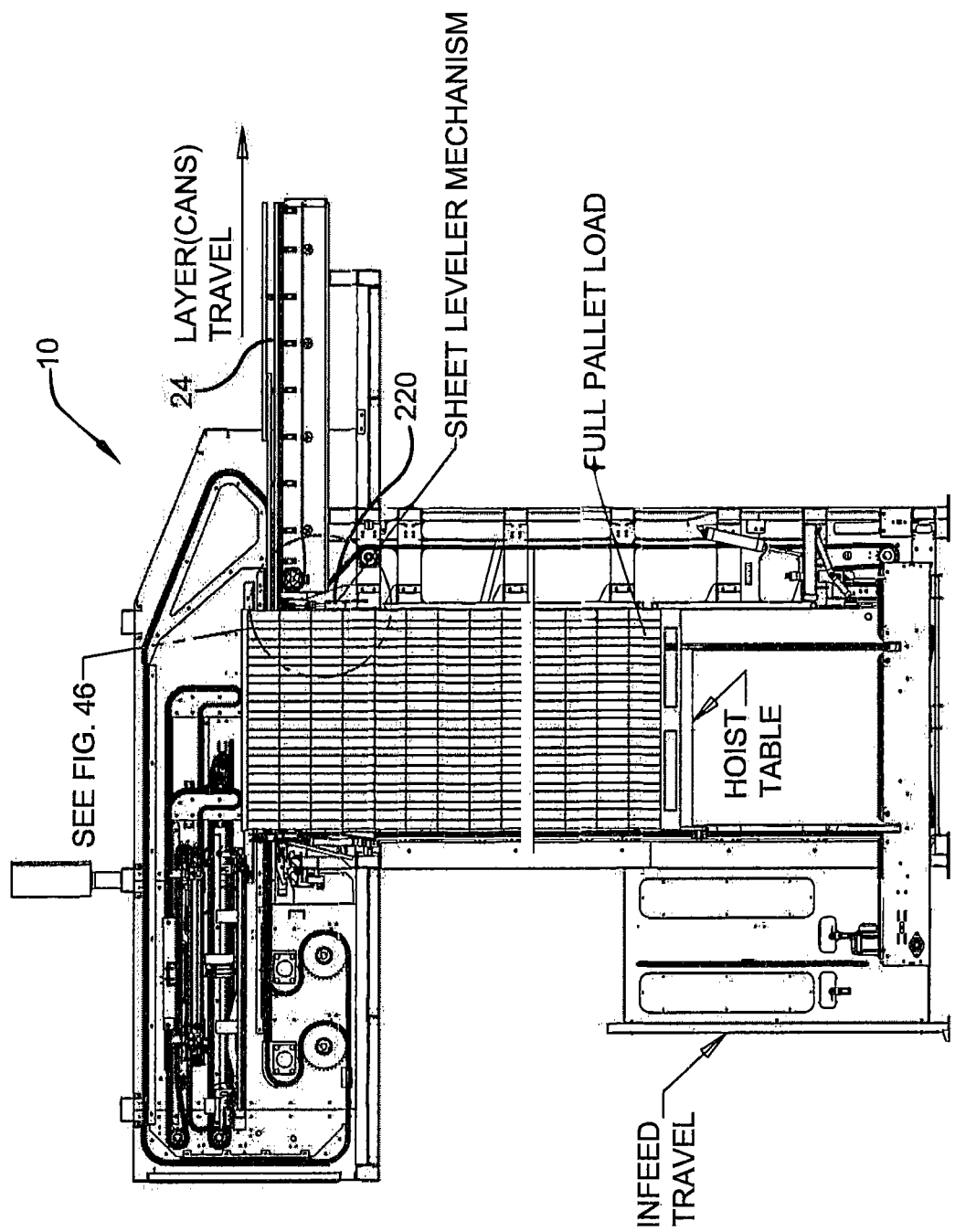
Figure 46:
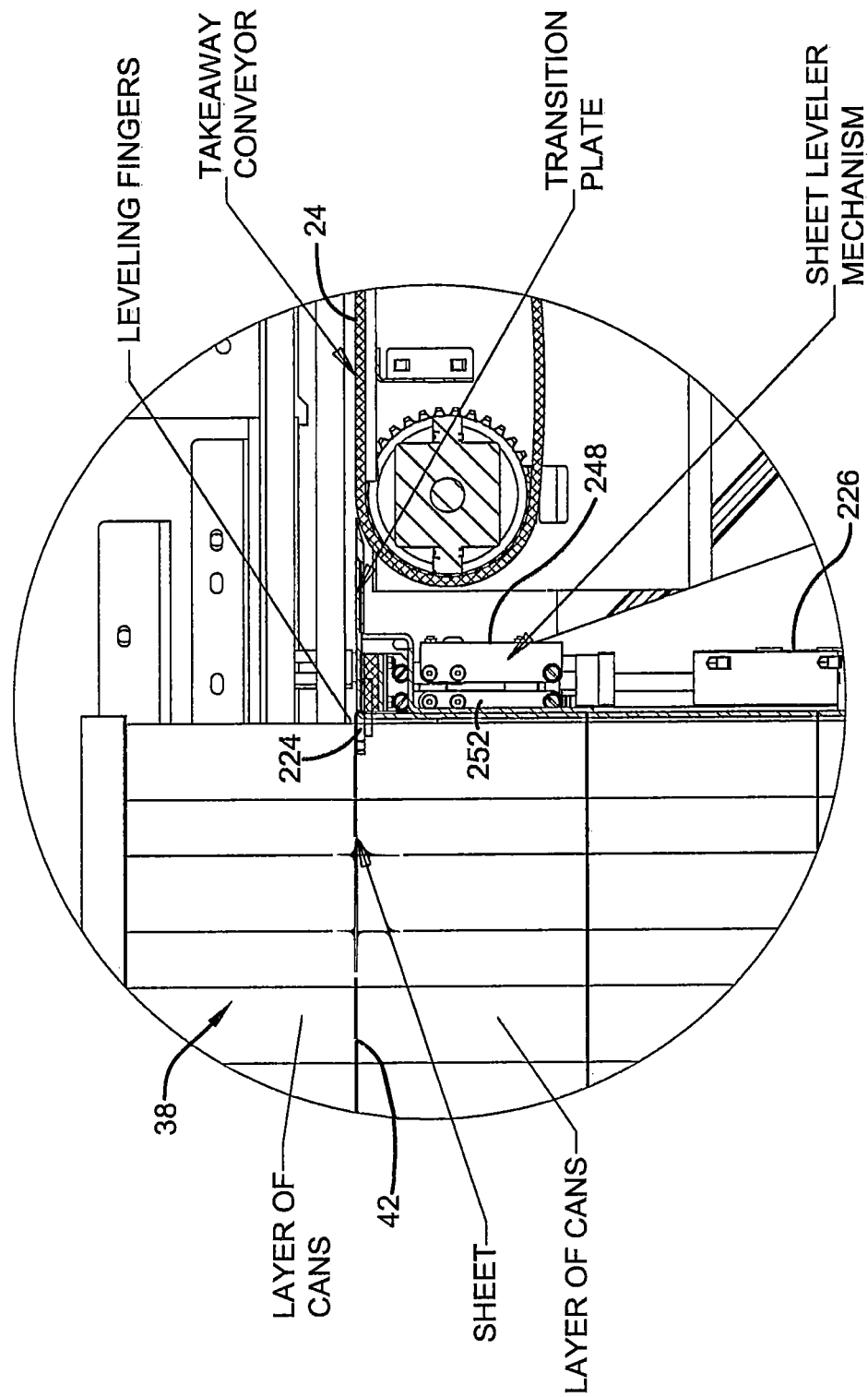
Figure 50:
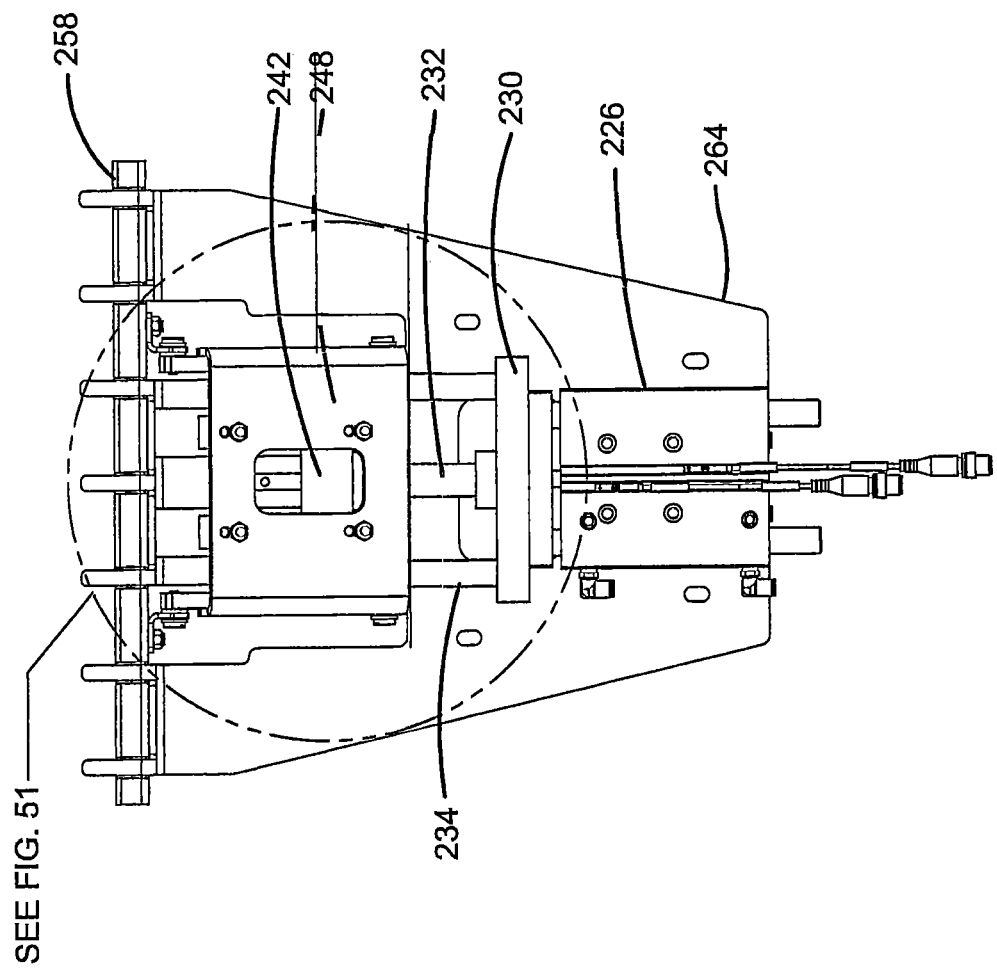
Figure 51:
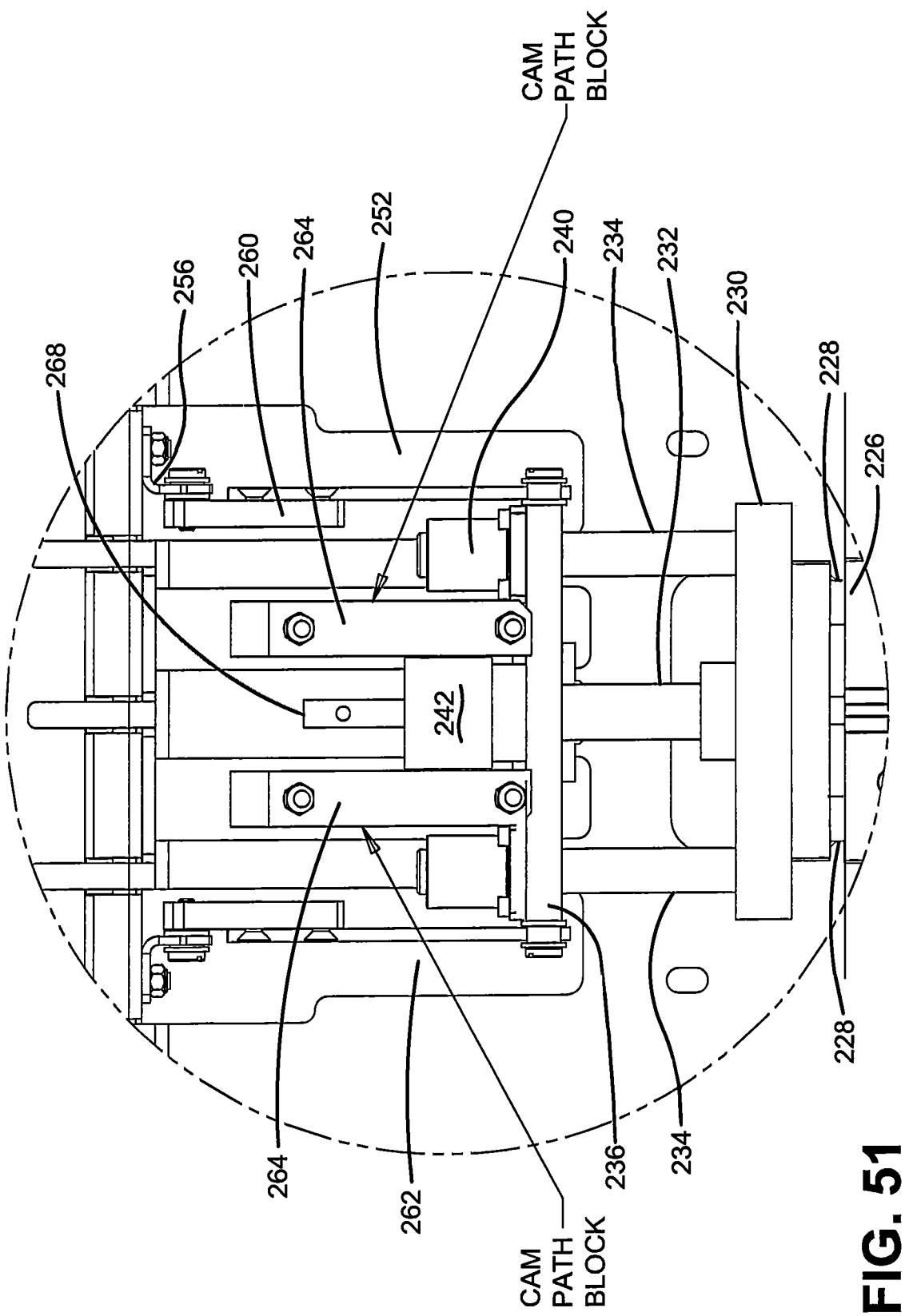
Figure 52:
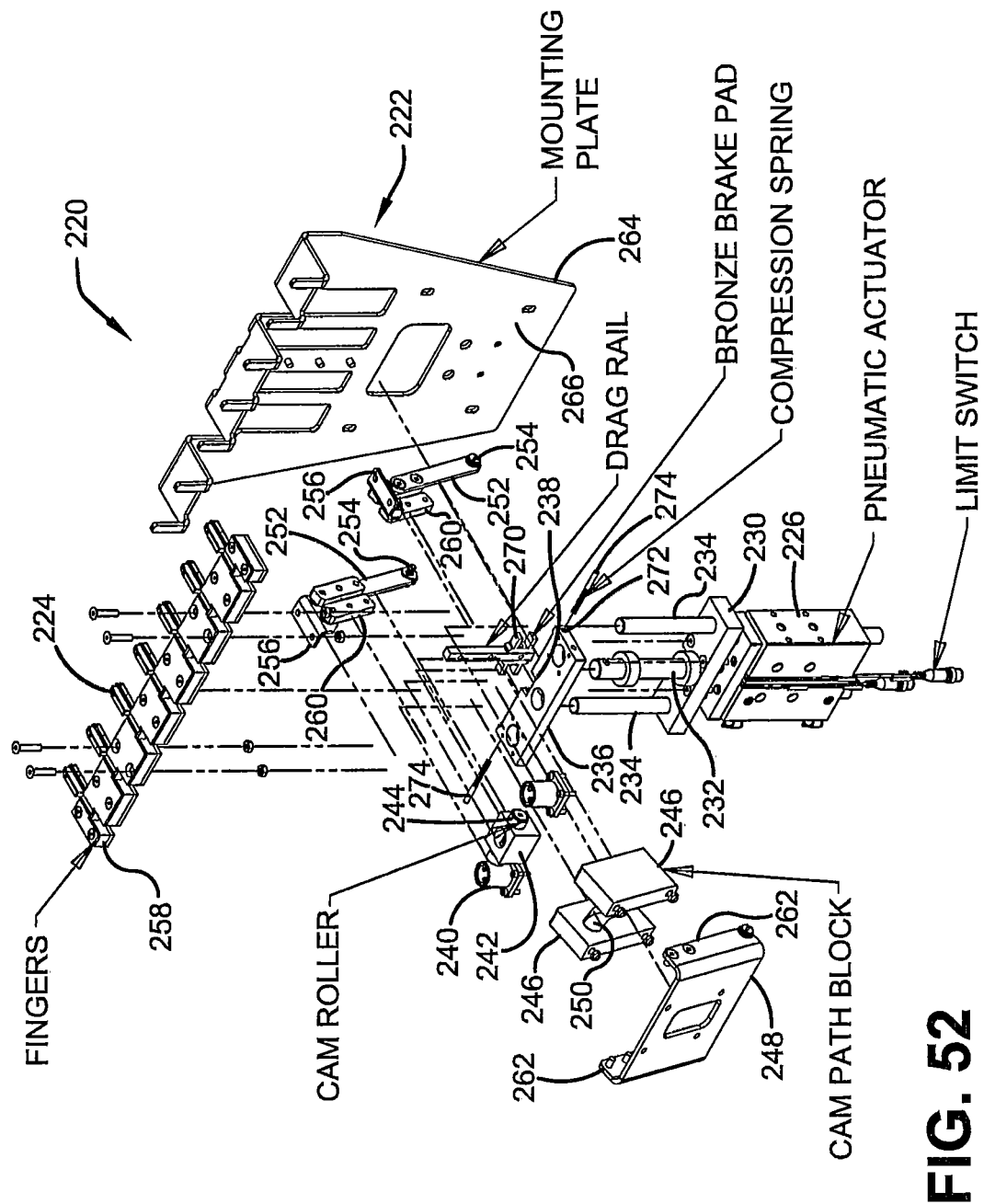

A sensor 216 is mounted to a side plate 182 through a bracket 218 as shown in FIG. 37. The exemplary sensor is an inductive proximity sensor that is operative to detect when the sensed portion 212 of the flag projection 210 is in aligned relation therewith. In the exemplary arrangement and as represented in FIGS. 42 and 43, when the sheet gripper 170 has the jaws thereof in clamped engagement with a dunnage sheet, the sensed portion 212 is positioned in aligned relation with the sensor 216 and is detected thereby. However if as represented in FIG. 44 the sheet gripper 170 has moved to the clamped grip position but no dunnage sheet is positioned intermediate of the teeth 208 at the ends of the jaws 172, 174, the sensed portion 212 is disposed to a position in which the sensing element 214 is not detected as aligned with the sensor 216. As a result the signals from the sensor enable the at least one machine controller to determine that the particular sheet gripper 170 has not engaged with the dunnage sheet.

When the at least one controller is operative to make this determination, the controller is enabled to operate in accordance with its programming to identify a potential fault condition. Further in some exemplary arrangements when the fault condition is determined the controller operates in accordance with its programming to operate the actuator 180 to return the gripper to the middle position in which the jaws are separated. The controller may then operate to move the gripper to the clamped grip position to again attempt to engage a dunnage sheet with the jaws. Further in some arrangements the controller may operate responsive to the circuit executable instructions stored in the at least one data store responsive to failing to engage a dunnage sheet, to move the gripper which has experienced the problem to another location along the track 176 through operation of the actuator 178. The controller may then operate to cause the gripper 172 engage and grip the dunnage sheet between the jaws in this horizontal location. Of course this approach is exemplary and in other arrangements other approaches and gripper arrangements may be utilized.

In the exemplary arrangement the sheet grippers 170 operate to hold the dunnage sheet underlying and immediately supporting the containers to be swept off the dunnage sheet and onto the container take away conveyor 24. After the containers have been removed from the dunnage sheet, the controller operates in accordance with its programming to move the sheet grippers from the clamped position to the retracted position. In this way the sheet grippers 170 are disengaged from the dunnage sheet and are retracted horizontally away from the dunnage sheet and the stack. This enables the pick head 66 to engage the dunnage sheet and move it into the dunnage tray 154 storage area in a manner like that previously discussed.

It should be mentioned that in exemplary arrangements there is a dunnage sheet that is located below the last layer of containers in the stack and directly engaged on a top surface of the pallet. In some pallet configurations the walls of the pallet will be positioned such that the lower jaw of the sheet gripper 170 will be unable to extend underneath the dunnage sheet due to being blocked by a wall of the pallet. In order to hold the last dunnage sheet in position while the final layer of containers is removed therefrom the exemplary arrangement also includes a further sheet gripper that is used to hold the final dunnage sheet in engagement with the pallet. In exemplary arrangements the sheet gripper may have a structure similar to sheet gripper 170, but may include only an upper jaw. Such an upper jaw may be movable horizontally and downward to engage and grip the top surface of a back edge portion of the final dunnage sheet to hold it in pressed biased engagement with the top of the pallet. Such a sheet gripper may include structures similar to sheet gripper 170 which provides for downward movement of the single upper jaw responsive to horizontal movement of an actuator. Alternatively in other arrangements other types of holding members and actuators may be utilized. In some exemplary arrangements only a single sheet gripper of this type may be necessary to engage and hold the dunnage sheet that is in immediately abutting relation with the top surface of the pallet. Further such a gripper may be positioned on a horizontal rail and be movable similar to sheet grippers 170, such that the position thereof may be selectively controlled responsive to operation of the at least one controller based on the type of container being handled by the machine. Of course it should be understood that these approaches are exemplary and other arrangements other approaches may be used.

The exemplary machine further includes a dunnage sheet leveler 220. The dunnage sheet leveler is positioned at the front or forward side of the stack and dunnage sheets, immediately adjacent to the container take away conveyor 24. In the exemplary arrangement the sheet leveler 220 includes a plurality of fingers that are operative to horizontally extend beneath and engage a horizontal front edge portion of the uppermost dunnage sheet that is supporting the layer of containers that are to be next moved from the stack and onto the conveyor. The sheet leveler operates to place the forward edge portion of the dunnage sheet at a suitable vertical elevation so that the upper surface of the dunnage sheet is generally vertically aligned with a transition plate onto and over which the containers will move to engage the take away conveyor.

In the exemplary arrangement the sheet leveler comprises an actuator that is controlled responsive to the at least one controller of the machine. The exemplary sheet leveler includes a plurality of fingers that initially move from a vertically downward position in which they are retracted horizontally away from being underneath the uppermost dunnage sheet, to a vertically upward and horizontally extended position in which they are in underlying engaged relation positioned below the bottom surface of the front edge portion dunnage sheet. Once the fingers are in the horizontally extended position underlying the front edge portion, the fingers move upward responsive to movement of the actuator to engage the underside of the front edge portion dunnage sheet. In the exemplary arrangement a plurality of horizontally disposed fingers engage the dunnage sheet in numerous horizontal locations transversely across the bottom surface of the sheet adjacent to the front edge portion. The actuator moves upwardly a sufficient distance so that the top surface of the front edge portion of the dunnage sheet is at a predetermined vertical elevation horizontally across the entire sheet. The actuator remains in this upward position while the containers are swept off the dunnage sheet, over the transition plate and onto the container take away conveyor 24 in a manner like that later discussed.

After the containers have been swept off the dunnage sheet the exemplary actuator first operates to cause the fingers to retract by moving in a horizontal direction toward the container take away conveyor and into slots in the transition plate and horizontally away from the dunnage sheet and the pallet hoist. The actuator then causes the fingers to move downward such that they are horizontally disposed away from the containers and dunnage sheets and below the transition plate. Thus in the retracted position the dunnage sheet from which the layer of cans has been removed is enabled to be engaged and transported by the pick head 66 and placed in the storage area of the dunnage tray 150 in a manner like that previously discussed. The controller then operates in accordance with its programming to move the pallet hoist upwardly until the next layer of cans is sensed by at least one sensor to be in a vertical position so that the next layer of containers can be removed by being swept from the stack. In some exemplary arrangements the sheet leveler may be operated to move toward the retracted downward position as the pallet hoist is moving the next layer of containers upward to the position in which the cans can be removed from the stack by sweeping them off an immediately underlying dunnage sheet and onto the take away conveyor 24.

In the exemplary arrangement the sheet leveler is operative to provide for movement of the dunnage sheet supporting fingers into four distinct vertical and horizontal positions required to perform the leveling operation, through an actuator that provides for movement of an actuating member along a single linear direction. This approach utilized in the exemplary arrangement reduces the number of devices needed to achieve the necessary movement and enhances reliability.

The exemplary sheet leveler structure is shown in further detail in FIGS. 46-64. The exemplary sheet leveler 220 includes a plurality of horizontally disposed finger positioning assemblies 222. The finger positioning assemblies are each operative to control the position of the plurality of interconnected leveling fingers 224 that are included in the assembly. The plurality of assemblies 222 are utilized so that numerous leveling fingers are engaged with the bottom surface of the dunnage sheet across the entire area adjacent to the front edge portion thereof. This helps to avoid any areas where vertical distance variations may impose impediments to the sweeping of containers off of the dunnage tray and onto a transition plate and the take away conveyor.

The exemplary arrangement includes a pneumatic actuator 226. The pneumatic actuator includes a pair of rods 228 that are selectively moved in upward and downward directions from the body of the actuator responsive of the delivery and release of fluid pressure. The rods are in operative connection with a base block 230. The exemplary base block includes three vertically extending rods that extend upwardly therefrom. The vertically extending rods include a central rod 232 and a pair of outboard rods 234 that extend on each transverse side of the central rod. A lower plate 236 includes holes therein through which the rods 234 and 232 extend. The holes in the lower plate are sufficiently large that the respective rods can move in the respective holes without binding. The exemplary lower plate 236 includes a central notch 238 therein in a side surface thereof. The central notch is associated with a drag brake that operates in a manner like that later discussed. The lower plate 236 is in attached connection with a pair of bearing sleeves 240. Each of the rods 234 extend through a respective bearing sleeve 240 in slidable relation.

In the exemplary arrangement the central rod 232 is in operative fixed connection vertically above the lower plate 236 with a cam block 242. The exemplary cam block includes a central opening which is engaged with the central rod 232. A cam roller 244 extends from each transverse side of the cam block 242. A pair of cam path blocks 246 are positioned in engagement with a back plate 248 so that one cam path block extends on each horizontal side of the cam block 242. Each cam path block includes a cam slot 250 therein. The cam roller 244 on the respective horizontal side of the cam block 242 is movable in the cam slot 250 of the respective cam path block.

A pair of forward levers 252 are positioned in horizontally disposed relation. A lower end 254 of each forward lever 252 is rotationally engaged with a horizontal side surface of the lower plate 236. The top of each forward lever 252 is rotationally engaged with the respective mounting bracket 256. The mounting brackets 256 are configured to engage a finger bar assembly 258 that includes the fingers 224. Each mounting bracket 256 is also rotatably engaged with a respective rear lever 260. Each rear lever 260 is held in fixed engagement with a forward extending side flange 262 of the back plate 248. Each side flange 262 of the back plate is attached in rotatable connection at its lower end with the lower plate 236. In the exemplary arrangement the lower end of the back plate side flange 262 is in attached connection with the lower plate 236 in a manner so that the front levers 252 and the back plate 248 and side flanges is thereof are independently rotationally movable relative to the lower plate 236.

In the exemplary arrangement the assembly 222 includes a mounting plate 264. The mounting plate 264 is configured to be mounted in fixed connection with the body of the machine. In the operative position the main plate portion 266 of the body plate 264 extends generally vertically. In the exemplary arrangement a generally rectangular drag rail 268 is attached in fixed connection with the mounting plate. Disposed on each transverse side of the drag rail are generally U-shaped brake pads 270. The inner generally planar faces of the brake ends engage horizontally opposed sides of the drag rail. The exemplary brake pads and drag rail are configured to extend in the notch 238 of the lower plate 236. The exemplary lower plate 236 includes openings 272 that extend from the lateral side surfaces of the lower plate to the notch. The openings 272 are configured to accept therein a respective compression spring and biasing plug 274. The springs and biasing plugs are each configured to biasingly engage a respective brake pad 270 and bias the planar face of the brake pad into engagement with the drag rail 268. In some exemplary arrangements the openings 272 that extend horizontally to the notch 238 may include threads in the outer areas to engage a fastener that serves as the rotatable pivot point for the adjacent forward lever 252. Of course it should be understood that this approach is exemplary and in other arrangements other approaches may be used.

Figure 58:
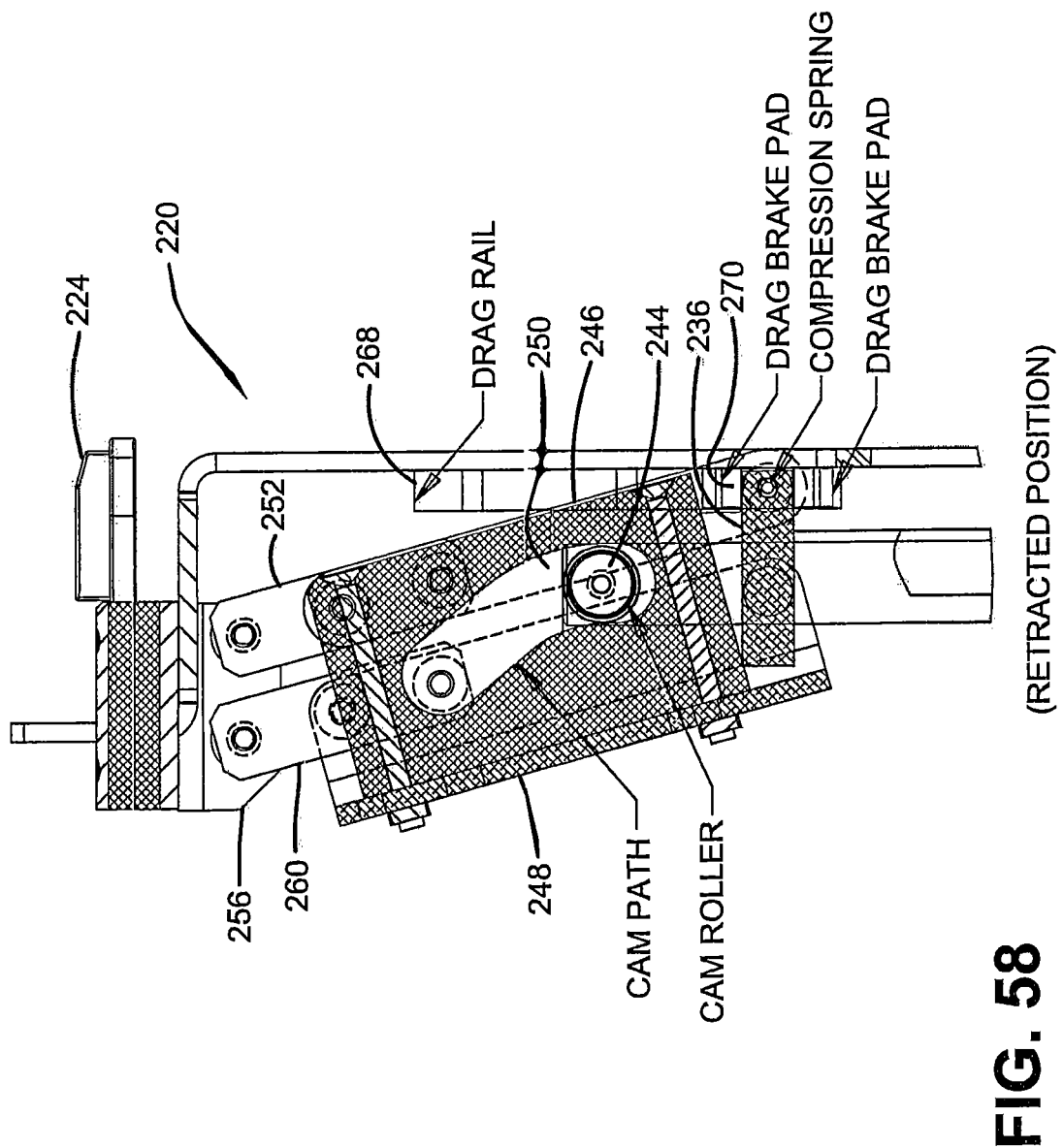
Figure 59:
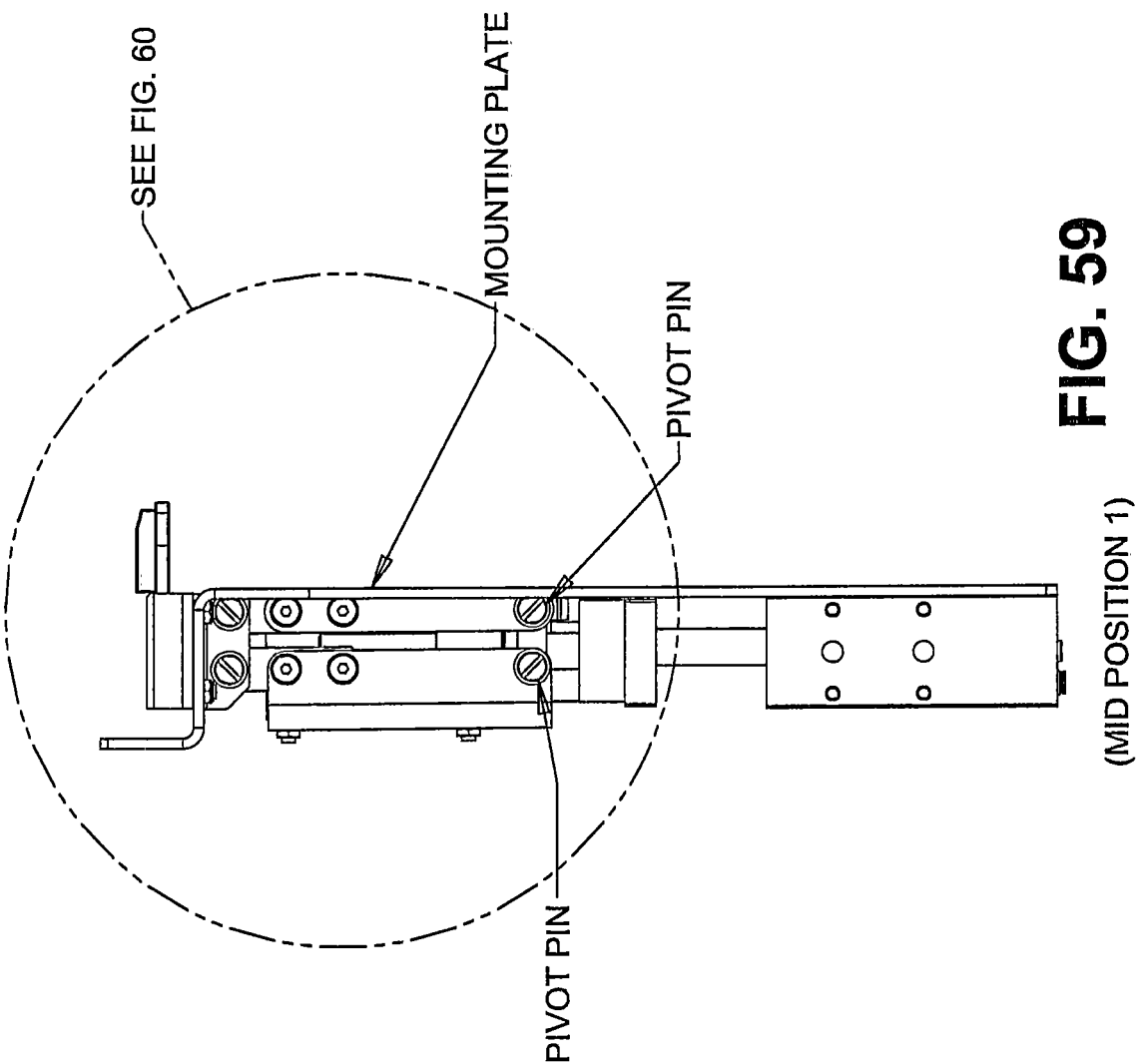
Figure 60:
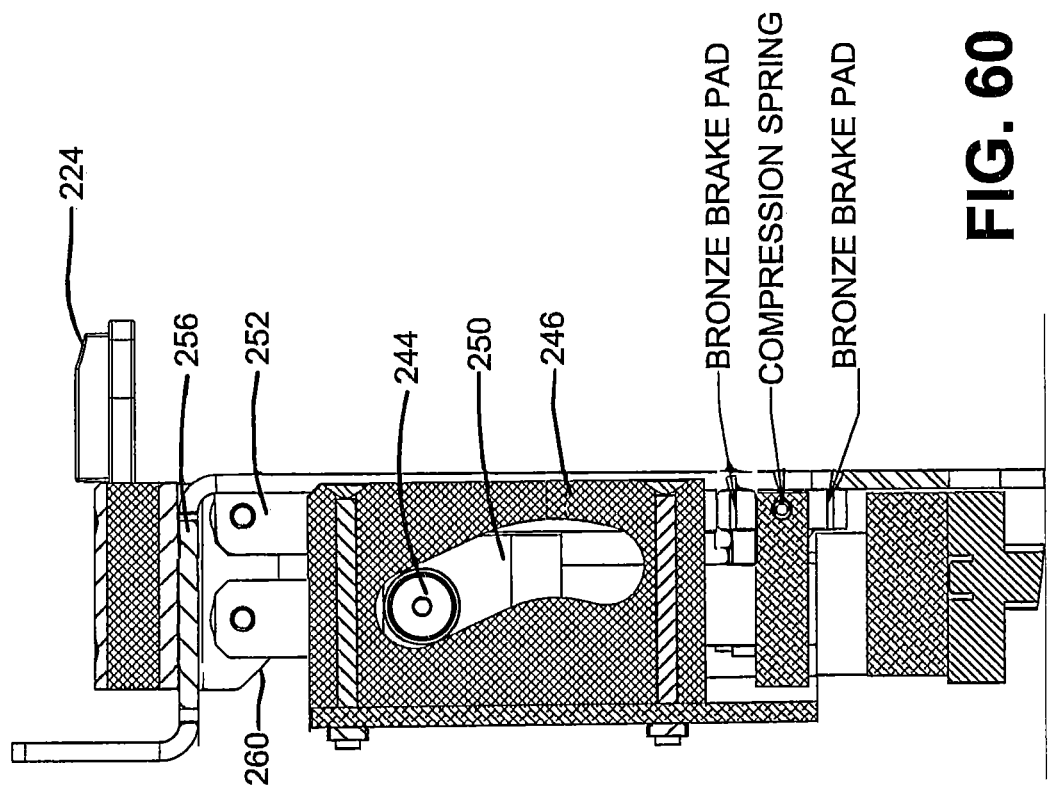
Figure 61:
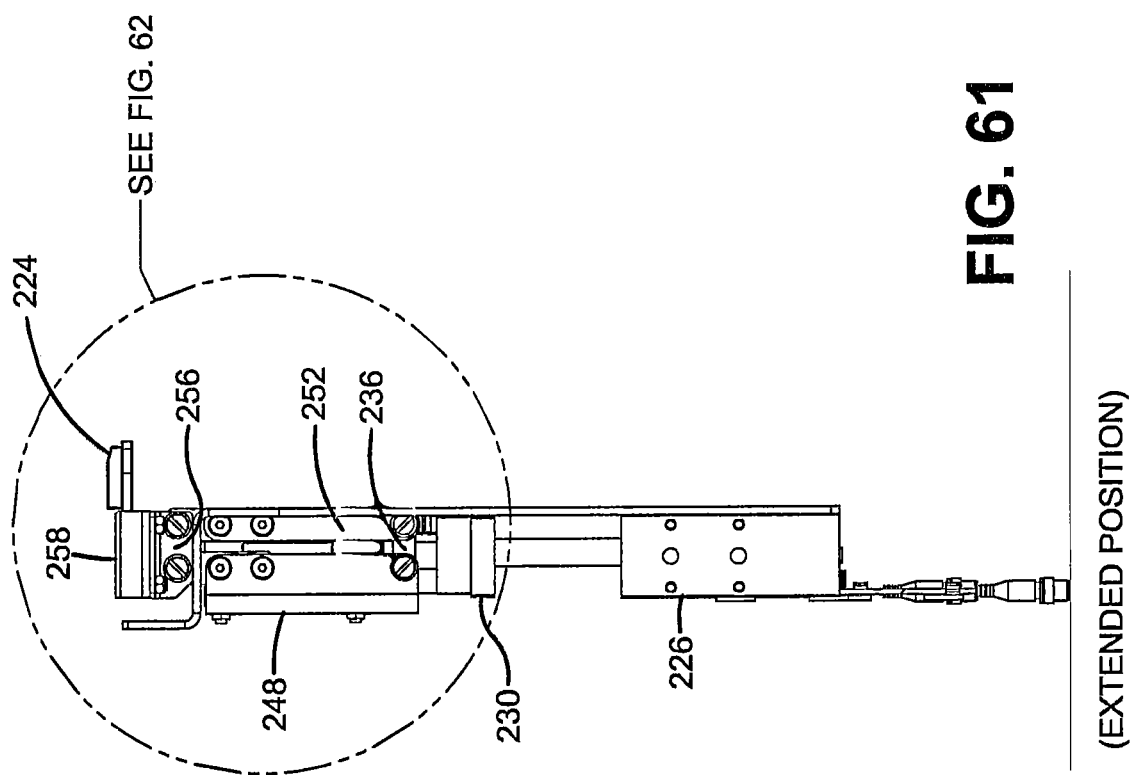
Figure 62:
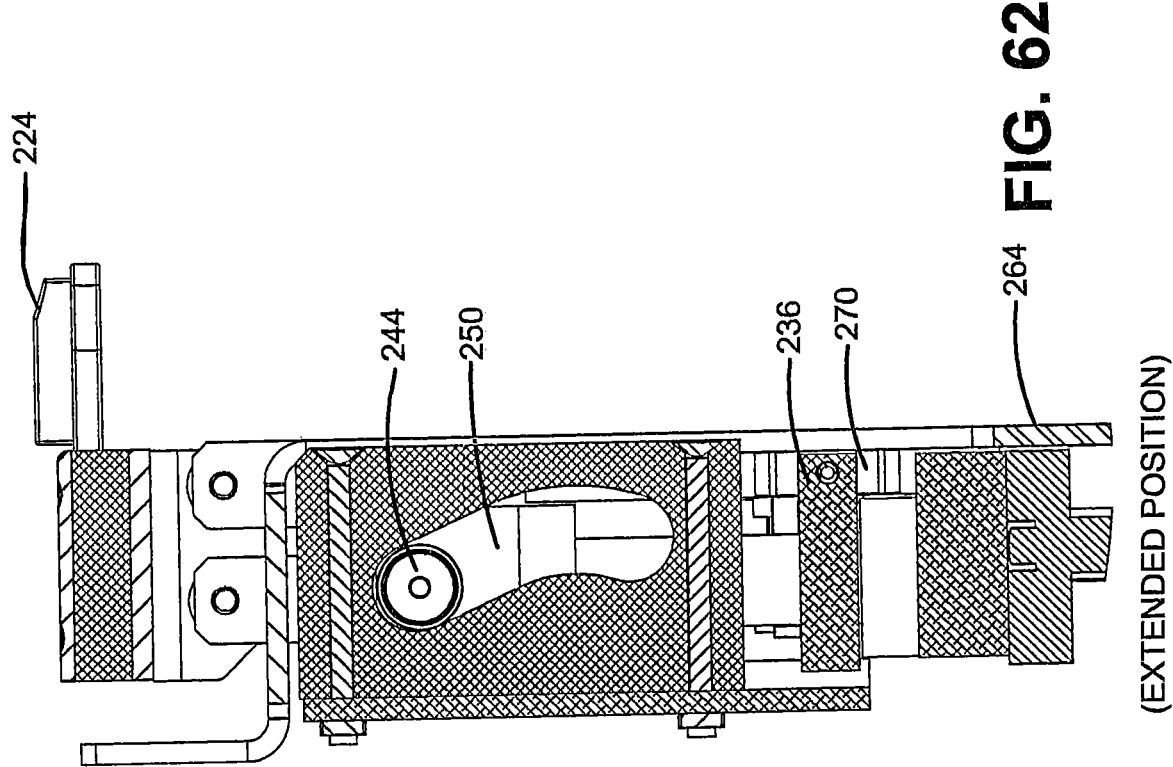
Figure 63:
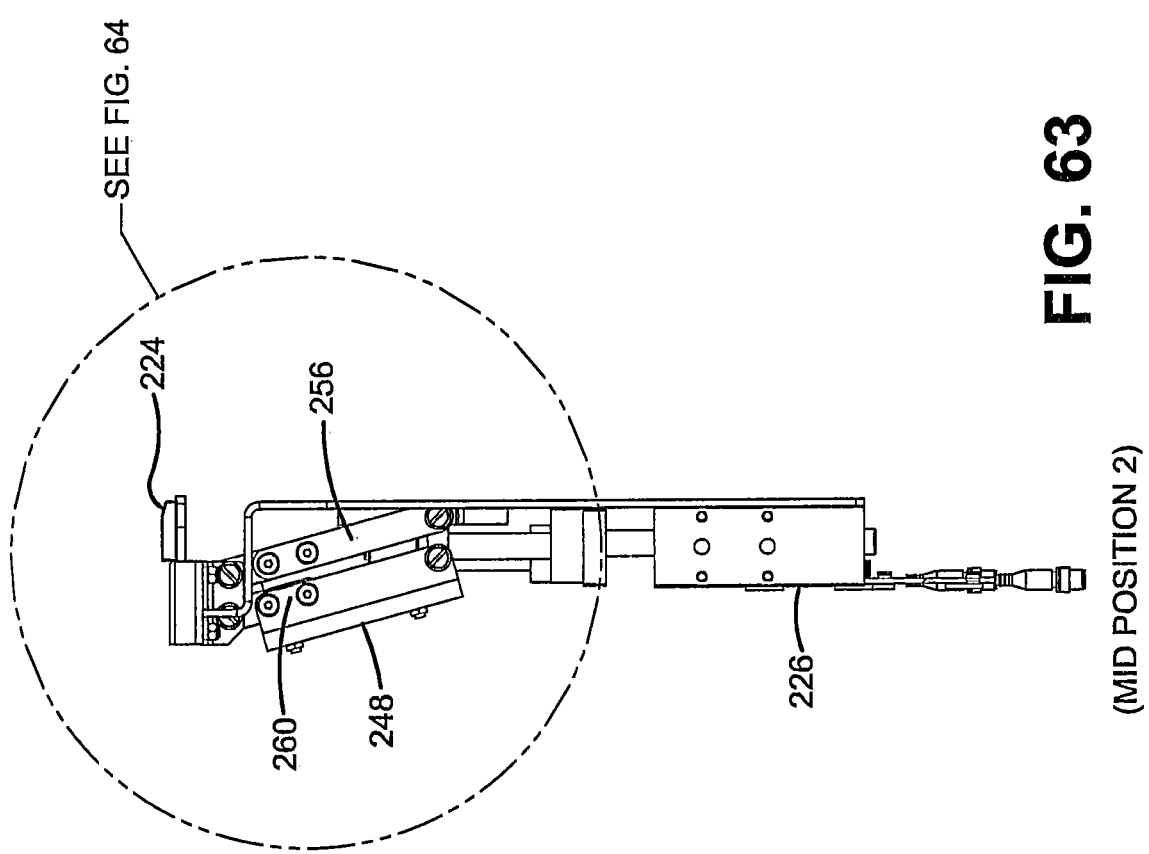

In operation of the exemplary sheet leveler 220 the fingers 224 which are attached to the finger bar assembly 258 are initially in a retracted horizontal position as shown in FIGS. 53, 57 and 58. It should be noted that in these Figures the orientation of the machine is shown in opposite hand views from that of the other Figures. As a result in these views the containers and dunnage sheets of the stack are positioned to the right of the mounting plate 264 and the take away and holding conveyor 24 is positioned to the left of the fingers 224. Further it should be noted that a transition plate 276 extends in overlying relation of the sheet leveler mechanism 220. The transition plate includes a plurality of horizontally disposed openings 278 through which the fingers 224 horizontally extend during certain portions of operation.

In the retracted position of the sheet leveler the fingers 224 are retracted horizontally inwardly away from the stack, the dunnage sheets and the pallet hoist, and are positioned below the transition plate 276 as shown in FIG. 53. As shown in FIG. 58 the fingers are held in this position by the engagement of the cam rollers 244 in the lower ends of the cam slots 250 of the cam path blocks 246. Responsive to the at least one controller making a determination to operate the sheet leveler 220, a solenoid valve or similar device is operated to deliver air pressure to the actuator 226. This causes the rods 234 and 232 to move upward through the corresponding openings in the lower plate 236. As the rods move upward, movement of the lower plate 236 in the upward direction is resisted by the engagement of the brake pads 270 with the drag rail 268.

Because movement of the lower plate is resisted by the brake pads, initial movement of the central rod causes only movement of the cam rollers 244 in the cam slots 250. Movement of the cam rollers 244 in the cam slots 250 causes the sheet leveler to change from the position shown in FIGS. 53, 57 and 58 to the position shown in FIGS. 54, 59 and 60. Due to the engagement of the brake pads with the drag rail the lower ends of the forward levers 252 and the lower end of the back plate 248 which are attached to the lower plate 236 rotate as the cam rollers 244 move to the upper end of the cam slots 250 in the cam path blocks 246. As a result the fingers 224 which are attached to the brackets 256 move horizontally to the right as shown from the positions shown in FIGS. 53, 57 and 58. In this position the fingers 224 are now positioned in underlying relation below the lower surface of the front edge portion of the dunnage sheet that is supporting the uppermost layer of containers.

Once the cam rollers 244 that are in attached connection with the cam block 242 have reached the upper end of the cam slots 250, the vertical force that is applied by the central rod 232 through the cam rollers 244 and to the cam path blocks 248 is sufficient to overcome the drag force that is applied by the engagement of the brake pads 272 with the drag rail 268. As a result the fingers 224 which had been extended horizontally to the right as shown in the Figures from the initial retracted position in FIG. 53, are now moved upward to the position shown in FIG. 55. In this position the fingers 224 are in underlying engagement with the bottom surface of the forward edge portion of the uppermost dunnage sheet supporting the top layer of containers. The fingers are positioned to be at a vertical level which provides a suitable transition from the dunnage sheet onto the transition plate 256. This extended upward position of the sheet leveler is shown in FIG. 55 as well as FIGS. 61 and 62. Further in some exemplary arrangements in the extended position of the fingers 224, the upper surface of the finger bar assembly 258 may be in abutting engagement with the underside of the transition surface 276. This exemplary arrangement provides a solid stop for the upper movement of the fingers and helps to assure that in the extended position of the sheet leveler the fingers are positioned at the desired vertical level. Of course it should be understood that this approach is exemplary and in other arrangements other approaches may be used.

With the sheet leveler 220 in the upward extended position as shown in FIG. 55 for example, the machine may operate in a manner later discussed to sweep the uppermost layer of containers from the uppermost dunnage sheet onto and across the transition plate 276 and onto the take away conveyor 24. Once the removal of the containers has been completed, the at least one controller changes the pressurized condition of the actuator 226 so the sheet leveler operates to retract the fingers 224 to the position shown in FIGS. 56, 63 and 64. In this position the fingers 224 are retracted inwardly into the slots of the transition plate. In exemplary arrangements the fingers are horizontally retracted away from dunnage sheets and other items supported by the pallet hoist while at the furthest upward vertical extent of their movement to provide clearance as soon as possible for the pallet hoist to move the next layer of cans upward into position. This approach reduces cycle time for the machine. Of course it should be understood that this approach is exemplary and in other arrangements other approaches may be used.

Figure 64:
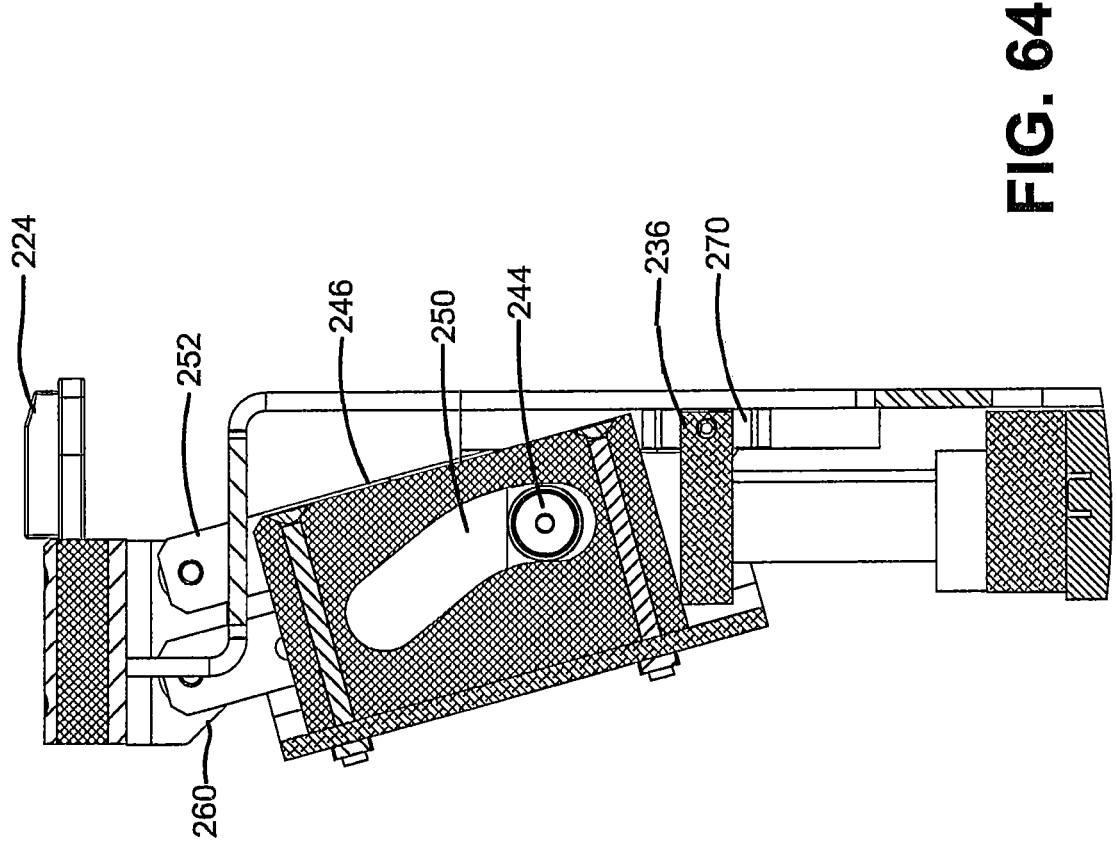
Figure 65:
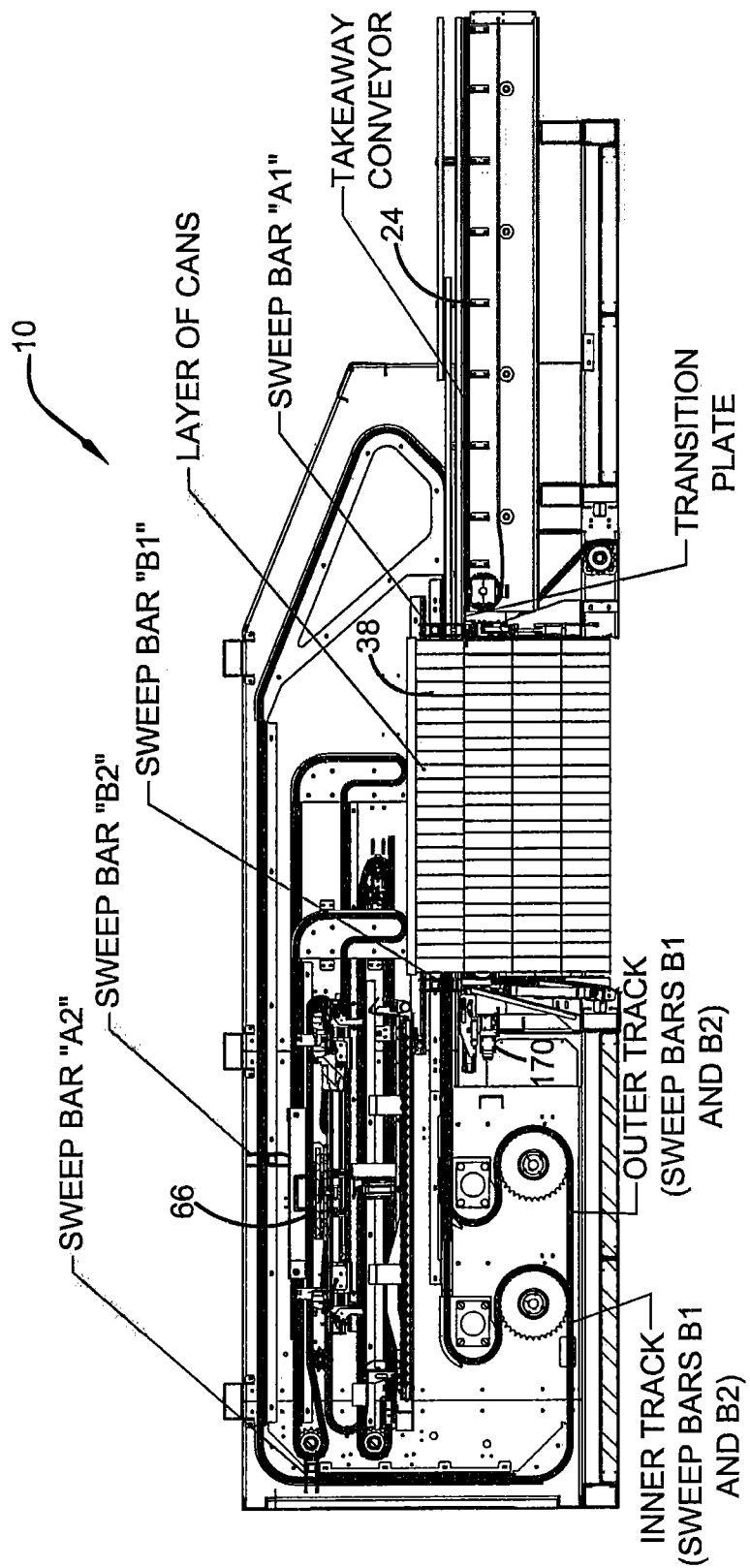
FIGS. 65-71 show independently driven pairs of sweep bars of the exemplary machine that are operative to sequentially move layers of containers that are supported on the pallet onto the container take away and holding conveyor.
Figure 66:
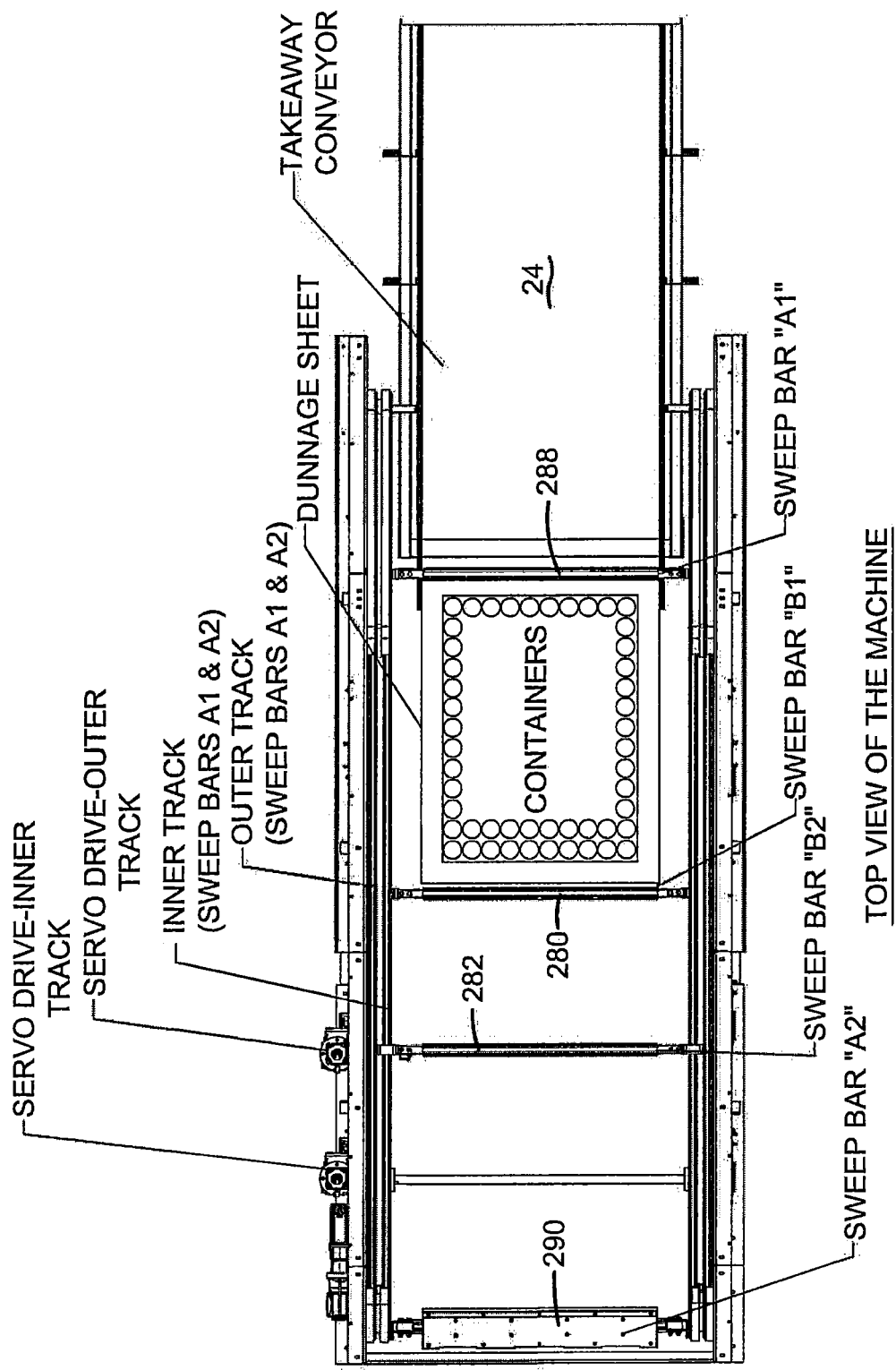

In the exemplary arrangement the fingers are horizontally retracted while at the level of the furthest upward travel by the at least one controller operating to cause the pneumatic actuator 226 to move the rods 232 and 244 downward. This causes the cam block 242 and the cam rollers 244 attached thereto to move relative to the cam slots in the cam path blocks 246 to the lowermost extent of travel as shown in FIG. 64. The exemplary sheet leveler operates to move in this manner initially because vertical movement of the lower plate 236 is resisted by the brake pads 270. As a result the lower plate which is attached to the forward levers 252 and rear levers 260 assume the orientation shown in FIGS. 56, 63 and 64 before any downward movement of the fingers occurs.

Once the cam rollers 244 have reached the lowermost extent of the cam slots 250 the vertical force applied from the actuator 226 pulling the lower plate 236 downward overcomes the drag force applied to the lower plate 236 by the brake pads 270. As a result the sheet leveler 220 returns to the fully retracted downward position shown in FIG. 53 for example. Of course it should be understood that the at least one controller of the machine operates to monitor the movement of the sheet leveler components during operation through the use of suitable sensing devices. In exemplary arrangements the at least one controller may also operate to control the speed of the actuator 226 and other associated components to facilitate the unloading of cans that are in operatively supported connection with the pallet onto the container take away and holding conveyor 24 from which the containers pass for further processing.

Of course it should be understood that in operation of the exemplary arrangement each one of the finger positioning assemblies 222 of the sheet leveler 220 operate in a coordinated manner responsive to the operation of the at least one controller. As a result all of the plurality of fingers move to a coordinated common vertical position in underlying engaged relation with the bottom surface of the forward edge portion of the uppermost dunnage sheet. This coordinated movement and vertical positioning assures that the containers can be swept off the dunnage sheet with a minimal risk of tipping or damage at a high production rate. Of course it should be understood that the approaches described for sheet leveling are exemplary and in other machine arrangements other approaches may be used.

Figure 67:
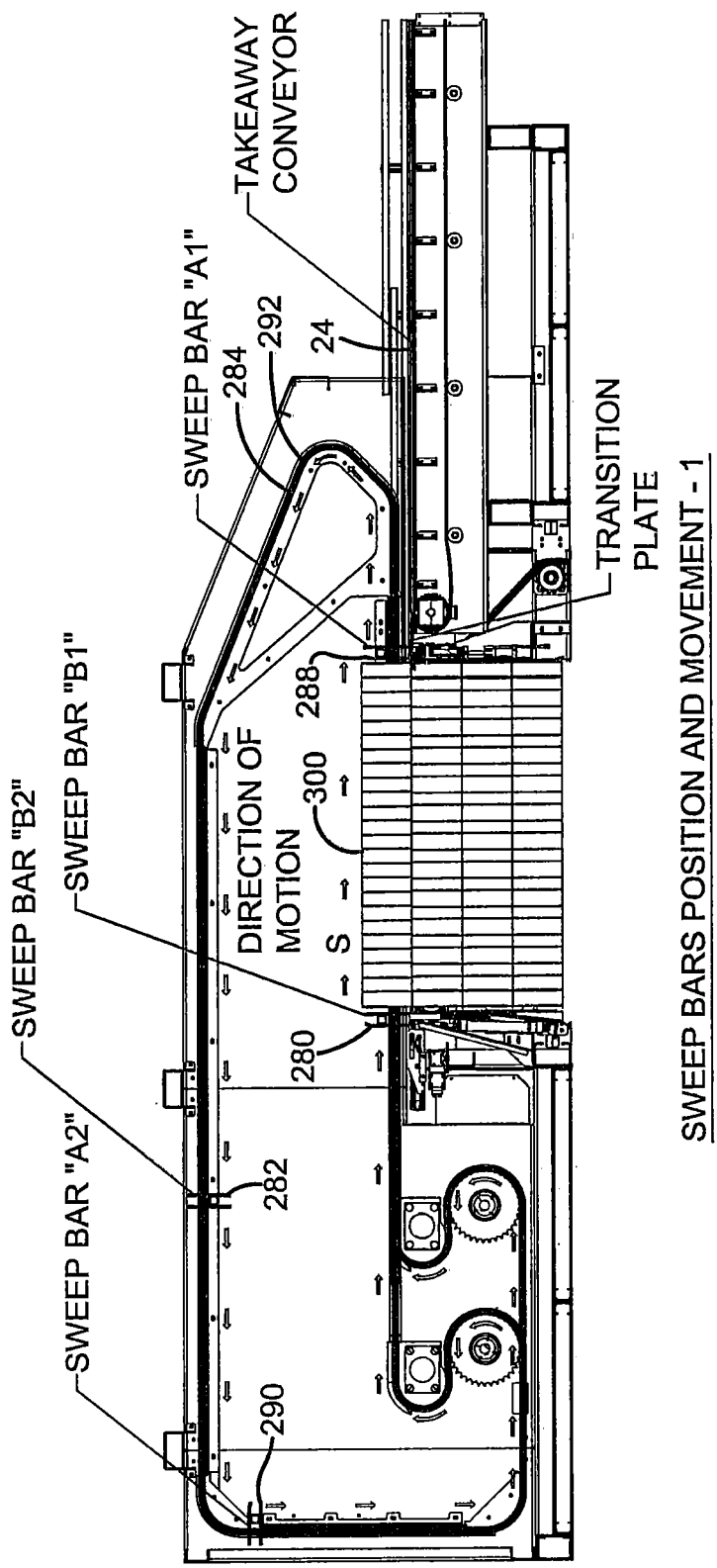
Figure 68:
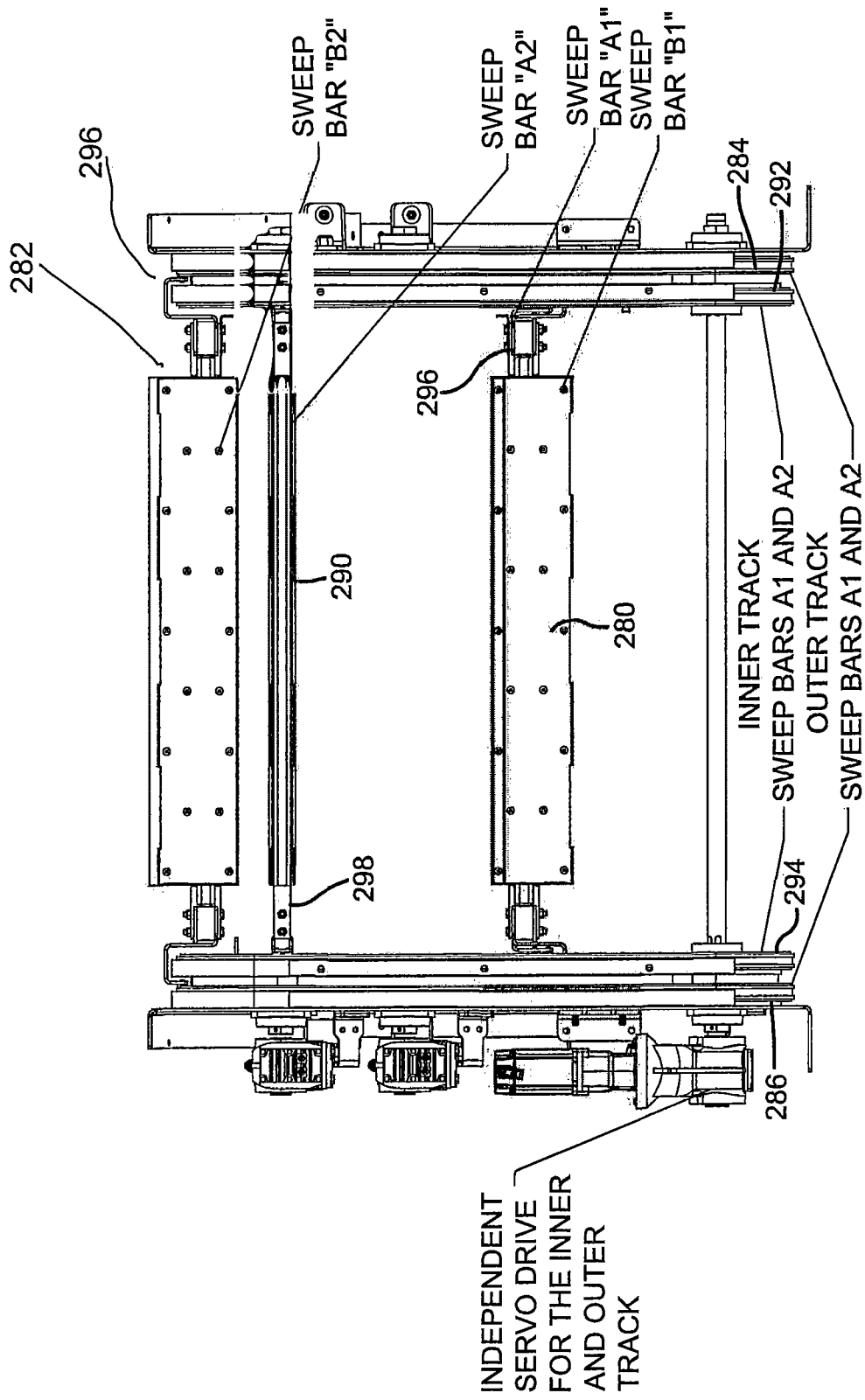

The operation of the exemplary machine in sweeping containers in the uppermost layer off of the supporting dunnage sheet and onto the container take away and holding conveyor 24 is shown in FIGS. 65-71. In the exemplary arrangement a pair of sweep bars 280, 282 are in operative connection with sweep bar drive chains 284 and 286 that extend on horizontally opposed sides of the stack including container layers as shown in FIG. 68. A further pair of sweep bars 288 and 290 are in operative connection with sweep bar drive chains 292 and 294 that extend on opposed sides of the container layers and parallel to the sweep bar drive chains 284 and 286. It should be understood that the sweep bar drive chains also extend transversely horizontally outward of the pick head 66 and the dunnage tray 150 and on each transverse side thereof.

Each of the pairs of sweep bar drive chains 284, 286 and 292, 294 are driven by a separate motor or other type of drive that is controlled through operation of the at least one machine controller. As a result the sweep bars that are attached to each of the pairs of drive chains may be moved independently of the sweep bars that are in operative connection with the other pair of drive chains. In the exemplary arrangement the sweep bars 280, 282 are in operative connection with the sweep bar drive chains 284, 286 through brackets 296. Likewise the sweep bars 288 and 290 are operatively connected to the sweep bar drive chains 292, 294 through brackets 298. The exemplary brackets are configured to reduce the risk of engagement with the parallel adjacent drive chain which operates the other pair of sweep bars. Of course it should be understood that this configuration is exemplary and in other arrangements other approaches may be used.

In operation of the exemplary arrangement the at least one controller of the machine is operative to sweep a top layer of containers indicated 300 in FIG. 67, off the stack using the sweep bars to engage and move containers in the layer. This is done while the dunnage sheet immediately below the containers in the layer is held at the back side by the sheet grippers 170 and the front side edge portion of the dunnage sheet is vertically positioned in engaged relation with the dunnage sheet leveler 220 and the fingers 224 thereof. In a starting position the controller is operative to position sweep bar 280 in close adjacent or abutting relation with the containers on the back side of the top layer 300 of the containers. This is done through operation of the associated drive that is connected to sweep bar drive chains 284, 286. The at least one controller is also operative to position sweep bar 288 in close adjacent or abutting relation with the containers on the front side of the top layer 300. This is done through operation of the drive that is in operative connection with the drive chains 292 and 294. The controller is operative to position the sweep bars responsive to suitable sensors such as photosensors or encoders that detect indicia indicative of the positions of the sweep bars.

Figure 69:
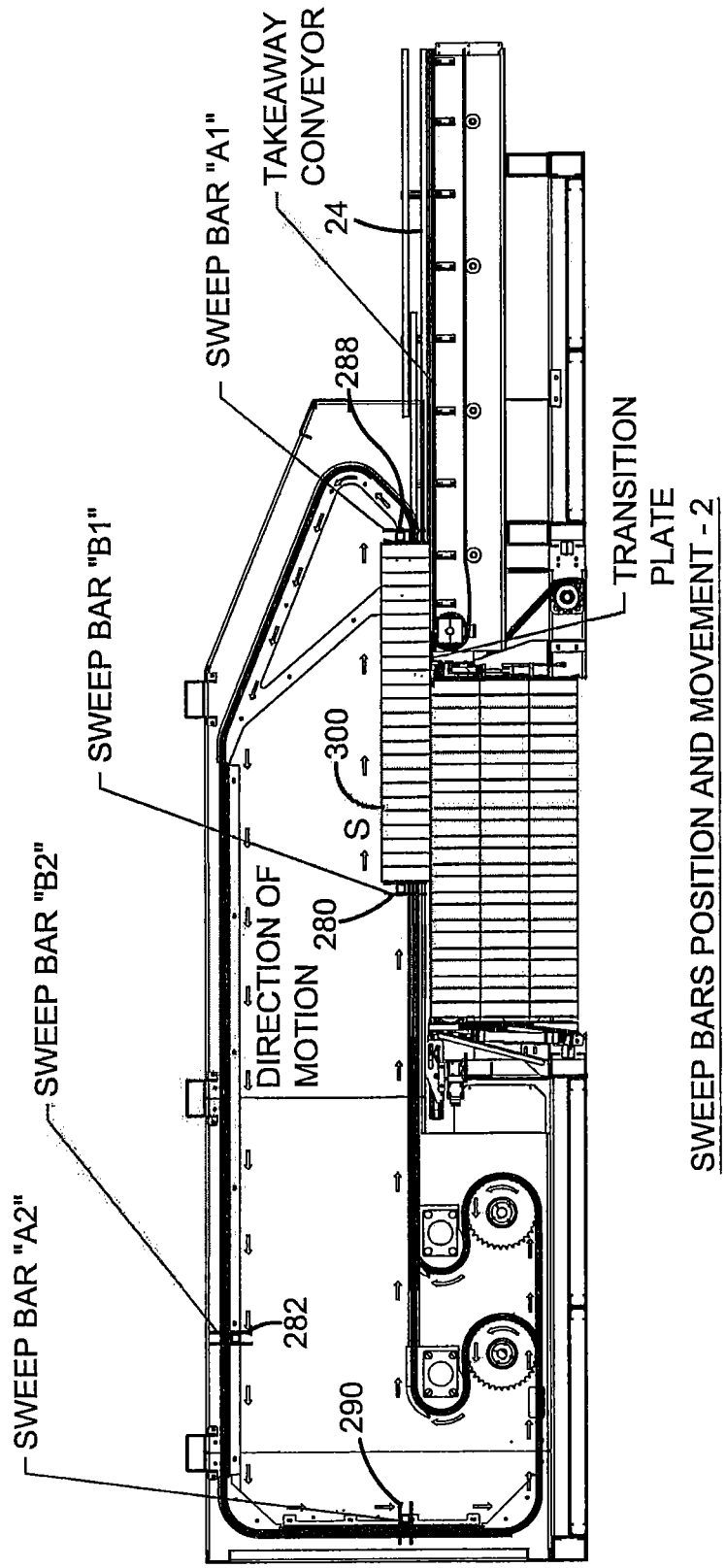

To sweep the top layer of containers 300 from the stack and onto the conveyor 24 the at least one controller is operative to operate the drives to move the sweep bars 280 and 288 in the direction of arrows S in coordinated relation and at the same speed. As a result the top layer of containers is moved off the stack and across the top dunnage sheet and the transition plate and onto the conveyor 24 in sandwiched relation between the sweep bars 280 and 288. Moving the containers in sandwiched relation between the sweep bars helps to assure that the containers remain in the upright orientation as they move off the stack. This movement is represented in FIG. 69.

Figure 70:
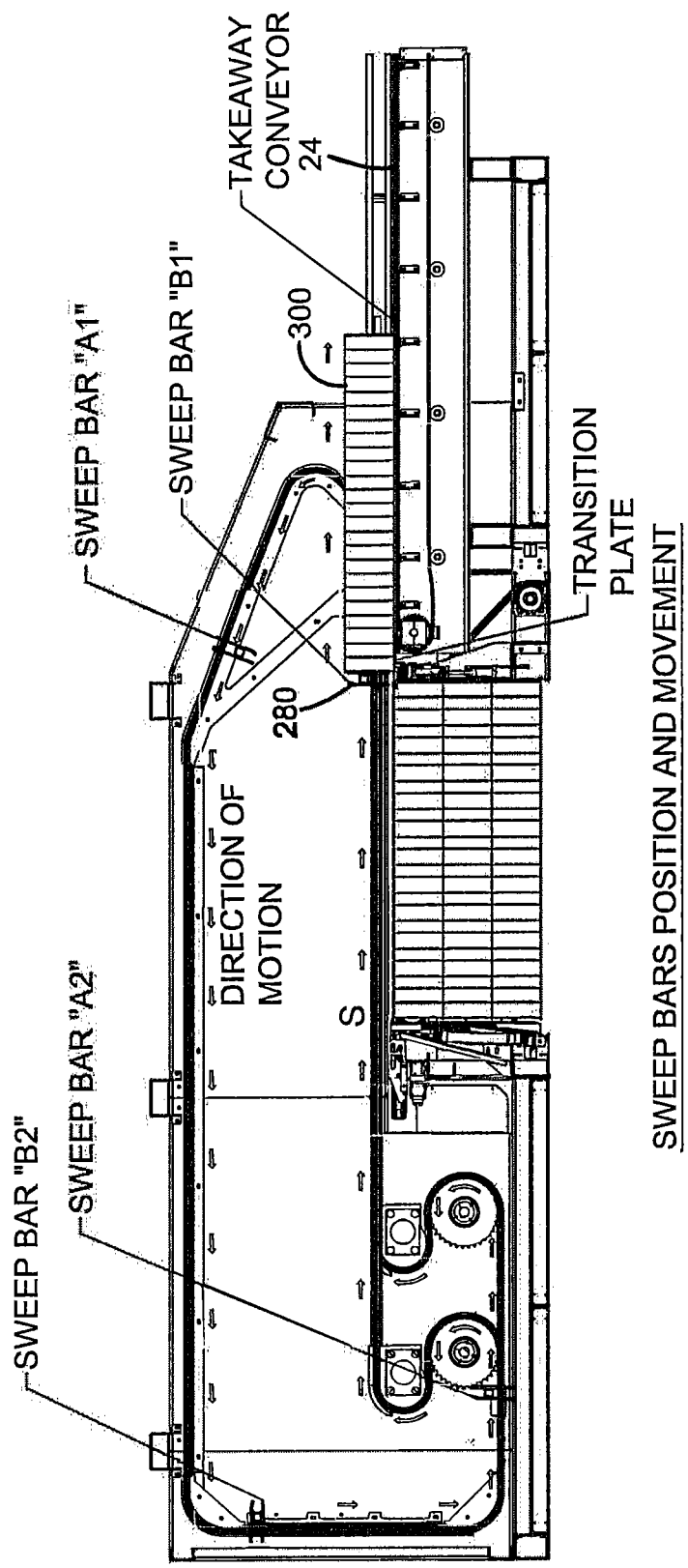
Figure 71:
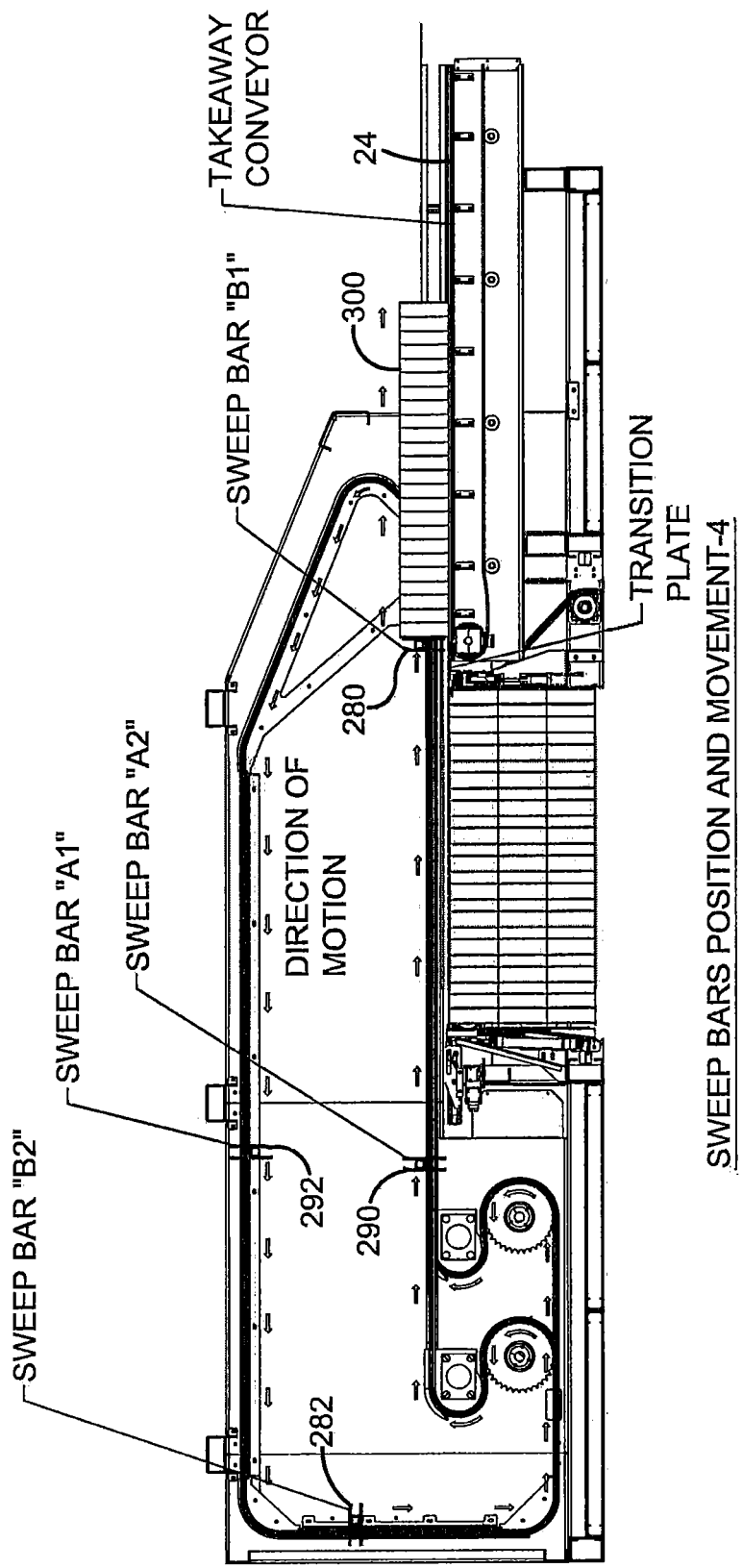
Figure 72:
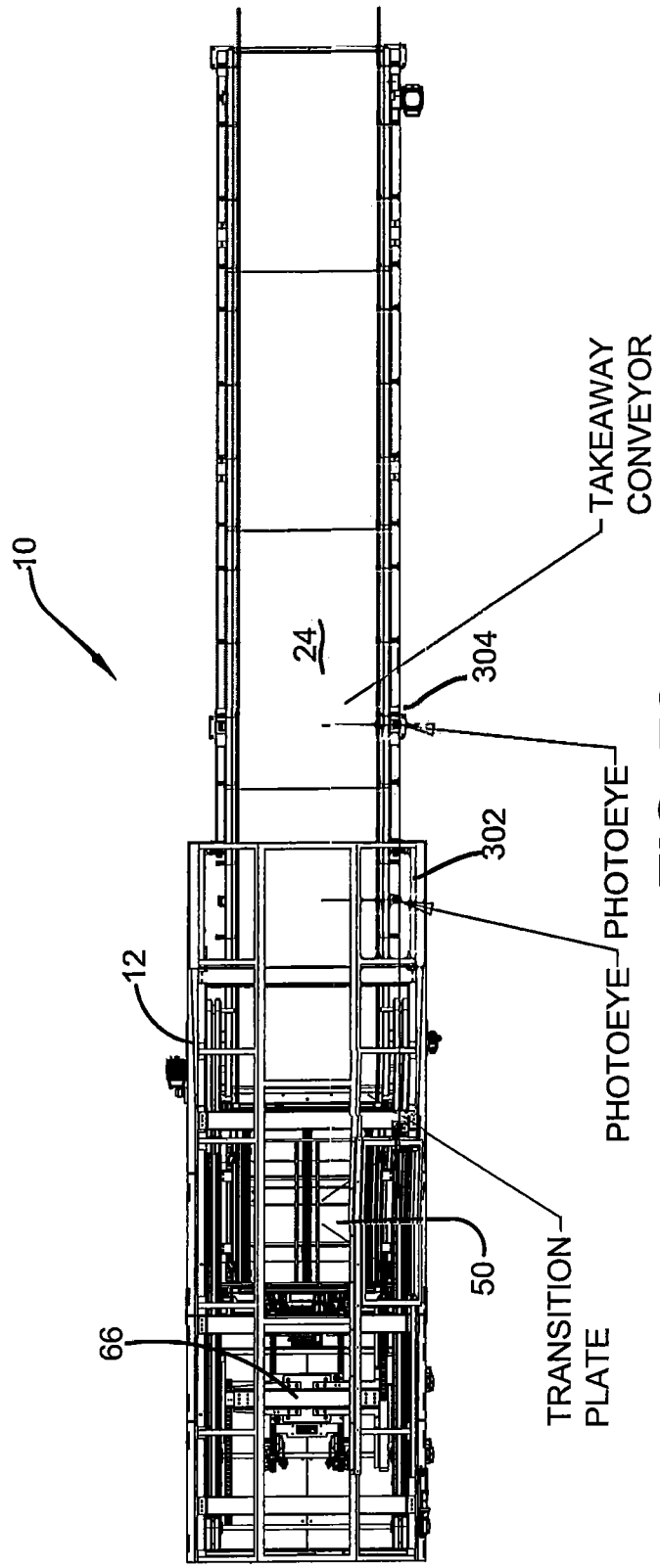
FIGS. 72-75 are views of the exemplary container take away and holding conveyor operating to transport and hold containers for delivery to further processing equipment.
Figure 73:
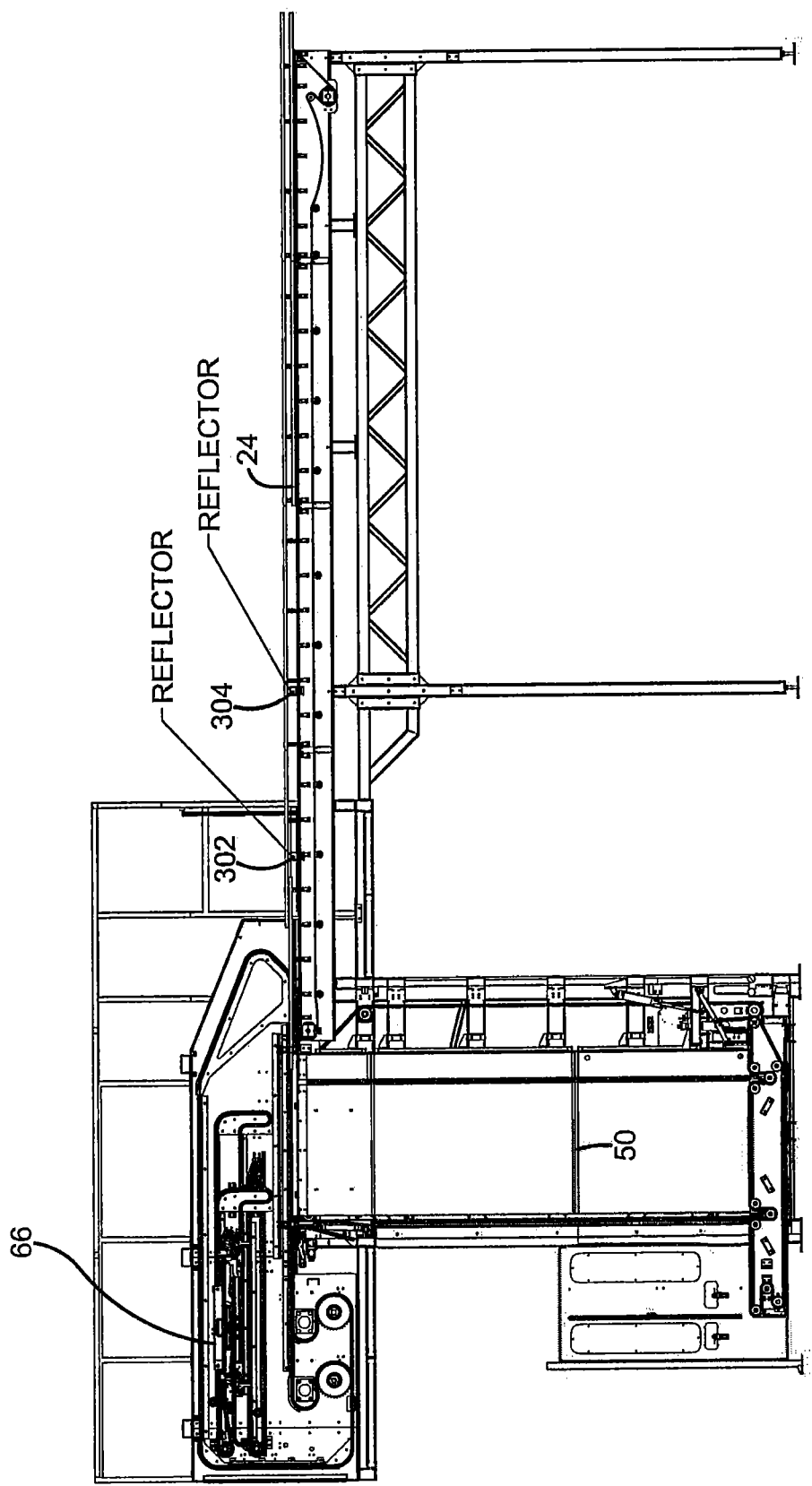

Once the sweep bar 288 reaches the area of the drive chain that extends upward the controller operates the associated drive to move the sweep bar 288 at a faster speed than sweep bar 280. In this way the sweep bar 288 is moved out of the way of the containers as the sweep bar 280 continues pushing the containers onto the conveyor 24. Once the sweep bar 280 has moved the containers in the layer 300 onto the conveyor 24 the controller operates responsive to its programming to stop movement of the sweep bar 280. Alternatively in some arrangements the sweep bar 280 may be moved beyond the transition plate, and then its movement reversed to place the sweep bar in the desired position. In this manner the sweep bar 280 is positioned to bound the front of the layer of containers in the next uppermost layer of the stack. This is represented in FIG. 70. Concurrently the at least one controller operates to move sweep bar 292 to the horizontal position in which sweep bar 280 was previously located before sweeping layer 300 from the stack, so that sweep bar 290 can engage the back side of the next layer of containers. In the exemplary arrangement the at least one controller of the machine is operative to maintain the sweep bar 290 disposed horizontally somewhat away from the stack until after the pick head 66 operates to remove the dunnage sheet above the next layer of containers and moves it into the dunnage tray 150. The controller then operates to cause the pallet hoist 50 to move the pallet and containers upward so that the next uppermost layer of containers is positioned for engagement by the sheet grippers 170, dunnage sheet leveler 220 and the sweep bars 290 and 280.

Figure 74:
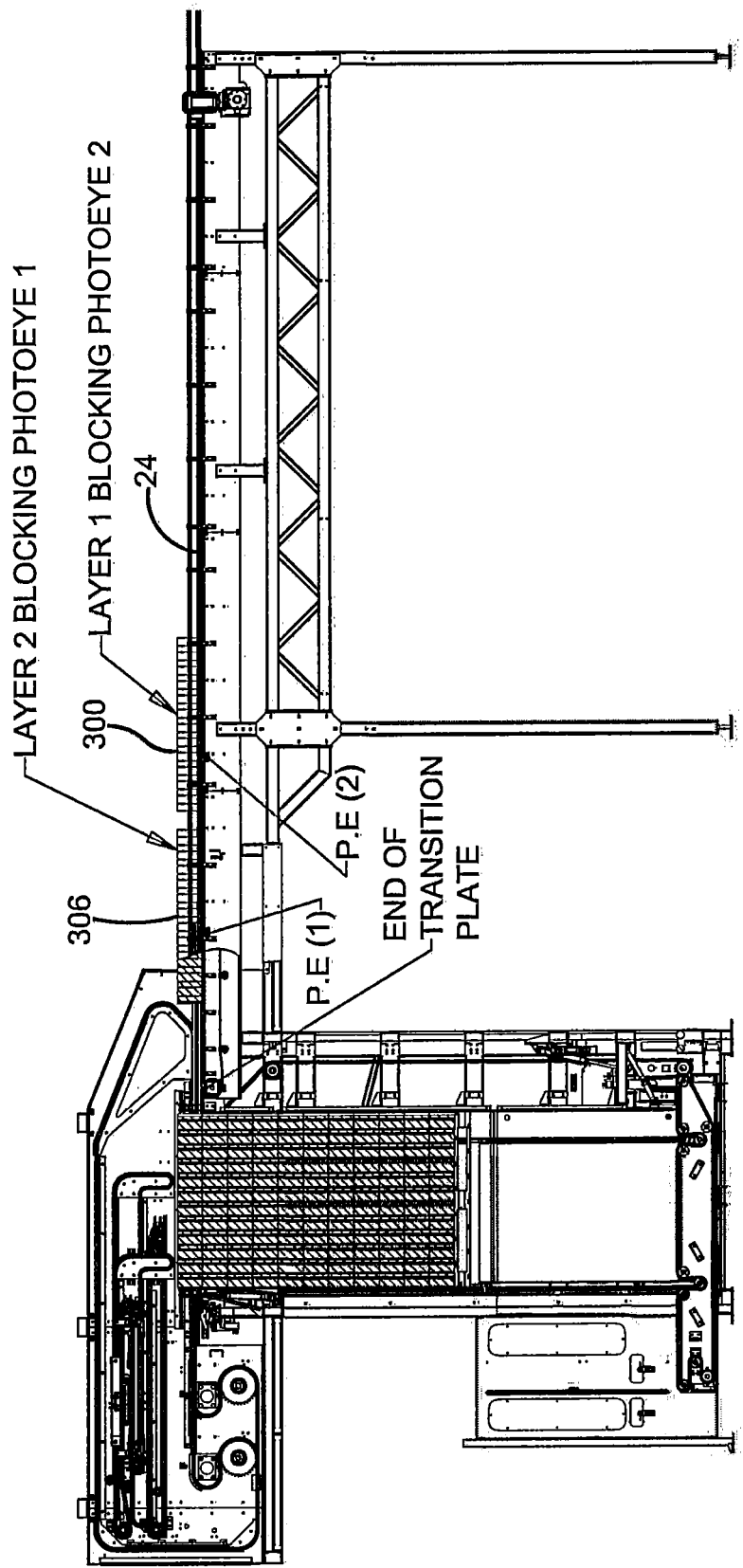
Figure 75:
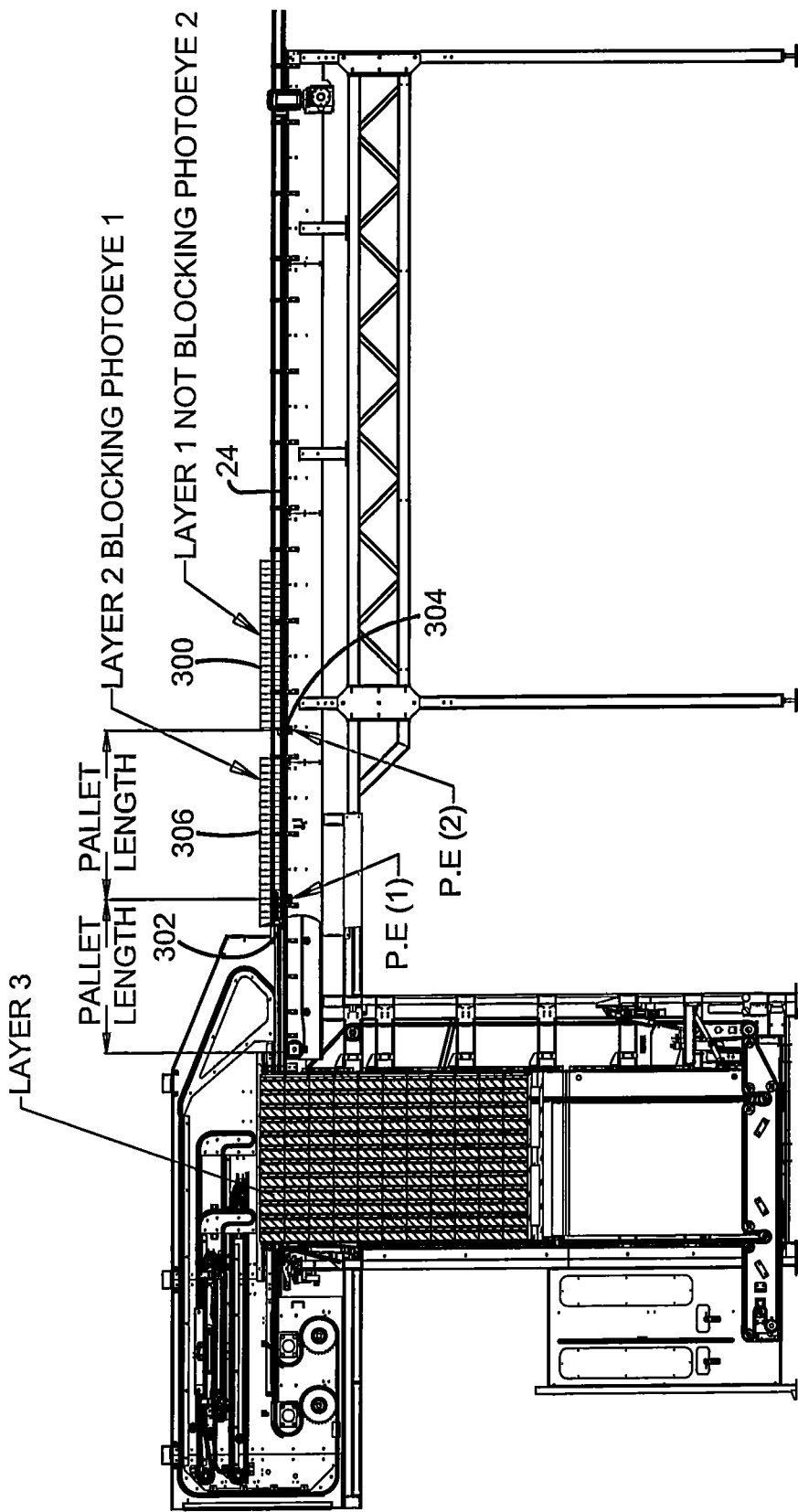

In the exemplary arrangement the operation of sweeping the layers of containers is repeated so that each layer of cans is swept by the sweep bars off of the stack and onto the conveyor 24. In the exemplary arrangement a plurality of sensors designated 302, 304 are positioned to sense the presence of containers on the conveyor. In the exemplary arrangement the at least one machine controller operates to cause the conveyor 24 to run generally continuously to move the containers included in the layers that have been sequentially removed from the stack away from the area of the pallet hoist and the sweep bars. Layers of containers that have been moved off the stack are represented by cans 304, 306 in FIGS. 74 and 75 for example. In exemplary arrangements to maintain a desirably fast cycle time the exemplary controller operates in a manner to sweep a further layer of containers from the top of the stack as long as sufficient area to receive the stack will become available on the conveyor 24 by the time the layer is swept off the stack. In exemplary arrangements this means that the at least one controller will operate to begin sweeping a layer onto the conveyor 24 even if the sensor 302 that is closest to the sweep bars is currently detecting cans in proximity thereto. The controller makes the determination to begin sweeping a layer of cans off the stack based on at least one of the sensors that are downstream of the stack, sensing an open space adjacent thereto. Such sensors detecting an open space is indicative that the cans that are already positioned on the conveyor 24 will move away from the stack a sufficient distance to provide room on the conveyor 24 for another layer by the time the next layer can be swept. In exemplary arrangements the circuit executable instructions of the at least one controller that enables carrying out this approach provide more rapid removal of containers from the stack compared to an approach where available space on the take away conveyor 24 must open up immediately adjacent to the stack before another layer of containers is delivered onto the conveyor.

The exemplary approach of determining the future availability of space on the conveyor to receive additional containers based on available space disposed further downstream away from the sweep bars, enables the take away conveyor to be more effectively filled with cans and to speed the depalletizing process. In exemplary arrangements the sensors may be disposed at intervals along the take away conveyor that correspond to the horizontal length of a layer of containers. However in other arrangements sensors may be positioned at different intervals for purposes of detecting available space for incoming containers. Further in other exemplary arrangements other types of sensors such as cameras or other types of imaging devices may be utilized for determining available space on the conveyor 24 which can be occupied by containers which are delivered from the stack. Further in some exemplary arrangements the conveyor 24 may be operated continuously so that the conveyor continues to move as containers become stationary as a result of entering into abutting relation, and stack up on the conveyor. This approach further helps to eliminate excess space on the conveyor and helps to assure that ample containers are available to the processing operation to which the containers are delivered by the conveyor 24.

Figure 76:
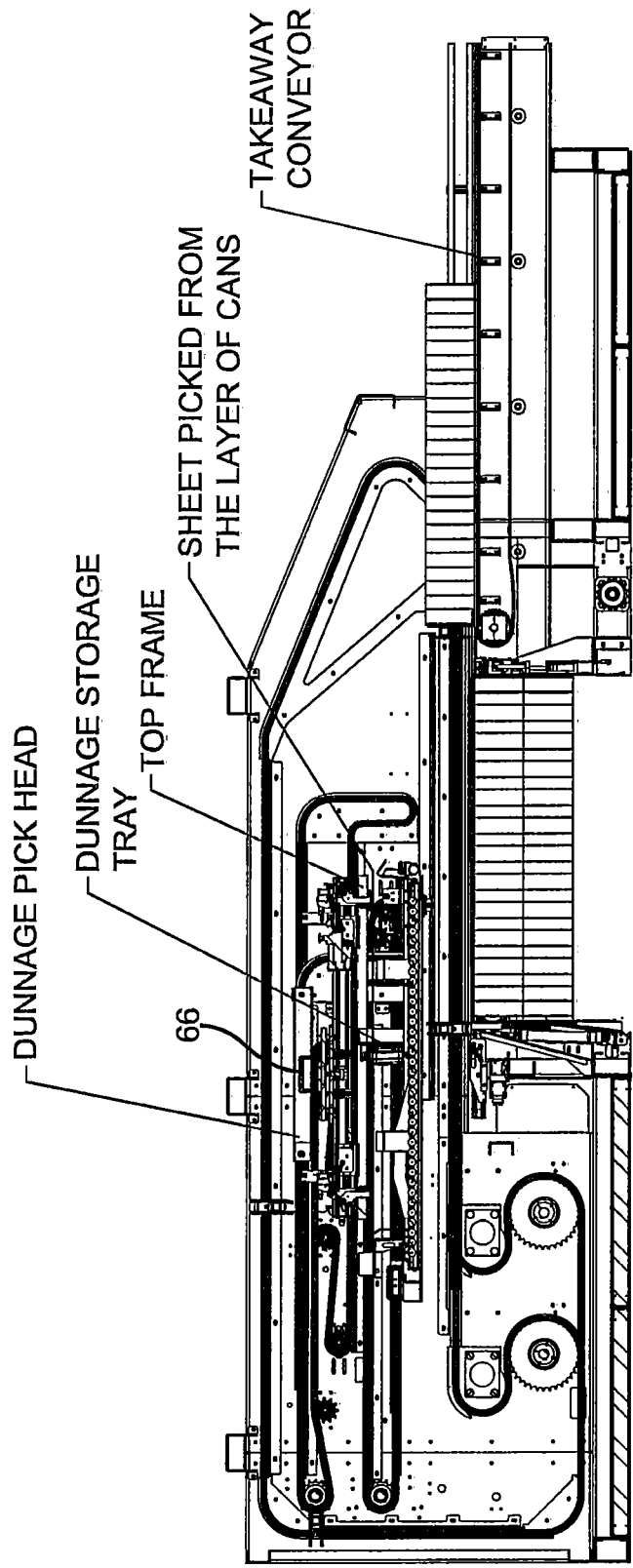
FIG. 76 is a side view showing the exemplary pick head in vertical overlying alignment with the dunnage tray to enable deposit of dunnage sheets and a top frame therein.

Of course as can be appreciated from the foregoing discussion after each layer of containers is removed from the stack, the pick head 66 is moved to engage the dunnage sheet that overlies the next can layer. The pick head moves the dunnage sheet upward and horizontally rearward while the dunnage tray 150 moves horizontally forward from the retracted position as shown in FIG. 76 for example. The dunnage sheet is then released from the pick head in a manner like that previously discussed and deposited into the stack of dunnage sheets that are collected within the interior sheet storage area of the dunnage tray. The processes previously discussed are repeated until the last layer of containers is removed from the pallet by the sweep bars. As previously discussed before the last layer is removed, the gripper with only an upper jaw is engaged with the final dunnage sheet to hold the dunnage sheet horizontally fixed in engagement with the pallet as the last layer of containers is removed therefrom. In operation of the exemplary machine this last dunnage sheet will remain in engagement with the pallet until the containers have been swept onto the conveyor 24, after which the last dunnage sheet will be moved through operation of the pick head 66 into the dunnage tray 150. Of course in other arrangements because the dunnage sheets are going to be removed from the dunnage tray and placed onto the pallet, the final dunnage sheet may remain engaged with the pallet while the other dunnage sheets are placed thereon.

In the exemplary arrangement after all the dunnage sheets have been removed from the pallet 36 and deposited in the dunnage tray 150, the at least one controller operates to cause the top frame 44 that is engaged with the pick head 66, to be released by the frame engaging hooks into the dunnage storage area of the dunnage tray on top of the dunnage sheets. This is accomplished in the exemplary arrangement by the controller causing the pick head and dunnage tray to move into vertically aligned relation. The at least one controller then operates the actuators of all the top frame clamps 82 to move in the manner previously discussed so that the frame retainer clips 130 rotate and the projections 132 no longer underlie the lower bottom surface of the top frame. This causes the top frame to disengage from the pick head and to fall onto the top of the stack of dunnage sheets that are housed in the dunnage tray 150.

Figure 77:
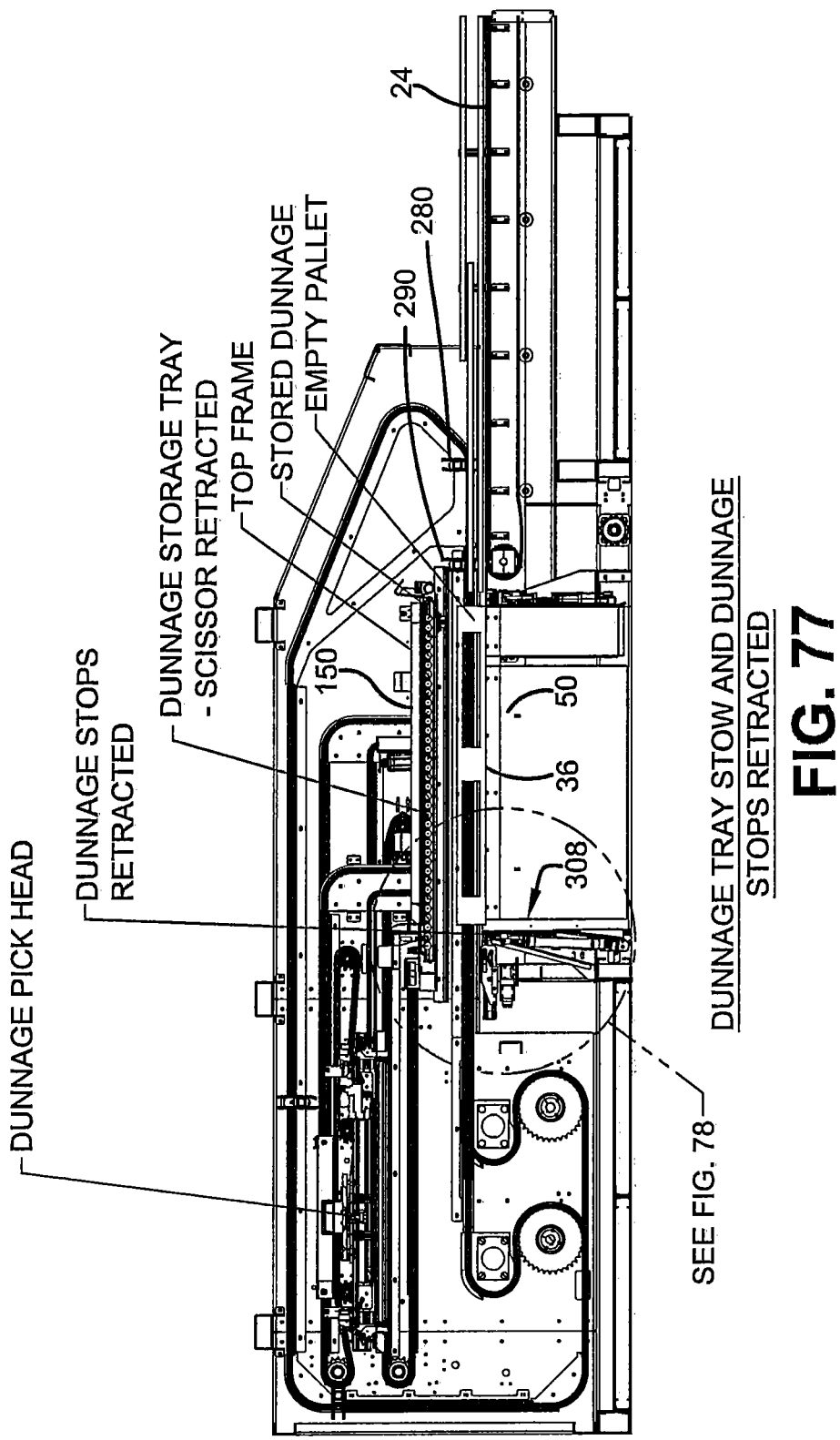
FIGS. 77-83 show the operation of the exemplary dunnage tray and dunnage stop operative to remove a stack including a plurality of dunnage sheets and a top frame from the dunnage tray, and deposit the stack on a pallet.

The exemplary machine operates to return the stack of dunnage sheets and the top frame with the pallet to the lower level of the machine where the different dunnage items are separated in a manner like that later described. To deposit the dunnage sheets and top frame onto the top of the pallet, the controller operates in accordance with its circuit executable instructions to first operate the drives controlling the sweep bars so that the sweep bars are disposed away from the area overlying the top of the pallet 36. This is represented by the movement of sweep bars 290, 280 to the positions shown in FIG. 77. Moving the sweep bars in this manner provides space that enables the dunnage tray 150 to be moved through operation of its respective drive to a position in overlying relation of the now empty pallet 36 as shown in FIG. 77.

The exemplary machine includes a pair of selectively vertically movable dunnage stops 308 which are alternatively referred to as extendable members. The exemplary dunnage stops 308 comprise vertically movable bars that are in horizontally fixed positions which in an upward extended position extend between immediately horizontally adjacent roller tracks 152 of the dunnage tray. The dunnage stops are selectively movable in the vertical direction between upward extended positions and downward retracted positions, through operation of an actuator 310. In the exemplary arrangement the actuator 310 comprises a pneumatic cylinder that is controlled by the at least one controller responsive to the delivery and release of air pressure through a solenoid valve or similar structure. Of course it should be understood that this configuration of the dunnage stops is exemplary and in other arrangements other approaches may be used.

Figure 79:
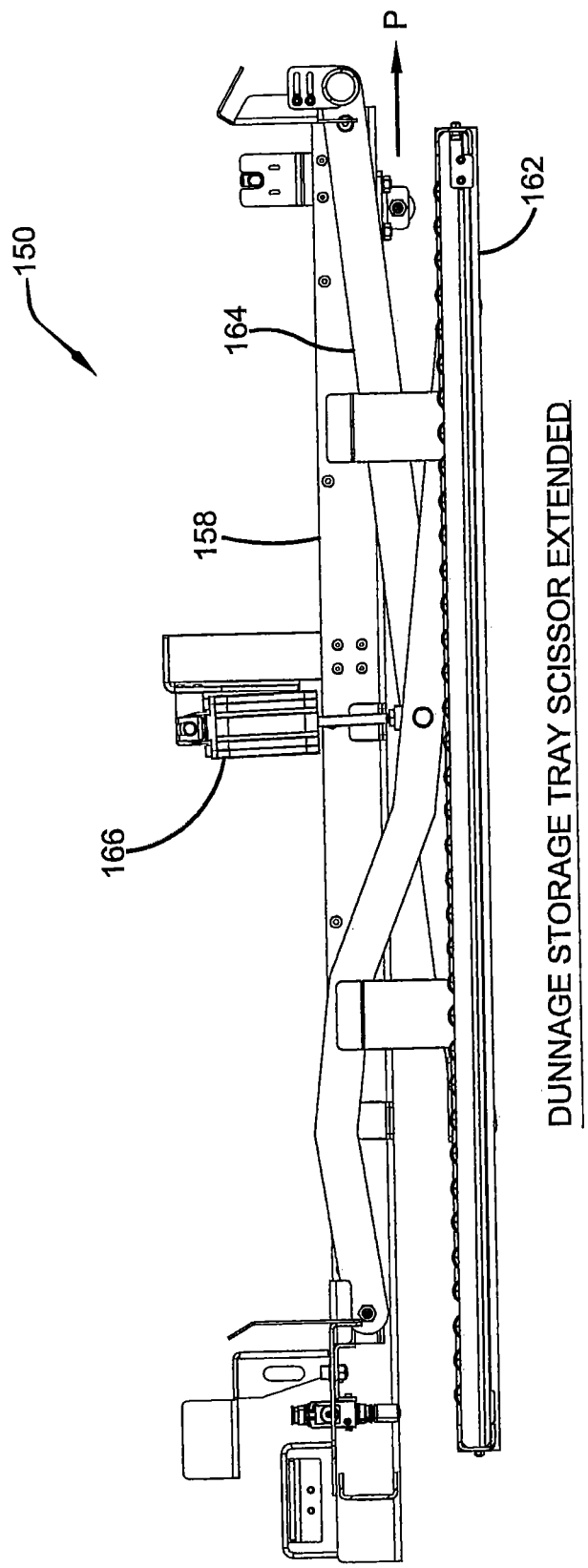

In the exemplary arrangement with the dunnage tray positioned in overlying relation of the pallet, and with the dunnage stops 308 in the downward retracted position, the at least one controller operates the actuators 166 associated with the dunnage tray to move the extendable members 164 so that the subframe 162 that includes the roller tracks 152 is disposed downward from the front wall 154, back wall 156 and sidewalls 158 of the dunnage tray into the downward position. Displacement of the subframe 162 toward the downward position is shown in FIG. 79.

Figure 80:
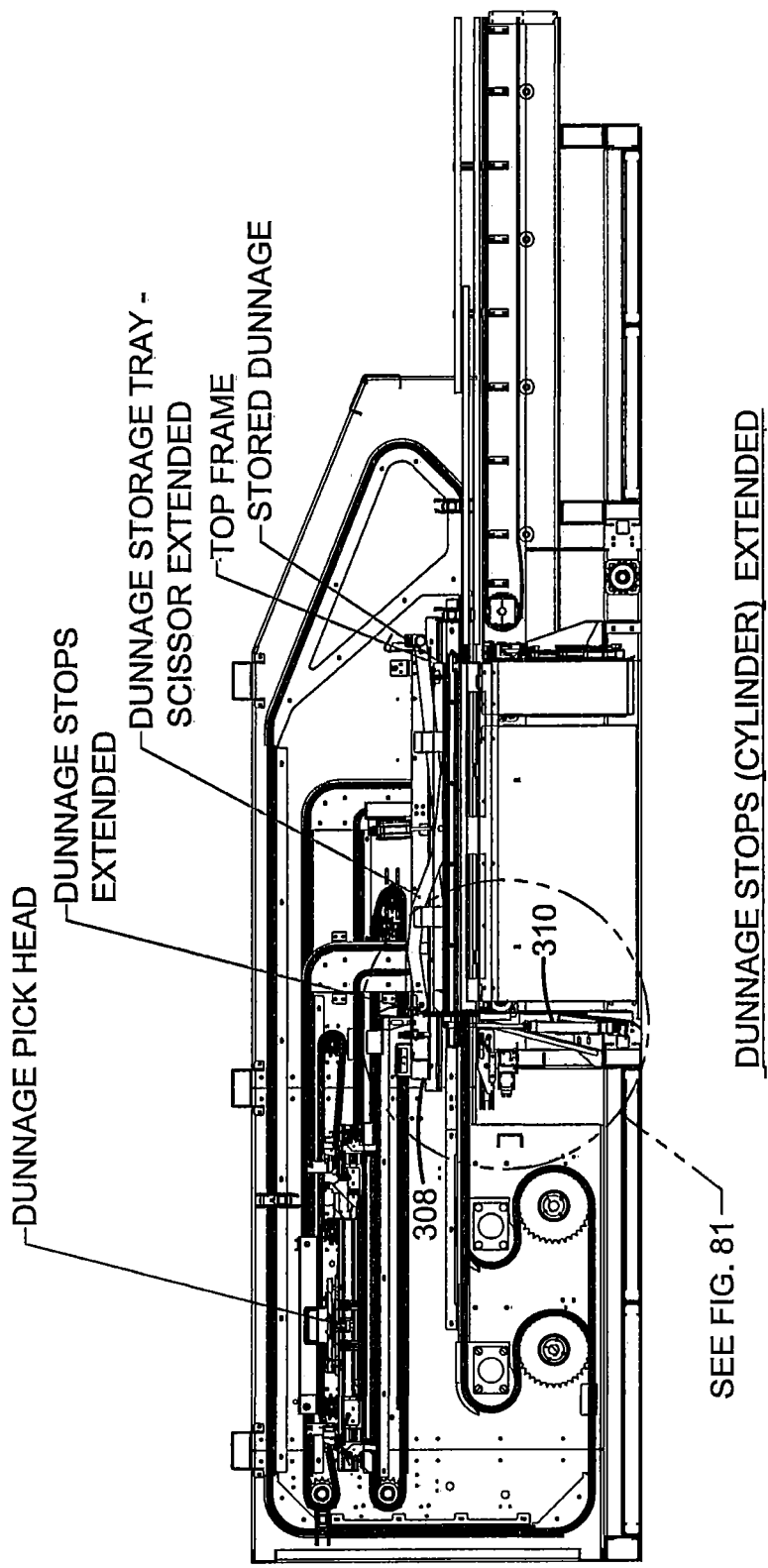
Figure 81:
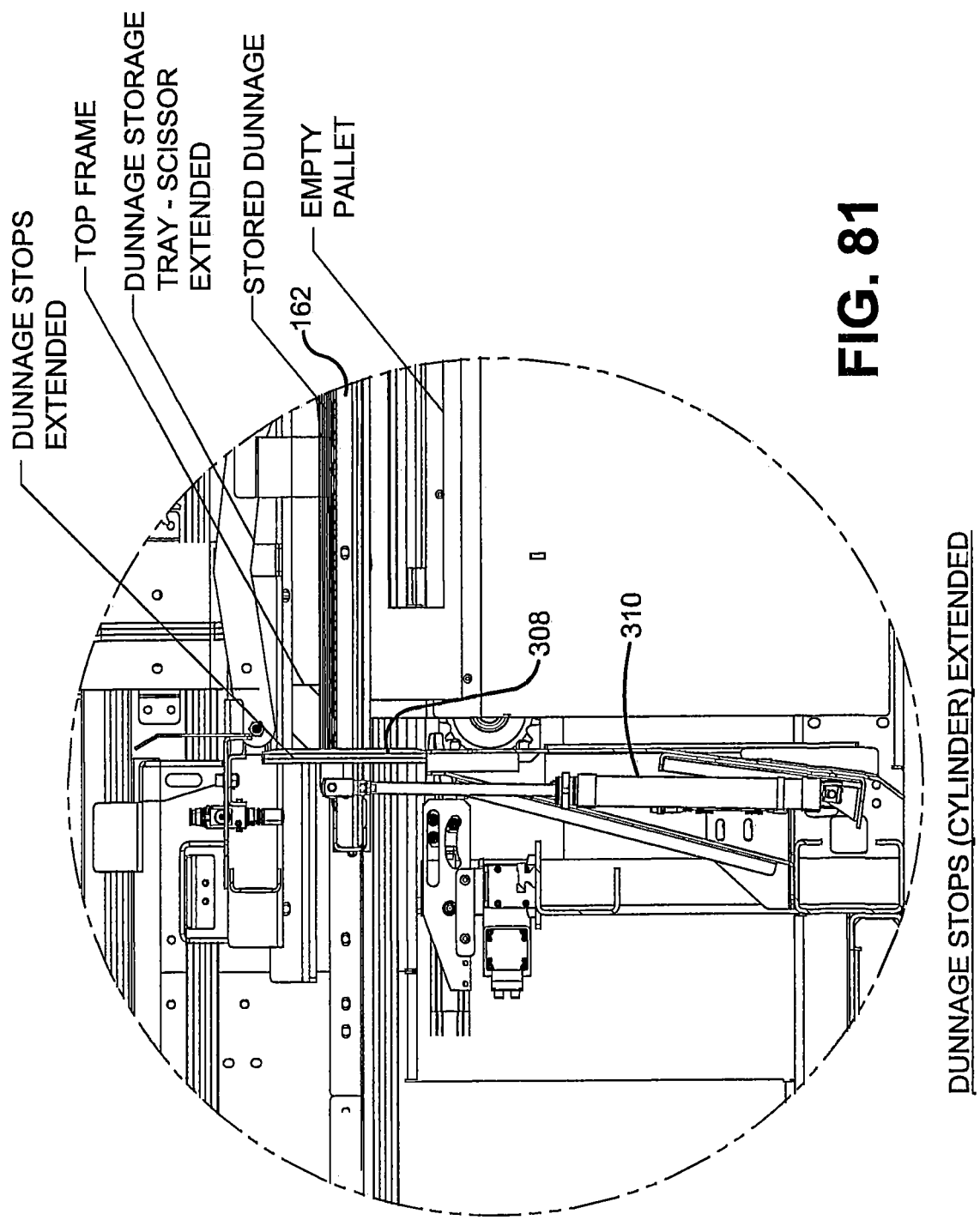

In the exemplary arrangement once the subframe has been extended fully downward to the downward position, the at least one controller operates the actuator 310 to move the dunnage stops 308 to an upward extended position as shown in FIGS. 80 and 81. In this configuration the dunnage stops extend vertically upward between the roller tracks 152 and on the back side of the stack dunnage sheets and top frame supported on the subframe as shown in FIG. 81.

Figure 78:
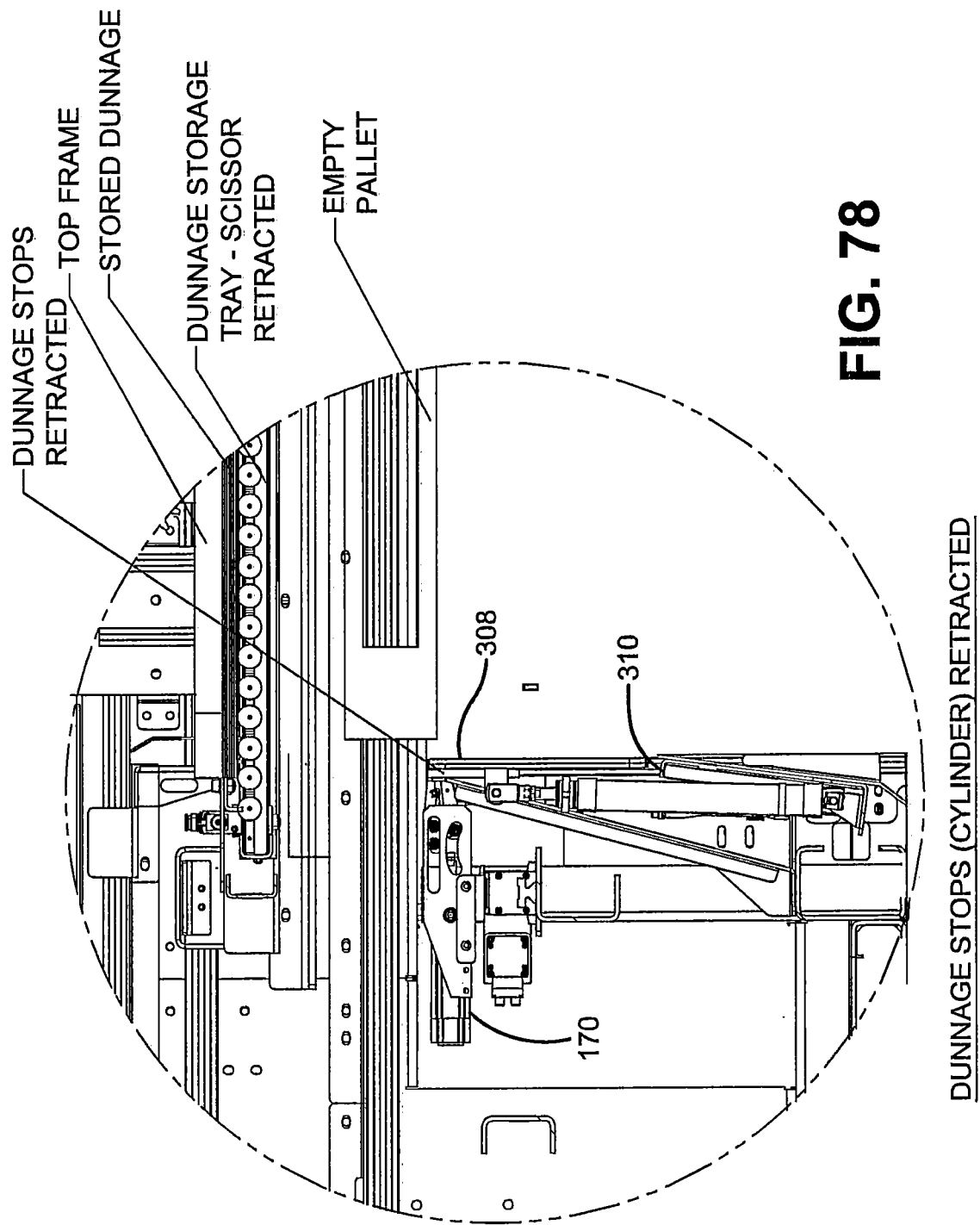
Figure 82:
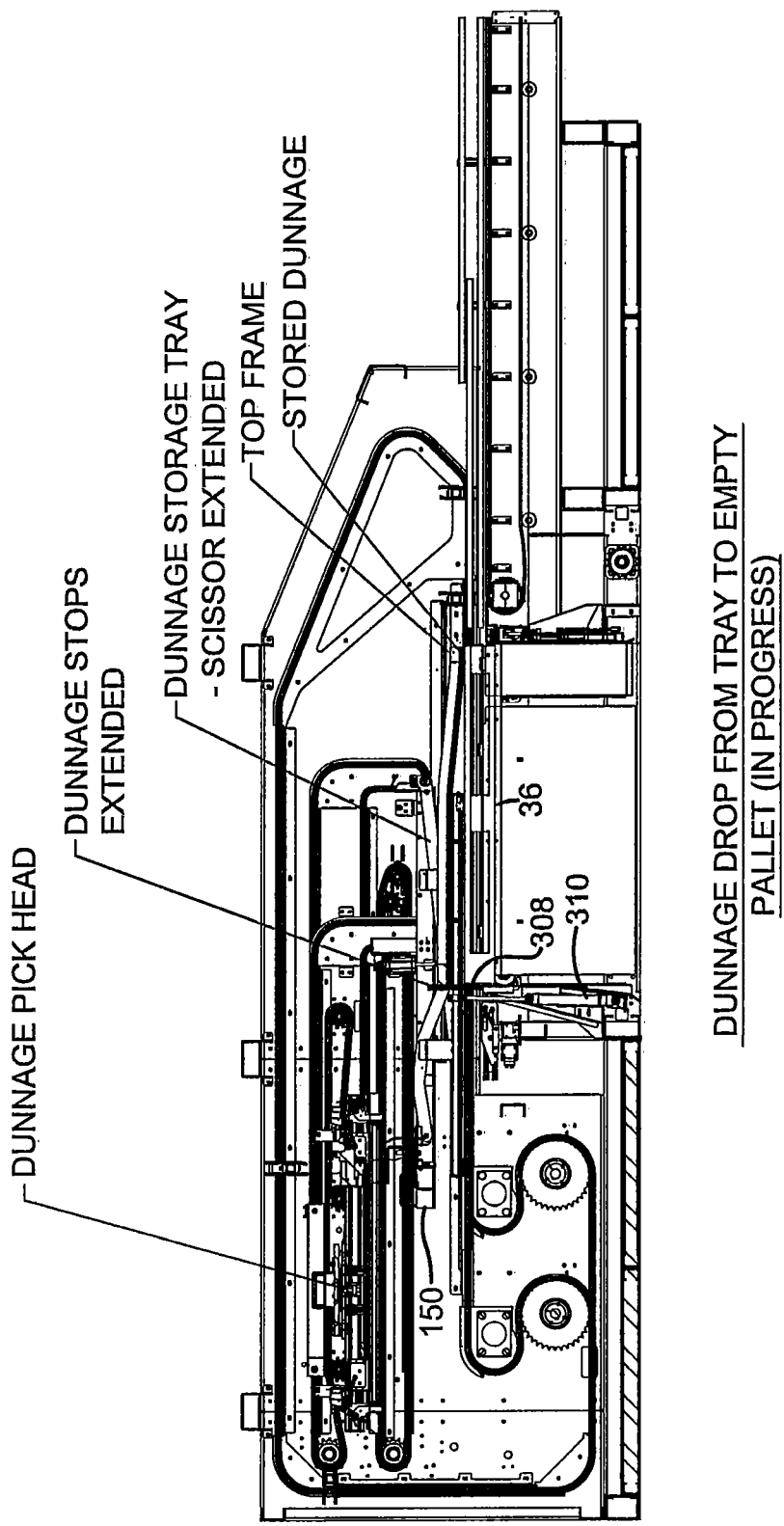
Figure 83:
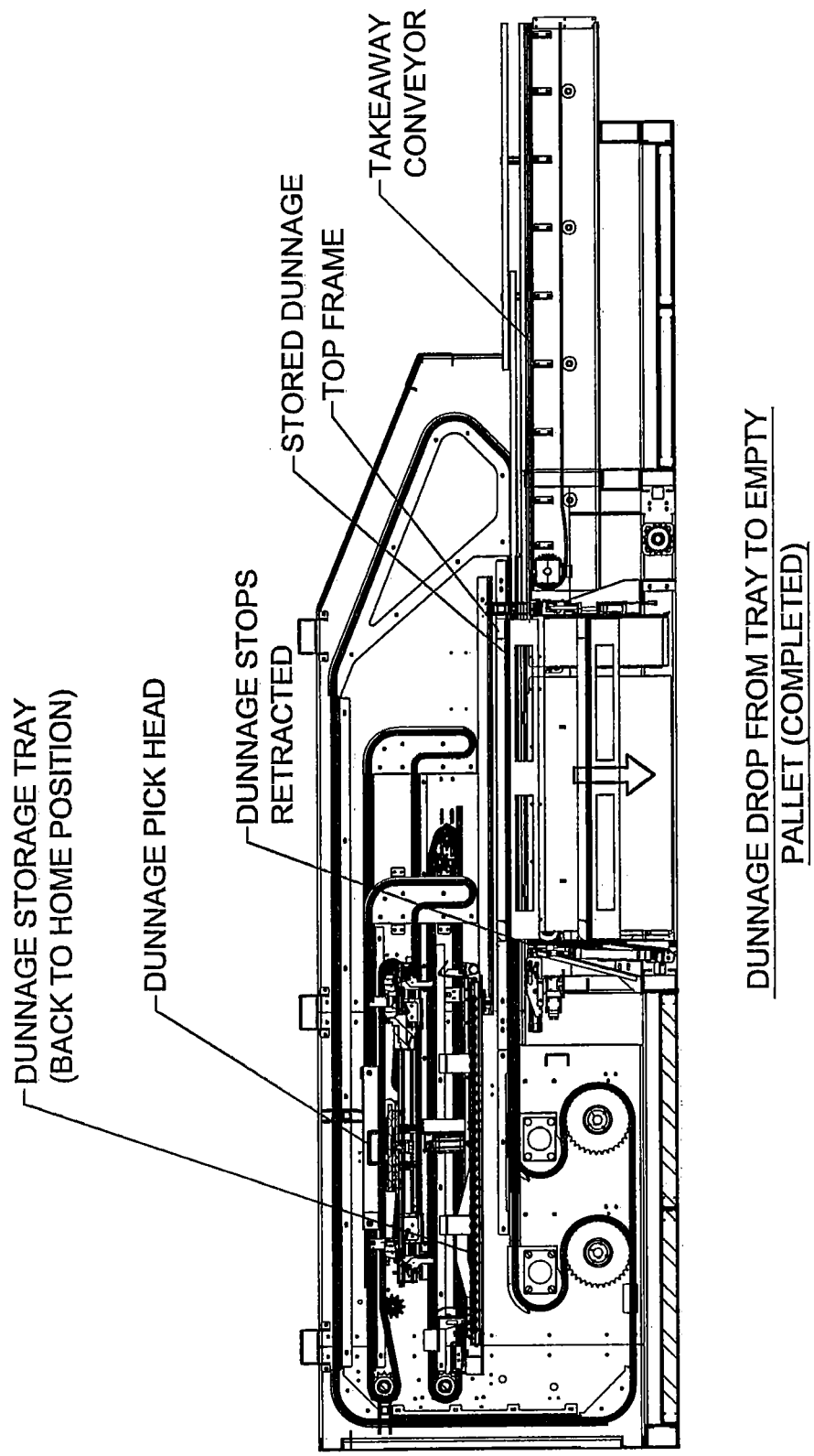

The at least one controller then operates to cause the drive that moves the dunnage tray to cause the tray to move horizontally toward the retracted position, which is to the left as shown in FIGS. 81-83. As shown in FIG. 82 as the dunnage tray 150 moves toward the retracted position with the subframe 162 positioned downward and the dunnage stops 308 extended upward, the stack of dunnage sheets and the top frame are held stationary as the subframe and roller tracks are displaced to the left as shown. This causes the stack including the dunnage sheets and the top frame to be deposited directly onto the top of the pallet 36. Once the stack of dunnage sheets and the top frame have been disengaged from the subframe, the controller operates to cause the actuator 310 to retract the dunnage stops 308 back to the downward retracted position as shown in FIGS. 77, 78 and 83. The controller further operates to cause the actuators 166 to move the subframe 162 to the upward position so that the subframe vertically bounds the bottom of the dunnage storage area and the roller tracks are positioned within the sidewalls of the dunnage tray 150 as shown in FIG. 83.

Of course this approach that is utilized for placing the stored dunnage sheets and the top frame onto the top of the empty pallet is exemplary. In other arrangements other approaches and devices for depositing the dunnage sheets and top frame may be used.

The exemplary machine controller then operates to cause the pallet hoist 50 to lower and return the pallet with the dunnage sheets and top frame thereon to the lower level 14 at which the pallet was received on the at least one pallet receiving conveyor 18. The at least one controller further operates to cause the drives that control the sweep bars, the pick head and the dunnage tray to move to the positions in which the components are ready for receipt of another stack which includes multiple layers of containers.

Once the pallet 36 has reached the level at the bottom of the pallet hoist 50, the at least one controller operates to cause the pallet stop door 46 to be changed from the stop position which is shown in FIG. 5 to the open position which is shown in FIG. 4. The exemplary mechanism associated with controlling the position of the pallet stop door 46 is shown in FIGS. 84-88. In the exemplary arrangement the pallet stop door 46 is mounted through a hinge 312 to the body 12 of the machine. As previously discussed a front side of the pallet stop door 46 is in facing relation with the pallet hoist area 20 when pallets including numerous layers of cans are received into the hoist area on the pallet receiving conveyor 18. The backside of the pallet stop door 46 includes a bracket 314. The bracket 314 includes a pivot pin 316 that is configured to engage a rotatable front link 318.

The front link 318 includes a pivot pin 320 that rotatably connects the front link 318 to a back link 322. The back link 322 is connected to a back side bracket 324 that is mounted in fixed connection to the body of the machine. A pivot pin 326 rotatably connects the back side bracket 324 to the back end of the back link 322. The back link 322 includes in an intermediate location thereof a projection 328. The projection 328 is rotatably connected through a pivot pin 332. The actuator 48 for the door includes a cylinder rod 332 of a pneumatic cylinder 334. The side of the cylinder 334 opposed of the cylinder rod is connected to a mounting bracket 336 through a pivot pin 338. The mounting bracket 336 is mounted in fixed connection to the body of the machine.

Figure 84:
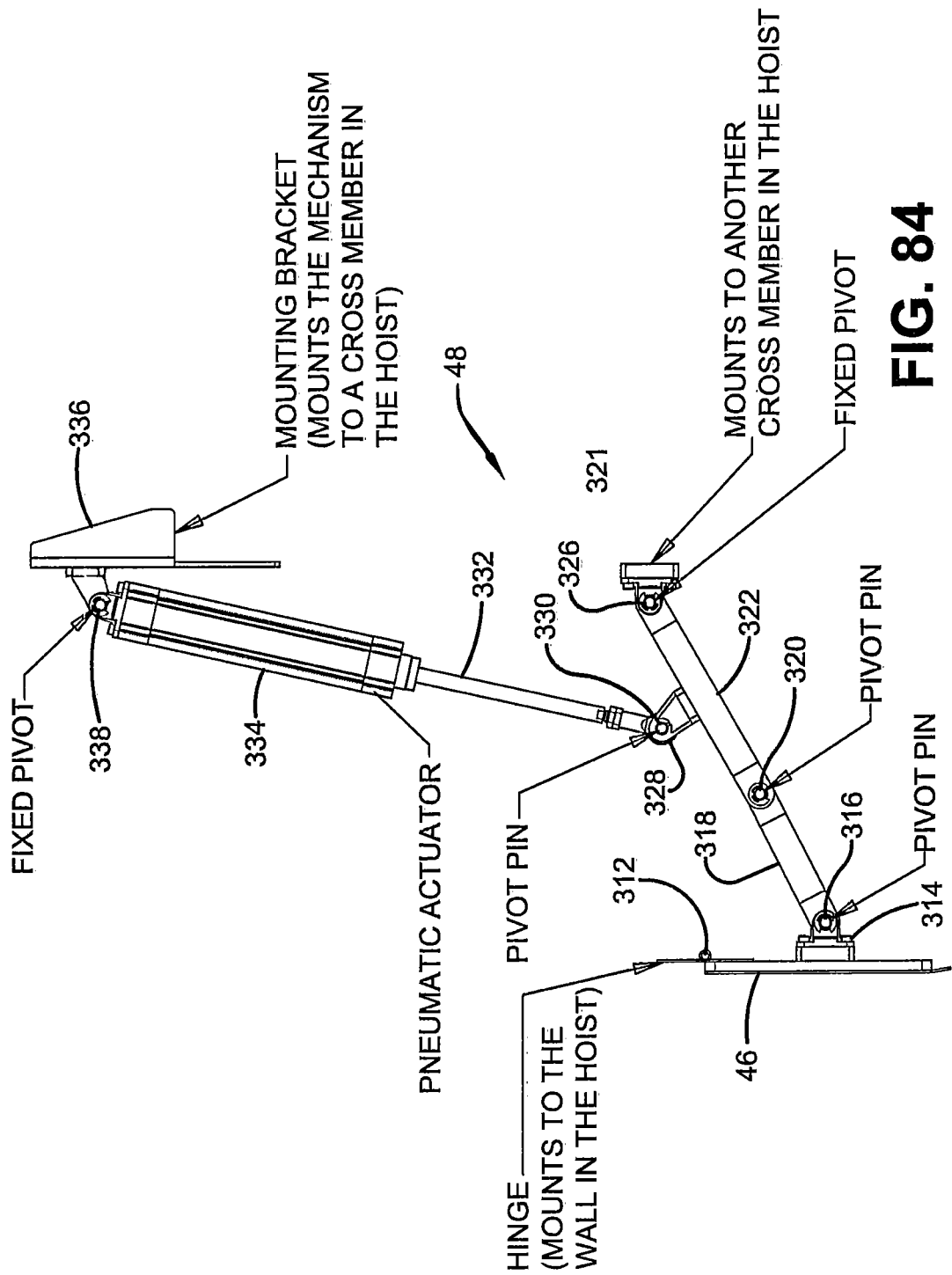
FIGS. 84-88 show an exemplary pallet stop door and associated actuator that is operative to provide a stop for an incoming pallet to the machine that is loaded with containers so that the pallet is in alignment with the pallet hoist, and to enable a dunnage stack including dunnage that has been separated from the containers to move away from the pallet hoist.
Figure 85:
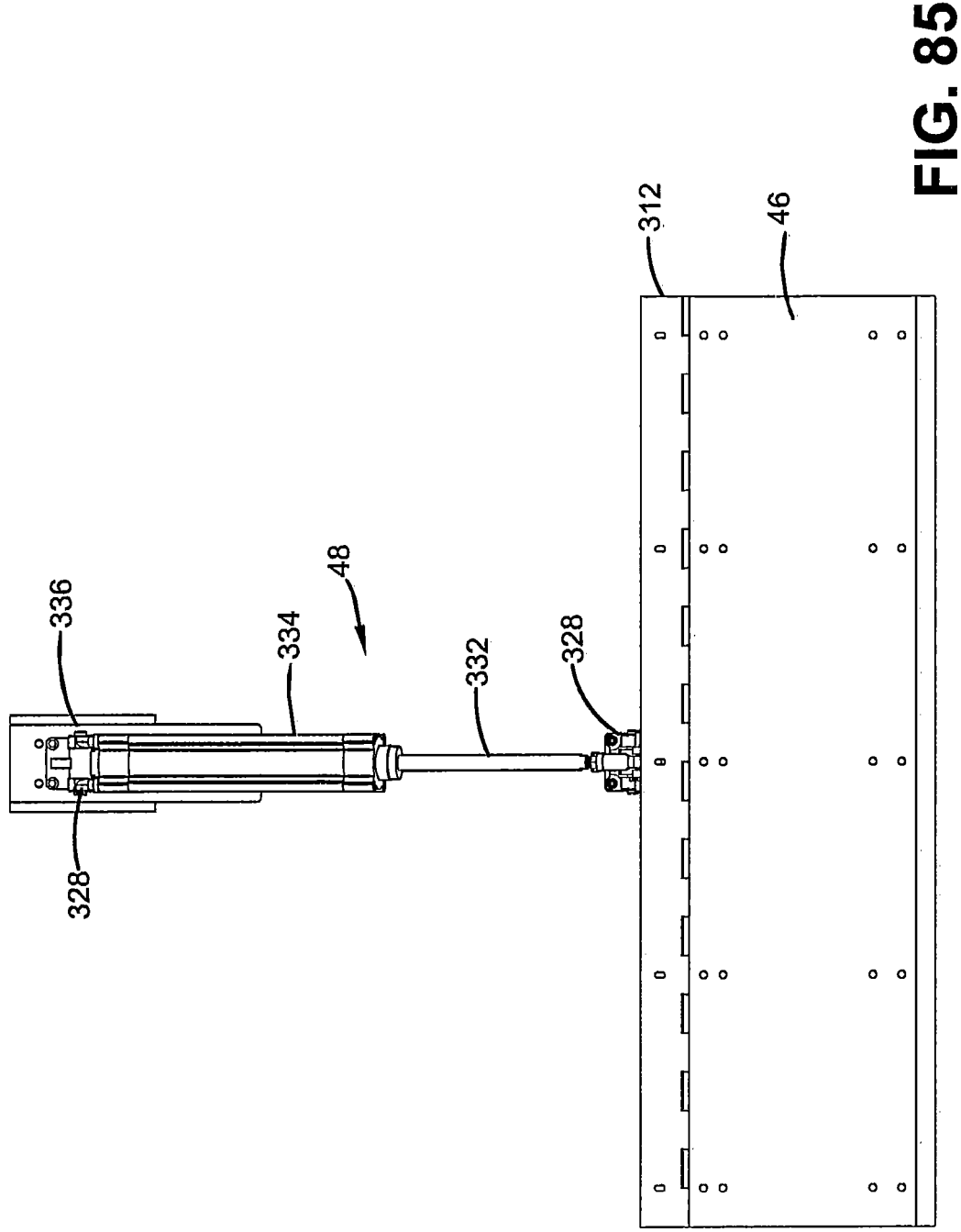
Figure 86:
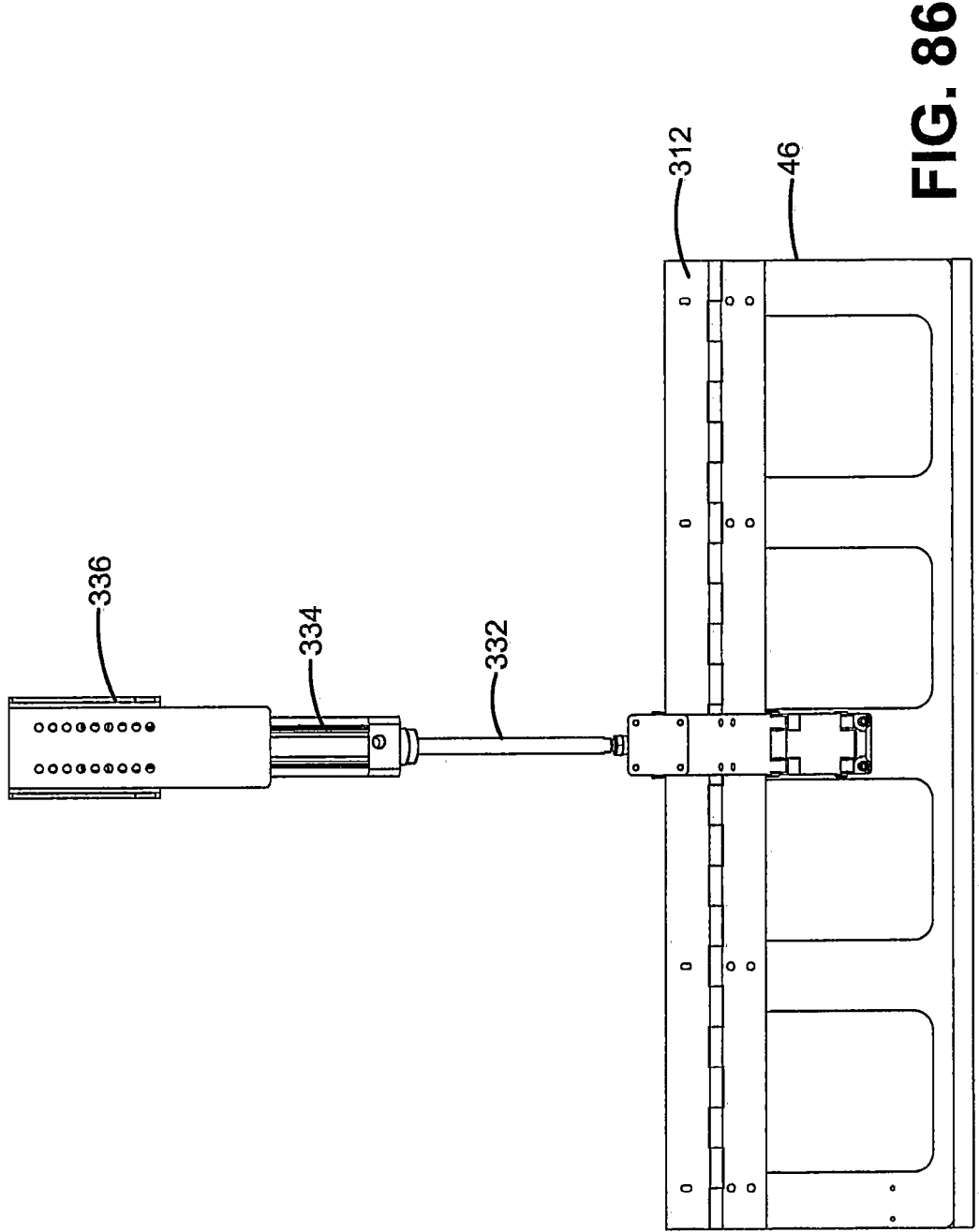

In the closed position of the exemplary pallet stop door 46 which is shown in FIGS. 84-86, the cylinder 334 is operative to position the front link 318 and the back link 322 in linearly aligned relation. The linear alignment of the links is operative to provide a connection between the pallet stop door 46 and the back side bracket 324 that operates to firmly resist any force that would otherwise cause rotational movement of the door 46 about the hinge 312.

Figure 87:
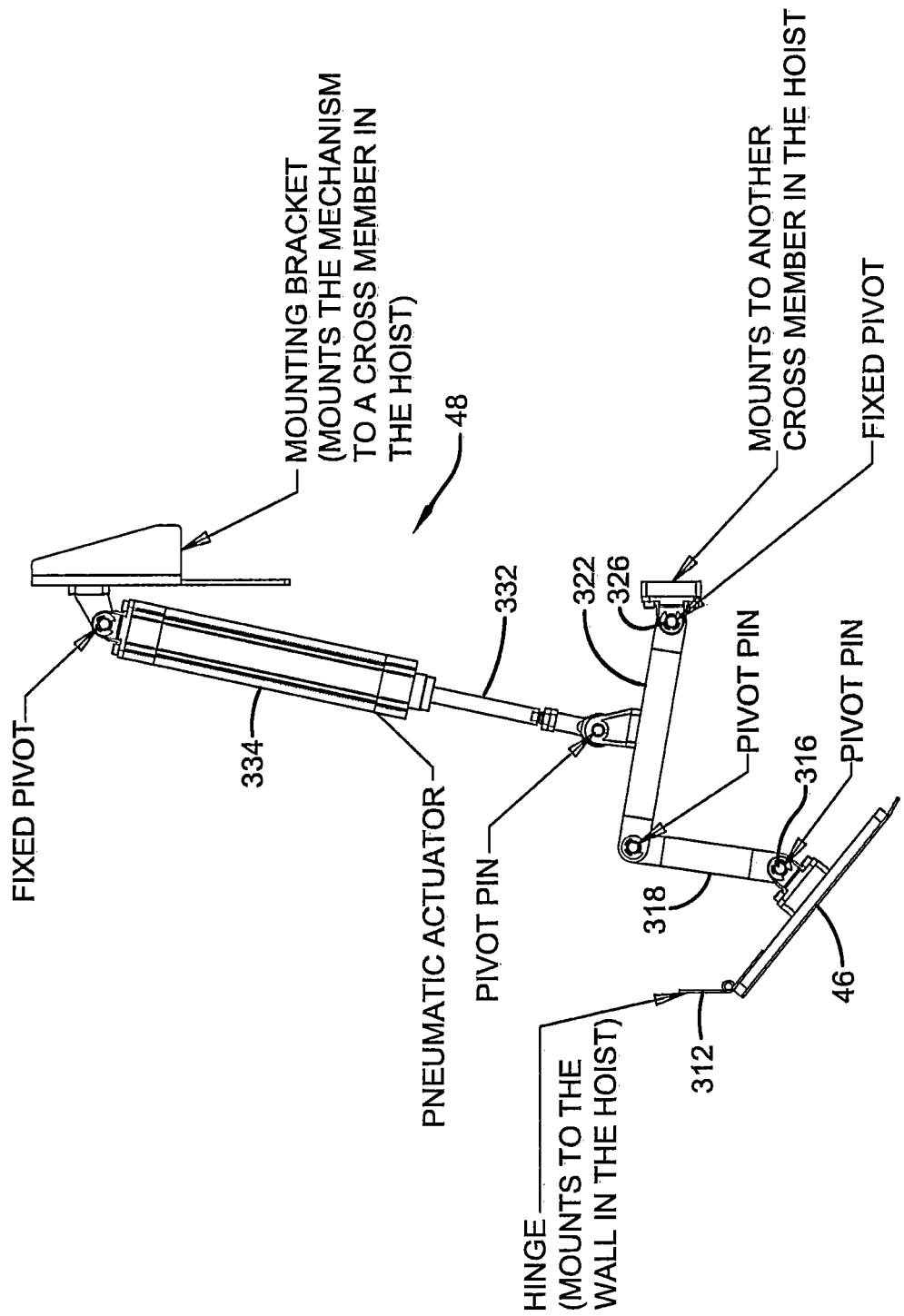

When the at least one controller of the machine operates to cause the pallet stop door to be opened, the controller causes a solenoid valve to deliver air pressure to the cylinder 334 of the actuator 48 that causes the cylinder rod 332 to retract inwardly into the cylinder from the position shown in FIG. 84. Such movement causes the back link 322 to rotate in a manner that is clockwise relative to the pivot pin 326 as shown and the front link 318 to rotate in a counterclockwise manner about the pivot pin 360 this causes the pallet stop door to be partially open as shown in FIG. 87.

Figure 88:
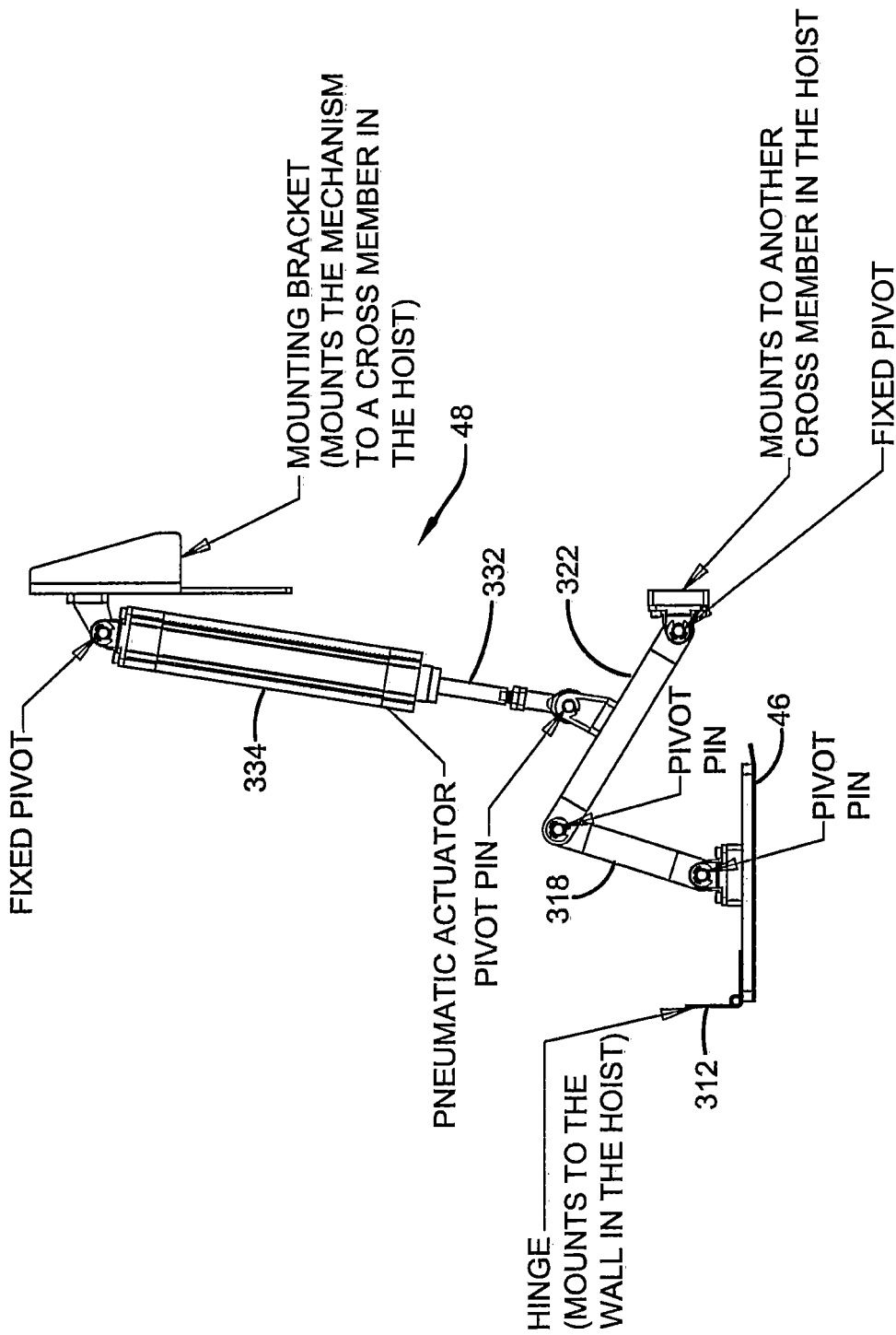

Further retracting movement of the cylinder rod 332 into the cylinder 334 is operative to cause the pallet stop door 46 to move to the fully open position which is shown in FIG. 88. In the exemplary arrangement with the pallet stop door in the fully open position the pallet stop door enables the pallet 36 with the dunnage sheets and top frame thereon to be movable from the pallet hoist area 20 in a direction that is to the right as shown in FIG. 4.

Figure 89:
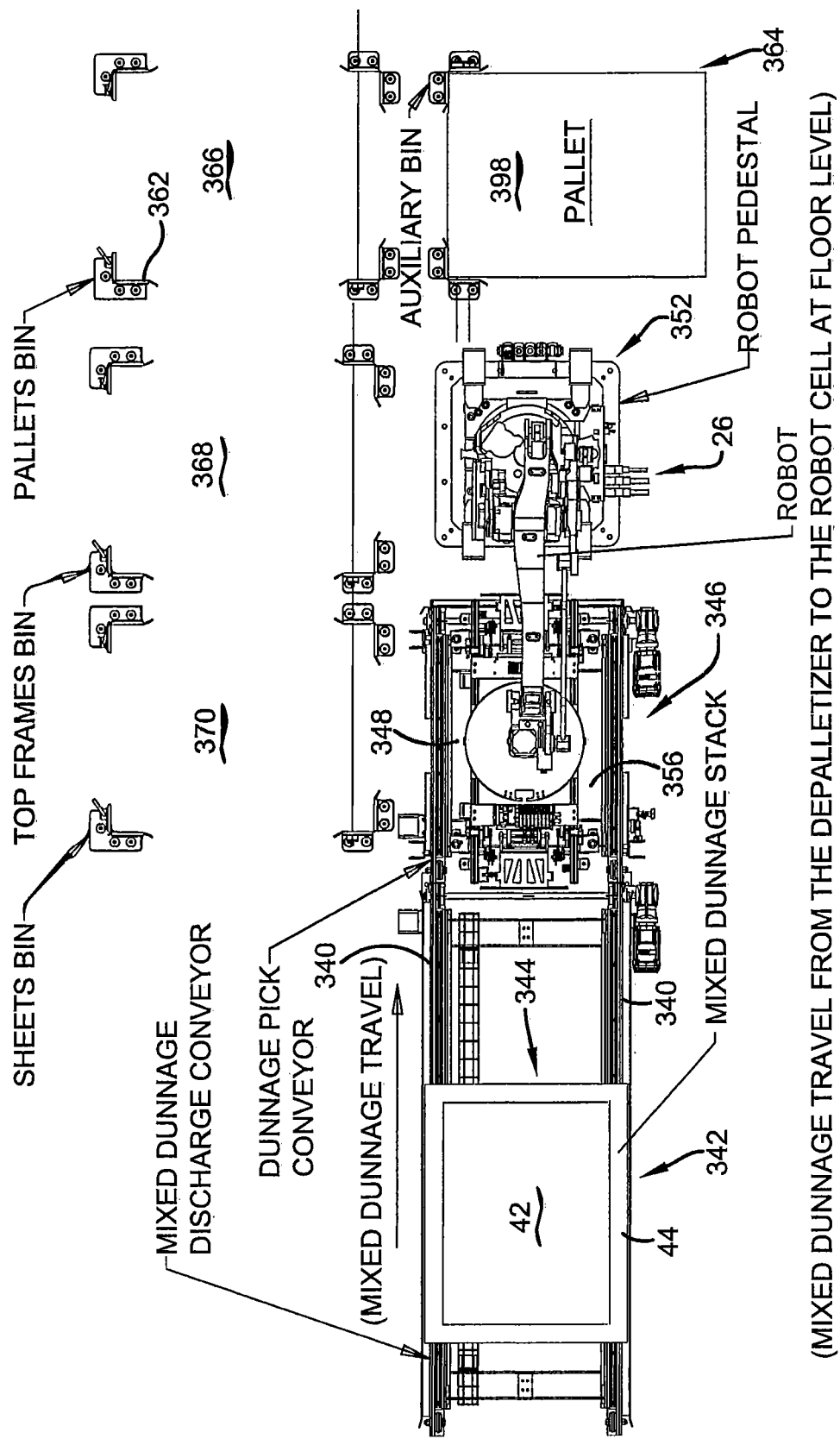
Figure 90:
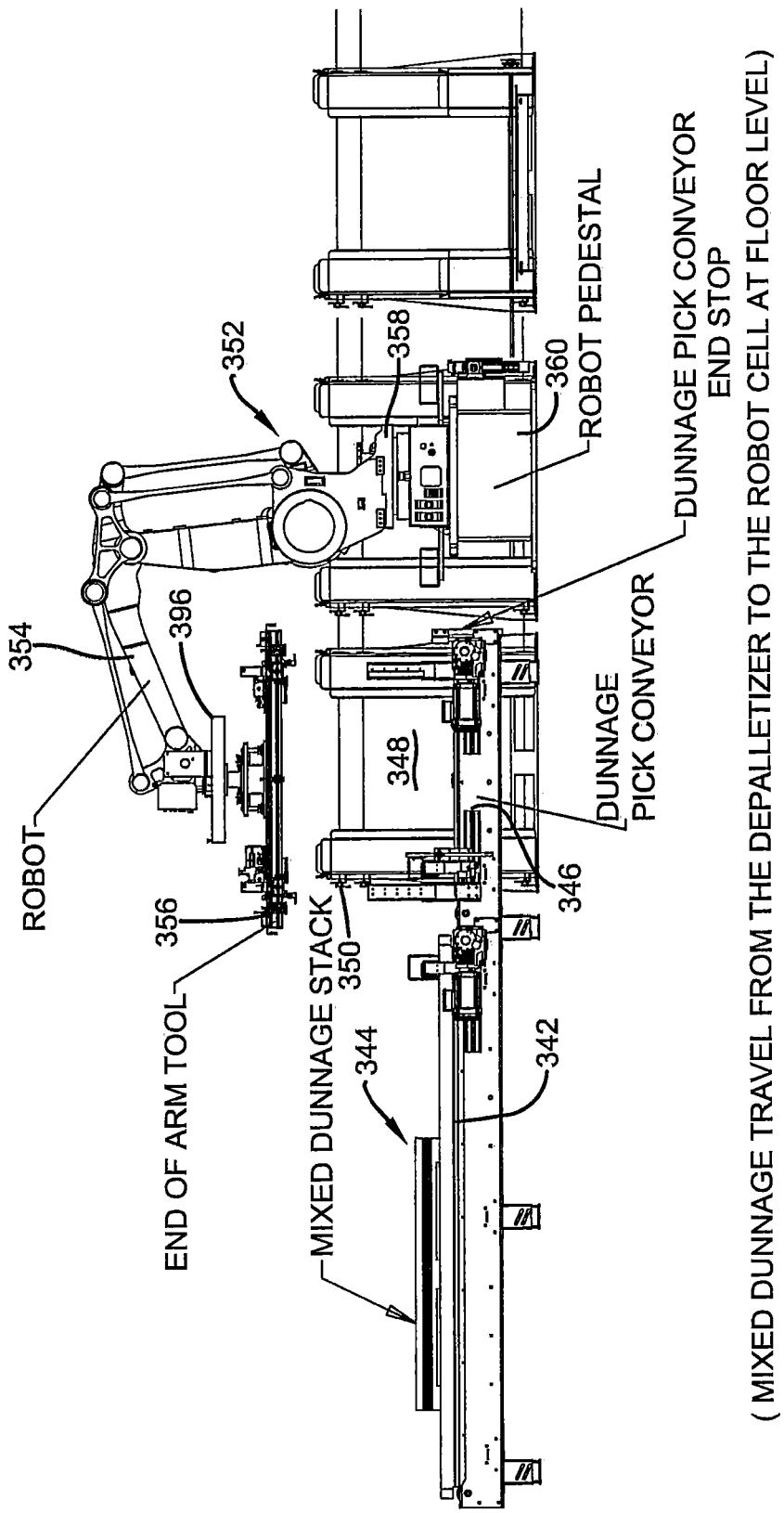

The movement of the mixed dunnage stack which includes dunnage sheets 42 and the top frame 44 on top of the pallet 36 is accomplished by the at least one controller moving the pallet on the at least one pallet conveyor which includes the conveyor belts 56 that extend in the hoist area and the belts 340 of a mixed dunnage conveyor 342 which is shown in FIGS. 89 and 90. In the exemplary arrangement the mixed dunnage stack which is indicated in FIG. 89 as 344 is comprised of the pallet 36 which is directly engaged with the belts 340 of the mixed dunnage conveyor 342. The plurality of dunnage sheets 42 are in stacked relation on top of the pallet, and the top frame 44 is positioned above the stack of dunnage sheets. In operation of the exemplary machine the mixed dunnage stack 344 is moved to a dunnage pick conveyor 346 which terminates in a dunnage separation station 348 in which the mixed dunnage stack may be accessed through operation of the components in the dunnage separation cell 26.

In exemplary arrangements the dunnage separation station 348 includes vertically extending guides 350. The guides 350 help to hold the mixed dunnage stack in position as its components are separated. Further in exemplary arrangements the guides 350 include features such as brushes, air knives and antistatic strips that facilitate the separation of the sheets that are included in the mixed dunnage stack 344.

The exemplary separation station 348 is adjacent to an industrial robot 352. The exemplary robot includes a single articulated robot arm 354 that supports an end of arm tool 356 that can be selectively positioned vertically and horizontally. The industrial robot 352 further includes a rotational base 358. The rotational base enables selectively positioning the robot arm and attached end of arm tool 356 rotationally about a pedestal base 360 of the robot.

Adjacent to the robot 352 are plurality of storage areas that include respective storage bins. The exemplary storage bins are bounded by vertically extending bin guides 362. In the exemplary arrangement the bins include an auxiliary bin 364, a pallets bin 366, a top frames bin 368 and a sheets bin 370. Of course it should be understood that these bins are exemplary and in other arrangements different bins and bin configurations may be used.

Figure 91:
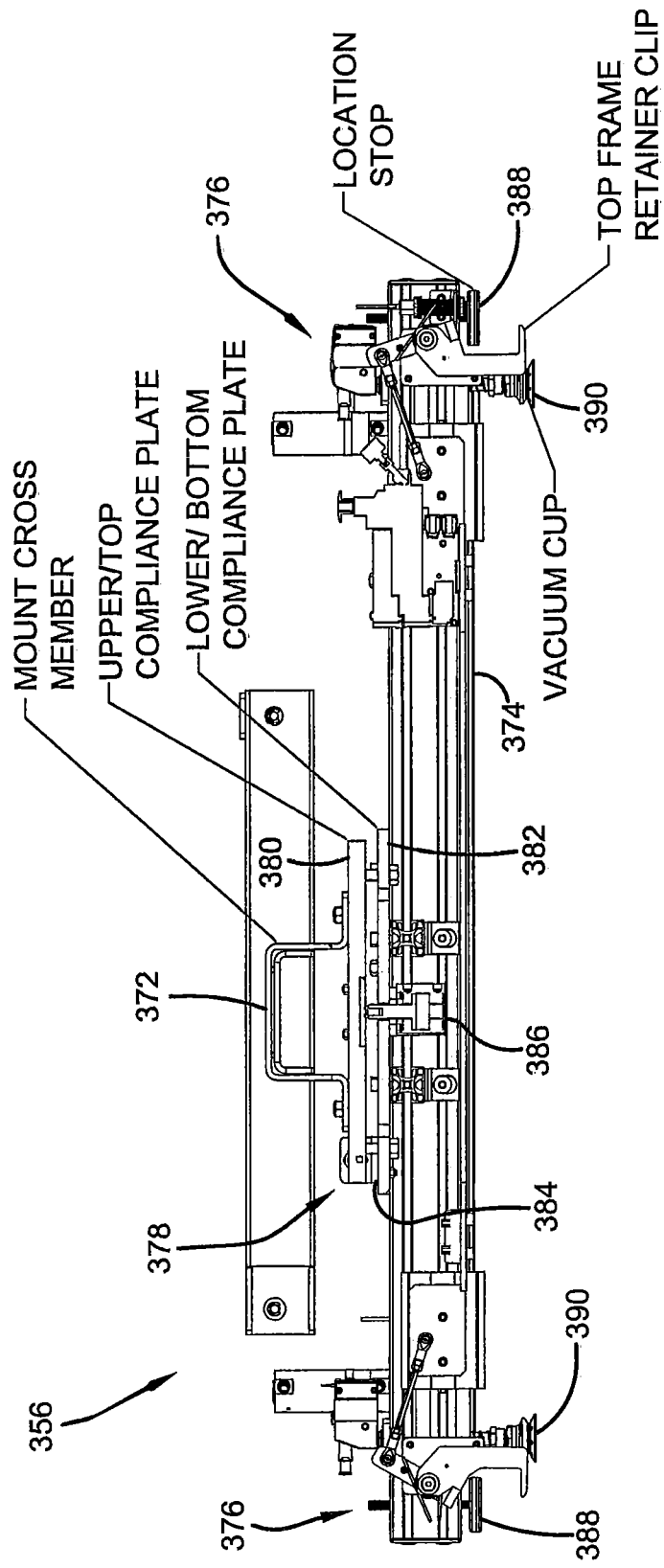
Figure 92:
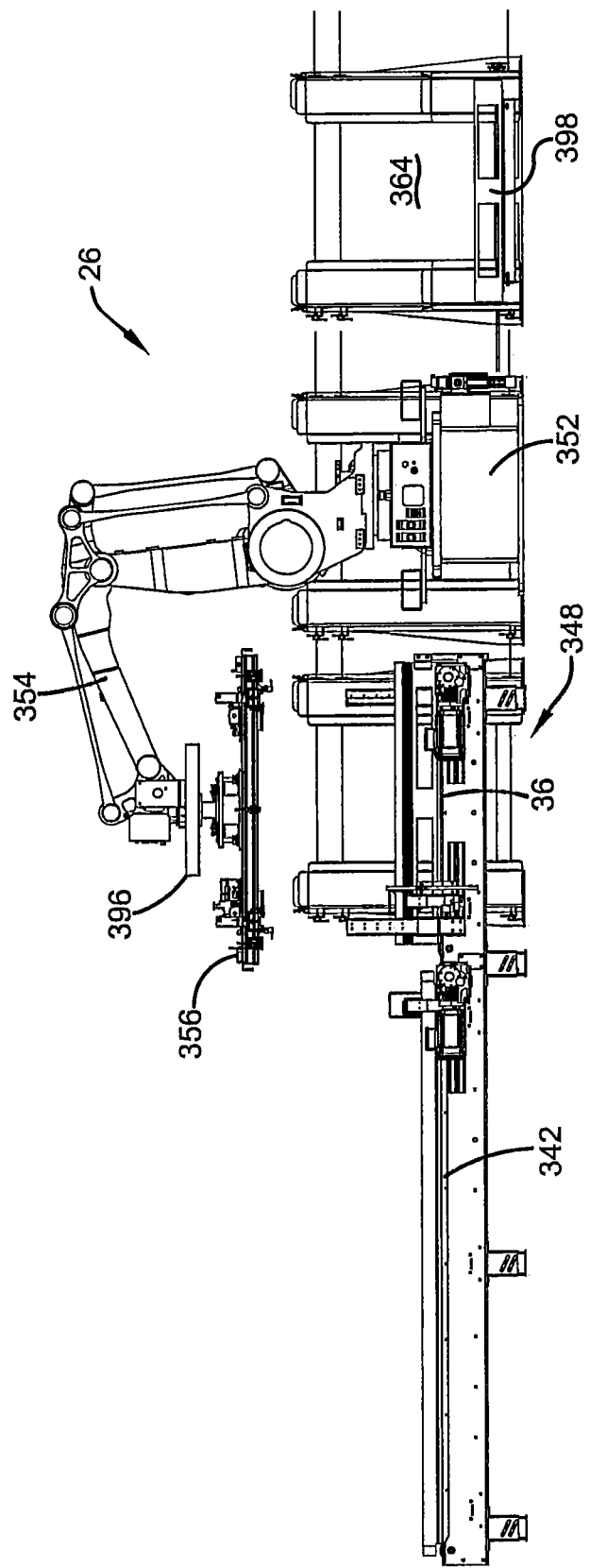

An exemplary end of arm tool is shown in greater detail in FIG. 91. The exemplary end of arm tool includes numerous features that are similar to the pick head 66 that has been previously described. The end of arm tool includes a crossmember 372 that is similar to crossmember 74. A pair of horizontally disposed frame rails 374 similar to the frame rails 78, 80 are also included. The end of arm tool also includes four frame clamps 376 that are selectively operable to engage and release a top frame. The frame clamps 376 are similar to frame clamps 82 previously discussed.

The exemplary end of arm tool 356 further includes a rotatable mount 378. The exemplary rotatable mount is similar to rotatable swivel mount 100. The exemplary rotatable mount 378 is capable in an unlocked condition of providing compliant tilting motion about the center of the end of arm tool, and a pair of perpendicular horizontally extending axes, and to selectively provide in a locked condition a rigid connection which holds the end of arm tool in a fixed level position. In the exemplary arrangement the rotatable mount 378 includes an upper compliance plate 380 and a lower compliance plate 382 which are similar to compliance plates 102, 104. A plurality of studs 384 which are similar to studs 106 extend between the compliance plates. The openings in the upper compliance plate and configurations of the studs may be similar to those previously discussed in connection with the pick head to enable rotational movement of the end of arm tool. A cylinder 386 operates in a manner similar to cylinder 112 to provide a swivel lock. Extending the rod associated with the cylinder 386 provides a rigid level connection between the upper and lower compliance plates which is usable to avoid unwanted movement due to inertial or other forces when separating the items that are included in the mixed dunnage stack. In alternative arrangements other types of actuators and locks may be utilized in place of the cylinder 386. For example in other exemplary arrangements one or more air bag actuators may be utilized for this purpose.

The exemplary end of arm tool further includes a plurality of location stops 388. Location stops 388 are similar to location stops 84 and are suitable for engagement with an upper face of the top frame. The end of arm tool further includes a plurality of grip members which in the exemplary arrangement includes suction cups 390. The suction cups 390 are each in operative connection with a spring level compensator and a vacuum pump similar to suction cups 86 previously discussed.

Figure 105:
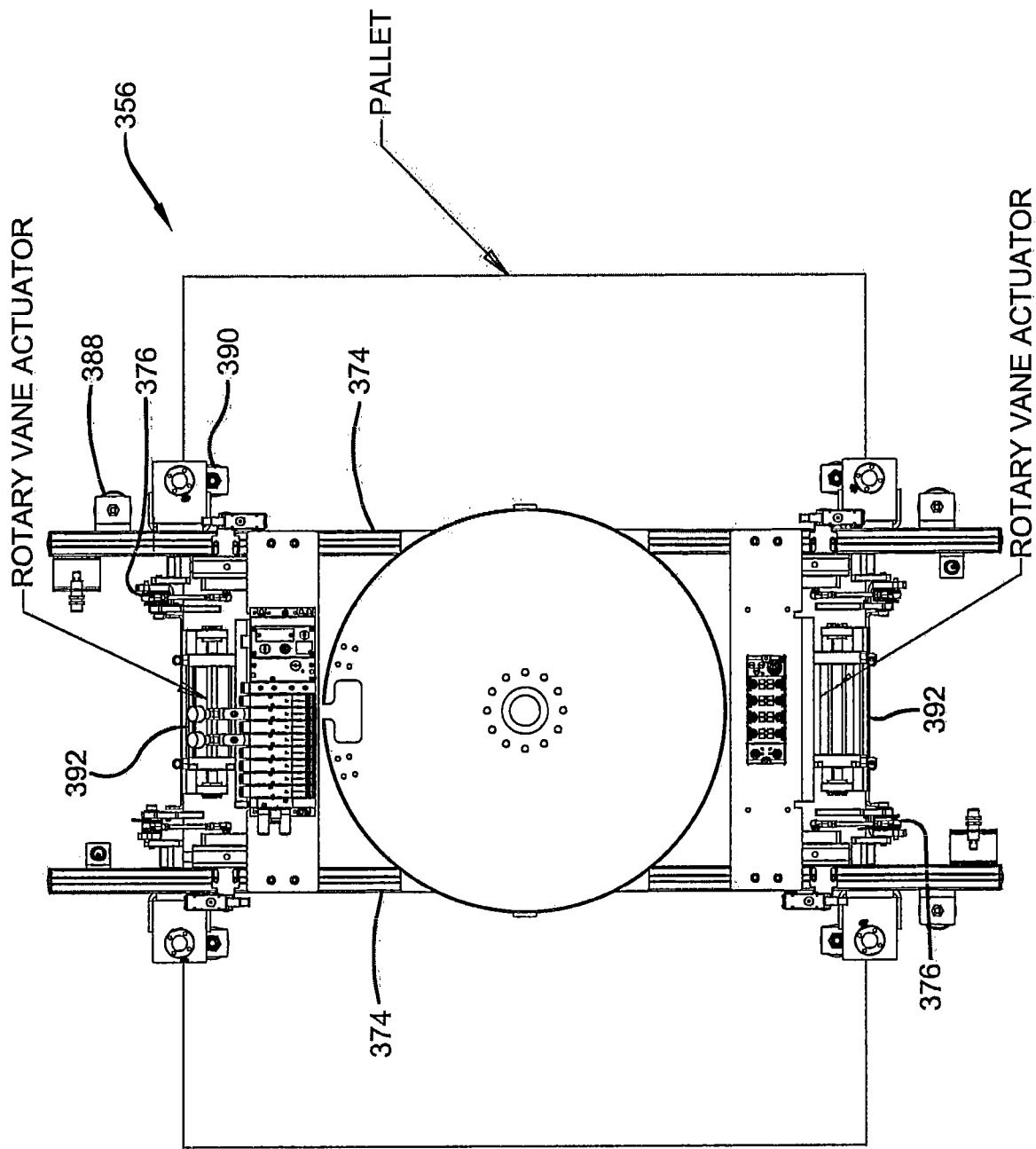
Figure 106:
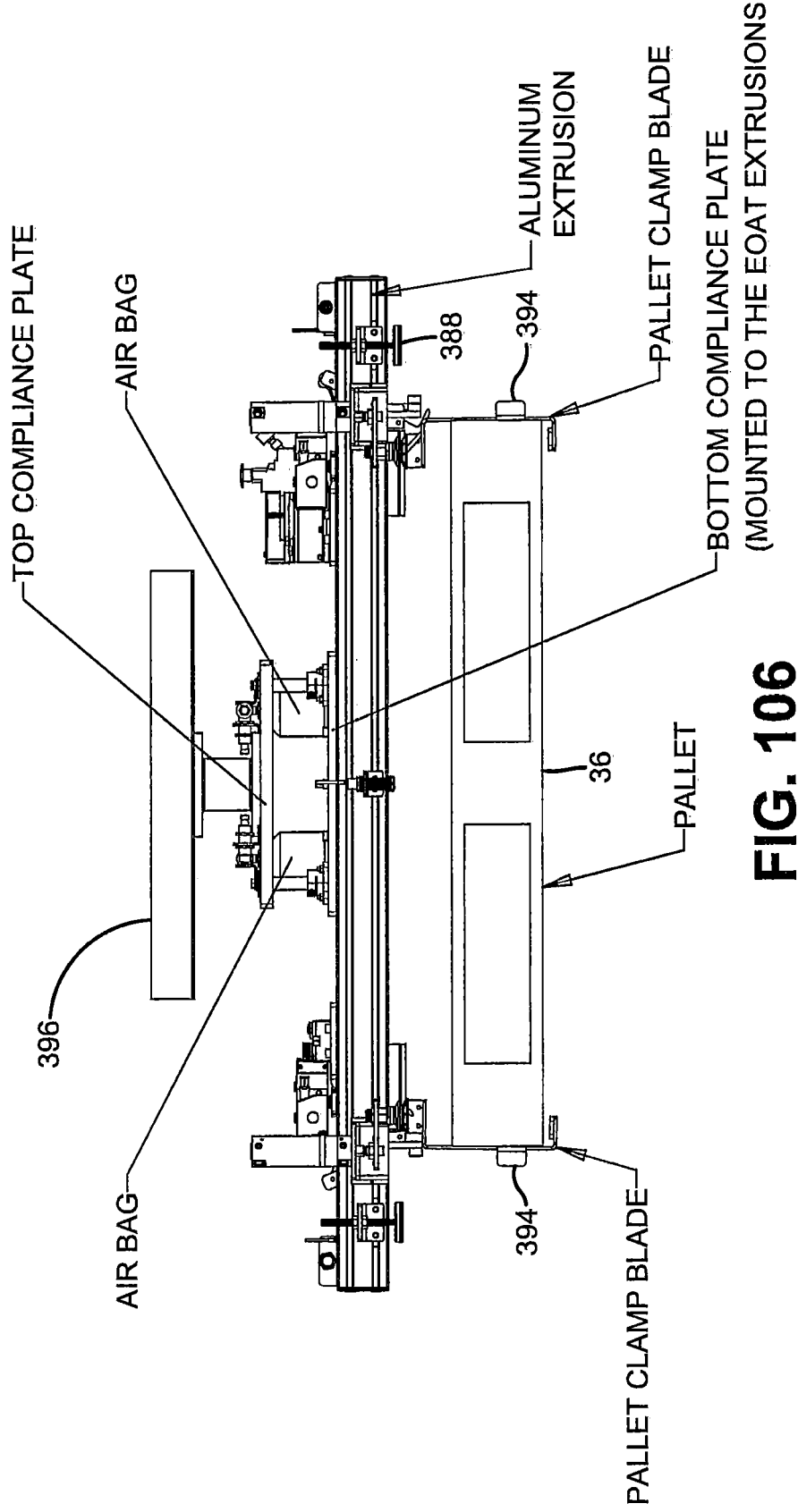

The exemplary end of arm tool further includes a pair of rotary actuators 392 at the transverse sides thereof as shown in FIG. 105. Each of the rotary actuators is selectively operative to move respective clamp blades 394 into a position that underlies the sides of pallet 36. The rotary clamp blades 394 are used in exemplary arrangements for engaging the pallet 36 to remove it from the separation station 348 as later discussed.

The exemplary end of arm tool is in operative connection with a central rotational actuator 396. The exemplary rotational actuator 396 is operatively positioned between the end of the robot arm 354 and the end of arm tool 356. The exemplary rotational actuator 396 may include suitable servomotors, pneumatic actuators or other devices that can be controlled through operation of the at least one controller to position the rotational position of the end of arm tool 356. As a result the end of arm tool is enabled to be selectively positioned vertically, horizontally and rotationally as the items in the mixed dunnage stack 344 are separated and placed in the various bins for eventual reuse in assembling further palletized container stacks.

In operation of the exemplary arrangement, with the sheets bin 370, the top frames bin 368 and the pallets bin 366 all empty, a starting pallet 398 is positioned in the auxiliary bin 364. In the exemplary arrangement the vertical bin guides 362 which bound the auxiliary bin include sensors that are in operative connection with the at least one controller to detect that a starting pallet 398 is present. It should be understood of course that this initial starting configuration is a circumstance that may only exist in situations where the other bins currently do not contain pallets or other dunnage items. In most operational circumstances the other bins will contain such items that have been obtained from other mixed dunnage stacks.

Figure 93:
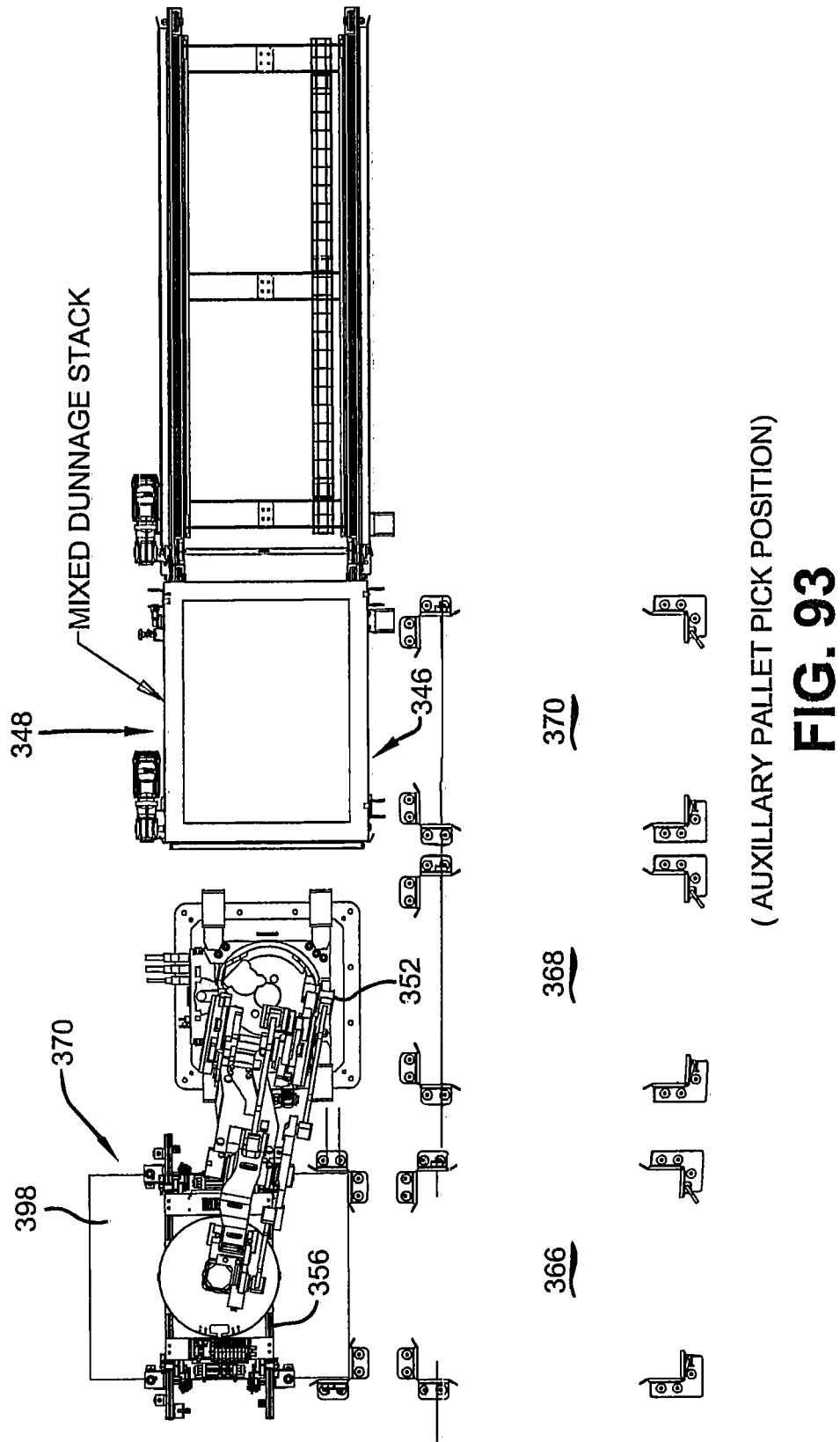
Figure 94:
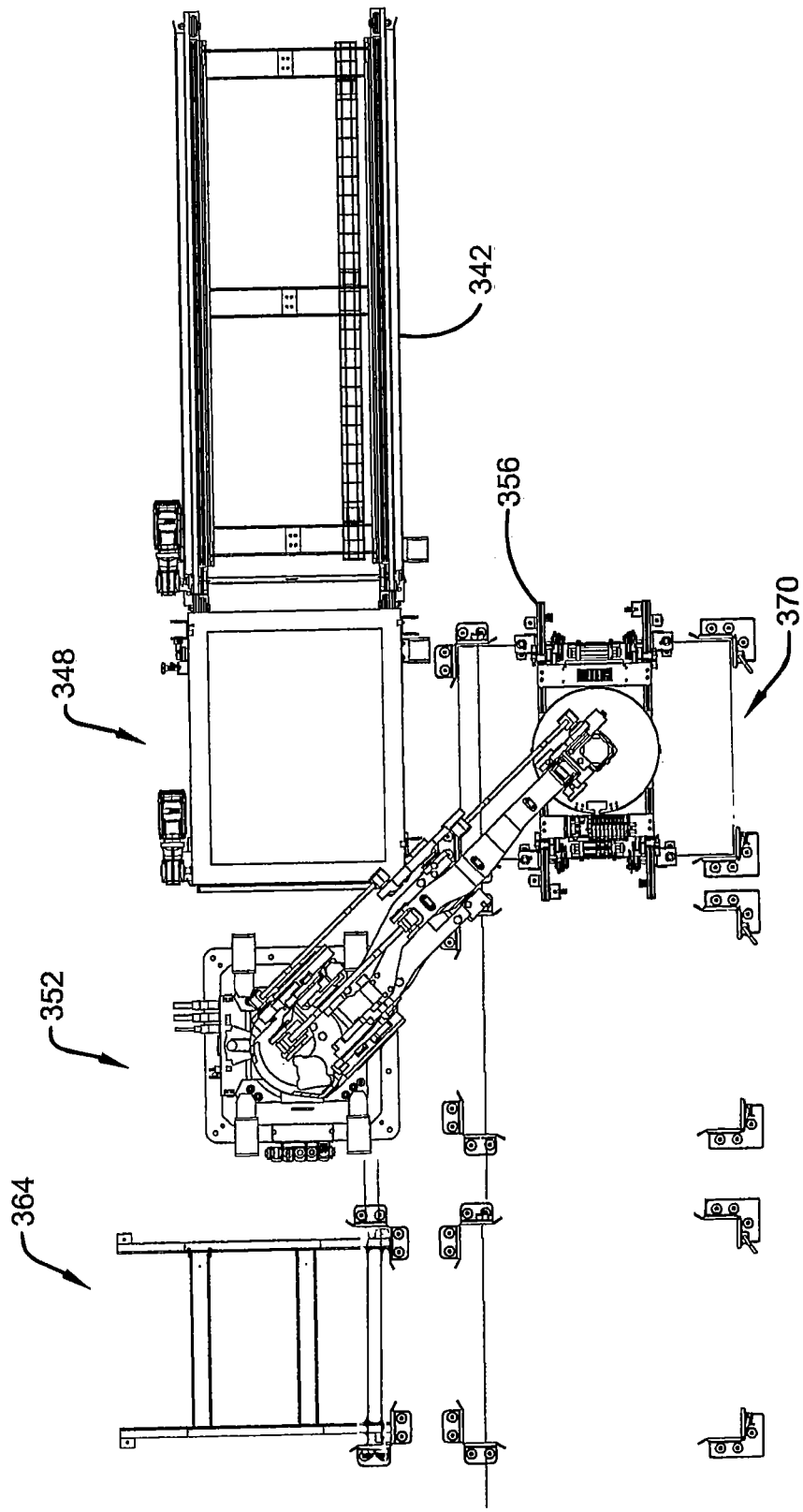
Figure 95:
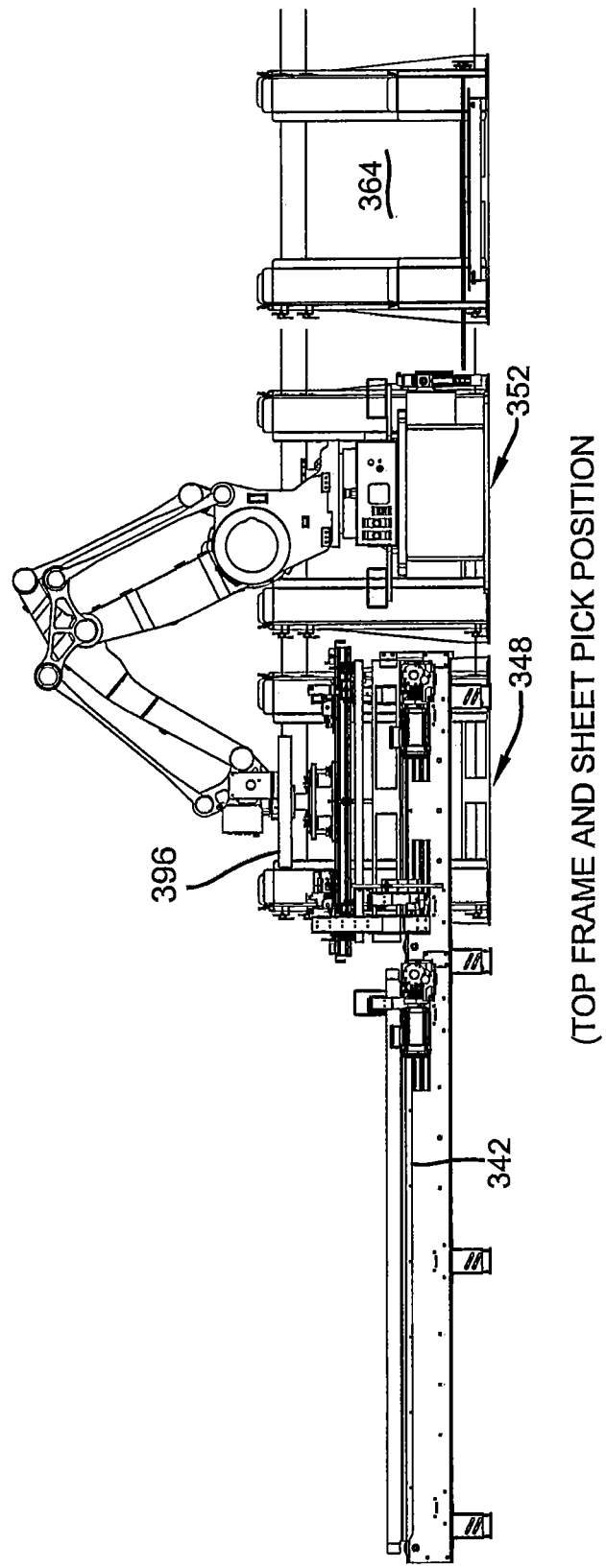
Figure 96:
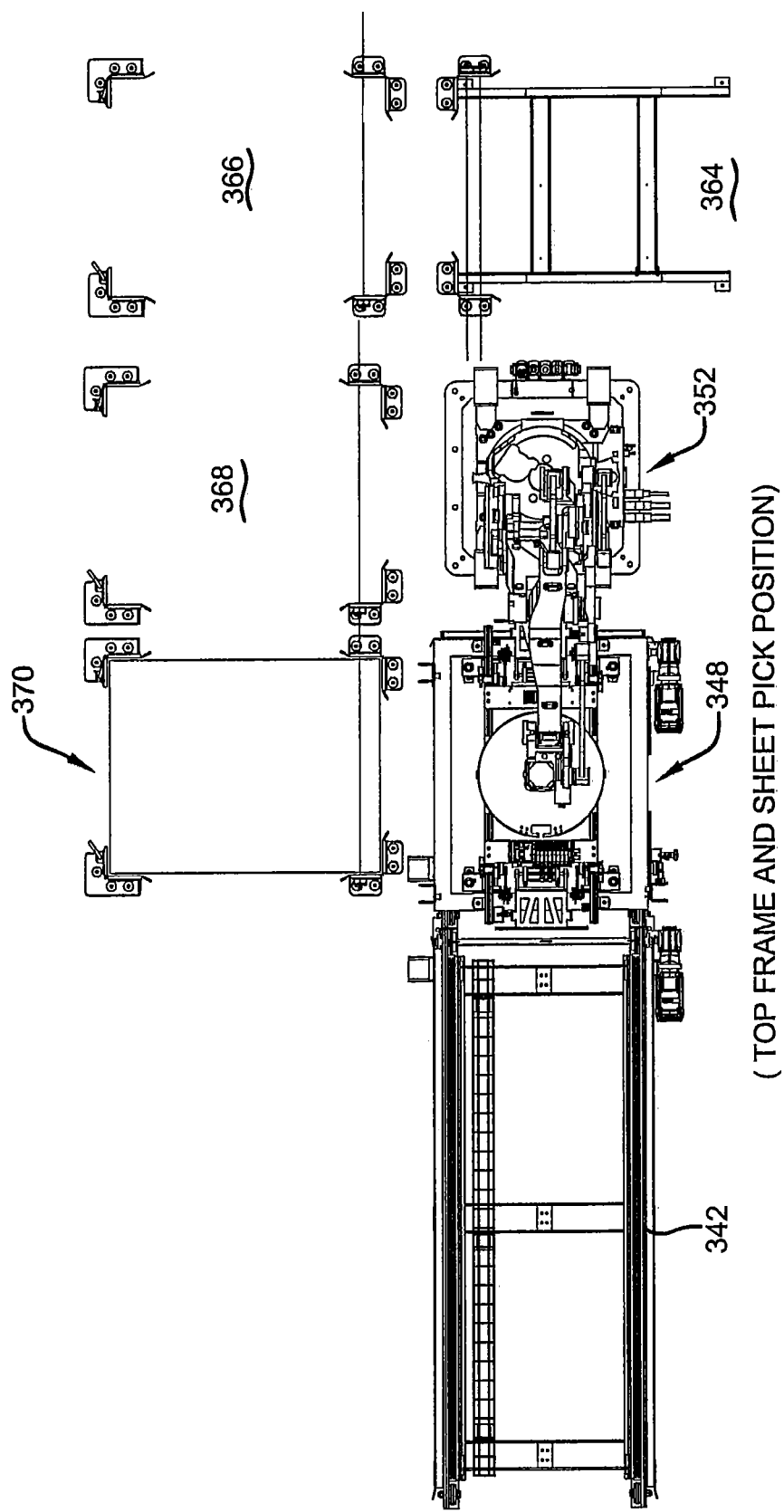
Figure 97:
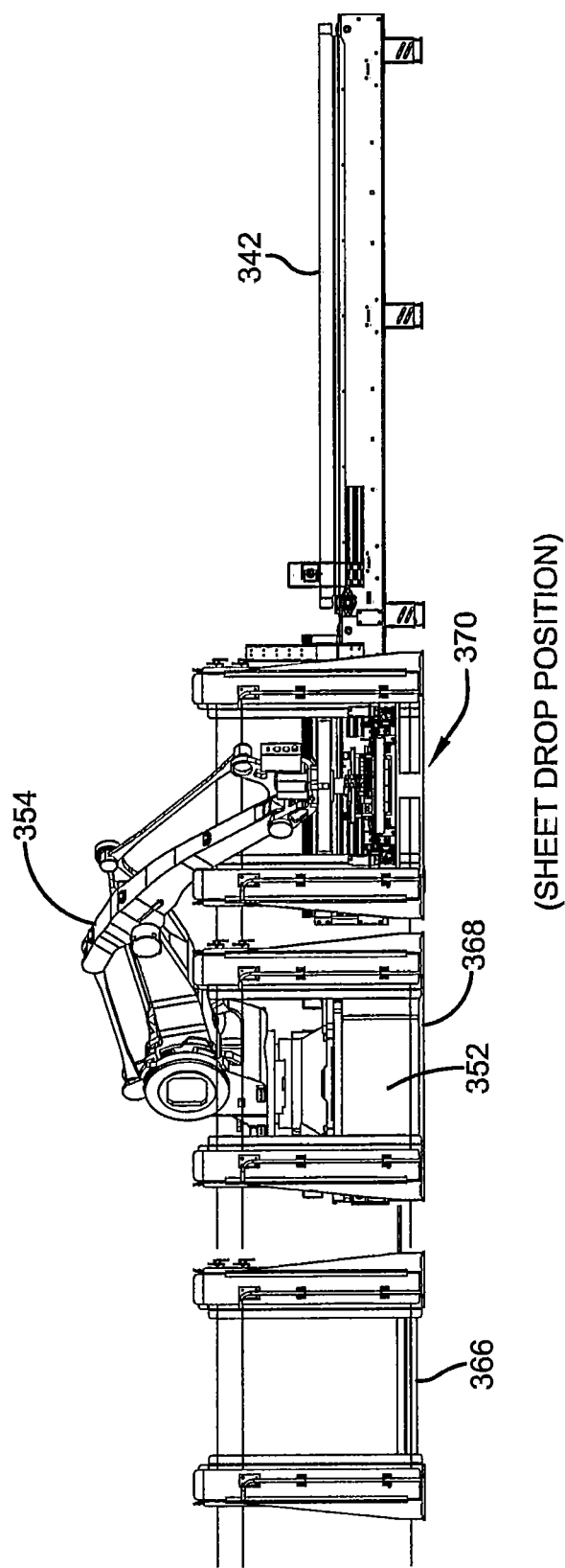
Figure 98:
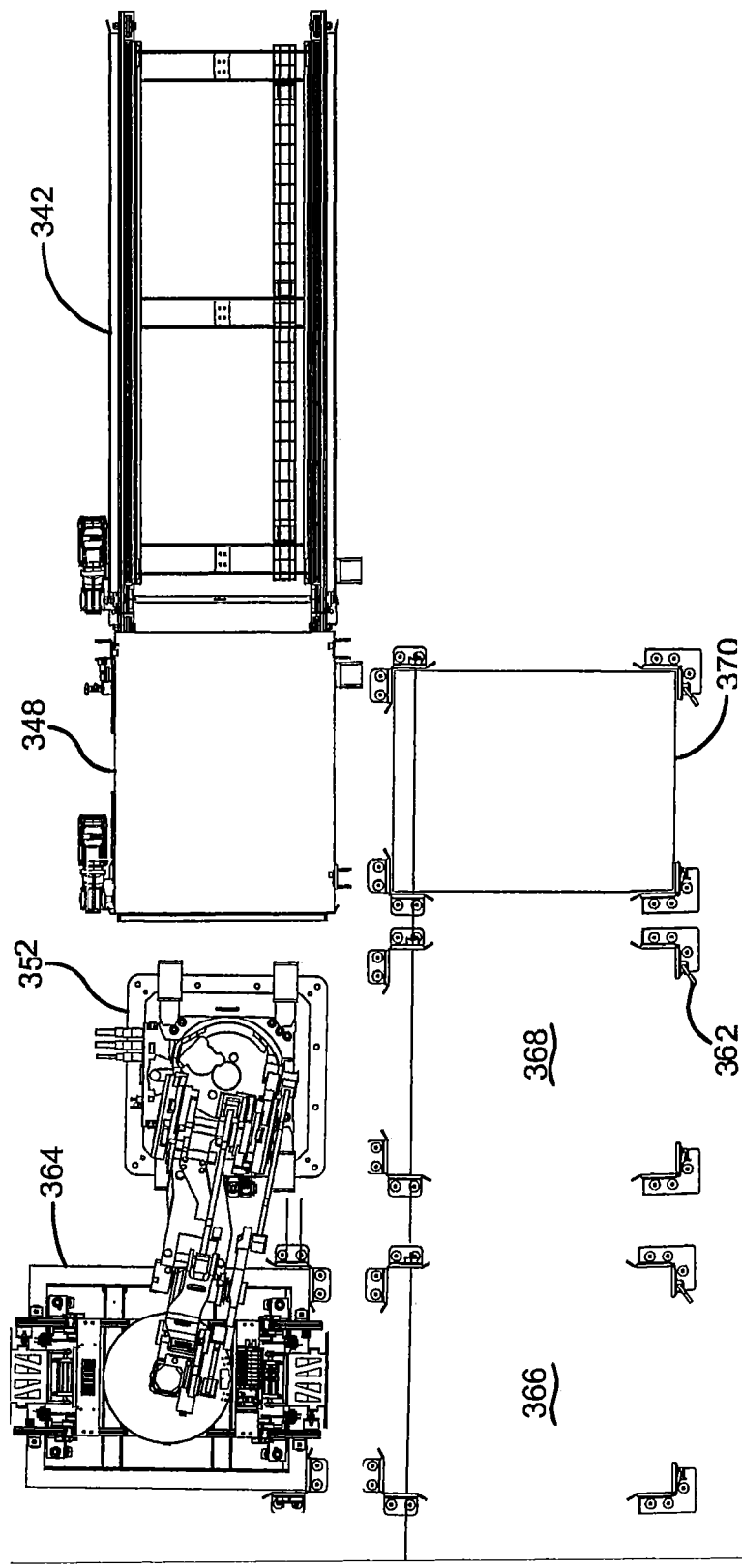
Figure 99:
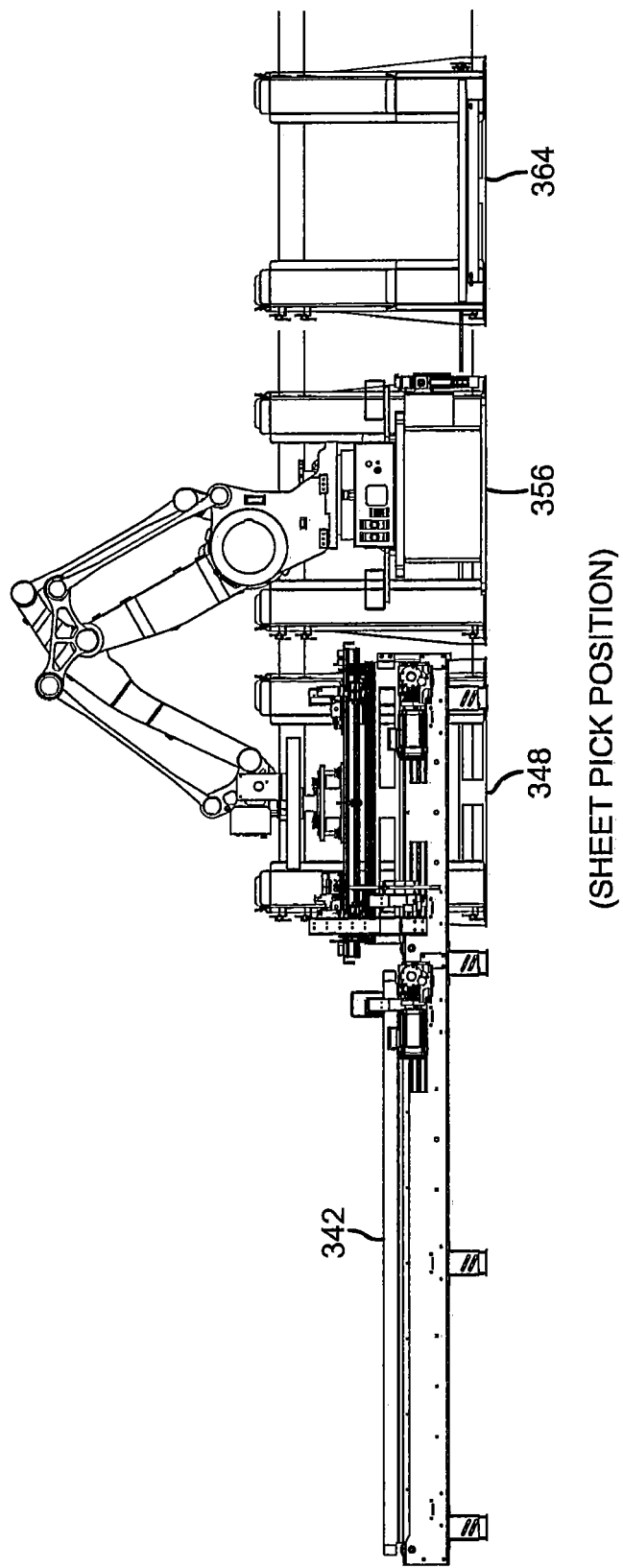
Figure 100:
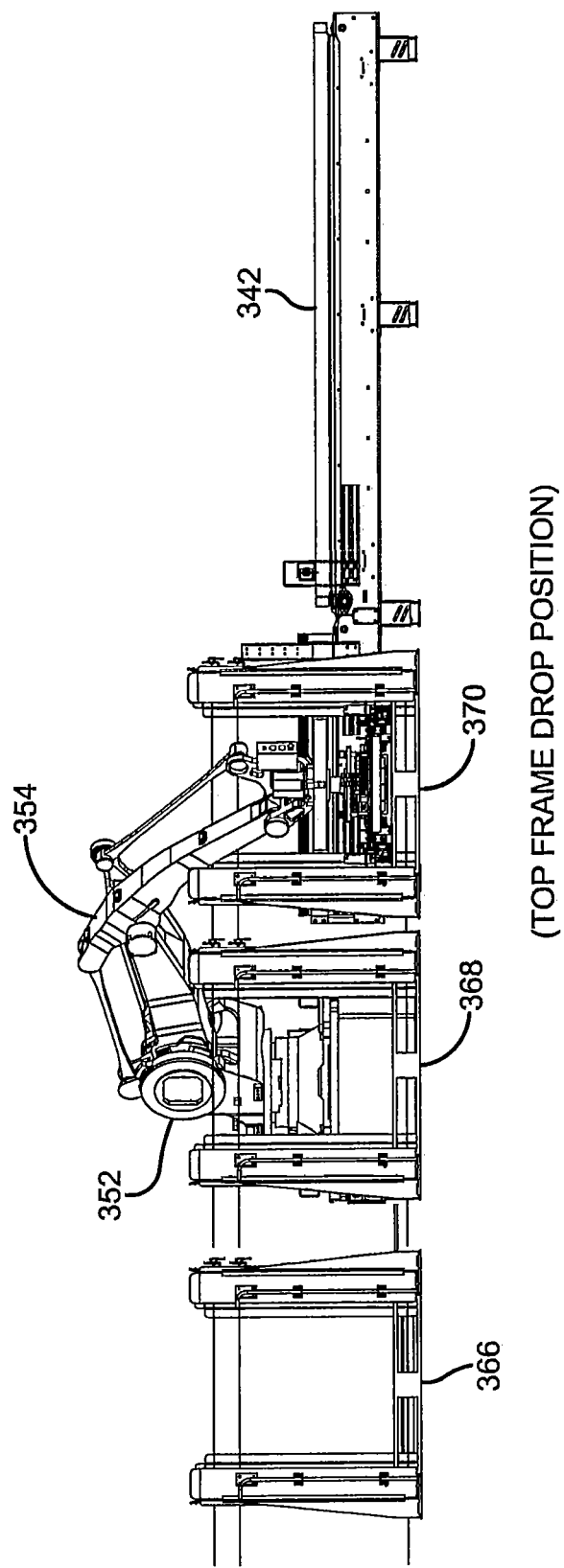
Figure 101:
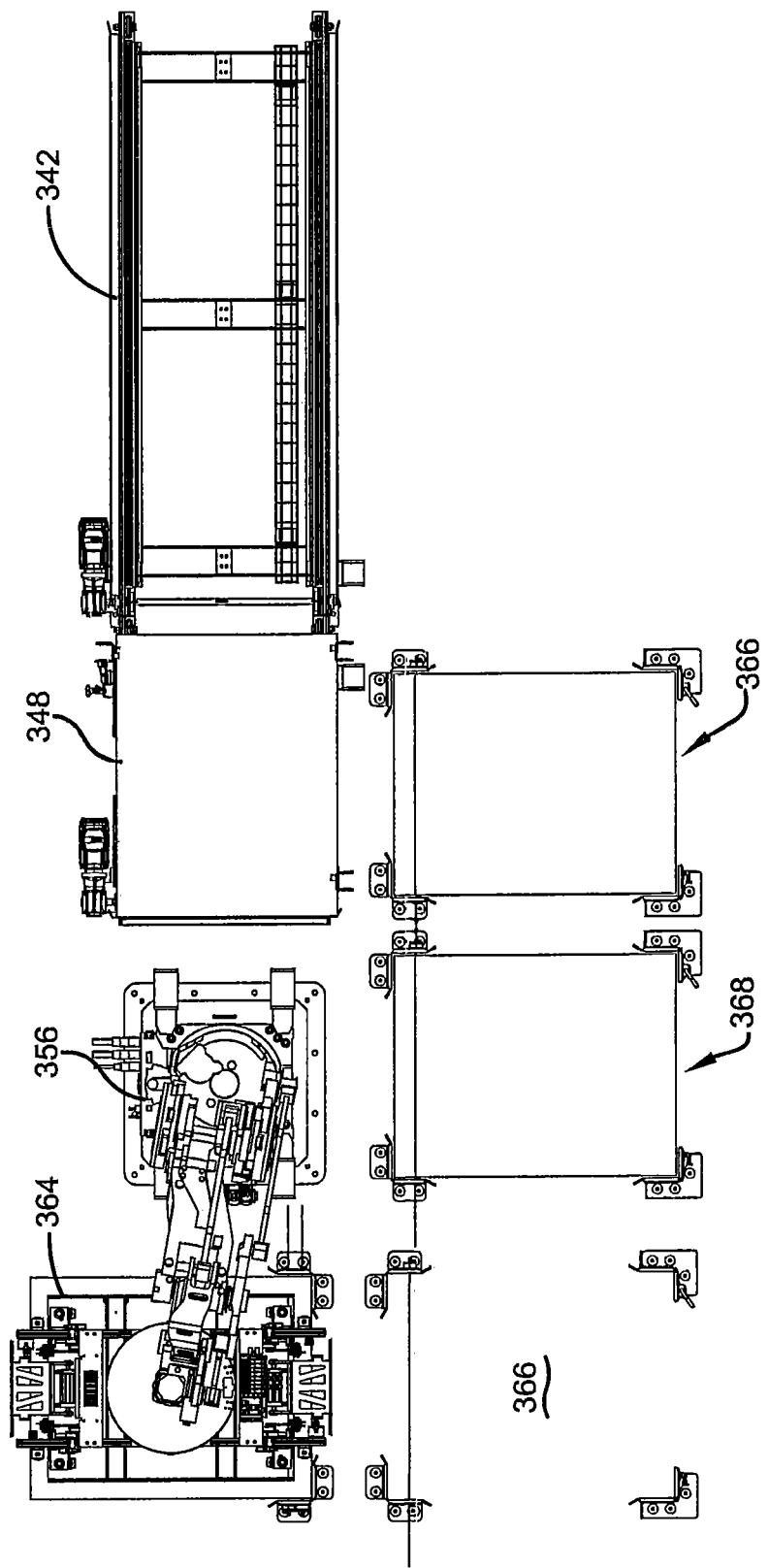
Figure 102:
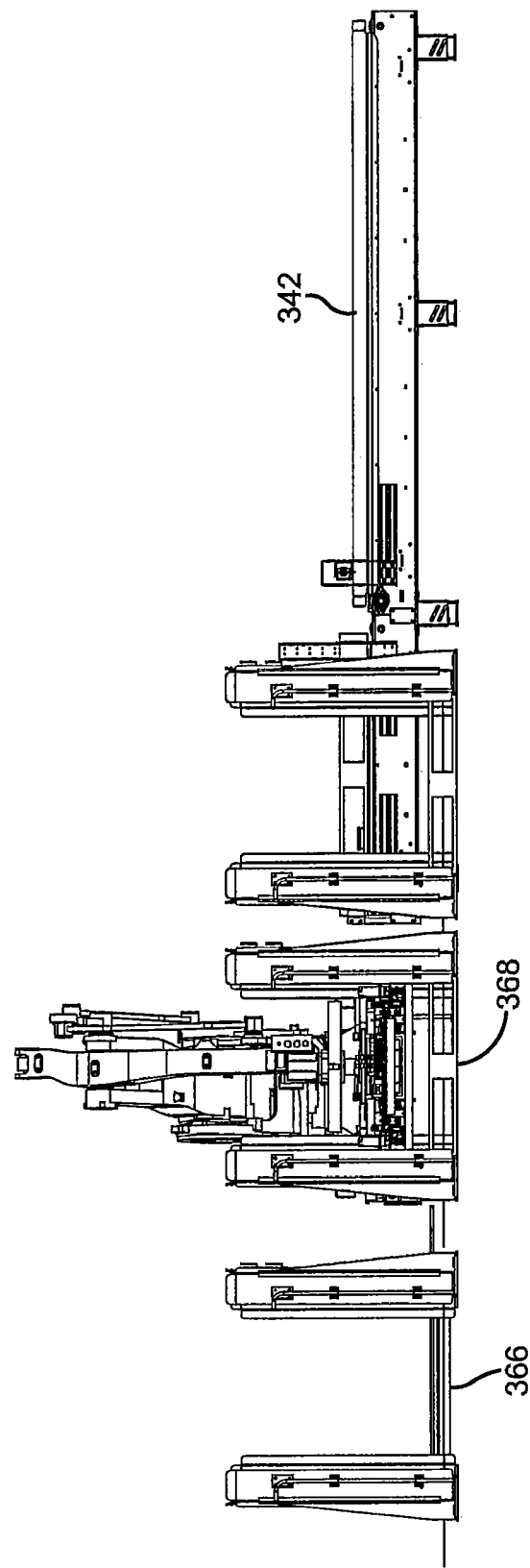
Figure 103:
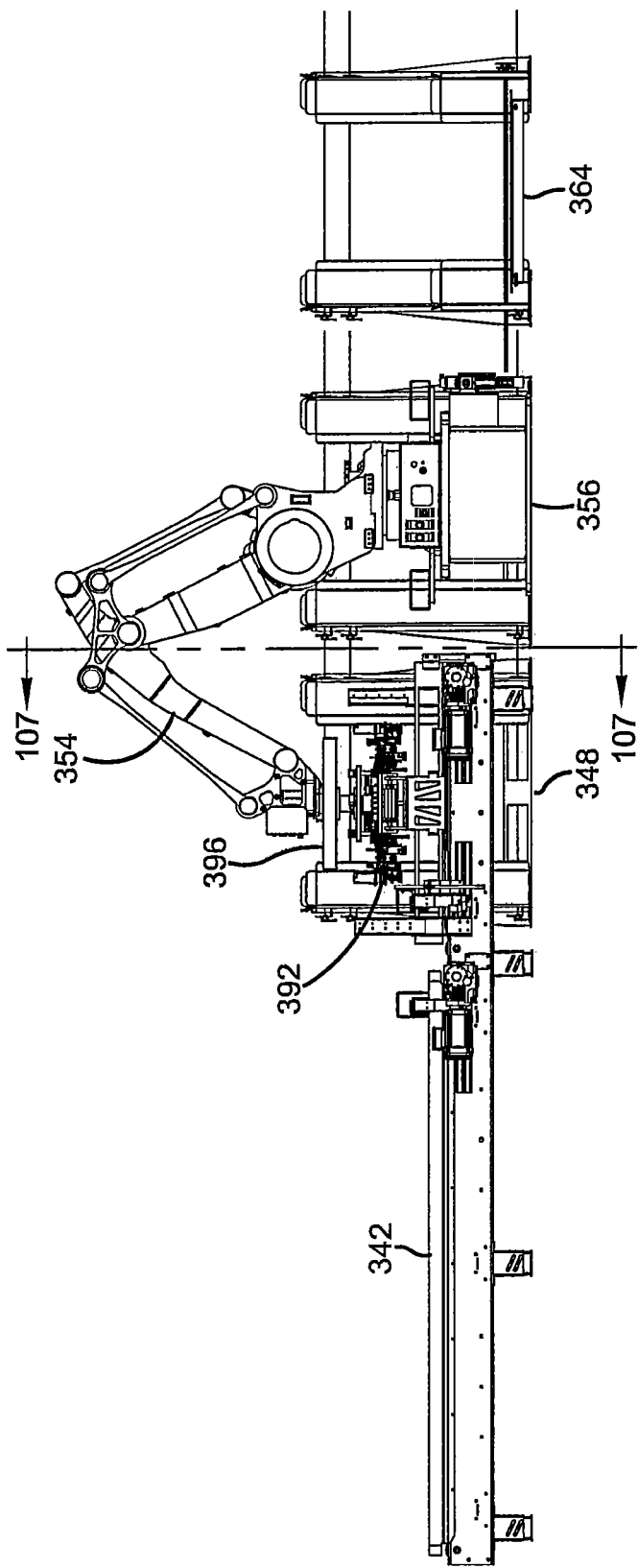
Figure 104:
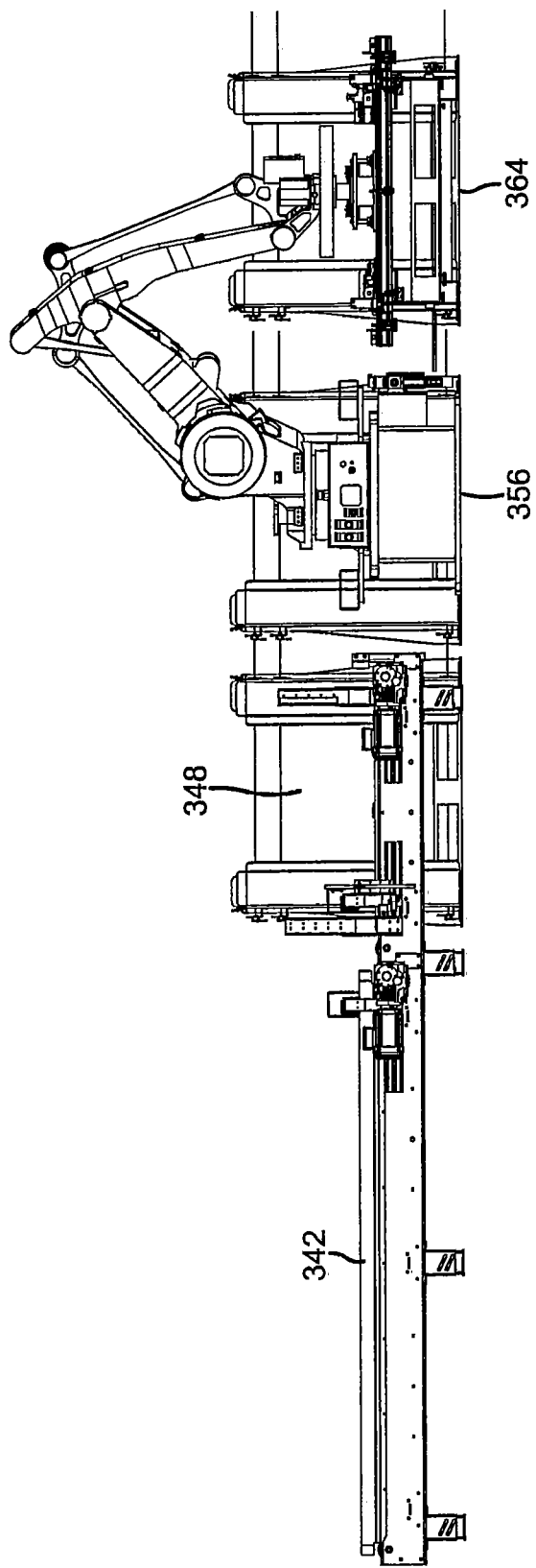

Starting from the arrangement represented by FIG. 89 the at least one controller of the machine operates the robot to engage the end of arm tool 356 with the starting pallet 398 in the auxiliary bin 364. This is accomplished by engaging the clamp blades 394 through operation of the rotary actuators 392. The end of arm tool engages the starting pallet and the robot 352 operates to place the starting pallet in the sheets bin 370. The engagement of the starting pallet 398 by the end of arm tool is represented in FIG. 93. The robot 352 then operates to place the starting pallet 398 in the sheets bin 370. The movement of the end of arm tool to the sheets bin is represented in FIG. 94. The end of arm tool releases the starting pallet.

The at least one machine controller then operates in accordance with its programming instructions to operate to engage the end of arm tool with the top frame 44 and the first dunnage sheet 42 immediately beneath the top frame in the mixed dunnage stack 344. This is accomplished in a manner like that carried out by the pick head 66 in engaging a top frame and first dunnage sheet as previously discussed. In the exemplary arrangement the robot then operates to move the dunnage sheet engaged with the end of arm tool into overlying relation with the starting pallet 398 located in the bin 370. The controller then operates to release the sheet so that it sits on top of the starting pallet 398 in the sheets bin 370.

As the sensors associated with the top frames bin 368 provide signals to the at least one controller to indicate that no pallet is located therein, the controller operates in accordance with its programming to disengage the top frame 44 from the end of arm tool and position it in the auxiliary bin 364. The top frame is placed in this location on a temporary basis until the pallet 36 at the bottom of the mixed dunnage stack is eventually placed in the top frames bin. Of course it should be understood that in other circumstances where there is already a pallet and at least one top frame in the top frames bin 368, the at least one controller will operate to place the top frame that has been removed from the mixed dunnage stack 344 directly in the top frames bin 368.

The at least one controller is then operative in accordance with its circuit executable instructions to cause the end of arm tool 356 to engage the dunnage sheet currently at the top of the mixed dunnage stack. The end of arm tool is operative to engage the dunnage sheet through operation of the suction cups 390 in a manner like that previously discussed in connection with the description of the operation of the pick head 66. In the exemplary arrangement the vertical guides 350 which bound the separation station 348 include features that help to separate the top dunnage sheet from the other dunnage sheets that remain in the mixed dunnage stack. In exemplary arrangements the vertical guides include brush bristles which engage the dunnage sheet as it is being removed from the stack by the end of arm tool. The bristles provide separating action that help to separate any additional dunnage sheets that may be attached thereto as a result of surface tension or static electricity.

Further in exemplary arrangements at least one air knife delivers an air blast in generally a horizontal direction at the dunnage sheet as it is being lifted by the end of arm tool. The horizontally directed air blast is further operative to separate any underlying dunnage sheets that may be moving with the top dunnage sheet. Further in exemplary arrangements an electrical ground pad or ground brushes may be provided to engage the dunnage sheets and help to dissipate any static electricity which may be holding further dunnage sheets in engagement with the top dunnage sheet being moved by the end of arm tool.

Further as can be appreciated in exemplary arrangements, similar to the pick head 66 previously discussed, when the robot 352 operates to move the end of arm tool rotationally to place items in bins the rotatable mount 378 is controlled so that the compliance plates thereof are in a rigid connection. This helps to minimize the risk of any undesirable relative motion that may make it more difficult to precisely position the end of arm tool and the items that are engaged therewith. Of course it should be understood that this approach is exemplary and in other arrangements other approaches may be used.

In the exemplary arrangement the robot 352 operates in accordance with its programming to move each dunnage sheet one at a time from the mixed dunnage stack into the sheets bin 370. The exemplary vertical bin guides 362 include one or more sensors that are usable to provide to the at least one controller an indication of the level of items within the particular bin. This enables the at least one controller to provide signals to monitor the levels of items and indicate when a particular bin is starting to fill up so that it can be emptied. Of course this approach is exemplary and in other arrangements other approaches may be used.

Once all of the dunnage sheets have been removed from the mixed dunnage stack 344, the at least one controller operates the robot 352 and the end of arm tool 356 to engage the pallet 36. This is done through the operation of the rotary actuators 392 and the clamp blades 394 which have been previously described. The clamp blades extend underneath the pallet 36 to hold it in engaged relation while the robot lifts the pallet and places it in the top frames bin 368 which is currently empty. Once the pallet has been placed in the top frames bin 368, the robot operates to engage the top frame 44 that is currently temporarily located in the auxiliary bin 364. The robot operates to move the top frame from the auxiliary bin and into the top frames bin 368 where the top frame is placed on top of the pallet 36.

In this position the dunnage separating cell 26 is ready to receive another mixed dunnage stack similar to stack 344. In this situation because there are already pallets in the sheets bin 370 and the top frames bin 368, the robot operates to place the top frame from the subsequent mixed dunnage stack directly into the top frames bin on top of the prior top frame, and the dunnage sheets into the sheets bin 370. However in exemplary arrangements because the auxiliary bin 364 currently does not contain a pallet, the robot is operated to place the pallet from the next received mixed dunnage stack into the auxiliary bin so that the pallet is available to use as a starting pallet when needed.

When a further mixed dunnage stack is received, the separation operations previously described are repeated. The top frame from the next stack is added to the top frames bin 368, and the sheets are added to the sheets bin 370. However, because there is a starting pallet located already in the auxiliary bin 364, the pallet from the latest dunnage stack is placed in the pallets bin 366. As can be appreciated the robot and the end of arm tool 356 are operated in this manner to separate mixed dunnage stacks as they are received in the separation station 348.

The at least one controller is operative responsive to the sensors 400 that are included on the vertical bin guides 362 to determine the levels of items that are included in the bins. The at least one controller operates in accordance with its programming to determine when a sensed level of material such as top frames or dunnage sheets is reaching a point at which the material should be removed. In response to making such a determination the exemplary at least one controller operates in accordance with its programming to generate at least one signal indicative of the condition. The at least one signal may cause one or more messages to be sent to a material handling operation or other appropriate function in the facility to remove the pallet and the associated material from the particular bin. Alternatively or in addition the at least one signal may be operative to provide a visual and/or audible indication that a particular bin needs to be emptied.

In exemplary arrangements the at least one controller is further operative to determine when a particular top frame or dunnage sheet bin has been emptied. In such circumstances the at least one controller operates in accordance with its programming to move the starting pallet 398 that is located in the auxiliary bin into the top frame or dunnage sheet bin location that requires a pallet. The pallet can then be used as the base for further material that is placed therein. The at least one controller further operates in accordance with its programming to place a new starting pallet in the auxiliary bin the next time a new pallet is received in a mixed dunnage stack. Of course it should be understood that these approaches are exemplary and in other arrangements other approaches may be used.

Thus the exemplary arrangements achieve improved operation, eliminate difficulties encountered in the use of prior devices and systems, and attain the useful results that are described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited to the exact features and relationships that have been shown and described.

Further it should be understood that the features and/or relationships associated with one arrangement can be combined with features and/or relationships from other arrangements. That is, various features and/or relationships from various arrangements can be combined to produce further arrangements. The inventive scope of the disclosure is not limited only to the arrangements that have been shown and described.

Having described features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. Apparatus comprising:
    a depalletizing machine operative to separate containers from a pallet upon which the containers are operatively supported,
    wherein prior to separation the containers are arranged in a plurality of vertically aligned layers each of which layers comprises a plurality of containers positioned in side-by-side relation, and a respective dunnage sheet separates each layer from an immediately adjacent layer,
    the machine including
        a pallet hoist, wherein the pallet hoist is selectively operative to selectively vertically position the pallet, a take away conveyor, wherein the take away conveyor
is configured to receive containers removed from
operative supported connection with the pallet,
at least one selectively horizontally movable sweep bar,
wherein the at least one sweep bar is operative to
horizontally move a layer of containers relative to a
supporting immediately underlying dunnage sheet,
wherein the containers in the layer are engageable
with the take away conveyor,
a pick head, wherein the pick head
is selectively vertically movable in overlying relation of the pallet hoist,
includes at least one grab member configured to
releasably hold a dunnage sheet in engagement
with the pick head,
a dunnage tray, wherein the dunnage tray
is configured to hold a plurality of dunnage sheets in
a dunnage storage area, and
is selectively horizontally movable between a first
position in which the dunnage tray is in vertically
overlying relation of the pallet hoist and a second
position in which the dunnage tray is not in
vertically overlying relation of the pallet hoist,
at least one controller, wherein the controller is in
operative connection with each of
the pallet hoist,
the at least one sweep bar,
the take away conveyor,
the pick head, and
the dunnage tray,
wherein the at least one controller is operative to cause
the at least one grab member of the pick head to
engage a dunnage sheet overlying a top layer of
containers that are in operatively supported connection with the pallet,
the pick head to move the engaged dunnage sheet
vertically away from the top layer,
the dunnage tray to move horizontally wherein the
dunnage storage area is in underlying relation of
the engaged dunnage sheet,
the at least one grab member of the pick head to
release the dunnage sheet into the dunnage storage
area, and
the at least one sweep bar to cause the top layer
containers to be moved horizontally into engagement with the take away conveyor,
wherein prior to separation of any of the layers from
operatively supported connection with the pallet, a top
frame extends vertically above an uppermost dunnage
sheet, wherein the top frame includes a top surface,
wherein the uppermost dunnage sheet extends vertically
above an uppermost layer of containers in operatively
supported connection with the pallet,
wherein the pick head further includes
a swivel mount, wherein the swivel mount enables the
pick head to rotate relative to each of a pair of
perpendicular horizontally extending axes,
a plurality of downward extending location stops,
wherein the plurality of downward extending location stops are configured to engage a top surface of
the top frame in a plurality of disposed locations,
wherein the at least one grab member extends vertically below the plurality of location stops,
wherein the at least one controller is further operative to
cause
prior to engagement of the at least one grab member
and the uppermost dunnage sheet
vertical movement of at least one of the pallet hoist
and the pick head such that each of the plurality of
location stops is in engagement with the top
surface of the top frame,
whereby the swivel mount positions the pick head in
angularly aligned relation with the top surface.

2. The apparatus according to claim 1
wherein the pick head further includes
a swivel lock, wherein the swivel lock is selectively
changeable between an unlocked condition in which
the pick head is rotatable relative to each of the pair
of axes, and a locked condition in which the pick
head is prevented from rotating relative to each of
the pair of horizontally extending axes,
wherein the at least one controller is further operative to
cause
prior to engagement of the at least one grab member
and the uppermost dunnage sheet
the swivel lock to be in the unlocked condition,
wherein the vertical movement of the at least one
of the pallet hoist and the pick head is operative to
cause each of the plurality of location stops to be
in engagement with the top surface of the top
frame, whereby the swivel mount positions the
pick head in angularly aligned relation with the
top surface,
and after engagement of the at least one grab member
and the uppermost dunnage sheet
the swivel lock to change from the unlocked condition to the locked condition,
wherein the swivel lock remains in the locked condition while the uppermost dunnage sheet is
released into the dunnage storage area.

3. The apparatus according to claim 1,
wherein the pick head further includes
a swivel lock, wherein the swivel lock is selectively
changeable between an unlocked condition in which
the pick head is rotatable relative to each of the pair
of axes, and a locked condition in which the pick
head is prevented from rotating relative to each of
the pair of horizontally extending axes, wherein in
the locked position each of the at least one grab
members are positioned within a single horizontal
plane,
wherein the at least one controller is further operative to
cause
prior to engagement of the at least one grab member
and the uppermost dunnage sheet
the swivel lock to be in the unlocked condition,
wherein the vertical movement of at least one of
the pallet hoist and the pick head is operative to
cause each of the plurality of location stops is to
be in engagement with the top surface of the top
frame, whereby the swivel mount positions the
pick head in angularly aligned relation with the
top surface,
and after engagement of the at least one grab member
and the uppermost dunnage sheet
the swivel lock to change from the unlocked condition to the locked condition,
wherein the swivel lock remains in the locked condition while the uppermost dunnage sheet is
released into the dunnage storage area.

4. The apparatus according to claim 1
wherein each respective grab member includes a downwardly biased vertically movable suction cup on which
a vacuum is drawn.

5. Apparatus comprising:
a depalletizing machine operative to separate containers from a pallet upon which the containers are operatively supported,
wherein prior to separation the containers are arranged in a plurality of vertically aligned layers each of which layers comprises a plurality of containers positioned in side-by-side relation, and a respective dunnage sheet separates each layer from an immediately adjacent layer,
the machine including
  a pallet hoist, wherein the pallet hoist is selectively operative to selectively vertically position the pallet,
  a take away conveyor, wherein the take away conveyor is configured to receive containers removed from operative supported connection with the pallet,
  at least one selectively horizontally movable sweep bar, wherein the at least one sweep bar is operative to horizontally move a layer of containers relative to a supporting immediately underlying dunnage sheet, wherein the containers in the layer are engageable with the take away conveyor,
  a pick head, wherein the pick head
    is selectively vertically movable in overlying relation of the pallet hoist,
    includes at least one grab member configured to releasably hold a dunnage sheet in engagement with the pick head,
  a dunnage tray, wherein the dunnage tray
    is configured to hold a plurality of dunnage sheets in a dunnage storage area, and
    is selectively horizontally movable between a first position in which the dunnage tray is in vertically overlying relation of the pallet hoist and a second position in which the dunnage tray is not in vertically overlying relation of the pallet hoist,
    wherein the dunnage storage area of the dunnage tray
      is bounded horizontally by a front wall, a back wall at a pair of sidewalls, and is bounded vertically downward by a subframe,
      wherein the subframe is selectively movable between an upward position in which the subframe closes a lower side of the dunnage storage area, and a downward position in which an opening extends vertically between the front wall and the subframe,
  at least one controller, wherein the controller is in operative connection with each of
    the pallet hoist,
    the at least one sweep bar,
    the take away conveyor,
    the pick head, and
    the dunnage tray,
    wherein the at least one controller is operative to cause
      the at least one grab member of the pick head to engage a dunnage sheet overlying a top layer of containers that are in operatively supported connection with the pallet,
      the pick head to move the engaged dunnage sheet vertically away from the top layer,
      the dunnage tray to move horizontally wherein the dunnage storage area is in underlying relation of the engaged dunnage sheet,
      the at least one grab member of the pick head to release the dunnage sheet into the dunnage storage area, and
      the at least one sweep bar to cause the top layer containers to be moved horizontally into engagement with the take away conveyor,
      the pick head, the at least one sweep bar, the dunnage tray and the pallet hoist to operate to cause each layer of containers below the top layer to be sequentially moved into engagement with the take away conveyor and each dunnage sheet to be engaged with the pick head and released into the dunnage storage area while the subframe is in the upward position,
      and thereafter
      the dunnage storage tray to move horizontally into overlying relation of the pallet,
      the subframe to be moved from the upward position to the downward position,
      with the subframe in the downward position, the dunnage sheets in the dunnage storage area to be moved horizontally through the opening into operatively supported relation with the pallet, and
      the pallet hoist to then vertically lower the pallet with the dunnage sheets in operatively supported relation therewith.

6. The apparatus according to claim 5
wherein the machine further includes
a sheet leveler, wherein the sheet leveler
  is in operative connection with the at least one controller,
  is positioned horizontally intermediate of the pallet hoist and the take away conveyor,
  is selectively operative to vertically position a horizontal edge portion of the immediately underlying dunnage sheet from which the top layer of containers is moved by the at least one sweep bar, wherein the horizontal edge portion comprises an edge portion of the dunnage sheet immediately horizontally adjacent to the take away conveyor,
wherein the at least one controller is further operative to cause
  the sheet leveler to selectively vertically position the horizontal edge portion prior to the at least one sweep bar causing the top layer containers to be moved horizontally.

7. The apparatus according to claim 5
wherein the subframe comprises a plurality of horizontally extending tracks,
wherein each horizontally extending track extends parallel to the sidewalls,
wherein the machine further includes a plurality of selectively vertically extendable members, wherein each of the vertically extendable members
  is in operative connection with the at least one controller,
  is in a horizontal position intermediate of immediately adjacent horizontally extending tracks, and
  is selectively movable between an upward extended position in a downward retracted position,
wherein the at least one controller is further operative to cause
  with the subframe moved to the downward position,
  each of the plurality of extendable members to be moved from the downward retracted position to the upward extended position,
  and with the extendable members in the upward extended position, the dunnage storage tray to move horizontally away from overlying relation of the pallet, wherein the dunnage sheets in the dunnage storage area are engaged by the extendable members and held stationary during dunnage storage tray movement horizontally away from overlying relation of the pallet, whereby the dunnage sheets are caused to be moved through the opening into operatively supported relation with the pallet.

8. Apparatus comprising:
a depalletizing machine operative to separate containers from a pallet upon which the containers are operatively supported,
wherein prior to separation the containers are arranged in a plurality of vertically aligned layers each of which layers comprises a plurality of containers positioned in side-by-side relation, and a respective dunnage sheet separates each layer from an immediately adjacent layer,
the machine including
  a pallet hoist, wherein the pallet hoist is selectively operative to selectively vertically position the pallet,
  a take away conveyor, wherein the take away conveyor is configured to receive containers removed from operative supported connection with the pallet,
  at least one selectively horizontally movable sweep bar, wherein the at least one sweep bar is operative to horizontally move a layer of containers relative to a supporting immediately underlying dunnage sheet, wherein the containers in the layer are engageable with the take away conveyor,
  a pick head, wherein the pick head
    is selectively vertically movable while in overlying relation of the pallet hoist and horizontally movable,
    includes at least one grab member configured to releasably hold a dunnage sheet in engagement with the pick head,
  a dunnage tray, wherein the dunnage tray
    is configured to hold a plurality of dunnage sheets in a dunnage storage area, and
    is selectively horizontally movable between a first position in which the dunnage tray is in vertically overlying relation of the pallet hoist and a second position in which the dunnage tray is not in vertically overlying relation of the pallet hoist,
  a sheet leveler, wherein the sheet leveler
    is positioned horizontally intermediate of the pallet hoist and the take away conveyor,
    is selectively operative to vertically position a horizontal edge portion of the immediately underlying dunnage sheet from which the top layer of containers is moved by the at least one sweep bar, wherein the horizontal edge portion comprises an edge portion of the dunnage sheet immediately horizontally adjacent to the take away conveyor,
    includes a plurality of horizontally and vertically movable fingers, wherein each of the plurality of movable fingers
      extends horizontally and in contacting underlying relation of the horizontal edge portion when in a vertically upward position, and
      does not extend in underlying relation of the horizontal edge portion when in a vertically downward position,
  at least one controller, wherein the controller is in operative connection with each of
    the pallet hoist,
    the sheet leveler,
    the at least one sweep bar,
    the take away conveyor,
    the pick head, and
    the dunnage tray,
  wherein the at least one controller is operative to cause
    the at least one grab member of the pick head to engage a dunnage sheet overlying a top layer of containers that are in operatively supported connection with the pallet,
    while the at least one grab member is engaged with the dunnage sheet,
      the pick head to move vertically to cause the engaged dunnage sheet to be disposed vertically away from the top layer,
      the dunnage tray and the pick head to each move horizontally wherein the dunnage storage area is in underlying relation of the engaged dunnage sheet, and
      the at least one grab member of the pick head to release the dunnage sheet into the dunnage storage area,
    the sheet leveler to move the plurality of fingers from the downward position to the upward position, wherein the fingers engage and selectively vertically position the horizontal edge portion prior to the at least one sweep bar causing the top layer containers to be moved horizontally, and
    the at least one sweep bar to cause the top layer containers to be moved horizontally into engagement with the take away conveyor.

9. The apparatus according to claim 8
wherein prior to separation of any of the layers from operatively supported connection with the pallet, a top frame extends vertically above an uppermost dunnage sheet, wherein the uppermost dunnage sheet extends vertically above an uppermost layer of containers in operatively supported connection with the pallet,
wherein the pick head further includes
  at least one top frame engaging clamp, wherein the at least one top frame engaging clamp is releasably engageable with the top frame,
wherein the at least one controller is further operative to cause
  prior to engagement of the uppermost dunnage sheet with the at least one grab member,
    the at least one frame engaging clamp to engage the top frame, and
    the pick head to move the engaged top frame vertically away from the uppermost dunnage sheet,
  and thereafter with the top frame in engagement with the at least one frame engaging clamp,
    the at least one grab member to engage the uppermost dunnage sheet,
    the pick head to move the engaged uppermost dunnage sheet vertically away from the uppermost layer,
    each of the dunnage tray and the pick head to move horizontally so the dunnage storage area is in underlying relation of the engaged uppermost dunnage sheet, and
    the at least one grab member to release the uppermost dunnage sheet into the dunnage storage area.

10. The apparatus according to claim 8
wherein prior to separation of any of the layers from operatively supported connection with the pallet, a top frame extends vertically above an uppermost dunnage sheet, wherein the uppermost dunnage sheet extends vertically above an uppermost layer of containers in operatively supported connection with the pallet, wherein the pick head further includes at least one top frame engaging clamp, wherein each at least one top frame engaging clamp is releasably engageable with a vertically extending side surface of the top frame, at least one top frame retainer clip, wherein each at least one top frame retainer clip is releasably engageable with a horizontally extending lower surface of the top frame, wherein the lower surface of the top frame is vertically lower than the side surface of the top frame, wherein the at least one controller is further operative to cause prior to engagement of the uppermost dunnage sheet with the at least one grab member, the at least one frame engaging clamp to engage the side surface of the top frame, and the pick head to move the side surface engaged top frame vertically away from the uppermost dunnage sheet, and thereafter with the top frame in operative engagement with the pick head, the at least one grab member to engage the uppermost dunnage sheet, the pick head to move the engaged uppermost dunnage sheet vertically away from the uppermost layer, each of the dunnage tray and the pick head to move horizontally so the dunnage storage area is in underlying relation of the engaged uppermost dunnage sheet, and the at least one grab member to release the uppermost dunnage sheet into the dunnage storage area, each at least one top frame retainer clip to engage the lower surface of the top frame and each frame engaging clamp to release the side surface of the top frame, the at least one sweep bar to cause the uppermost layer of containers to be moved to the take away conveyor, thereafter the at least one grab member of the pick head to engage a current top dunnage sheet overlying a current top layer of containers that are in operatively supported connection with the pallet while the top frame is held engaged with the pick head by top frame lower surface engagement with the at least one top frame retainer clip, thereafter the pick head to move the current top dunnage sheet vertically away from the current top layer of containers, each of the dunnage tray and the pick head to move horizontally, wherein the dunnage storage area is in underlying relation of the engaged current top dunnage sheet, thereafter the at least one grab member of the pick head to release the current top dunnage sheet into the dunnage storage area.

11. The apparatus according to claim 8 wherein prior to separation of any of the layers from operatively supported connection with the pallet, a top frame extends vertically above an uppermost dunnage sheet, wherein the at least one controller is further operative to cause the pick head, the at least one sweep bar, the dunnage tray and the pallet hoist to operate to cause each layer of containers to be sequentially moved into engagement with the take away conveyor and each dunnage sheet to be engaged with the pick head and released into the dunnage storage area, and thereafter the dunnage storage tray to move horizontally into overlying relation of the pallet, the dunnage sheets in the dunnage storage area to be moved into operatively supported relation with the pallet, the top frame to be placed on top of the dunnage sheets that are in supported relation with the pallet, and the pallet hoist to then vertically lower the pallet with the dunnage sheets and the top frame above the dunnage sheets, in operatively supported relation therewith.

12. The apparatus according to claim 8 wherein the machine further includes a dunnage separation station, wherein the dunnage separation station is in operative connection with the at least one controller, at least one pallet conveyor, wherein the at least one pallet conveyor is in operative connection with the at least one controller, is configured to move a pallet into engagement with the pallet hoist, and a pallet in engagement with the pallet hoist into operative engagement with the dunnage separation station, wherein prior to separation of any of the layers from operatively supported connection with the pallet, a top frame extends vertically above an uppermost dunnage sheet, wherein the uppermost dunnage sheet extends vertically above an uppermost layer of containers in operatively supported connection with the pallet, wherein the pick head further includes at least one top frame retainer clip, wherein the at least one top frame retainer clip is releasably engageable with the top frame, wherein the at least one controller is further operative to cause the top frame to be engaged with the at least one frame retainer clip, with the top frame engaged with the at least one top frame retainer clip, the pick head, the at least one sweep bar, the dunnage tray and the pallet hoist to operate to cause each layer of containers to be sequentially moved into engagement with the take away conveyor and each dunnage sheet to be engaged with the pick head and released into the dunnage storage area, and thereafter the top frame to be released from the at least one top frame retainer clip into the dunnage storage area, the dunnage storage tray to move horizontally into overlying relation of the pallet, the dunnage sheets and the top frame in the dunnage storage area to be moved into operatively supported relation with the pallet with the top frame above all the dunnage sheets, and the pallet hoist to then vertically lower the pallet with the dunnage sheets and the top frame above all the dunnage sheets in operatively supported relation pallet, wherein the pallet is lowered into engagement with the at least one pallet conveyor, then the pallet with the dunnage sheets and the top frame above all the dunnage sheets to be moved responsive to the at least one pallet conveyor into operative connection with the dunnage separation station.

13. The apparatus according to claim 8
wherein the pick head is vertically and horizontally movable in horizontally intermediate relation of and in operatively engaged relation with a pair of horizontally disposed selectively movable pick head chains, and
wherein the dunnage tray is horizontally movable in horizontally intermediate relation of and in operatively engaged relation with a pair of horizontally disposed selectively movable dunnage chains.

14. The apparatus according to claim 8
wherein the machine further includes
a pair of sweep bars,
two independently movable sweep bar drives,
  wherein each respective sweep bar drive
    is in operative attached connection with a respective sweep bar,
    is in operative connection with the at least one controller,
wherein the at least one controller is operative to cause
  each respective sweep bar drive to cause the respective sweep bar in operatively attached connection therewith to independently cause a respective top layer of containers to be moved horizontally into engagement with the take away conveyor.

15. The apparatus according to claim 8
wherein the sheet leveler
  includes an actuator rod that is selectively movable linearly in opposed directions and a brake that continuously applies drag opposing movement caused by the actuator rod,
  wherein each of the plurality of movable fingers
    is in operative connection with the each of the actuator rod and the brake, responsive to the actuator rod and the brake is caused to
      extend horizontally and in contacting vertically underlying relation of the horizontal edge portion when in a vertically upward position, and
      not extend in underlying relation of the horizontal edge portion in a vertically downward position in which the fingers are disposed vertically away from the horizontal edge portion.

16. Apparatus comprising:
a depalletizing machine operative to separate containers from a pallet upon which the containers are operatively supported,
wherein prior to separation the containers are arranged in a plurality of vertically aligned layers each of which layers comprises a plurality of containers positioned in side-by-side relation, and a respective dunnage sheet separates each layer from an immediately adjacent layer,
the machine including
  a pallet hoist, wherein the pallet hoist is selectively operative to selectively vertically position the pallet,
  a take away conveyor, wherein the take away conveyor is configured to receive containers removed from operative supported connection with the pallet,
  a pair of selectively horizontally movable sweep bars, wherein each of the sweep bars is operative to horizontally move a respective top layer of containers relative to a respective supporting immediately underlying dunnage sheet, wherein through such movement the containers in the top layer are engageable with the take away conveyor,
  a pick head, wherein the pick head
    is selectively vertically movable while in overlying relation of the pallet hoist and horizontally movable,
    includes at least one grab member configured to releasably hold a dunnage sheet in engagement with the pick head,
  a dunnage tray, wherein the dunnage tray
    is configured to hold a plurality of dunnage sheets in a dunnage storage area, and
    is selectively horizontally movable between a first position in which the dunnage tray is in vertically overlying relation of the pallet hoist and a second position in which the dunnage tray is not in vertically overlying relation of the pallet hoist,
  two pairs of independently movable sweep bar drive chains,
    wherein each sweep bar drive chain extends in parallel relation to the top layer of containers,
    wherein each sweep bar drive chain of a respective pair is
      positioned on an opposed horizontal side of the pick head and the dunnage tray from the other sweep bar drive chain of the respective pair, and
      continuously horizontally disposed away from each of the pick head and the dunnage tray,
    wherein each respective sweep bar
      is in operatively attached connection with only one respective pair of sweep bar drive chains, and
      extends horizontally intermediate of the sweep bar drive chains of the respective pair,
  at least one controller, wherein the controller is in operative connection with each of
    the pallet hoist,
    each respective pair of sweep bar drive chains,
    the take away conveyor,
    the pick head, and
    the dunnage tray,
  wherein the at least one controller is operative to cause
    the at least one grab member of the pick head to engage a dunnage sheet overlying a top layer of containers that are in operatively supported connection with the pallet,
    while the at least one grab member is engaged with the dunnage sheet,
      the pick head to move vertically to cause the engaged dunnage sheet to be disposed vertically away from the top layer,
      the dunnage tray and the pick head to each move horizontally wherein the dunnage storage area is in underlying relation of the engaged dunnage sheet, and
      the at least one grab member of the pick head to release the dunnage sheet into the dunnage storage area,
    each respective pair of sweep bar drive chains and the respective sweep bar operatively connected thereto, to move independently of the other respective pair of sweep bar drive chains and the other respective sweep bar operatively connected thereto, and
    each respective sweep bar to independently cause a respective top layer of containers to be moved horizontally into engagement with the take away conveyor.

17. The apparatus according to claim 16
wherein prior to separation of any of the layers from operatively supported connection with the pallet, a top frame extends vertically above an uppermost dunnage sheet, wherein the uppermost dunnage sheet extends vertically above an uppermost layer of containers in operatively supported connection with the pallet,
wherein the pick head further includes
at least one top frame engaging clamp, wherein the at least one top frame engaging clamp is releasably engageable with the top frame,
wherein the at least one controller is further operative to cause
prior to engagement of the uppermost dunnage sheet with the at least one grab member, the at least one frame engaging clamp to engage the top frame, and the pick head to move the engaged top frame vertically away from the uppermost dunnage sheet.

18. The apparatus according to claim 16
wherein prior to separation of any of the layers from operatively supported connection with the pallet, a top frame extends vertically above an uppermost dunnage sheet,
wherein the uppermost dunnage sheet extends vertically above an uppermost layer of containers in operatively supported connection with the pallet,
wherein the pick head further includes
at least one top frame retainer clip, wherein the at least one frame retainer clip is releasably engageable with a lower surface of the top frame,
wherein the at least one controller is further operative to cause
the top frame to be engaged with the at least one frame retainer clip,
and thereafter
the pick head, the at least one sweep bar, the dunnage tray and the pallet hoist to operate to cause each layer of containers to be sequentially moved into engagement with the take away conveyor and each dunnage sheet to be engaged with the pick head and released into the dunnage storage area,
and thereafter
the top frame to be released from the at least one frame retainer clip into the dunnage storage area,
the dunnage storage tray to move horizontally into overlying relation of the pallet,
the dunnage sheets and the top frame in the dunnage storage area to be moved into operatively supported relation with the pallet with the top frame above all the dunnage sheets, and
the pallet hoist to then vertically lower the pallet with the dunnage sheets and the top frame above all the dunnage sheets in operatively supported relation with the pallet.

19. The apparatus according to claim 16
wherein the machine further includes a dunnage separation station including a robot,
wherein the dunnage separation station is in operative connection with the at least one controller,
at least one pallet conveyor, wherein the at least one pallet conveyor
is in operative connection with the at least one controller,
is configured to move
a pallet into engagement with the pallet hoist,
and a pallet in engagement with the pallet hoist into operative engagement with the dunnage separation station,
wherein prior to separation of any of the layers from operatively supported connection with the pallet, a top frame extends vertically above an uppermost dunnage sheet, wherein the uppermost dunnage sheet extends vertically above an uppermost layer of containers in operatively supported connection with the pallet,
wherein the pick head further includes
at least one top frame retainer clip, wherein the at least one top frame retainer clip is releasably engageable with the top frame,
wherein the at least one controller is further operative to cause
the top frame to be engaged with the at least one top frame retainer clip,
with the top frame engaged with the at least one top frame retainer clip, the pick head, the at least one sweep bar, the dunnage tray and the pallet hoist to operate to cause each layer of containers to be sequentially moved into engagement with the take away conveyor and each dunnage sheet to be engaged with the pick head and released into the dunnage storage area,
and thereafter
the top frame to be released from the at least one top dunnage frame retainer clip into the dunnage storage area,
the dunnage storage tray to move horizontally into overlying relation of the pallet,
the dunnage sheets and the top frame in the dunnage storage area to be moved into operatively supported relation with the pallet with the top frame above all the dunnage sheets, and
the pallet hoist to then vertically lower the pallet with the dunnage sheets and the top frame above all the dunnage sheets in operatively supported relation with the pallet, wherein the pallet lowered into engagement with the at least one pallet conveyor,
then thereafter the pallet with the dunnage sheets and the top frame above all the dunnage sheets to be moved responsive to the at least one pallet conveyor into operative connection with the dunnage separation station,
wherein in the dunnage separation station the robot operates to separate and place the dunnage sheets, the top frame and the pallet in respective separate storage areas.

* * * * *